US010705643B2

United States Patent
Rosenberg et al.

(10) Patent No.: US 10,705,643 B2
(45) Date of Patent: *Jul. 7, 2020

(54) TACTILE TOUCH SENSOR SYSTEM AND METHOD

(71) Applicant: Sensel, Inc., Mountain View, CA (US)

(72) Inventors: Ilya Daniel Rosenberg, Mountain View, CA (US); John Aaron Zarraga, San Francisco, CA (US)

(73) Assignee: Sensel, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,230

(22) Filed: Jan. 28, 2019

(65) Prior Publication Data

US 2019/0171325 A1 Jun. 6, 2019

Related U.S. Application Data

(63) Continuation of application No. 15/875,625, filed on Jan. 19, 2018, now Pat. No. 10,338,722, which is a
(Continued)

(51) Int. Cl.
*G06F 3/041* (2006.01)
*G06F 3/044* (2006.01)
(Continued)

(52) U.S. Cl.
CPC ............ *G06F 3/0414* (2013.01); *G06F 3/016* (2013.01); *G06F 3/042* (2013.01); *G06F 3/044* (2013.01);
(Continued)

(58) Field of Classification Search
CPC . G06F 2203/04102; G06F 2203/04103; G06F 2203/04104; G06F 2203/04106;
(Continued)

(56) References Cited

U.S. PATENT DOCUMENTS

| 152,726 A | 7/1874 | Cramer |
| 276,682 A | 5/1883 | Guernsey |

(Continued)

FOREIGN PATENT DOCUMENTS

| CN | 101632057 A | 1/2010 |
| CN | 102460357 A | 5/2012 |

(Continued)

OTHER PUBLICATIONS

Non-Final Office Action received for U.S. Appl. No. 16/456,248 dated Jul. 25, 2019, 25 pages.
(Continued)

*Primary Examiner* — Dmitriy Bolotin
(74) *Attorney, Agent, or Firm* — Amin, Turocy & Watson, LLP

(57) ABSTRACT

A tactile touch sensor (TTS) system and method allowing physical augmentation of a high-resolution touch sensor array (TSA) is disclosed. Physical augmentation is accomplished using a TSA physical overlay (TPO) placed on top of the TSA. The TPO is constructed to transmit forces to the underlying TSA. Force transmission is accomplished by either using a flexible overlay or with a rigid mechanical overlay that transmits user forces exerted on the overlay to the underlying TSA. Incorporation of TPO identifiers (TPI) within the TPO permits identification of the TPO by a TPO detector (TPD) allowing operational characteristics of the TSA to be automatically reconfigured to conform to the currently applied TPO structure by a user computing device (UCD). The UCD may be configured to automatically load an appropriate application software driver (ASD) in response to a TPI read by the TPD from the currently applied TPO.

20 Claims, 128 Drawing Sheets

Related U.S. Application Data continuation of application No. 14/751,076, filed on Jun. 25, 2015, now Pat. No. 10,013,092, which is a continuation-in-part of application No. 14/314,662, filed on Jun. 25, 2014, now Pat. No. 9,001,082, and a continuation-in-part of application No. 14/498,478, filed on Sep. 26, 2014, now Pat. No. 9,582,098, and a continuation-in-part of application No. 14/499,001, filed on Sep. 26, 2014, now Pat. No. 9,465,477, and a continuation-in-part of application No. 14/499,090, filed on Sep. 27, 2014, now Pat. No. 9,459,746.

(60) Provisional application No. 62/025,589, filed on Jul. 17, 2014, provisional application No. 61/883,597, filed on Sep. 27, 2013, provisional application No. 61/928,269, filed on Jan. 16, 2014.

(51) Int. Cl.
*G06F 3/01* (2006.01)
*G06F 3/042* (2006.01)

(52) U.S. Cl.
CPC ........... *G06F 2203/04102* (2013.01); *G06F 2203/04103* (2013.01); *G06F 2203/04104* (2013.01); *G06F 2203/04106* (2013.01)

(58) Field of Classification Search
CPC ........ G06F 3/016; G06F 3/0414; G06F 3/042; G06F 3/044
See application file for complete search history.

(56) References Cited

U.S. PATENT DOCUMENTS

| | | |
|---|---|---|
| D173,309 S | 10/1954 | Johston |
| D244,317 S | 5/1977 | Russell et al. |
| D244,717 S | 6/1977 | Schneider et al. |
| D259,229 S | 5/1981 | Lady |
| 4,374,384 A | 2/1983 | Moates |
| D270,917 S | 10/1983 | Peterson et al. |
| 4,555,693 A | 11/1985 | Danish et al. |
| 4,856,993 A | 8/1989 | Maness et al. |
| D303,788 S | 10/1989 | Kondoh et al. |
| D313,409 S | 1/1991 | Chowdhree et al. |
| D328,915 S | 8/1992 | Sato |
| D333,125 S | 2/1993 | Komada et al. |
| D353,369 S | 12/1994 | Leibengood |
| D355,924 S | 2/1995 | Slater |
| D359,036 S | 6/1995 | Mandel |
| 5,463,388 A | 10/1995 | Boie et al. |
| 5,505,072 A | 4/1996 | Oreper |
| 5,543,588 A | 8/1996 | Bisset et al. |
| D377,789 S | 2/1997 | Wang et al. |
| D378,211 S | 2/1997 | Kuo |
| D385,857 S | 11/1997 | Cohen et al. |
| D388,065 S | 12/1997 | Kawauchi et al. |
| D390,211 S | 2/1998 | Yates et al. |
| 5,719,597 A | 2/1998 | Fong |
| 5,756,904 A | 5/1998 | Oreper et al. |
| 5,844,506 A | 12/1998 | Binstead |
| D405,771 S | 2/1999 | Nachinson et al. |
| 5,905,209 A | 5/1999 | Oreper |
| D413,877 S | 9/1999 | Renk |
| D432,137 S | 10/2000 | Holtzman et al. |
| D432,506 S | 10/2000 | Noguchi et al. |
| D435,186 S | 12/2000 | Fulkerson |
| D435,668 S | 12/2000 | Couey |
| D442,590 S | 5/2001 | Ledbetter et al. |
| D444,460 S | 7/2001 | Kitazawa et al. |
| 6,258,444 B1 | 7/2001 | Muramoto |
| 6,259,044 B1 * | 7/2001 | Paratore .............. G06F 3/04886 200/310 |
| D446,982 S | 8/2001 | Block |
| D451,505 S | 12/2001 | Iseki et al. |
| D464,988 S | 10/2002 | Edwards et al. |
| 6,507,338 B1 * | 1/2003 | Liao .................... G06F 3/03547 345/156 |
| D475,050 S | 5/2003 | Klein |
| 6,597,347 B1 | 7/2003 | Yasutake |
| D478,089 S | 8/2003 | Yokota |
| 6,661,407 B2 * | 12/2003 | Severson ............. G06F 1/1607 345/173 |
| 6,694,826 B2 | 2/2004 | Kiribayashi et al. |
| 6,714,213 B1 | 3/2004 | Lithicum et al. |
| D490,837 S | 6/2004 | Chang |
| D504,889 S | 5/2005 | Andre et al. |
| D506,195 S | 7/2005 | Leveridge et al. |
| D508,180 S | 8/2005 | Sneed |
| D513,616 S | 1/2006 | Glassman |
| D519,997 S | 5/2006 | Hirota |
| D525,262 S | 7/2006 | Boswell et al. |
| D525,621 S | 7/2006 | Hirota |
| 7,215,323 B2 | 5/2007 | Gombert et al. |
| D550,226 S | 9/2007 | Rogers |
| D550,678 S | 9/2007 | O'Neil |
| D555,640 S | 11/2007 | Amiya |
| D569,415 S | 5/2008 | Shigeru |
| D576,177 S | 9/2008 | Asanuma et al. |
| 7,499,036 B2 | 3/2009 | Flowers |
| D589,961 S | 4/2009 | Hackenberg et al. |
| D602,022 S | 10/2009 | Heck et al. |
| D604,300 S | 11/2009 | Andre et al. |
| 7,659,885 B2 * | 2/2010 | Kraus .................... B41J 5/102 345/168 |
| D616,886 S | 6/2010 | Andre et al. |
| D625,727 S | 10/2010 | Crisp et al. |
| D625,728 S | 10/2010 | Crisp et al. |
| D629,400 S | 12/2010 | Harper |
| D629,401 S | 12/2010 | Crisp et al. |
| D629,402 S | 12/2010 | Crisp et al. |
| D631,047 S | 1/2011 | Hirota |
| D631,469 S | 1/2011 | Demskie et al. |
| D631,894 S | 2/2011 | Chun et al. |
| D636,013 S | 4/2011 | Shin et al. |
| 7,926,365 B2 | 4/2011 | Yeh et al. |
| D639,810 S | 6/2011 | Hwang et al. |
| D642,160 S | 7/2011 | Roberts |
| D642,174 S | 7/2011 | Hirota |
| D642,562 S | 8/2011 | Kato |
| 8,036,846 B1 | 10/2011 | Vullaganti |
| D648,723 S | 11/2011 | Harper et al. |
| D648,727 S | 11/2011 | Van Den Nieuwenhuizen et al. |
| D652,837 S | 1/2012 | Kawasaki |
| D652,838 S | 1/2012 | Kawasaki |
| D664,144 S | 7/2012 | Akana et al. |
| D666,618 S | 9/2012 | Doyea et al. |
| D667,404 S | 9/2012 | Akana et al. |
| D668,708 S | 10/2012 | Park et al. |
| 8,416,213 B2 | 4/2013 | Shen et al. |
| D684,157 S | 7/2013 | Chan et al. |
| D686,630 S | 7/2013 | Ehrlich |
| 8,482,540 B1 * | 7/2013 | Reeves ................ G06F 1/1662 345/156 |
| D689,492 S | 9/2013 | Halsinger et al. |
| D689,496 S | 9/2013 | Park et al. |
| D689,497 S | 9/2013 | Park et al. |
| D695,743 S | 12/2013 | Akana et al. |
| D695,750 S | 12/2013 | Ehrlich |
| D701,570 S | 3/2014 | Fletcher et al. |
| D702,235 S | 4/2014 | Jonsson et al. |
| D702,579 S | 4/2014 | Lee et al. |
| D705,108 S | 5/2014 | Lee et al. |
| 8,766,925 B2 | 7/2014 | Perlin |
| D715,291 S | 10/2014 | Cacioppo et al. |
| D716,302 S | 10/2014 | Delgado |
| 8,868,373 B2 | 10/2014 | Eng et al. |
| D718,308 S | 11/2014 | Nishizawa |
| 8,878,823 B1 * | 11/2014 | Kremin ............... G06F 3/03545 345/179 |
| D721,375 S | 1/2015 | Choi et al. |
| D722,043 S | 2/2015 | Requa |
| D726,724 S | 4/2015 | Wahlqvist et al. |
| 9,001,082 B1 | 4/2015 | Rosenberg et al. |

(56) References Cited

U.S. PATENT DOCUMENTS

| | | | |
|---|---|---|---|
| D730,915 S | 6/2015 | Lee et al. | |
| D732,526 S | 6/2015 | Ferren et al. | |
| D732,533 S | 6/2015 | Hirota | |
| D735,196 S | 7/2015 | Son | |
| D744,484 S | 12/2015 | Huebner | |
| D745,521 S | 12/2015 | Jiang et al. | |
| D747,769 S | 1/2016 | Sarkis | |
| D747,991 S | 1/2016 | Lee et al. | |
| D748,630 S | 2/2016 | Helwig et al. | |
| D753,223 S | 4/2016 | Chin | |
| D754,008 S | 4/2016 | Huebner | |
| D754,245 S | 4/2016 | Wampold | |
| D762,215 S | 7/2016 | Luttrell | |
| 9,459,746 B2 | 10/2016 | Rosenberg et al. | |
| 9,465,477 B2 | 10/2016 | Rosenberg et al. | |
| D773,456 S | 12/2016 | Mitchell | |
| D776,190 S | 1/2017 | Kimura et al. | |
| D778,342 S | 2/2017 | Washio | |
| 9,582,098 B2 | 2/2017 | Rosenberg et al. | |
| D786,238 S | 5/2017 | Roberts | |
| D786,254 S | 5/2017 | Yum et al. | |
| 9,746,964 B2 | 8/2017 | Rosenberg et al. | |
| D802,599 S | 11/2017 | Magargee et al. | |
| 2001/0045941 A1 | 11/2001 | Rosenberg et al. | |
| 2002/0011991 A1 | 1/2002 | Iwasaki et al. | |
| 2003/0184528 A1 | 10/2003 | Kawasaki et al. | |
| 2003/0197687 A1* | 10/2003 | Shetter | G06F 3/04886 345/173 |
| 2003/0209604 A1 | 11/2003 | Harrison, Jr. | |
| 2003/0231197 A1 | 12/2003 | Janevski | |
| 2003/0235452 A1* | 12/2003 | Kraus | B41J 5/102 400/472 |
| 2004/0056781 A1* | 3/2004 | Rix | G06F 3/0202 341/20 |
| 2004/0056849 A1* | 3/2004 | Lohbihler | G06F 3/03545 345/173 |
| 2004/0085716 A1* | 5/2004 | Uke | G06F 3/0202 361/679.08 |
| 2006/0181515 A1* | 8/2006 | Fletcher | G06F 3/04886 345/173 |
| 2006/0197750 A1 | 9/2006 | Kerr et al. | |
| 2006/0238518 A1 | 10/2006 | Westerman | |
| 2006/0256090 A1* | 11/2006 | Huppi | A63F 13/02 345/173 |
| 2007/0103454 A1 | 5/2007 | Elias | |
| 2007/0229468 A1 | 10/2007 | Peng et al. | |
| 2007/0234825 A1 | 10/2007 | Loomis | |
| 2007/0235231 A1* | 10/2007 | Loomis | G01L 1/205 178/18.06 |
| 2007/0257890 A1 | 11/2007 | Hotelling | |
| 2008/0059131 A1 | 3/2008 | Tokita et al. | |
| 2008/0158172 A1 | 7/2008 | Hotelling | |
| 2008/0162996 A1 | 7/2008 | Krah | |
| 2008/0211783 A1 | 9/2008 | Hotelling et al. | |
| 2009/0002925 A1 | 1/2009 | Hung et al. | |
| 2009/0256817 A1* | 10/2009 | Perlin | G06F 3/0233 345/174 |
| 2009/0266218 A1 | 10/2009 | Parienti | |
| 2009/0284398 A1 | 11/2009 | Shen et al. | |
| 2009/0322700 A1 | 12/2009 | D'Souza et al. | |
| 2010/0037709 A1 | 2/2010 | Yeh et al. | |
| 2010/0103136 A1 | 4/2010 | Ono et al. | |
| 2010/0188345 A1 | 7/2010 | Keskin et al. | |
| 2010/0214232 A1 | 8/2010 | Chan et al. | |
| 2010/0238119 A1* | 9/2010 | Dubrovsky | G06F 1/1626 345/169 |
| 2010/0242274 A1 | 9/2010 | Rosenfeld et al. | |
| 2010/0277420 A1 | 11/2010 | Charlier et al. | |
| 2010/0300773 A1 | 12/2010 | Cordeiro | |
| 2010/0315102 A1 | 12/2010 | Portmann | |
| 2011/0041098 A1 | 2/2011 | Kajiya et al. | |
| 2011/0050587 A1* | 3/2011 | Natanzon | G06F 3/04842 345/173 |
| 2011/0051343 A1 | 3/2011 | Lee | |
| 2011/0115784 A1 | 5/2011 | Tartz et al. | |
| 2011/0141026 A1 | 6/2011 | Joquet | |
| 2011/0169832 A1 | 7/2011 | Brown et al. | |
| 2011/0283864 A1 | 11/2011 | Mathews | |
| 2011/0291951 A1 | 12/2011 | Tong | |
| 2011/0310002 A1 | 12/2011 | Tidemand et al. | |
| 2012/0062497 A1 | 3/2012 | Rebeschi | |
| 2012/0086659 A1 | 4/2012 | Perlin et al. | |
| 2012/0086666 A1* | 4/2012 | Badaye | G06F 3/044 345/174 |
| 2012/0092285 A1 | 4/2012 | Osborn et al. | |
| 2012/0099264 A1 | 4/2012 | Degner et al. | |
| 2012/0105361 A1 | 5/2012 | Kremin | |
| 2012/0105362 A1* | 5/2012 | Kremin | G06F 3/03545 345/174 |
| 2012/0110447 A1 | 5/2012 | Cheng | |
| 2012/0113047 A1 | 5/2012 | Hanauer et al. | |
| 2012/0242594 A1 | 9/2012 | Matsumoto | |
| 2012/0256870 A1 | 10/2012 | Klein et al. | |
| 2012/0293448 A1 | 11/2012 | Dietz et al. | |
| 2013/0033450 A1 | 2/2013 | Coulson et al. | |
| 2013/0082936 A1 | 4/2013 | Islamkulov | |
| 2013/0082970 A1 | 4/2013 | Frey et al. | |
| 2013/0154938 A1* | 6/2013 | Arthur | G06F 3/041 345/168 |
| 2013/0174715 A1 | 7/2013 | Akiyama | |
| 2014/0071069 A1 | 3/2014 | Anderson et al. | |
| 2014/0104274 A1 | 4/2014 | Hilliges et al. | |
| 2014/0253440 A1 | 9/2014 | Karakotsios et al. | |
| 2014/0306891 A1 | 10/2014 | Latta et al. | |
| 2015/0091820 A1 | 4/2015 | Rosenberg et al. | |
| 2015/0091857 A1 | 4/2015 | Rosenberg et al. | |
| 2015/0091858 A1 | 4/2015 | Rosenberg et al. | |
| 2015/0091859 A1 | 4/2015 | Rosenberg et al. | |
| 2015/0378492 A1 | 12/2015 | Rosenberg et al. | |
| 2016/0026261 A1 | 1/2016 | Cheng et al. | |
| 2016/0253019 A1 | 9/2016 | Geaghan | |
| 2017/0003796 A1 | 1/2017 | Kono | |
| 2017/0329370 A1 | 11/2017 | Han | |
| 2017/0336891 A1 | 11/2017 | Rosenberg et al. | |

FOREIGN PATENT DOCUMENTS

| | | |
|---|---|---|
| CN | 102640097 A | 8/2012 |
| DE | G 93 14 627.2 U1 | 1/1994 |
| DE | 199 62 552 A1 | 7/2001 |
| EP | 2 104 023 A2 | 9/2009 |
| EP | 2 669 767 A2 | 12/2013 |
| JP | S58-90235 A | 5/1983 |
| JP | S61-37536 A | 2/1986 |
| JP | 62-100827 A | 5/1987 |
| JP | S62-130420 A | 6/1987 |
| JP | S63-204374 A | 8/1988 |
| JP | H02-17524 A | 1/1990 |
| JP | H02-53132 A | 2/1990 |
| JP | 3-291714 A | 12/1991 |
| JP | H6-242875 A | 9/1994 |
| JP | 9-511086 A | 11/1997 |
| JP | 2005-530236 A | 10/2005 |
| JP | 2009-531709 A | 9/2009 |
| JP | 2009-282825 A | 12/2009 |
| JP | 2010-272064 A | 12/2010 |
| JP | 2011-242906 A | 12/2011 |
| JP | 2012-003522 A | 1/2012 |
| JP | 4868232 B1 | 2/2012 |
| JP | 2012-530964 A | 12/2012 |
| JP | 2013-037674 A | 2/2013 |
| JP | 2013-143152 A | 7/2013 |
| JP | 2013-529803 A | 7/2013 |
| WO | 99/05492 A1 | 2/1999 |
| WO | 2007/107522 A1 | 9/2007 |
| WO | 2009/031214 A1 | 3/2009 |
| WO | 2010/147692 A1 | 12/2010 |

(56) References Cited

FOREIGN PATENT DOCUMENTS

| WO | 2011/154524 A1 | 12/2011 |
|---|---|---|
| WO | 2012/147634 A1 | 11/2012 |

OTHER PUBLICATIONS

Communication pursuant to Article 94(3) EPC received for EP Patent Application Serial No. 14847403.4 dated Dec. 2, 2019, 8 pages.
Communication pursuant to Article 94(3) EPC received for EP Patent Application Serial No. 14847722.7 dated Dec. 2, 2019, 9 pages.
Communication pursuant to Article 94(3) EPC received for EP Patent Application Serial No. 14849048.5 dated Dec. 2, 2019, 9 pages.
Communication pursuant to Article 94(3) EPC received for EP Patent Application Serial No. 15811995.8 dated Jan. 3, 2020, 7 pages.
Notice of Reasons for Refusal received for Japanese Patent Application Serial No. 2016-575496 dated Sep. 3, 2019, 11 pages (Including English Translation).
Final Office Action dated May 16, 2019 for U.S. Appl. No. 16/127,143, 48 pages.
Non Final Office Action received for U.S. Appl. No. 15/653,856 dated Oct. 19, 2017, 29 pages.
Non Final Office Action received for U.S. Appl. No. 15/271,953 dated Dec. 28, 2016, 57 pages.
Non Final Office Action received for U.S. Appl. No. 14/499,090 dated Feb. 10, 2016, 40 pages.
International Search Report and Written Opinion of the International Searching Authority for International Application No. PCT/US2014/057912 dated Jan. 2, 2015, 8 pages.
International Search Report and Written Opinion of the International Searching Authority for International Application No. PCT/US2014/057911 dated Jan. 2, 2015, 8 pages.
International Search Report and Written Opinion of the International Searching Authority for International Application No. PCT/US2014/057913 dated Jan. 2, 2015, 8 pages.
Non Final Office Action received for U.S. Appl. No. 14/499,001 dated Mar. 10, 2016, 33 pages.
Non Final Office Action received for U.S. Appl. No. 14/314,662 dated Sep. 2, 2014, 33 pages.
Extended European Search Report issued in European Patent application No. 14847403.4, dated May 9, 2017, 8 pages.
Communication pursuant to Rules 70(2) and 70a(2) EPC issued in European Patent application No. 14847403.4, dated May 29, 2017, 1 page.
Extended European Search Report issued in European Patent application No. 14847722.7, dated May 9, 2017, 8 pages.
Communication pursuant to Rules 70(2) and 70a(2) EPC issued in European Patent application No. 14847722.7, dated May 29, 2017, 1 page.
Extended European Search Report issued in European Patent application No. 14849048.5, dated May 9, 2017, 8 pages.
Communication pursuant to Rules 70(2) and 70a(2) EPC issued in European Patent application No. 14849048.5, dated May 29, 2017, 1 page.
Extended European Search Report issued in European Patent application No. 15811995.8, dated Oct. 13, 2017, 11 pages.
Rekimoto, SmartSkin: An Infrastructure for Freehand Manipulation on Interactive Surfaces, CHI, Apr. 20, 2002, Minneapolis, MN, 8 pages.
Communication pursuant to Rules 70(2) and 70a(2) EPC issued in European Patent application No. 15811995.8, dated Nov. 2, 2017, 1 page.
Non Final Office Action received for U.S. Appl. No. 14/498,478 dated Jun. 30, 2016, 71 pages.
Notice of Allowance received for U.S. Appl. No. 15/223,968 dated Aug. 30, 2017, 28 pages.
Notice of Allowance received for U.S. Appl. No. 15/224,003 dated Oct. 18, 2017, 34 pages.
Steinicke et al., Multi-Touching 3D Data: Towards Direct Interaction in Stereoscopic Display Environments coupled Nith Mobile Devices, 2008. [retrieved on Nov. 16, 2016] Retrieved from the internet. <URL: http://lciteseerx.ist.psu.edu/ll'iewdoc/download?doi=1 0 .1.1 .187. 1133&rep 1 &type=pdf>.
Non Final Office received for Action U.S. Appl. No. 14/751,076 dated Jul. 13, 2016, 28 pages.
Final Office Action received for U.S. Appl. No. 14/751,076 dated Jan. 10, 2017, 23 pages.
Non Final Office Action received for U.S. Appl. No. 14/751,076 dated Apr. 18, 2017, 26 pages.
Analog Devices, Inc., CapTouch Programmable Controller for Single-Electrode Capacitance Sensors, Analog Devices, 2009, 71 pages , AD7147A, Inc., www_analog_com.
Atmel, QTouch 12-channel Touch Sensor IC, AT42QT2120, 9634E-AT42, Jun. 2012, 47 pages.
Texas Instruments, DRV5053 Analog-Bipolar Hall Effect Sensor, SLIS153B, May 2014, revised Sep. 2014, 24 pages.
Texas Instruments, LDC1000 Inductance-to-Digital Converter, SNOSCX2B, 2015, Sep. 2013, revised Mar. 2015, 33 pages.
Texas Instruments, LDC1312, LDC1314 Multi-Channel 12-Bit Inductance to Digital Converter {LOG) for Inductive Sensing; SNOSCZO, Dec. 2014, 57 pages.
Toshiba, CMOS Digital Integrated Circuit Silicon Monolithic; TCS2ODLR; Mar. 1, 2014, 7 pages.
International Search Report and Written Opinion of the International Searching Authority for International Application No. PCT/US2015/037831 dated Sep. 23, 2015, 8 pages.
International Search Report and Written Opinion of the International Searching Authority for International Application No. PCT/US2016/044814 dated Dec. 8, 2016, 9 pages.
Non-Final Office Action received for U.S. Appl. No. 15/875,625 dated Mar. 9, 2018, 23 pages.
Final Office Action received for U.S. Appl. No. 15/875,625 dated Jul. 12, 2018, 9 pages.
Notice of Allowance received for U.S. Appl. No. 29/575,547 dated Dec. 14, 2017, 26 pages.
The Maker. senselblog.wordpress.com [online]5 pgs. senselblog. wordpress.com. Posted Jul. 27, 2015 [Retrieved on Nov. 29, 2017]. https://senselblog. wordpress.com/20 15/07/.
Notice of Allowance and accompanying letter containing list of references for Japanese Design Application No. 2017-3843 dated Jun. 21, 2017, 6 pages.
Ex Parte Quayle Action received for Design U.S. Appl. No. 29/575,548 dated Aug. 16, 2017, 8 pages.
Notice of Allowance received for Design U.S. Appl. No. 29/575,554 dated Dec. 22, 2017, 27 pages.
Notice of Allowance and accompanying letter containing list of references for Japanese Design Application No. 2017-3845 dated Jun. 21, 2017, 6 pages.
Search Report received for Chinese Application Serial No. 201480064892.X dated Mar. 6, 2018, 1 page.
First Office Action received for Chinese Application Serial No. 201480065162.1 dated Feb. 27, 2018, 11 pages (including English Translation).
First Office Action received for Chinese Application Serial No. 201480065163.6 dated Feb. 27, 2018, 9 pages (including English Translation).
Decision to Grant a Patent received for Japanese Application No. 2016-545251 dated Jun. 12, 2018, 5 pages. (including English Translation).
Communication pursuant to Rules 161(2) and 162 EPC issued in European Patent application No. 16831440.9, dated Mar. 7, 2018, 3 pages.
Second Office Action received for Chinese Application Serial No. 201480064892 dated Sep. 3, 2018, 09 pages (including English Translation).
Ex Parte Quayle Action received for Design U.S. Appl. No. 29/575,551 dated Mar. 19, 2018, 23 pages.
"Davies, Chris, "Sensel Morph Puts Force Touch-style tech into customizable pad", SlashGear, Aug. 25, 2015, 9 pages. Retrieved on

(56) References Cited

OTHER PUBLICATIONS

Dec. 7, 2017. <URL: https://www.slashgear.com/sensel-morph-puts-force-touch-into-customizable-pad-hands-on-25399140/>".
"Xkey 25-key portable musical keyboard", Amazon, Sep. 27, 2013, 4 pages. Retreived on Dec. 7, 2017. <URL: https://www.amazon.com/Xey-25-Key-Portable-Musical Keyboard/dp/B00DU2VKV8>.
"Akai Professional MPK Mini Keyboard", Amazon, Jan. 24, 2012, 4 pages. Retrieved on Dec. 7, 2017. <URL: https://www.amazon.ca/Akai-Professional-MPK-Ultra-Portable-Controller/dp/B00466HM28>.
Ex Parte Quayle Action received for Design U.S. Appl. No. 29/591,295 dated Jul. 25, 2018, 40 pages.
Takes on Tech, QuNeo Announches Touch Sensor Midi Controller Pad, posted Dec. 13, 2011, [online], [site visited Jul. 18, 2018]. Available from Internet, <URL: https://www.takesontech.com/quneo-announces-touch-sensor-midi-controller-pad> (Year: 2011).
Amazon, Yamaha DD20 Touch-Sensitive Digital Drums, posted Sep. 4, 1999, [online], [site visited Jul. 18, 2018]. Available from Internet, <URL: https://www.amazon.com/exec/obidos/ASIN/B00005M03W/gemotrack9-20/ref=nosim> (Year: 1999).
Walmart, Spectrum Seven-Pad Digital Drums with Drum Stand, reviewed Dec. 27, 2010, [online], [site visited Jul. 18, 2018]. Available from Internet, <URL: https://www.walmart.com/ip/Spectrum-Seven-Pad-Digital-Drums-with-Drum-Stand/15190390> (Year: 2010).
Amazon, PAXCESS Electronic Drum Set, postedMar. 30, 2016, [online], [site visited Jul. 18, 2018]. Available from Internet, <URL: https://www.amazon.com/PAXCESS-Electronic-Practice-Headphone-Playtime/dp/BO 1 DL YXX6E/ref=sr 1_3?ie=UTF8&qid=1531954233&sr=8-3&keywords=PAXCESS> (Year: 2016).
Notice of Allowance and accompanying letter containing list of references dated Jun. 21, 2017 for Japanese Design Application No. 2017-3847 (6 pages).
First Office Action received for Chinese Application Serial No. 201580033673.x dated May 27, 2019, 9 pages (including English Translation).
Partial Supplementary European Search Report received for European Application Serial No. 16831440.9 dated Jan. 29, 2019 8 pages.
Extended European Search Report received for European Application Serial No. 16831440.9 dated May 3, 2019, 13 pages.
"61 Key Electronic Piano Keyboard", TOMTOP, Feb. 26, 2015, 9 pages. Retrieved on Dec. 7, 2017. <URL: https://www.tomtop.com/p-i420.html#flow_review>.
"Endeavor Intros 24-key Midi Controller", Synthtopia, Nov. 2, 2012, 3 pages. Retrieved on Dec. 7, 2017. <URL: http://www.synthtopia.com/content/2012/ 11 /02/endeavor-intros-24-key-evo-advanced-midi-controller/>.
"Piano 24 Keys Vector", Pixabay, Apr. 23, 2014, 3 pages. Retrieved on Dec. 7, 2017. <URL: https://pixabay.com/en/piano-keys-octave-music-keyboard-307653/>.
"Paper Practice Piano Handout", Teachers Pay Teachers, Jul. 27, 2014, 3 pages. Retrieved on Dec. 7, 2017. <URL: https://www.teacherspayteachers.com/Product/Paper-Practice-Piano-Handout-142149>.
"The Pianist: Daniel Reyna", Vimeo, Oct. 2, 2015, 2 pages. Retrieved on Dec. 7, 2017. <URL: https://vimeo.com/141228710>.
"Logitech Wireless Rechargeable Touchpad", Amazon, Sep. 23, 2012, 6 pages. Retrieved on Dec. 7, 2017. <URL: https://www.amazon.com/LOG910003057-Logitech-Wireless-Rechargeable-Touchpad/dp/B0093H4WT6>, 6 pages.
"Mini Monster Piano", Amazon, 3 pages. Retrieved on Dec. 7, 2018. <URL: https://www.amazon.co.uk/Mini-Monster-Piano-Grand-Black/dp/B00GCST1HM>.
Decision to Grant a Patent received for Japanese Application No. 2016-545252 dated Aug. 1, 2018, 6 pages. (including English Translation), 6 pages.
Decision to Grant a Patent received for Japanese Application No. 2016-545253 dated Aug. 1, 2018, 6 pages. (including English Translation), 6 pages.
Office Action dated Dec. 14, 2018 for U.S. Appl. No. 15/827,411, 27 pages.
Office Action dated Oct. 17, 2018 for U.S. Appl. No. 16/127,143, 57 pages.

* cited by examiner

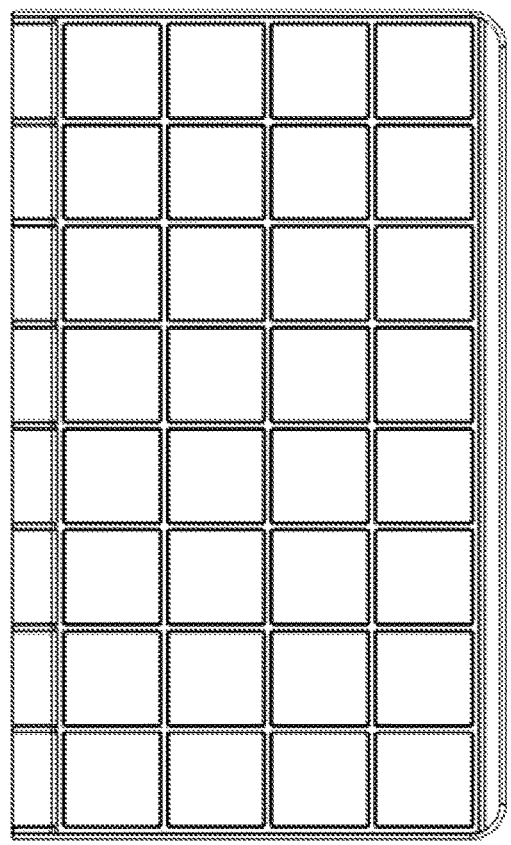
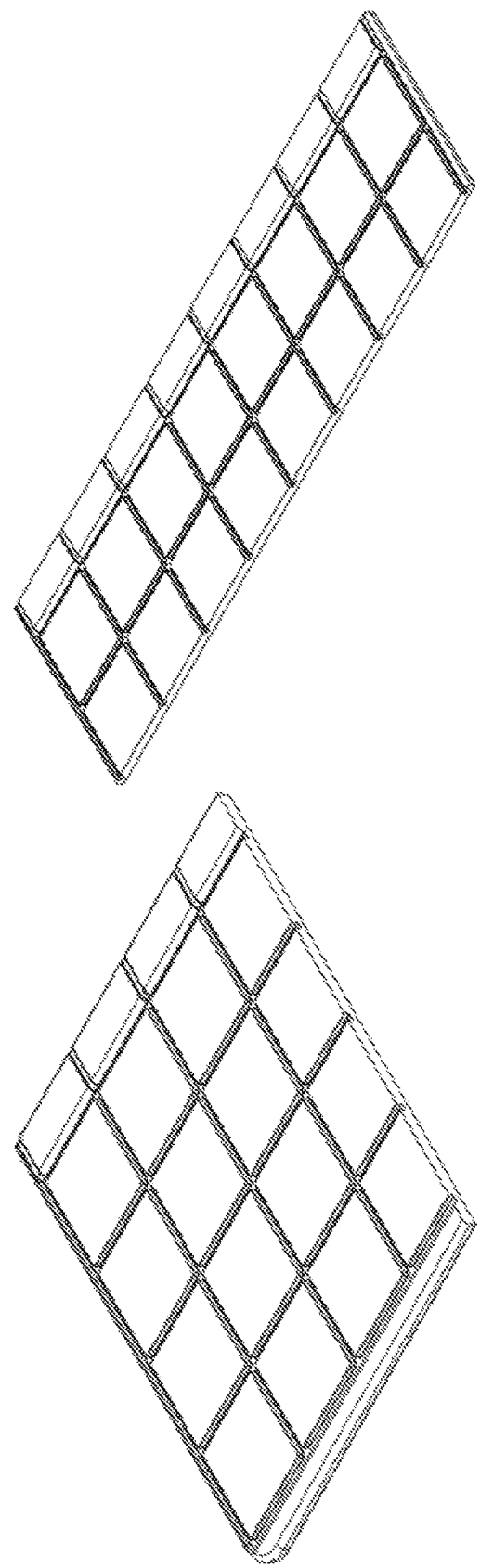
FIG. 30
3000

FIG. 32
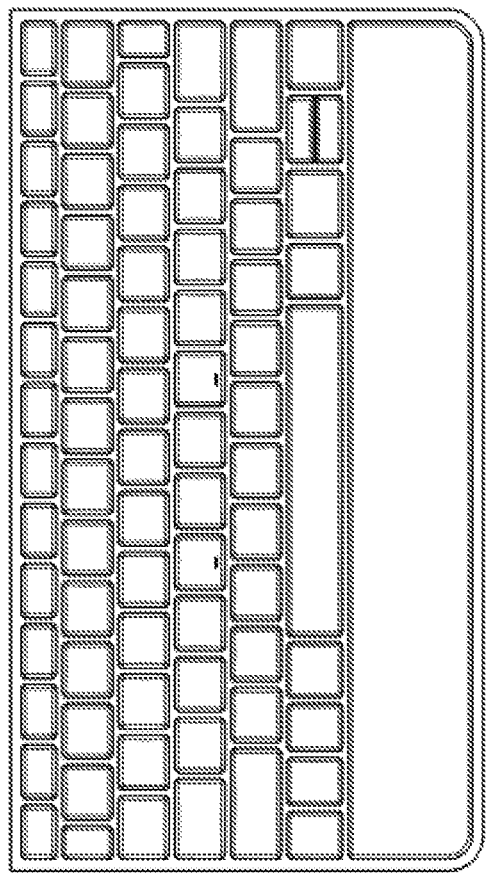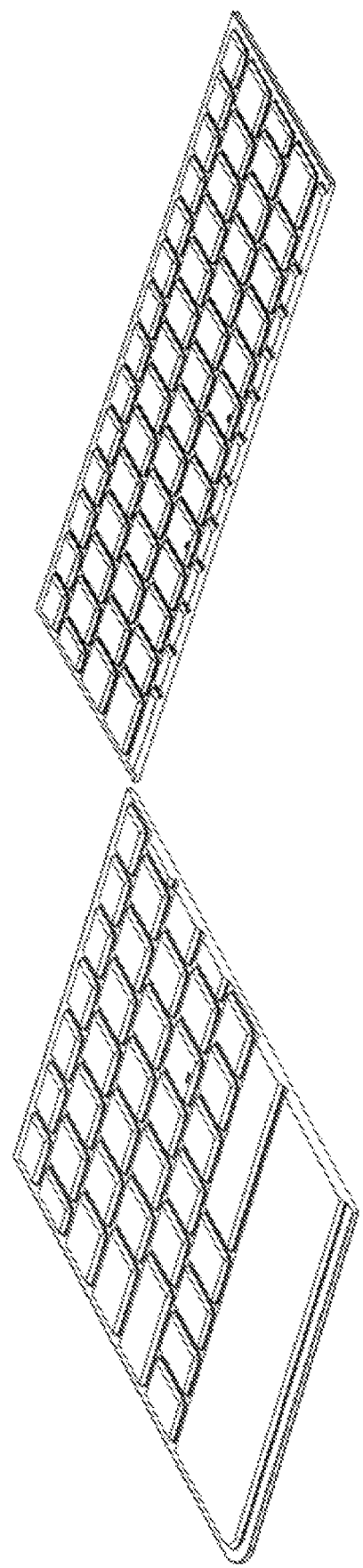

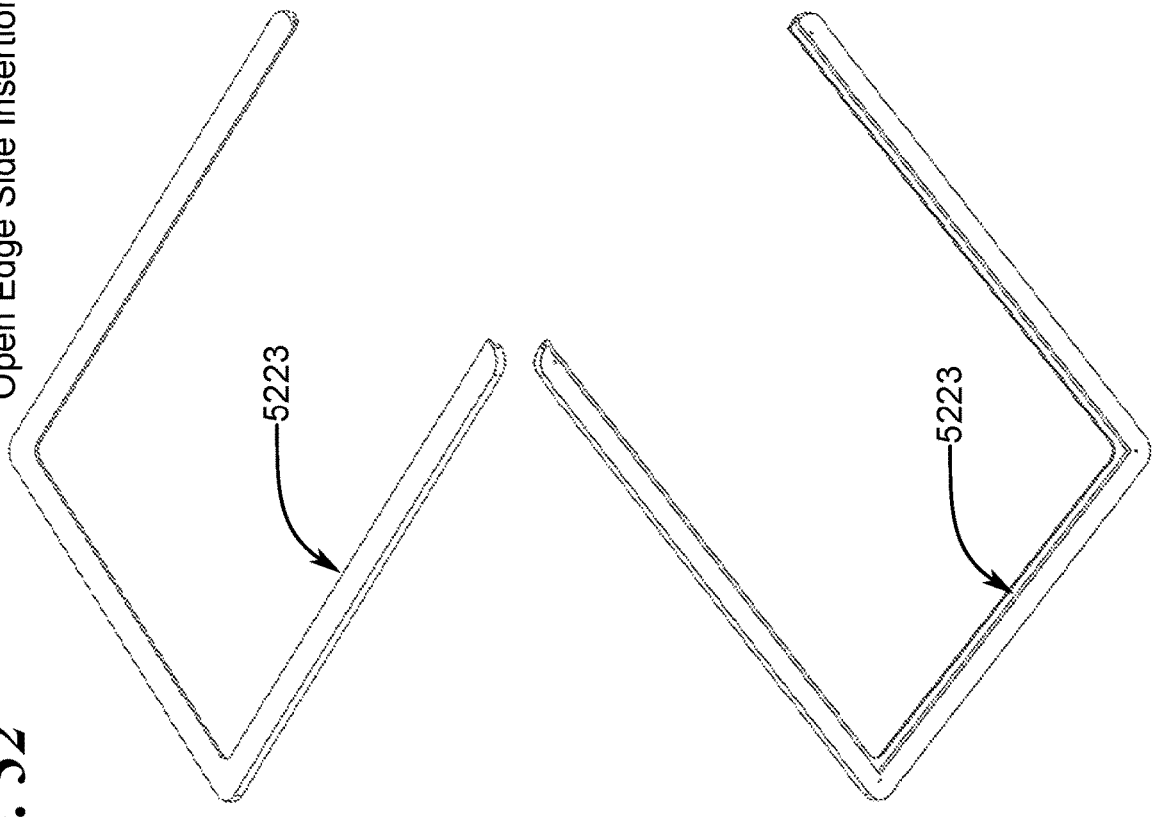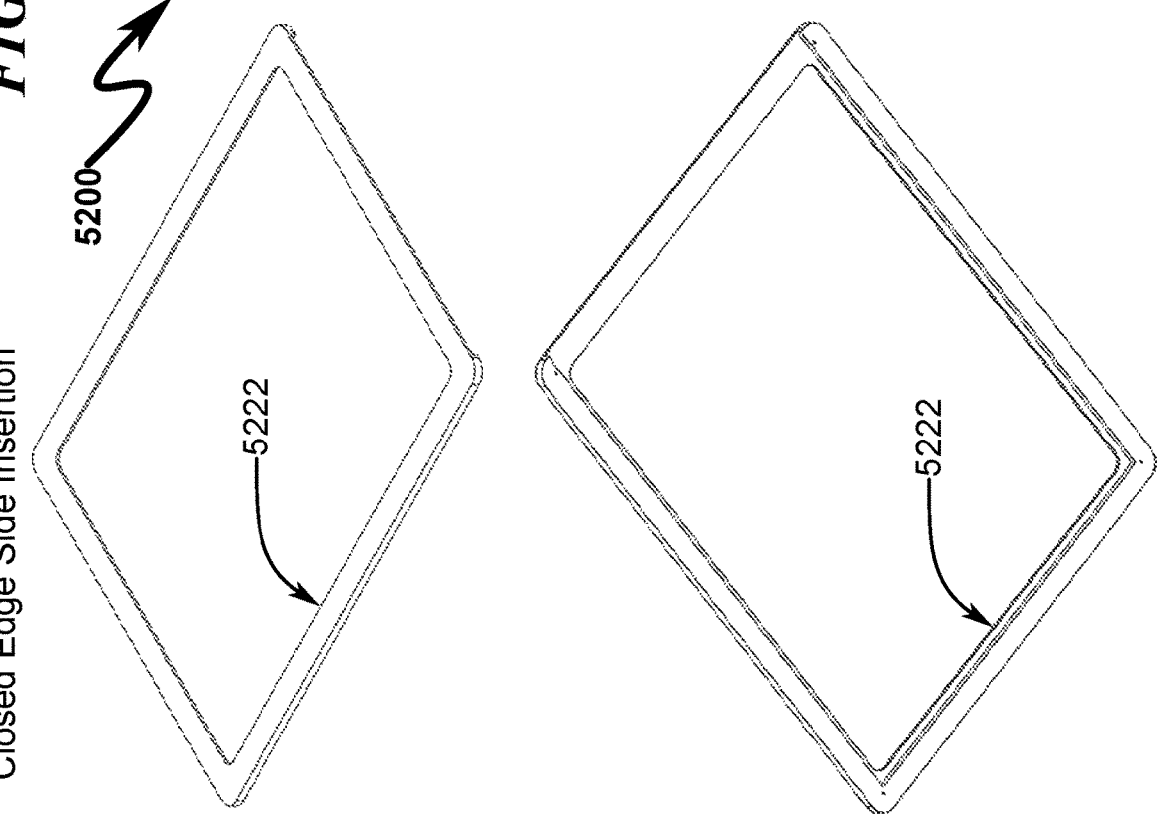
FIG. 52

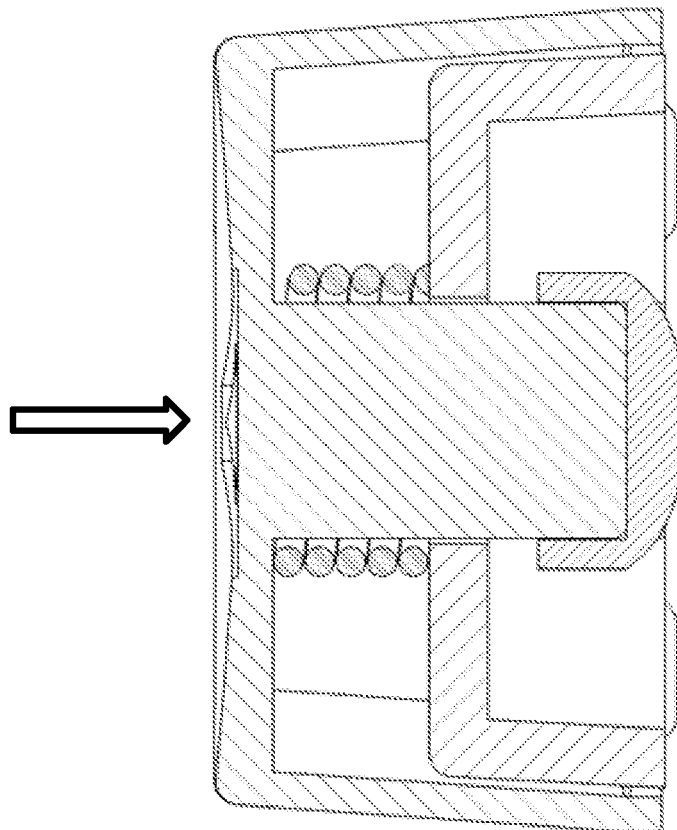
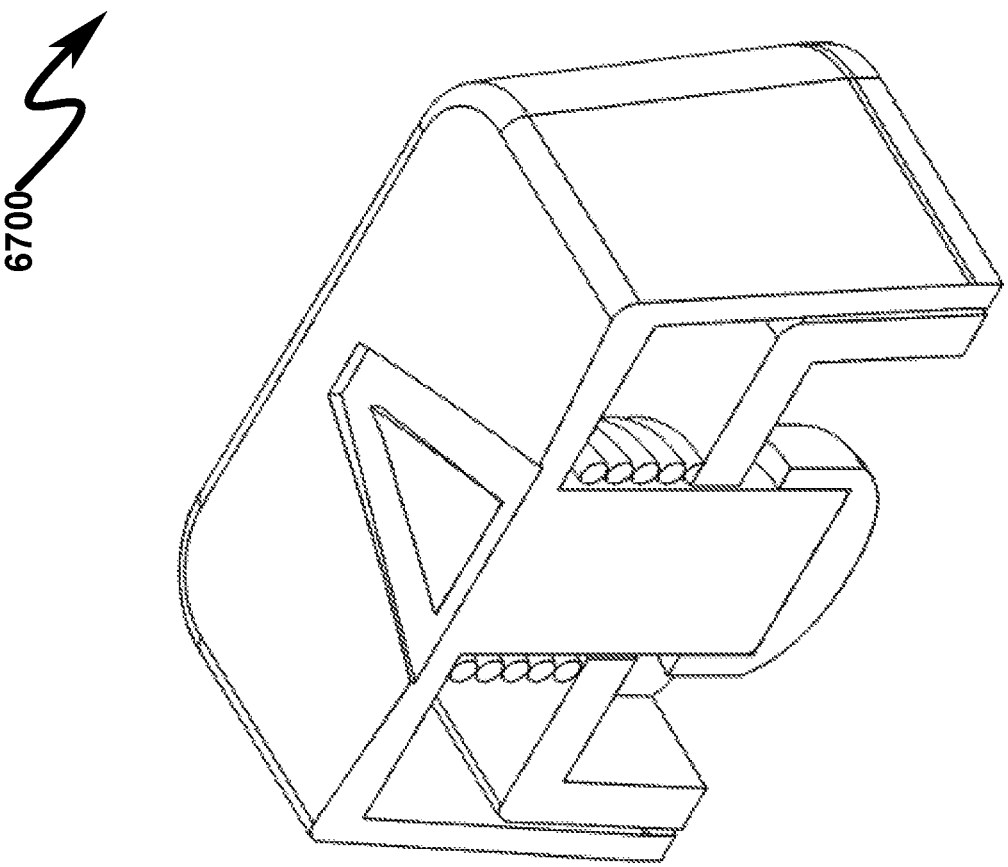
FIG. 67

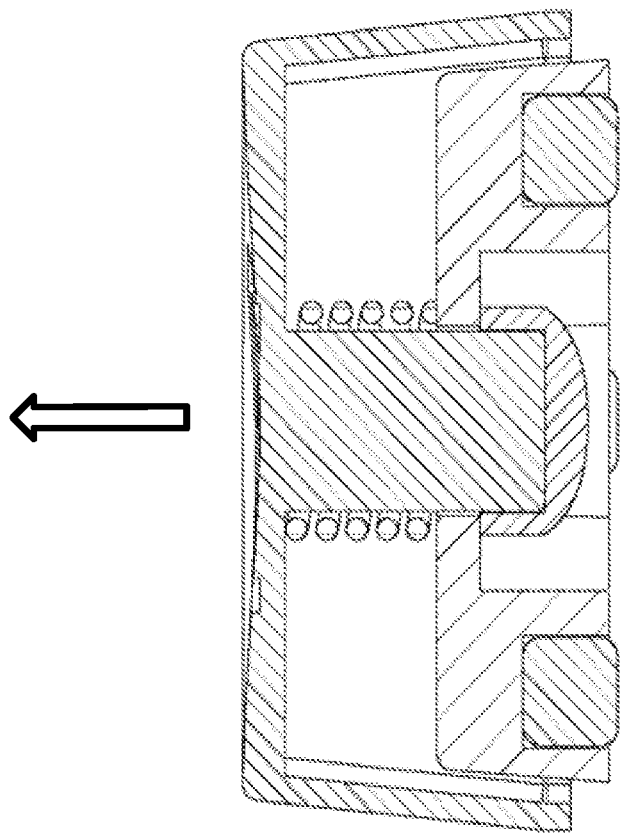
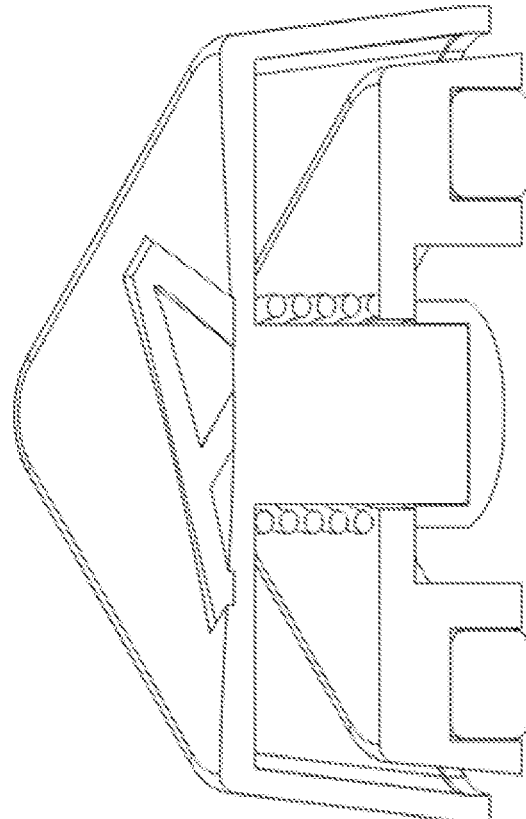
FIG. 68

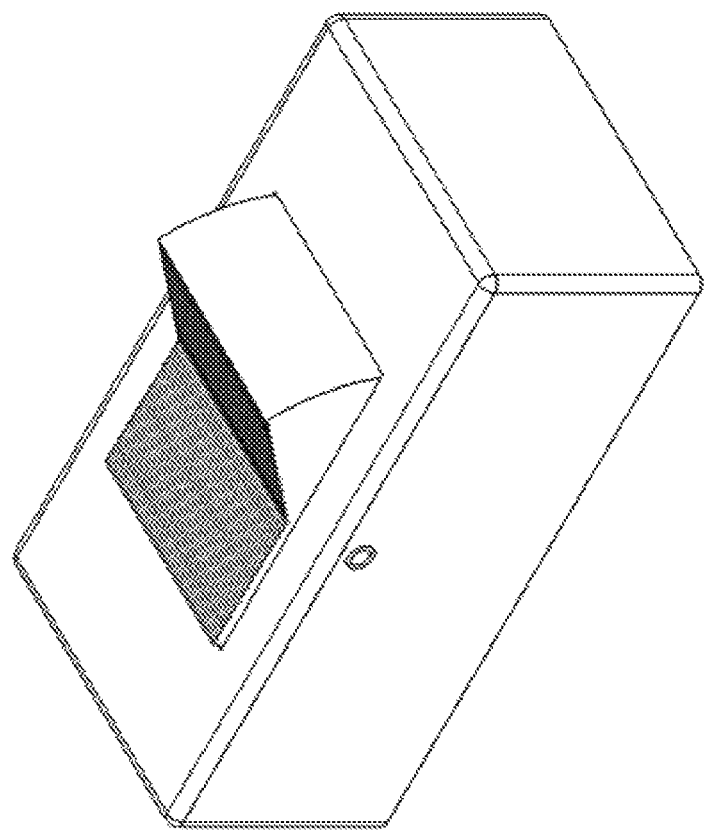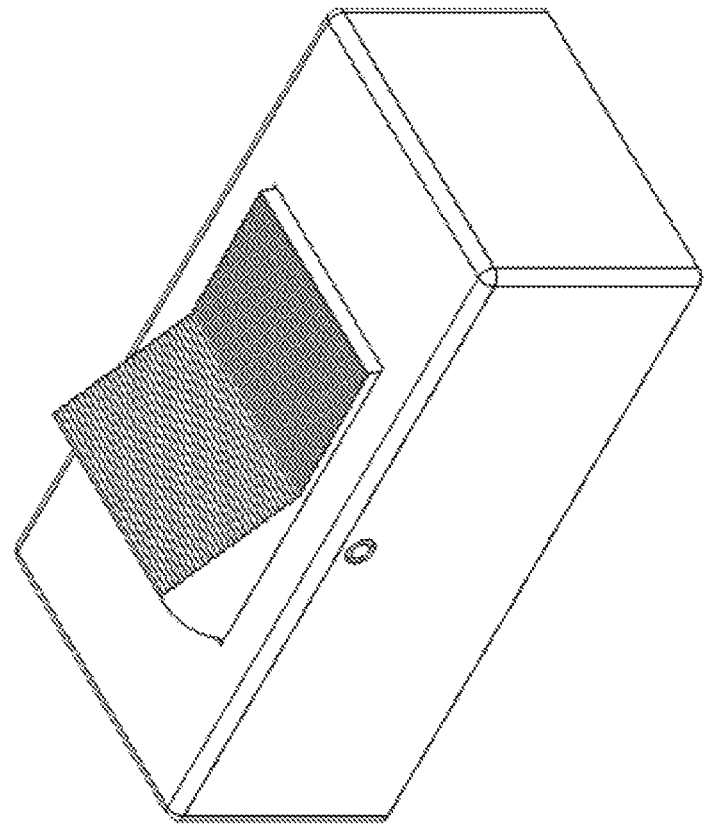
FIG. 69

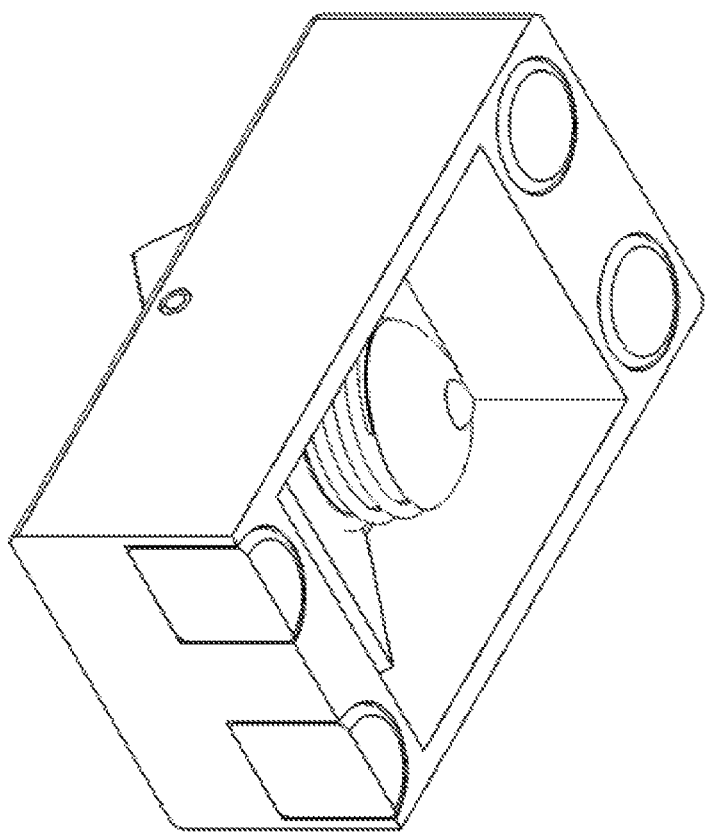
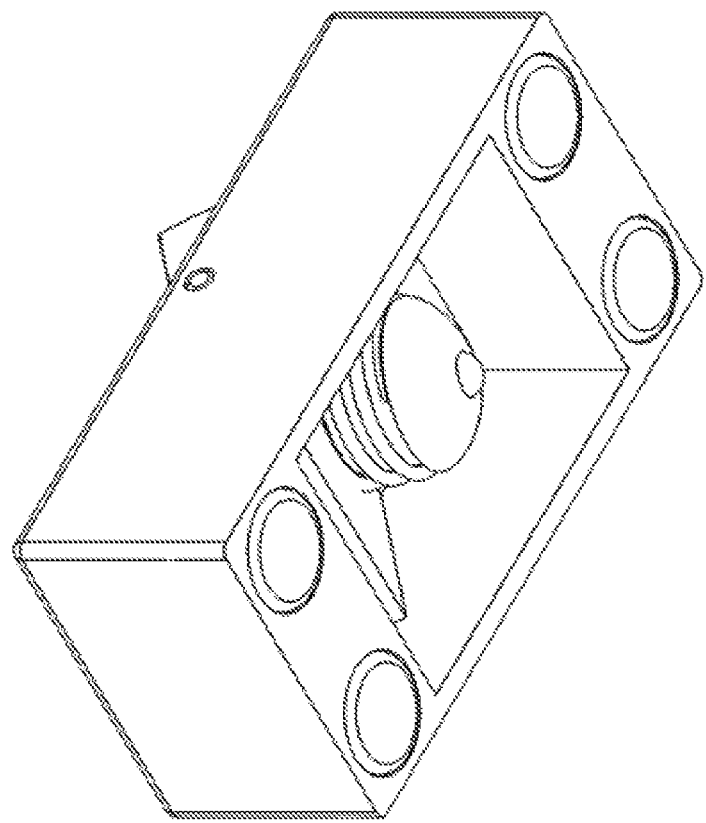
FIG. 70

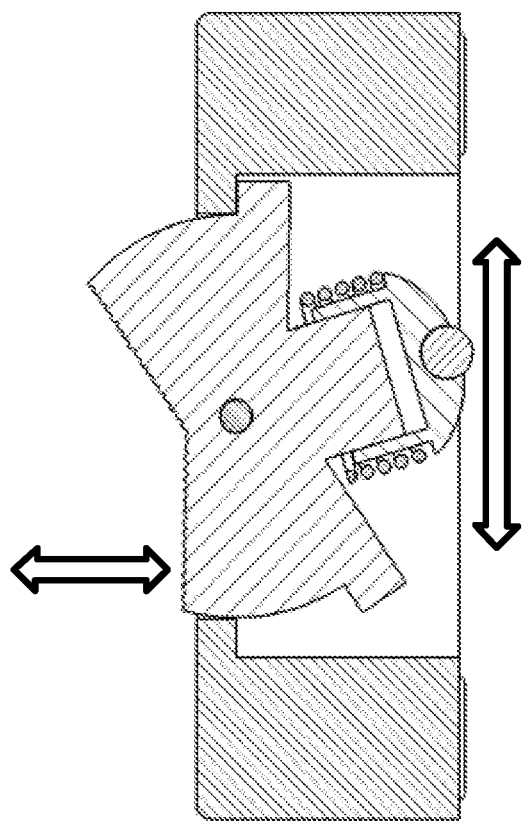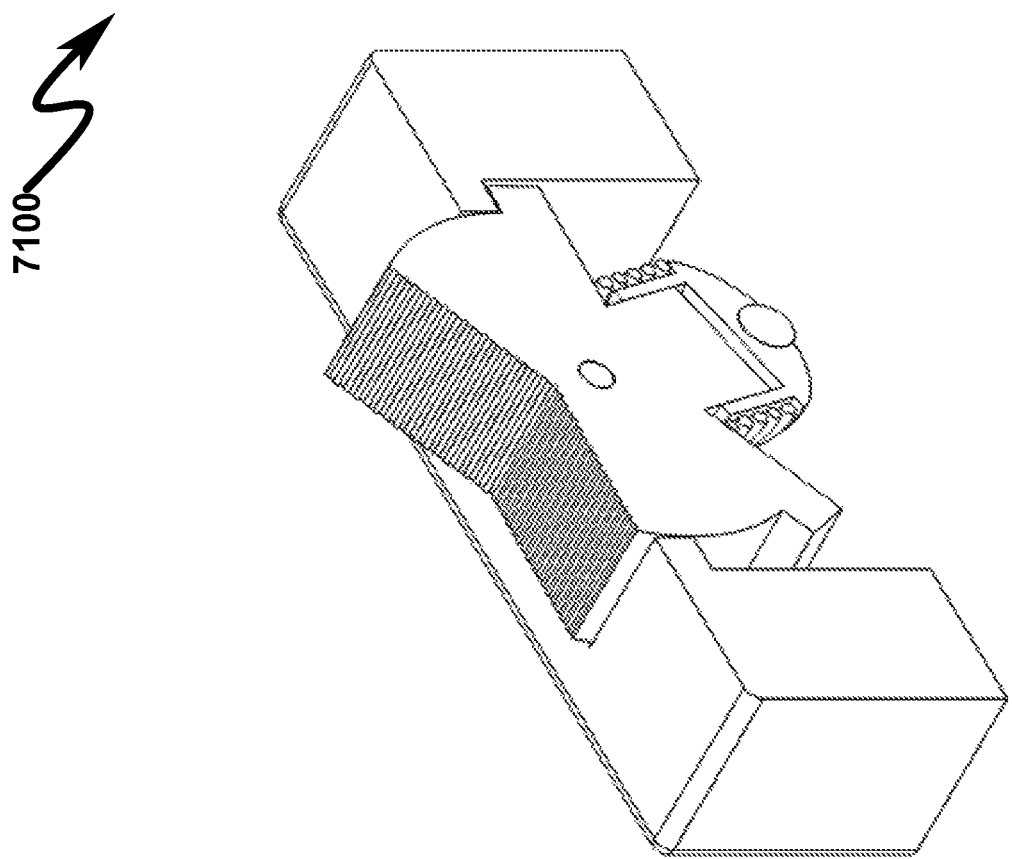
FIG. 71

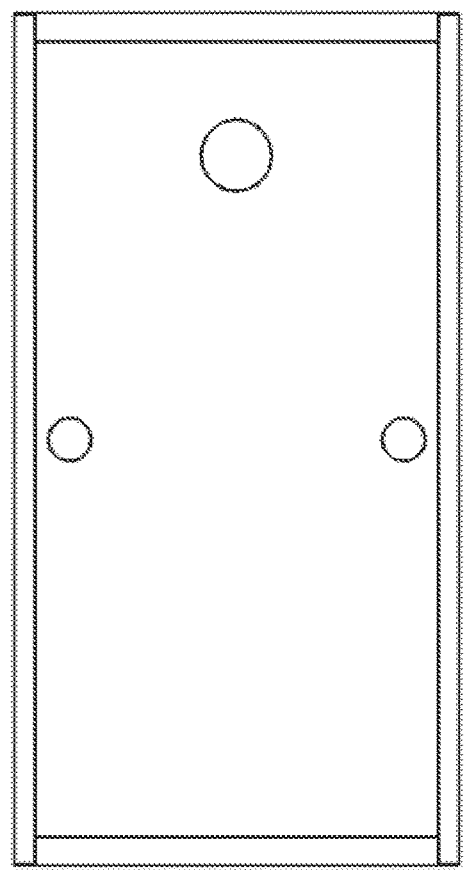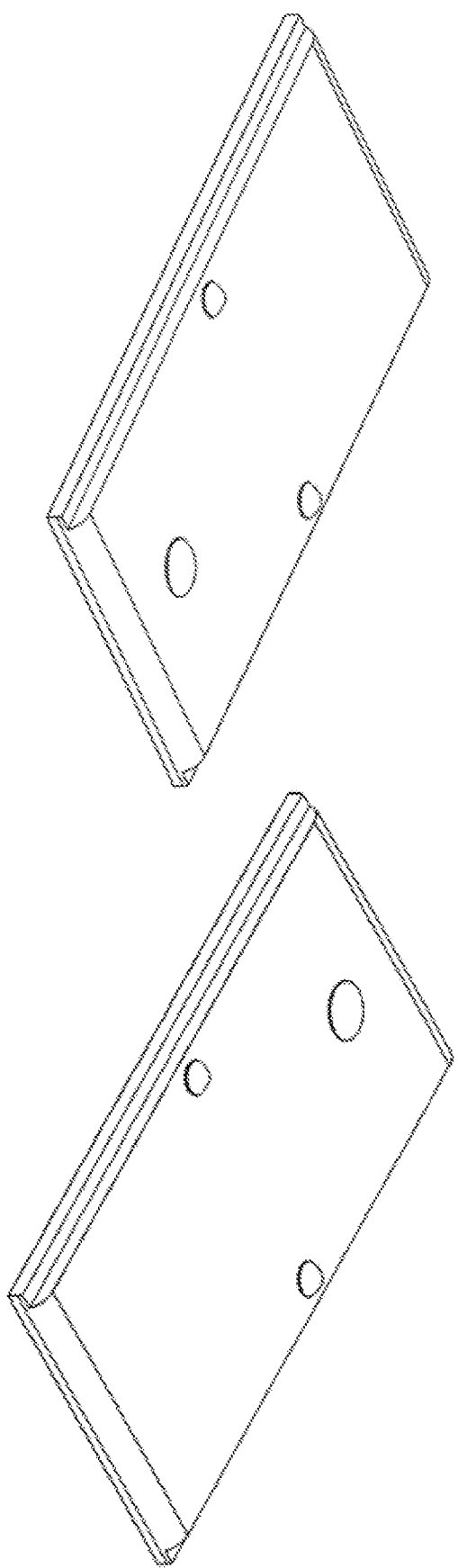
FIG. 88
8800

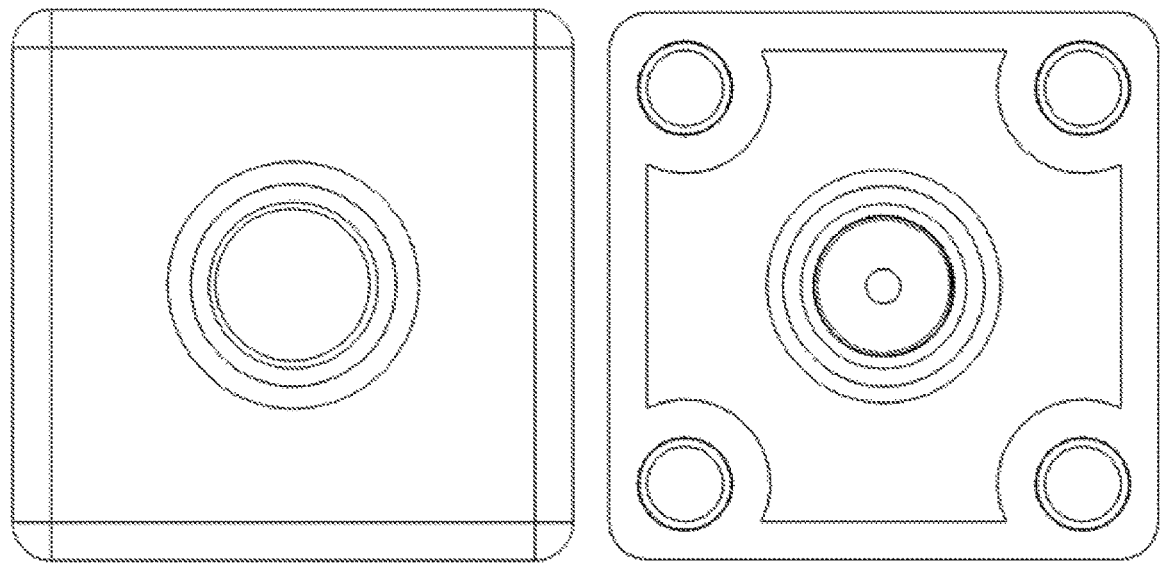
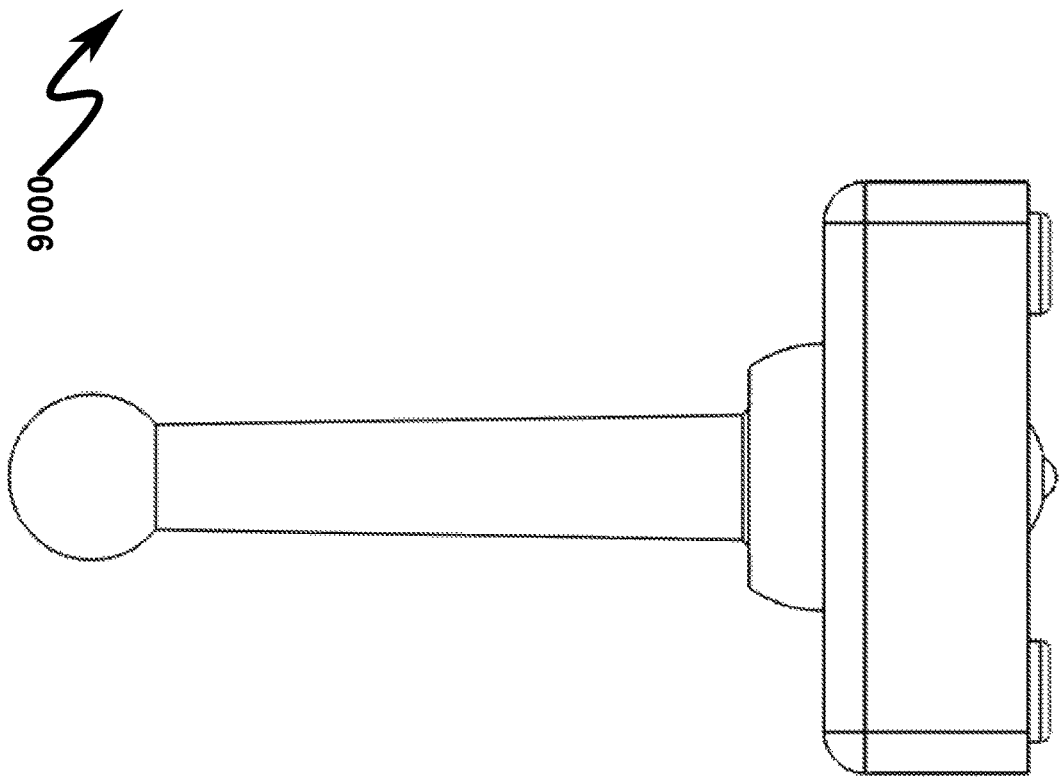
FIG. 90

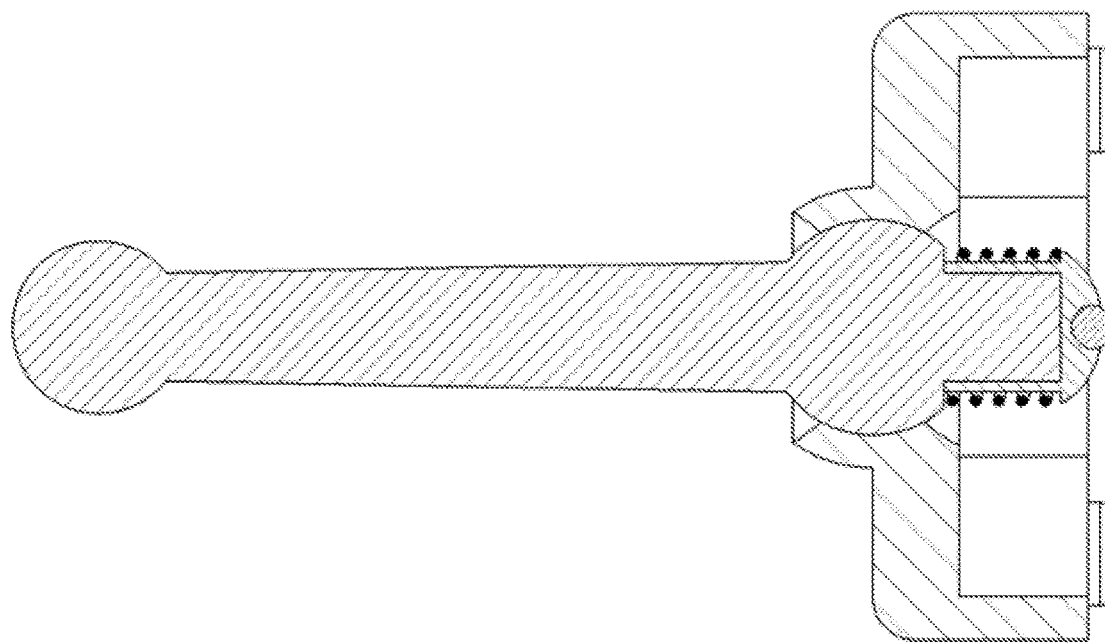
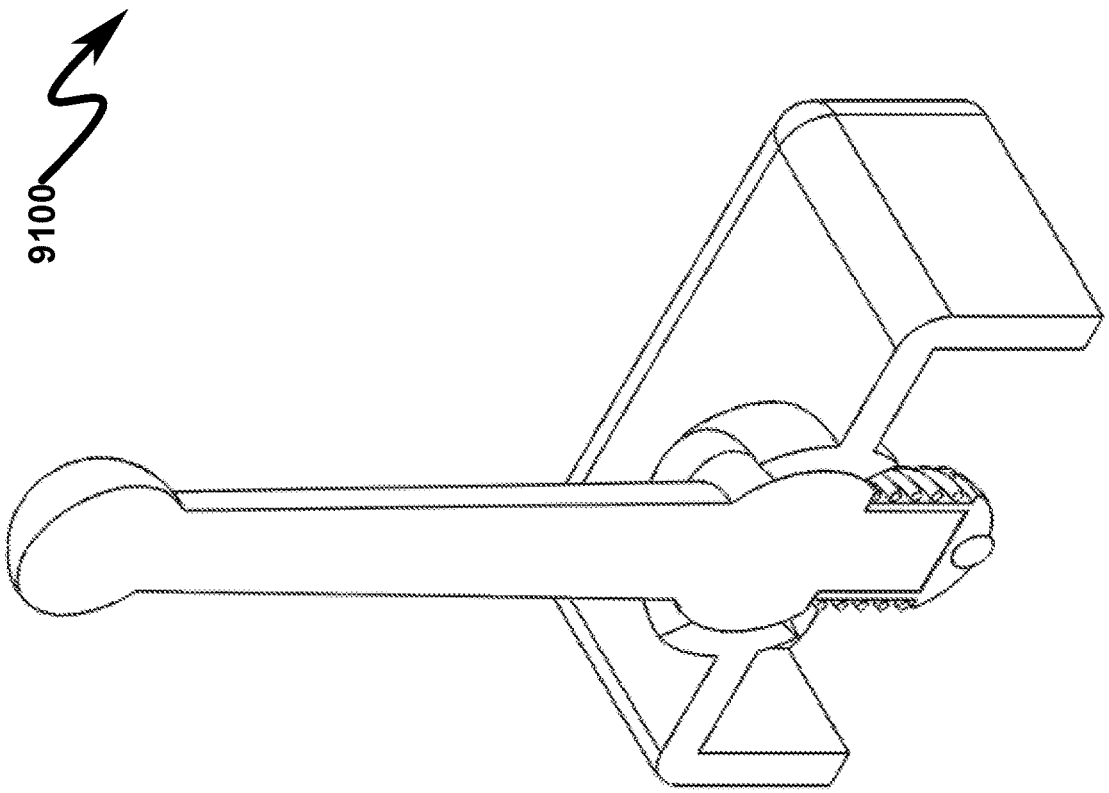
FIG. 91

TACTILE TOUCH SENSOR SYSTEM AND METHOD

CROSS REFERENCE TO RELATED APPLICATIONS

Utility Patent Applications

This application claims benefit under 35 U.S.C. § 120 and incorporates by reference U.S. Utility patent application for TACTILE TOUCH SENSOR SYSTEM AND METHOD by inventors Ilya Daniel Rosenberg and John Aaron Zarraga, filed electronically with the USPTO on Jan. 19, 2018, with EFS ID 31554128, confirmation number 8726, Ser. No. 15/875,625.

This application claims benefit under 35 U.S.C. § 120 and incorporates by reference U.S. Utility patent application for TACTILE TOUCH SENSOR SYSTEM AND METHOD by inventors Ilya Daniel Rosenberg and John Aaron Zarraga, filed electronically with the USPTO on Jun. 25, 2015, with EFS ID 2274923, confirmation number 9331, Ser. No. 14/751,076.

This application claims benefit under 35 U.S.C. § 120 and incorporates by reference U.S. Utility patent application for TOUCH SENSOR DETECTOR SYSTEM AND METHOD by inventors Ilya Daniel Rosenberg and John Aaron Zarraga, filed electronically with the USPTO on Jun. 25, 2014, with EFS ID 19410170, confirmation number 8306, Ser. No. 14/314,662, issued as U.S. Pat. No. 9,001,082 on Apr. 7, 2015.

This application claims benefit under 35 U.S.C. § 120 and incorporates by reference U.S. Utility patent application for TOUCH SENSOR DETECTOR SYSTEM AND METHOD by inventors Ilya Daniel Rosenberg and John Aaron Zarraga, filed electronically with the USPTO on Sep. 26, 2014, with EFS ID 20257165, confirmation number 2413, Ser. No. 14/498,478, issued as U.S. Pat. No. 9,582,098 on Feb. 28, 2017.

This application claims benefit under 35 U.S.C. § 120 and incorporates by reference U.S. Utility patent application for RESISTIVE TOUCH SENSOR SYSTEM AND METHOD by inventors Ilya Daniel Rosenberg and John Aaron Zarraga, filed electronically with the USPTO on Sep. 26, 2014, with EFS ID 20262520, confirmation number 8298, Ser. No. 14/499,001, issued as U.S. Pat. No. 9,465,477 on Oct. 11, 2016.

This application claims benefit under 35 U.S.C. § 120 and incorporates by reference U.S. Utility patent application for CAPACITIVE TOUCH SENSOR SYSTEM AND METHOD by inventors Ilya Daniel Rosenberg and John Aaron Zarraga, filed electronically with the USPTO on Sep. 27, 2014, with EFS ID 20263634, confirmation number 8881, Ser. No. 14/499,090, issued as U.S. Pat. No. 9,459,746 on Oct. 4, 2016.

Provisional Patent Applications

This application claims benefit under 35 U.S.C. § 119 and incorporates by reference U.S. Provisional Patent Application for TACTILE TOUCH SENSOR SYSTEM AND METHOD by inventors Ilya Daniel Rosenberg and John Aaron Zarraga, filed electronically with the USPTO on Jul. 17, 2014, with EFS ID 19606351, confirmation number 5185, Ser. No. 62/025,589.

This application claims benefit under 35 U.S.C. § 119 and incorporates by reference U.S. Provisional Patent Application for INTERPOLATING FORCE SENSING ARRAY by inventor Ilya Daniel Rosenberg, filed electronically with the USPTO on Sep. 27, 2013, with Ser. No. 61/883,597.

This application claims benefit under 35 U.S.C. § 119 and incorporates by reference U.S. Provisional Patent Application for INTERPOLATING FORCE SENSING ARRAY by inventor Ilya Daniel Rosenberg, filed electronically with the USPTO on Jan. 16, 2014, with Ser. No. 61/928,269.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods in the field of touch sensor devices and has specific application to tactile overlays for multi-touch and/or pressure-sensitive touch sensors. Specific invention embodiments may have particular applicability to touch-based force-sensing devices and methods for determining the location and amount of force exerted on a pressure-sensitive surface.

PRIOR ART AND BACKGROUND OF THE INVENTION

Touch sensors are input devices and are therefore typically paired with a complementary output device to provide a user with some form of feedback. In modern electronic devices this feedback is typically visual (i.e., a display). In smartphones, for instance, touch sensors are placed directly on top of displays to allow the direct manipulation of on-screen user interfaces. The display provides visual feedback and guides the user through the interaction.

When using a force-sensing touch solution, visual feedback can be implemented by actually printing visual indicators on top of the touch surface itself. For example, treadmills often have force-sensitive buttons behind a flexible membrane. This membrane is printed with a pattern that indicates button location and functionality. Some of these membranes also have raised edges to indicate boundaries between buttons. This adds tactile feedback for the user, and increases the interface's usability. Since the membrane is flexible, the user can transmit forces through the membrane and activate the force-sensitive buttons lying underneath. The membrane provides the user with adequate visual/tactile feedback, rendering a display unnecessary.

With this background as an application context, the present invention disclosure describes how physical augmentation of high-resolution force-sensitive touch sensors allows for the development of next-generation user interfaces. By replacing the set of discrete force-sensitive buttons with a high-resolution two-dimensional array of force sensors, the use of physical augmentation via overlays provides a much more powerful implementation and user experience. Instead of having a fixed set of buttons with a fixed membrane, it is possible to have one touch sensor that is compatible with an infinite number of membranes, each augmenting the sensor to add a different user experience. Touches may still be tracked across the entire sensor so much more data is available to application software directing the overall user experience.

BRIEF SUMMARY OF THE INVENTION

Overview

A tactile touch sensor system and method providing for physical augmentation of a high-resolution force-sensitive touch sensor (FSTS) is disclosed. This physical augmentation is enabled through the use of physical overlays that are placed on top of the FSTS. These overlays may be constructed to transmit forces to the underlying FSTS. This force transmission is accomplished by either using a flexible overlay or by fashioning a rigid mechanical overlay such that forces exerted on the overlay by a user are transmitted to the FSTS underneath. Identification of individual overlays by the FSTS permits operational characteristics of the FSTS to be automatically reconfigured to conform to the currently applied overlay format. Various methods teach the construction of these physical overlays and describe how this type of physical augmentation may be used to increase the functionality and modularity of a FSTS module and FSTS systems. These systems may in some embodiments be augmented with additional resistive and/or capacitive sensors to automatically identify or interact with the physical overlay applied to the FSTS.

The present invention involves coupling a physical overlay with a high-resolution, multi-touch, force-sensitive touch sensor. The physical overlay is designed to provide a user with visual/tactile feedback, and may be coupled with matching software to create a functional user interface. Since the physical overlay is placed between a user and the touch sensor, the overlay must be designed so that it transmits forces coming from the user to the sensor. These overlays can be flat or three-dimensional membranes, molded out of a flexible and/or compliant material. If an overlay is flexible, the overlay will naturally transmit forces from the user to the touch sensor. Alternatively, it is possible to construct rigid, mechanical widgets (buttons, sliders, knobs, etc.) which are designed to transmit user-supplied force to the underlying touch sensor. Finally, a programmable, deformable physical interface can be used to support a wide range of application-specific user interfaces.

Characteristics and Advantages of the Invention

Today, touch interfaces are primarily found on smartphones and tablets. One of the issues with these interfaces is that they have no tactile feedback. There have been industry efforts to "add back" the tactile feedback in these interfaces through the use of haptics. This has a wide set of challenges, and many efforts fail to effectively offer adequate tactile feedback. By physically augmenting force-sensitive touch sensors, it is possible to create physical and intuitive interfaces that offer both tactile and visual feedback, which increases the usability of the touch sensor. Instead of trying to "add back" the sensation of a button, you can design an overlay for a force-sensitive touch sensor that actually has a button. One can create overlays out of different materials, with different elasticity/compliance. With a "squishy" material, the user can better determine the level of force he/she is exerting on the sensor.

A major advantage of the disclosed invention is that it allows construction using a modular approach, so that one touch sensor is compatible with a wide array of physically flexible overlays. This becomes much more cost-effective for the end-user, and eliminates the end-user purchase requirement of sensor interfaces that are designed for a single application. For instance, a musician can have a force-sensitive touch sensor and also have two overlays: a piano keyboard overlay and a drum pad overlay. This modular approach allows the musician to purchase more overlays (which are relatively inexpensive) and use them on his one touch sensor. Alternatively, the end-user could have multiple touch sensors and mix and match which overlays he is using at any given time.

Exemplary Invention Application Contexts

One of the most obvious use-cases for the present invention is the implementation of a standard QWERTY keyboard functionality. Typing on a flat touch sensor is very unpleasant, and most people need tactile feedback to type accurately and efficiently. Creating a physical QWERTY keyboard overlay would solve some of these issues and make typing on a touch sensor much more enjoyable. In addition to a standard QWERTY keyboard, simply by changing the overlay, keyboards for different languages (such as French) and different key arrangements (such as DVORAK) can be made. Even unusual keyboards, such as court-stenographer keyboards, and keyboards that use highly unconventional layouts and interface schemes can be created simply by changing the overlay.

An infinite number of musical instruments could be fashioned using the present invention. For example, it is possible to make a drum pad or even a piano keyboard using the present invention teachings. For a drum pad, it is possible to 3D-print with a flexible material, and create any type of drum kit or layout. For a piano, it is possible to build an overlay that indicates piano key location. Since touches are tracked across the entire sensor, the sensor knows where the user is touching within a given key. This data can be used to expand the functionality of the piano. For example, software can use the fingers position within a given key to pitch-bend the current note a user is playing. Taking this idea further, novel forms of instruments having different button layouts, sizes, and shapes can be created just by creating custom overlays.

Instead of having a monolithic overlay that covers the entire sensor, it is possible to augment the touch interface with multiple smaller overlays. In order to secure the overlays to the touch sensor, it is possible to employ the use of magnets to hold each overlay against the surface of the sensor. This allows a user to create user interface building blocks and allow a user to develop new interfaces on the fly. These magnetic building blocks could be as simple as a rectangle which marks a special area of the sensor. This might include a drawing software application with a rectangle indicating where the user can draw on the sensor. Other building blocks could be more complicated, such as a physical slider bar. This slider may be built so that it transmits forces through to the touch sensor. This permits adding the slider next to the drawing rectangle and using it to control the drawing line width or other sketching parameters. Besides a slider and a drawing area, many other mechanical building blocks may be created to emulate physical interfaces, such as knobs, physical buttons, toggle switches, and joysticks. With this modular approach, it is possible to develop both simple and highly complex physical interfaces. This modular approach to building physical interfaces could have huge implications in medical and industrial fields, where custom controls for specialized equipment can be very expensive.

BRIEF DESCRIPTION OF THE DRAWINGS

For a fuller understanding of the advantages provided by the invention, reference should be made to the following detailed description together with the accompanying drawings wherein:

FIG. 30 illustrates a top view and right/front sectional perspective views of a preferred exemplary touch sensitive array (TSA) tablet interface (TTI) with a third exemplary custom TTA pressure overlay (TPO);

FIG. 32 illustrates a top view and right/front sectional perspective views of a preferred exemplary touch sensitive array (TSA) tablet interface (TTI) with a first exemplary typewriter keyboard TTA pressure overlay (TPO);

FIG. 52 illustrates top and bottom perspective views of a TPO side edge insertion attachment mechanism between the TPO and the TSA assembly depicting open and closed edge invention variants;

FIG. 67 illustrates top front perspective and front sectional views of an exemplary TPO key embodiment with the key in a depressed state;

FIG. 68 illustrates top diagonal perspective and diagonal sectional views of an exemplary TPO key embodiment with the key in an un-depressed state and depicts the attachment magnet structures;

FIG. 69 illustrates top front and top rear perspective views of an exemplary TPO rocker switch embodiment;

FIG. 70 illustrates bottom front perspective and bottom front sectional perspective views of an exemplary TPO rocker switch embodiment;

FIG. 71 illustrates side sectional perspective and side sectional views of an exemplary TPO rocker switch embodiment in a first switch position;

FIG. 88 illustrates a perspective isolation view of a mouse/puck contact surface variant in an exemplary two-piece TPO mouse/puck embodiment;

FIG. 90 illustrates front, top, and bottom views of an exemplary TPO joystick embodiment;

FIG. 91 illustrates front perspective sectional and front sectional views of an exemplary TPO joystick embodiment;

FIG. 119 illustrates a top right side sectional perspective view of an exemplary assembled TPO keyboard structure incorporating modular construction features;

FIG. 120 illustrates a top front side sectional perspective detail view of an exemplary assembled TPO keyboard structure incorporating modular construction features;

FIG. 121 illustrates top and bottom views of an exemplary TPO key structure incorporating modular construction features with integrated automatic identification mechanisms;

FIG. 122 illustrates bottom right front and bottom left rear perspective views of an exemplary TPO key structure incorporating modular construction features with integrated automatic identification mechanisms;

FIG. 123 illustrates a front view of an exemplary TPO key structure incorporating modular construction features with integrated automatic identification mechanisms;

FIG. 124 illustrates a side view of an exemplary TPO key structure incorporating modular construction features with integrated automatic identification mechanisms;

FIG. 125 illustrates a bottom view, top right front perspective view, and bottom right front perspective view an exemplary assembled TPO keyboard structure incorporating modular construction features with integrated automatic identification mechanisms;

FIG. 126 illustrates a top right front perspective view an exemplary TSA tablet combined with a number of TPO keyboard structures;

FIG. 127 illustrates a top view an exemplary TSA tablet combined with a number of TPO keyboard structures; and FIG. 128 illustrates a flowchart depicting automatic loading of application software and device drivers associated with placement of automatically identified TPO keyboard structures on a TSA.

DESCRIPTION OF THE PRESENTLY PREFERRED EXEMPLARY EMBODIMENTS

Figure 1:
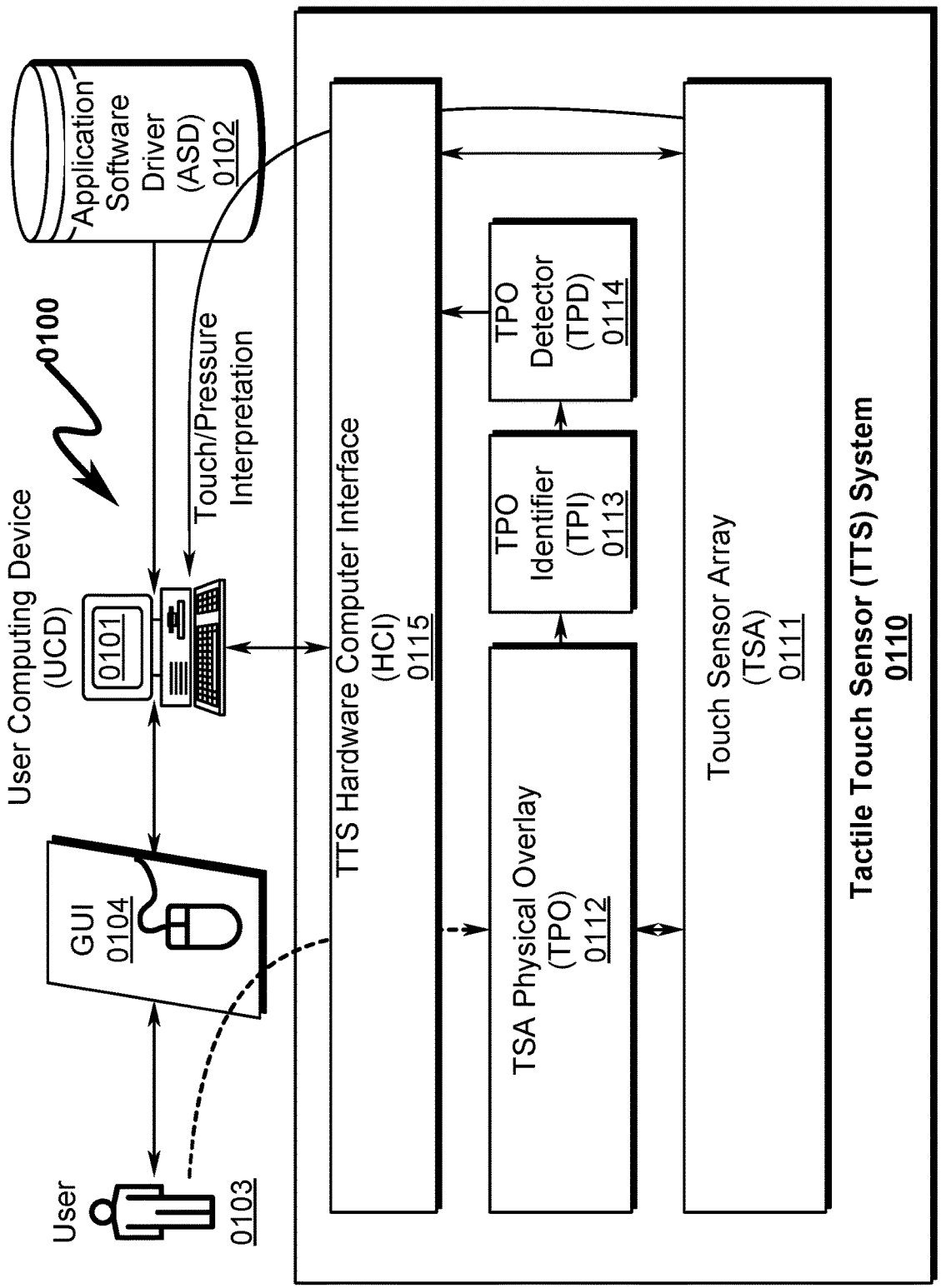
FIG. 1 illustrates an overview block diagram of a preferred exemplary invention system embodiment.

While the present invention is susceptible of embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a TACTILE TOUCH SENSOR SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Touch Sensor Array (TSA) Definition

Within the context of the present invention, the term "Touch Sensor Array (TSA)" is defined as the interpolating high-resolution force-sensitive touch sensor (FSTS) systems as described in the above-referenced patents and patent applications incorporated by reference in this application.

TPO Manufacturing Not Limitive

The present invention anticipates a means of producing TPO overlays in many preferred embodiments by injection molding and/or 3D printing. However, the present invention also anticipates that TPO overlays may be laser-cut from blank overlays or stock overlay materials.

TPO Overlay Transparency Not Limitive

An additional type of overlay anticipated by the present invention is a transparent overlay that retains a printed sheet of paper. This TPO overlay enables end-users that do not have access to a 3D printer or laser cutter to quickly prototype new overlay designs and apply them to the transparent overlay front or back surface.

TPO Overlay Material Not Limitive

With respect to the manufacture of TPO overlays, it should be noted that TPO overlays may be made of a squishy material such as a urethane foam (Rogers Corporation PORON® brand microcellular urethanes are provided as an example), silicone foam, neoprene foam, and any regular (non-foamed) silicone or rubber (including thermoplastic polyurethane (TPU)).

Mouse Not Limitive

The term "mouse" when used in the context of a moveable or non-movable TPO overlay should be given a broad interpretation to cover any kind of "puck" which might not even have buttons or a scroll wheel on it. Thus, the term "mouse" when used herein may literally be an object that the user moves and which the TSA sensor tracks. Within this context it is also possible with the present invention for the TSA to track the rotational orientation of the mouse/puck as well as the force distribution (so as to be able to detect tilting pressure applied to the mouse/puck).

TPO Automatic Identification Not Limitive

While the discussion herein regarding identification of TPO overlays concentrates on automatic identification of these structures, the present invention also anticipates scenarios in which some types of TPO overlays (such as home-made 3D printed overlays), allow the user to specify the overlay ID and/or location on the TSA surface manually.

TSA/TPO Magnetic Coupling Not Limitive

Many embodiments illustrated herein make use of paired magnets in the TSA and TPO structures to provide a mechanical coupling mechanism between the TSA and TPO. In some embodiments one of these magnets may be replaced by a ferromagnetic material (iron, steel, etc.) that is magnetically coupled to the remaining magnet in the coupled pair. This would provide, for example, the use of a ferromagnetic TPO or TPO bezel to be mated to magnets within the TSA or alternatively magnets within the TPO or TPO bezel to be mated to ferromagnetic material embedded within the TSA or the periphery of a bezel retaining the TSA. Thus, the term "magnet" and similar terms when used herein covers a wide variety of magnetically coupled mating methodologies.

TSA Construction

The TSA as described herein may comprise a pressure-sensitive surface (PSS) incorporating row-column force detection and/or row-column force interpolation detection.

Sensor Technologies Application Context

One of the main components of the present invention is a high-resolution, multi-touch, force-sensitive touch sensor. This technology is perfectly suited for physical augmentation, because unlike other touch technologies, the touch sensor can be activated with any object that exerts a force. With a capacitive touch technology, you would only be able to activate the sensor with conductive objects. This would make construction of overlays more difficult and would require special materials for fabrication. Many optical solutions will also not work, because most solutions transmit/receive light signals from the side of the sensor. If you placed an overlay on the sensor, it would potentially block paths for this light to travel, and you wouldn't be able to sense interaction on the overlay itself. A multi-touch, force-sensitive touch sensor is used in the preferred embodiment of the present invention. In the rest of the disclosure, "touch sensor" should be understood to be a multi-touch, force-sensitive touch sensor.

System Overview (0100)

A general overview of the present invention system is depicted in the block diagram of FIG. 1 (0100). Here the tactile touch sensor system (TTS) (0110) comprises a touch sensor array (TSA) (0111) as generally described in the patents and patent applications identified above and incorporated herein by reference. To this TSA (0111) a TSA physical overlay (TPO) (0112) is applied. This TPO (0112) may incorporate a wide variety of physical forms, many of which are provided by example in the present application and described further in detail below. The TPO (0112) may be of a fixed integrated form but also may be of disparate forms that are mated together to form a customized physical form.

Each of the TPO (0112) (whether integrated form or disparate form) may incorporate a TPO identifier (TPI) (0113) that uniquely identifies the type of TPO (0112) that constitutes the overlay structure. This TPI (0113) is then read by a TPO detector (TPD) (0114) that translates this information into a binary identification format (BIF). This BIF is suitable for interpretation by a TTS hardware computer interface (HCI) (0115) and is subsequently transmitted to a user computing device (UCD) (0101).

The UCD (0101) loads appropriate software and/or device drivers from an application software driver (ASD) (0102) database that are then used to interpret contact/pressure information retrieved from the TSA (0111) as the user (0103) interacts with the TPO (0112). Depending on the TPI (0113) detected by the TPD (0114) and the subsequent software driver loaded by the UCD (0101) from the ASD (0102), a variety of graphical user interfaces (GUI) (0104) may be presented to the user (0101).

Method Overview (0200)

Figure 2:
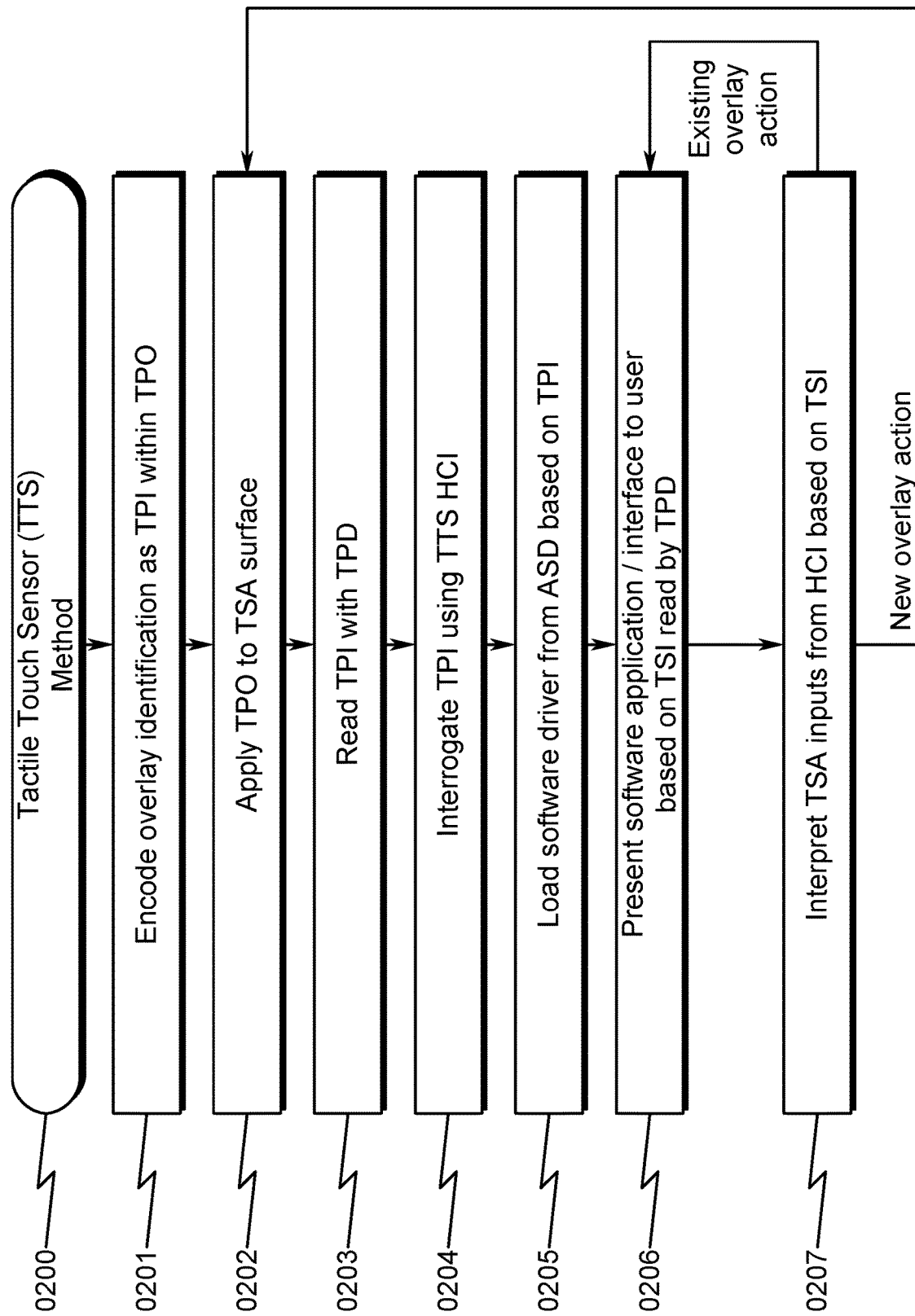
FIG. 2 illustrates an overview flowchart of a preferred exemplary invention method embodiment.

A general overview of the present invention method is depicted in the flowchart of FIG. 2 (0200). This tactile touch sensor (TTS) method comprises the following steps:

(1) Encoding a TPI overlay identification within a touch sensor physical overlay (TPO) to uniquely identify the function of the TPO (0201);
(2) Applying the TPO to the surface of a touch sensor array (TSA) (0202);
(3) Reading the TPI with a TPO detector (0203);
(4) Interrogating the TPI using TTS hardware computer interface (HCS) using a user computing device (UCD) (0204);
(5) Loading an application software driver (ASD) on said UCD based on the TPI read by said TPD (0205);
(6) Presenting a software application/interface to a user based on the TPI read by the TPD (0206);
(7) Interpreting inputs from the TSA inputs through the HCI based on the TPI read by the TPD (0207); and
(8) Proceeding to step (6) if the ISO has not been modified or replaced and proceeding to step (2) if the TPD has detected a change in the TPO applied to the TSA.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System Detail (0300)

Figure 3:
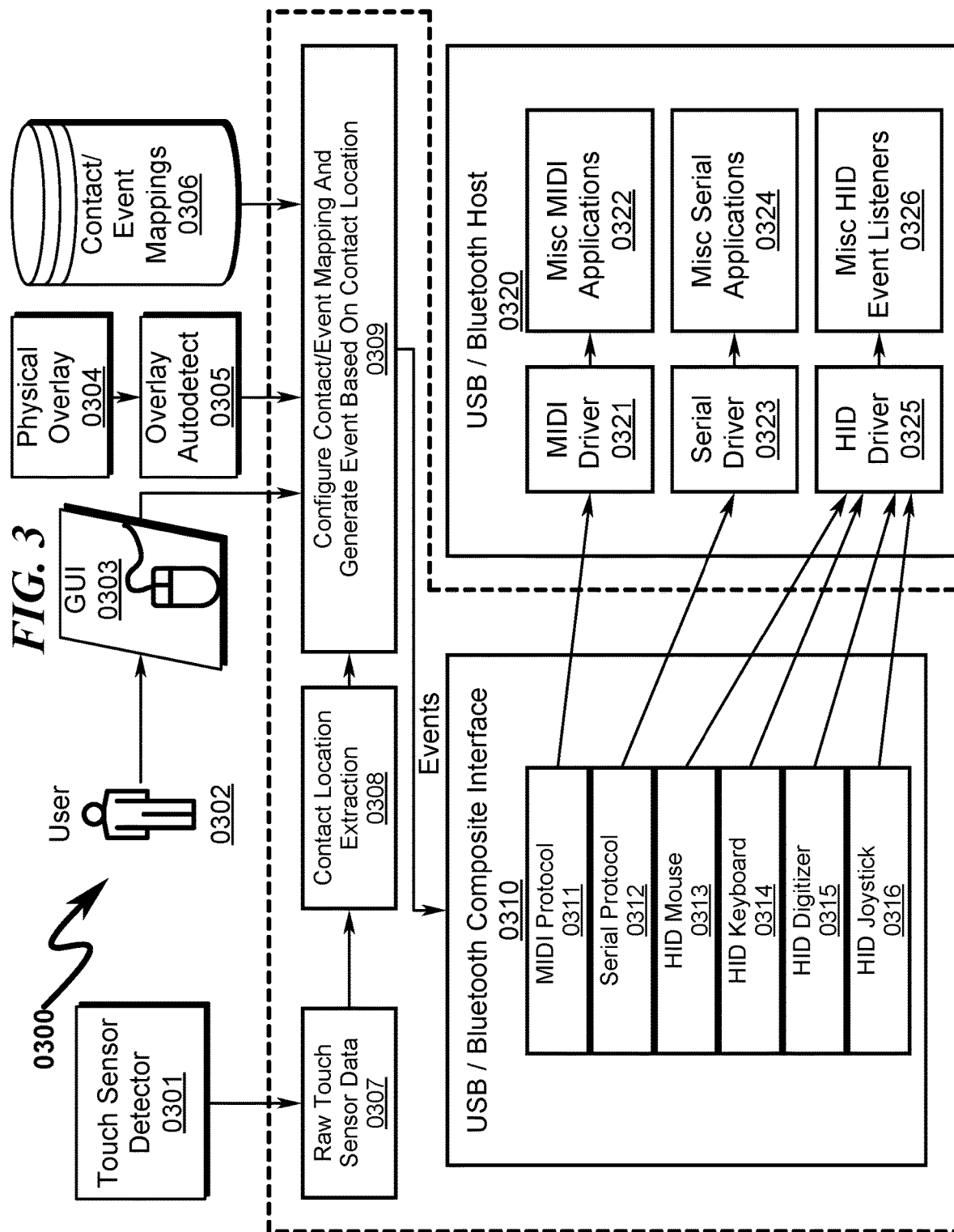
FIG. 3 illustrates a block diagram of a preferred exemplary invention system embodiment.

A detail overview of the present invention system is depicted in the flowchart of FIG. 3 (0300). The touch sensor array detector (TSA) (0301) forms the basis for collection of pressure sensor information from a pressure sensitive surface and is described in the referenced patent documents included by reference. The user (0302) interacts with a graphical user interface (0303) which is associated with a physical TSA pressure overlay (TPO) (0304) that is detected and identified with a TPO detector (TPD) (0305). A database of contact/event mappings (0306) is then used to associated software functions with the raw touch sensor data (0307) received from the TSA (0301). The raw touch sensor data (0307) is then interpreted by a contact location extraction process (0308) as configured by a contact/event mapping and event generator (0309) that has been configured by the automatic TPD detection (0305) of the TPO (0304). Events generated by the event generator (0309) are then transformed by a USB/BLUETOOTH® composite software interface (0310) into appropriate protocols (MIDI protocol (0311), serial protocol (0312), HID mouse protocol (0313), HID keyboard protocol (0314), HID digitizer protocol (0315), HID joystick protocol (0316), etc.) and delivered to a USB/BLUETOOTH® host (0320) for interpretation by the appropriate software driver ((0321), (0323) (0325)) and associated software application ((0322), (0324), (0326)).

One advantage of this system is the ability to automatically identify (0305) a particular TPO overlay (0304) and load appropriate software drivers/applications (0309) based on this identification process.

Software Interface

It is important to note that physical touch sensor augmentation requires a software component to enable an effective user interface. There must be software that is aware of what TPO overlay is on top of the TSA touch sensor, so that touch data can be translated into functionality as indicated by the overlay. For instance, if a piano keyboard overlay is placed on a sensor, the user must also have software enabled that is translating touches into piano key presses. The application software can generate audio directly or can send key press events to other software using a standard format such as MIDI.

It is also important to keep the overlay "in sync" with the software. If you replace the previously mentioned piano keyboard overlay with a drum pad and the piano software is still running, the drum pad will have very unexpected results (playing the drum pads would activate keys in the piano software). This invention disclosure teaches several methods for keeping the software "in sync" with the overlay. These methods will be described in a later section.

Method Detail (0400)

Figure 4:
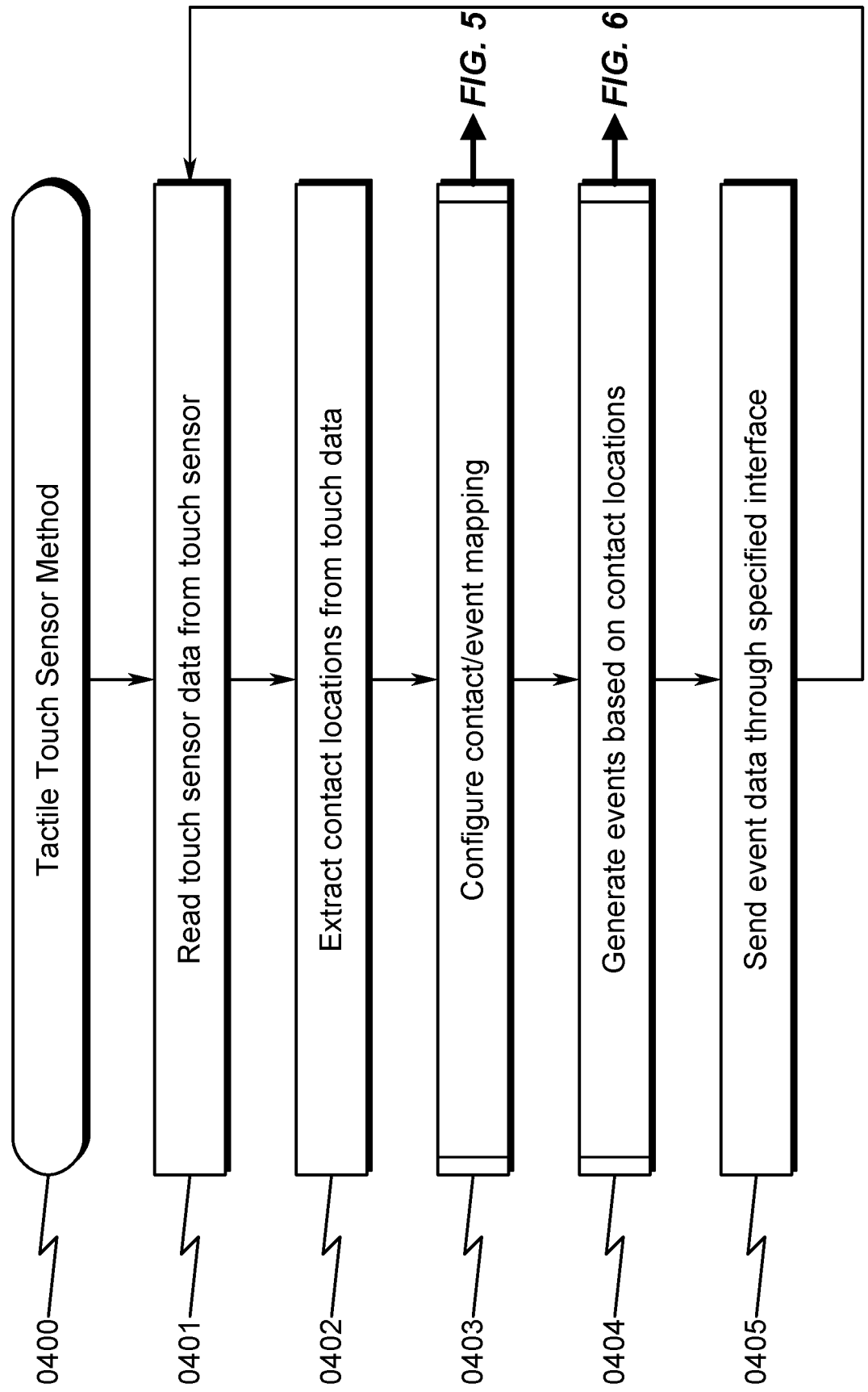
FIG. 4 illustrates a flowchart of a preferred exemplary invention method embodiment.

A detail overview of the present invention method is depicted in the flowchart of FIG. 4 (0400). This tactile touch sensor (TTS) method comprises the following steps:

(1) Reading touch sensor data from a TSA touch sensor (0401);
(2) Extracting contact locations from the touch sensor data (0402);
(3) Configuring contact/event mapping based on the detected contact locations (0403);
(4) Generating events based on the detected contact locations (0404);
(5) Sending event data through a specified API interface to an associated software application (0405); and
(6) Looping to step (1) to read additions touch sensor data (0406).

Figure 5:
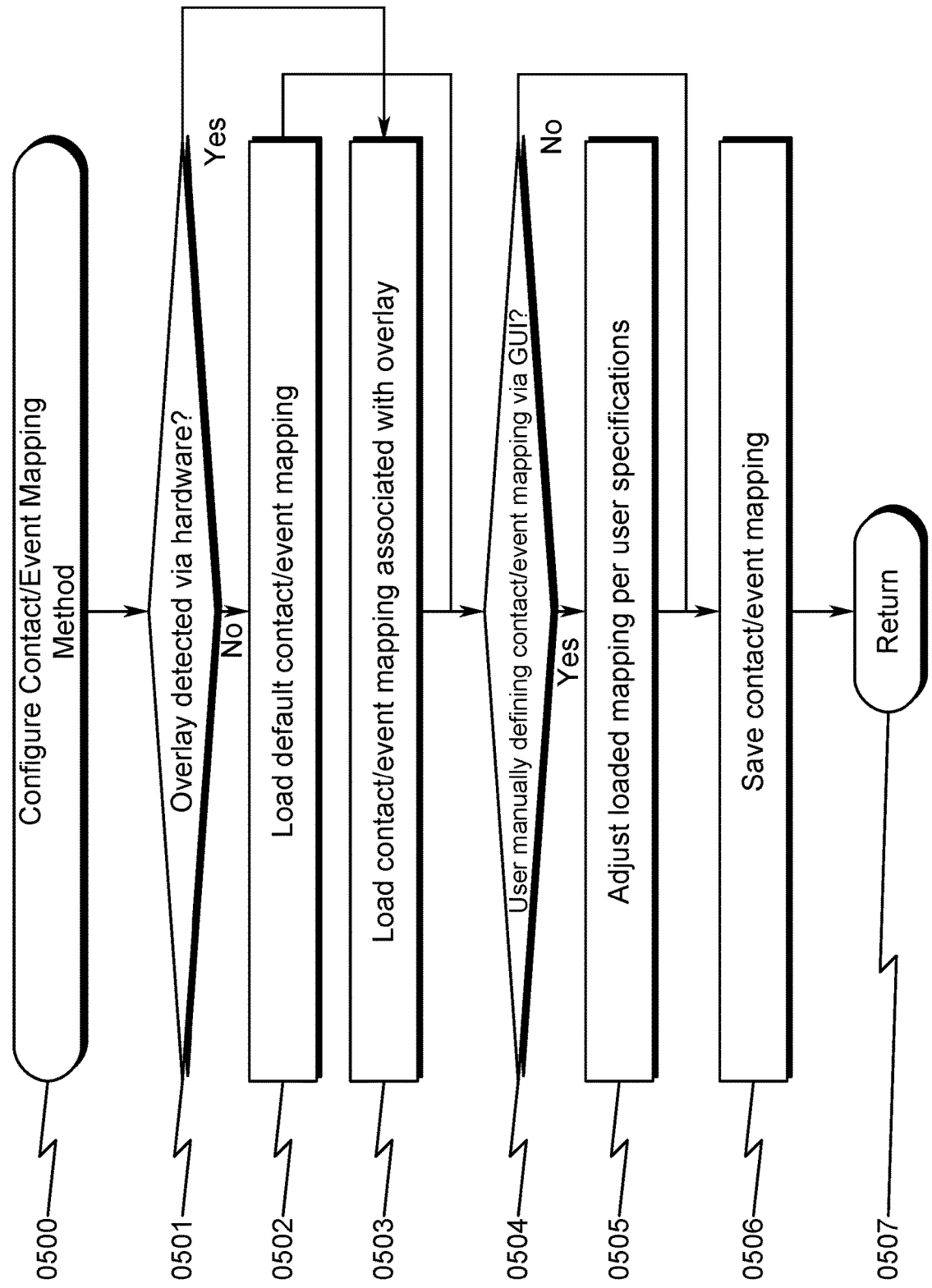
FIG. 5 illustrates a flowchart of a preferred exemplary contact/event mapping method embodiment.
Figure 6:
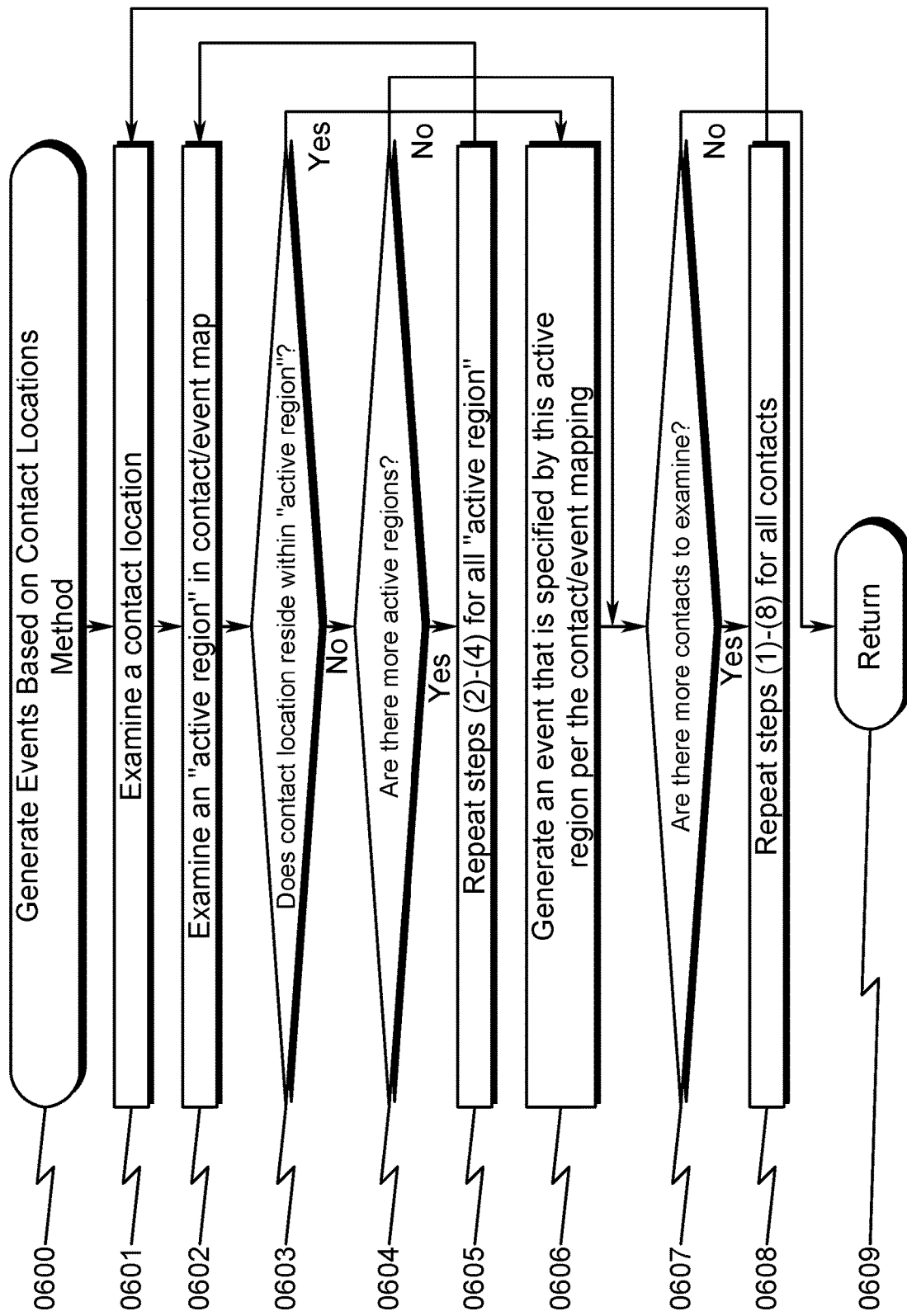
FIG. 6 illustrates a flowchart of a preferred exemplary event generation method embodiment depicting how the system software reads touch data and eventually determines if a particular touch has activated a region of interest on an overlay.
Figure 7:
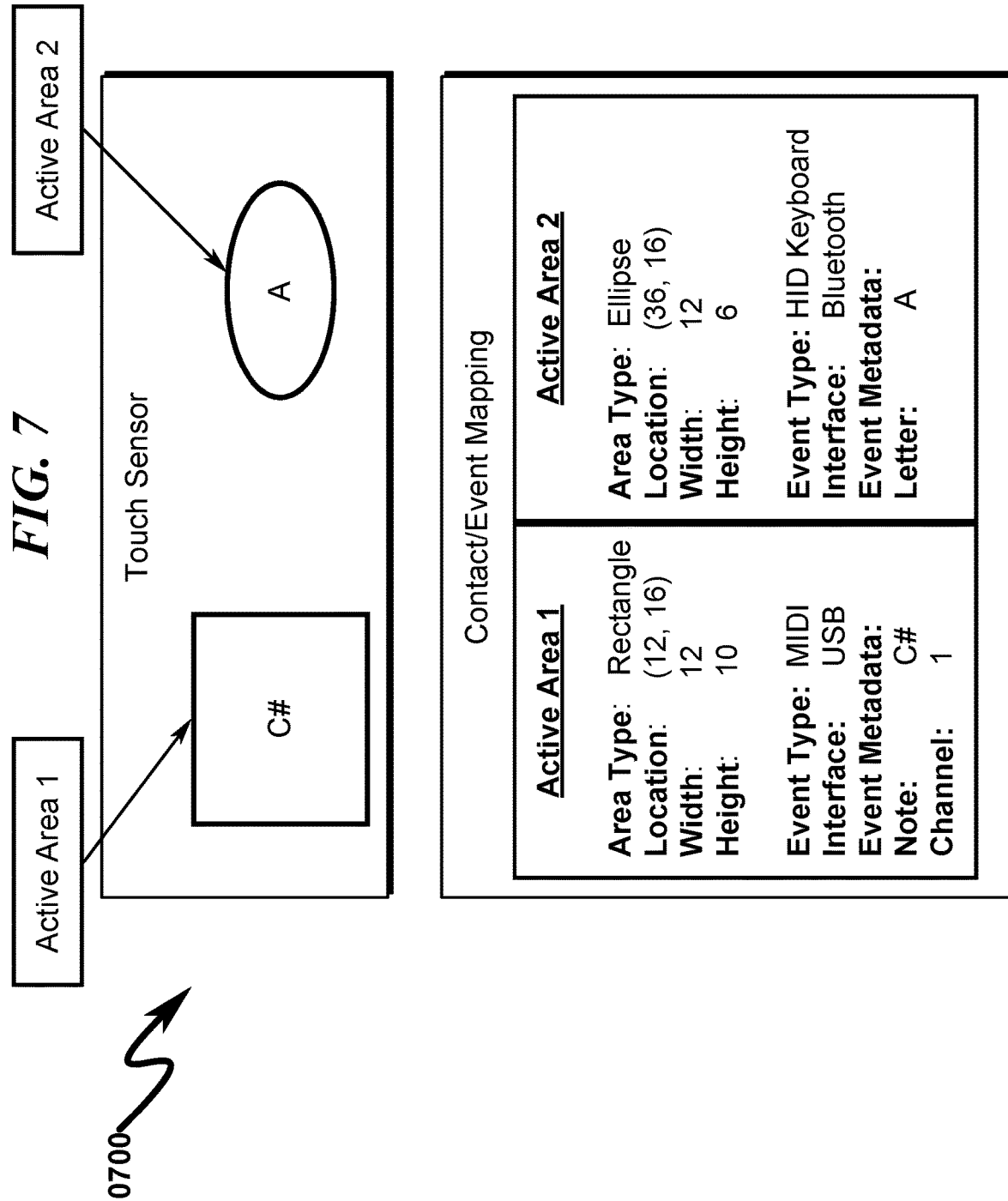
FIG. 7 illustrates how the system software reads touch data and eventually determines if a particular touch has activated a region of interest on a TPO overlay.

FIG. 4 (0400)-FIG. 7 (0700) depict how the system software reads touch data and eventually determines if a particular touch has activated a region of interest on an overlay. FIG. 4 (0400) provides an overview of system operation. FIG. 5 (0500) details the configuration of contact/event mapping. FIG. 6 (0600) details the generation of events based on contact locations.

The overlay in this example is provided in FIG. 7 (0700) and has two regions of interests, or two "features". The underlying software is made to run with this particular overlay, so it also knows where these two features are on the touch sensor. When a finger touches the TPO overlay, force is transmitted through the flexible overlay to the underlying force-sensitive touch sensor. This generates a force response the sensor sees for this particular touch. The sensor can use this response to calculate a contact position. The software uses its knowledge of the two features to determine if this touch lies within one of these regions. In this case, the software detects that the features on the left has been activated. The software can then trigger an event associated with the activation of the left feature.

Configure Contact/Event Mapping Method Detail (0500)

A detail overview of the present invention contact/event configuration mapping method is depicted in the flowchart of FIG. 5 (0500). This tactile touch sensor (TTS) method comprises the following steps:
(1) Determining if a TPO overlay is detected and if so, proceeding to step (3) (0501);
(2) Loading a default contact/event map and proceeding to step (4) (0502);
(3) Loading a contact/event map associated with the TPO overlay (0503);
(4) Determining if the user is manually defining a contact/event map via the GUI and if not, proceeding to step (6) (0504);
(5) Adjusting the loaded contact/event map per user specification from the GUI (0505);
(6) Saving the contact/event map (0506); and
(7) Returning to the calling procedure (0507).

This general method may be modified heavily depending on a number of factors, with rearrangement and/or addition/deletion of steps anticipated by the scope of the present invention.

Generate Events on Contact Locations Method (0600)

A detail overview of the present invention contact locations event generation method is depicted in the flowchart of FIG. 6 (0600). This tactile touch sensor (TTS) method comprises the following steps:
(1) Examining a contact location (0601);
(2) Examining an "active region" in the contact/event map (0602);
(3) Determining if the contact locations reside within the "active region" in the contact event/map, and if so, proceeding to step (6) (0603);
(4) Determining if there are additional "active regions" in the contact event map to be inspected, and if not, proceeding to step (7) (0604);
(5) Repeating steps (2)-(4) for all "active regions" in the contact event/map (proceed to step (2)) (0605);
(6) Generating an event that is specified by the currently active region per the contact/event mapping (0606);
(7) Determining if there are any more contacts to examine, and if not, proceeding to step (9) (0607);
(8) Repeating steps (1)-(8) for all contacts detected (proceed to step (1)) (0608); and
(9) Returning to the calling procedure (0609).

This general method may be modified heavily depending on a number of factors, with rearrangement and/or addition/deletion of steps anticipated by the scope of the present invention.

Generating Events on Contact Locations (0700)

An example of how events are generated based on contact locations is depicted in the diagram of FIG. 7 (0700). Here two active areas (1 and 2) are depicted and corresponding active area contact/event mapping is detailed. This diagram provides an example framework by which the procedures in FIG. 4 (0400)-FIG. 6 (0600) may operate.

TSA/TPO Magnet Placement Techniques (0800)

Figure 8:
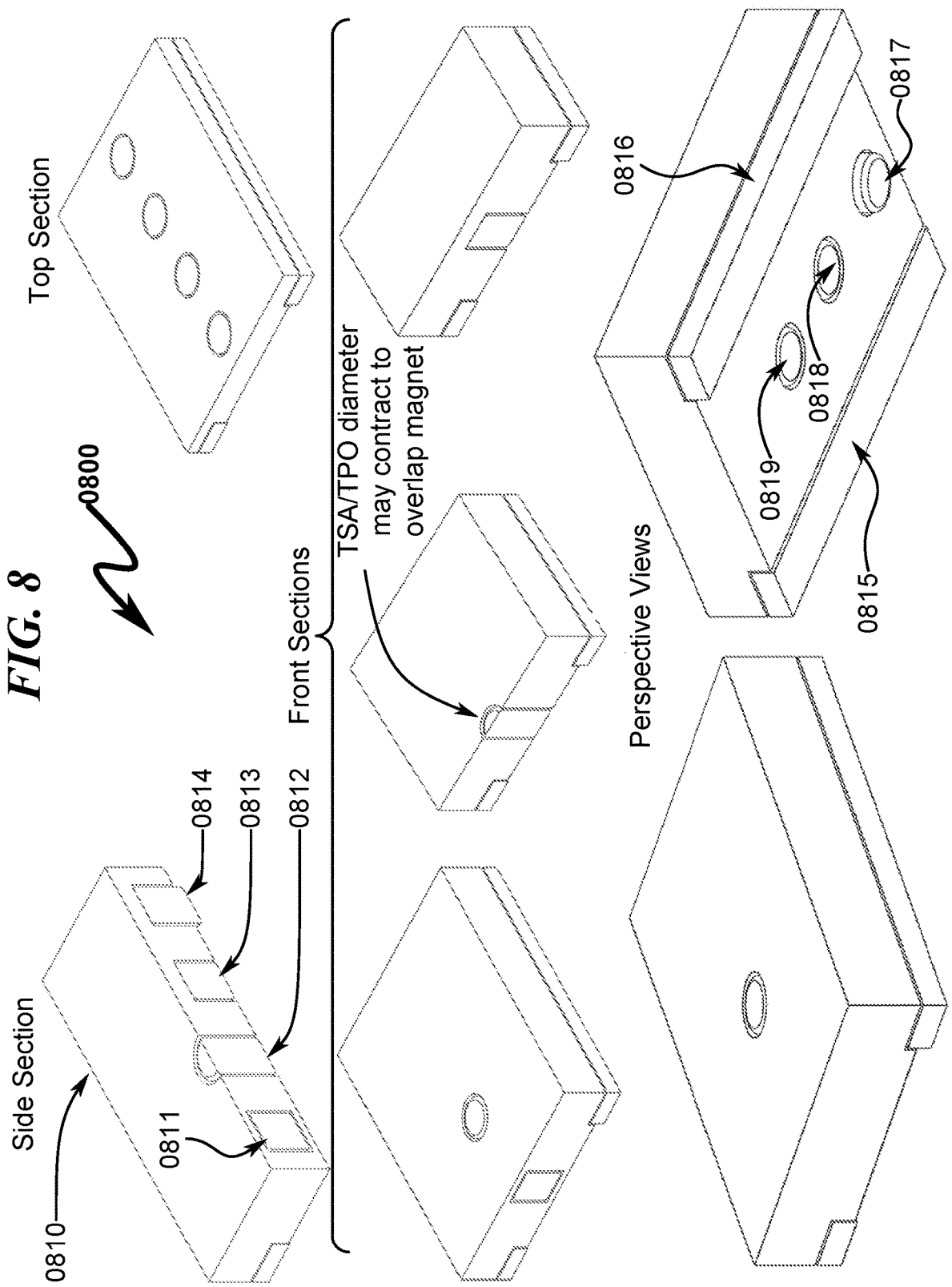
FIG. 8 illustrates various methods by which magnets may be incorporated into TSA/TPO structures.

Various methods by which magnets may be incorporated in TSA/TPO structures are generally depicted in the diagram of FIG. 8 (0800). Here a generic TSA/TPO structure (0810) is presented for illustrative purposes that combines a number of anticipated magnet placement techniques. Within this generic sampling context, the magnets may be placed/embedded internally (0811) within the TSA/TPO structure (0810), positioned through the entire structure (0812), placed flush to a surface of the structure (0813), or protruding from the surface of the structure (0814). In any of these situations the magnets may be placed inside the overlay during an injection molding process or glued in/inserted after the injection molding process is complete. In any of these situations the magnet may be configured in any physical form and placed when the TSA/TPO membrane (0810) is injected molded or in some circumstances inserted after the injection molding process is completed. For those situations in which the magnets are inserted after injection molding, it may be possible to fabricate the TSA/TPO with a magnet cavity having an external surface peripheral edge diameter slightly smaller than the magnet so as to capture the magnet when inserted into the magnet cavity.

Additionally, the use of flexible magnetic strips that are flush (0815) to the surface of the TSA/TPO (0810) and/or protruding (0816) from the surface of the TSA/TPO (0810) are also anticipated in these scenarios. As generally depicted, any of the magnetic structures depicted may be positioned as protruding (0817) or flush (0818, 0819) with the TSA/TPO (0810) surface.

Magnetometer TPO Identification (0900)-(1200)

Figure 9:
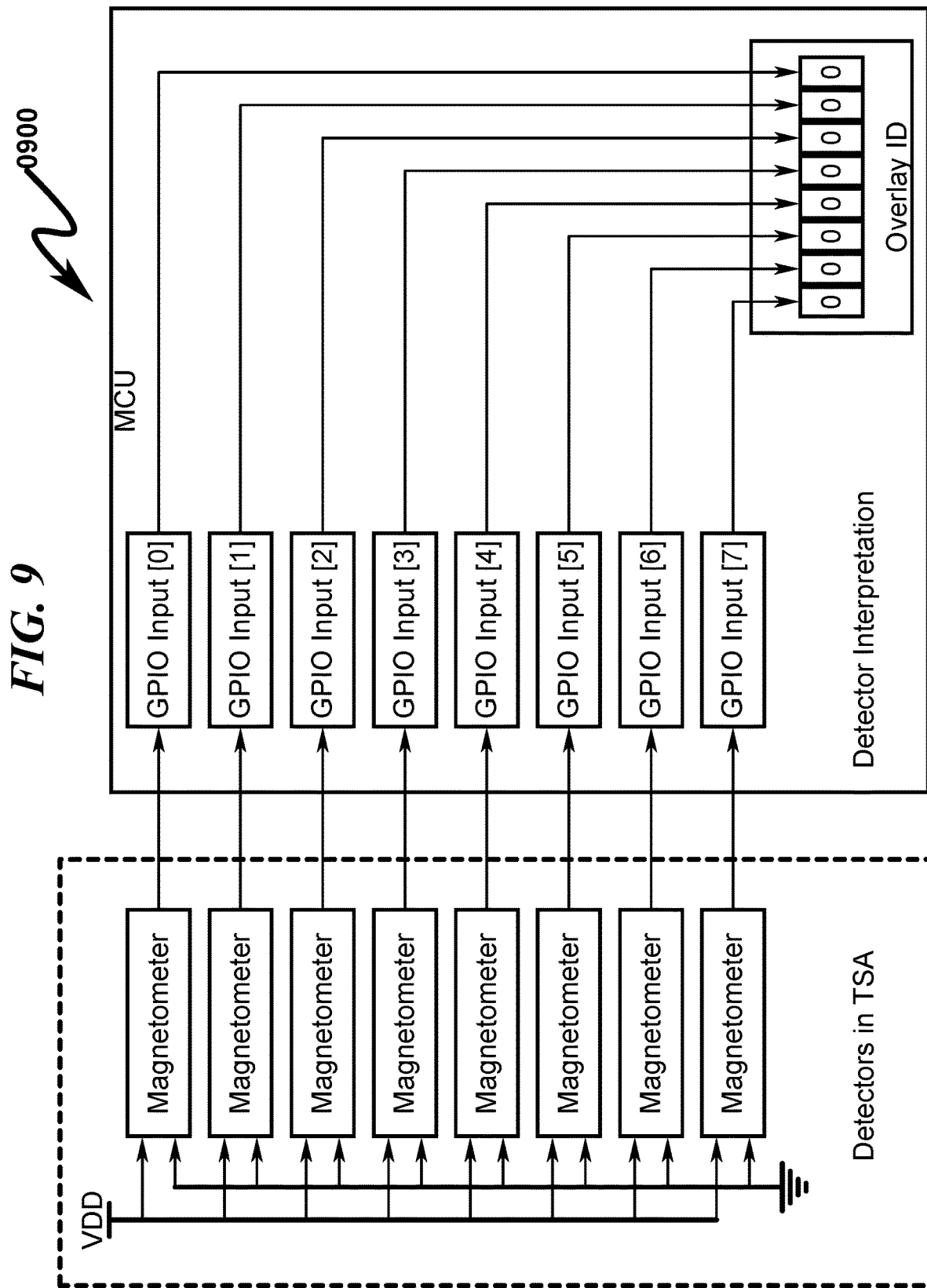
FIG. 9 illustrates a schematic depicting detection of TPO identification using magnetometers.
Figure 10:
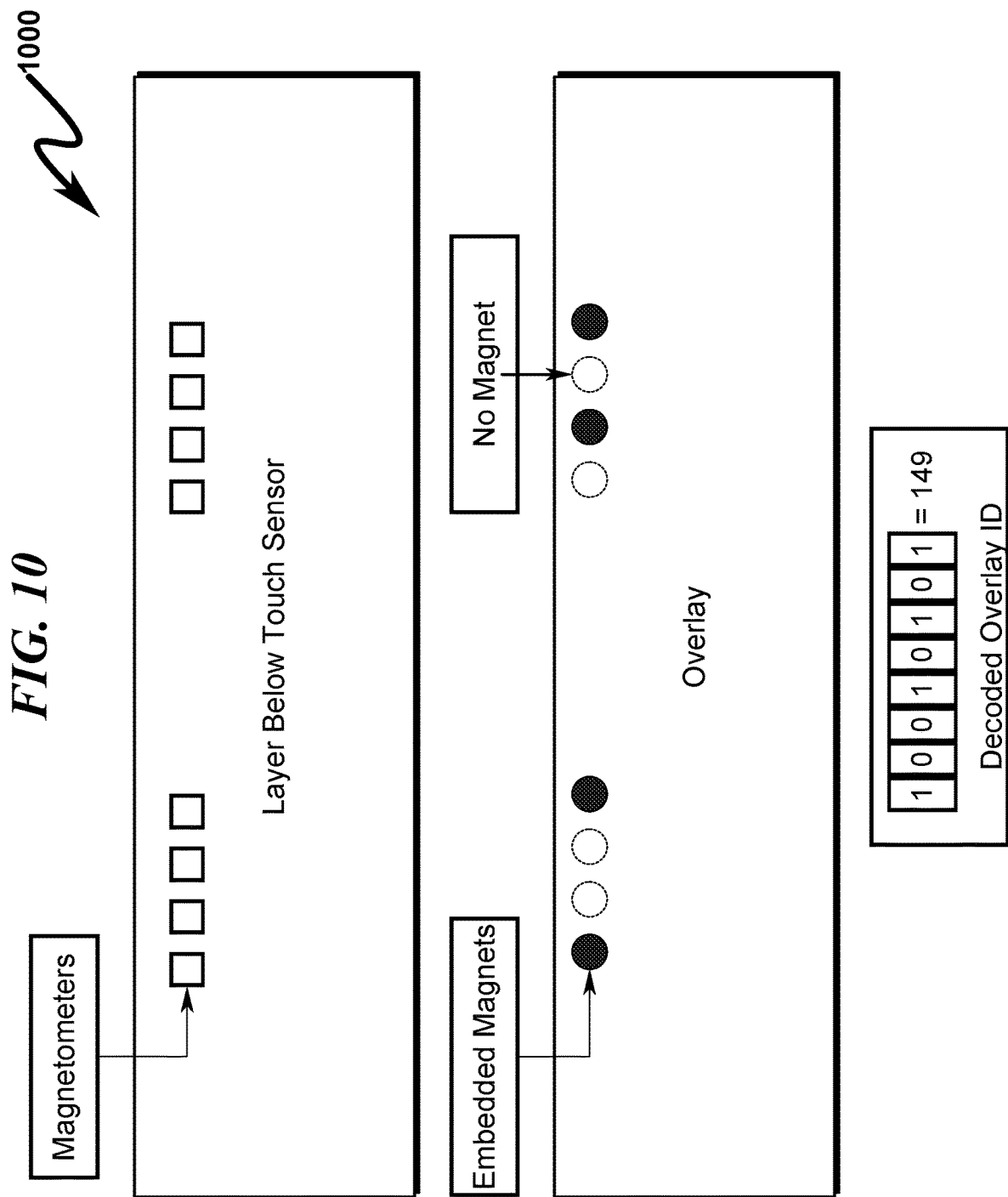
FIG. 10 illustrates a diagram depicting detection of TPO identification using a magnet-encoded overlay.
Figure 11:
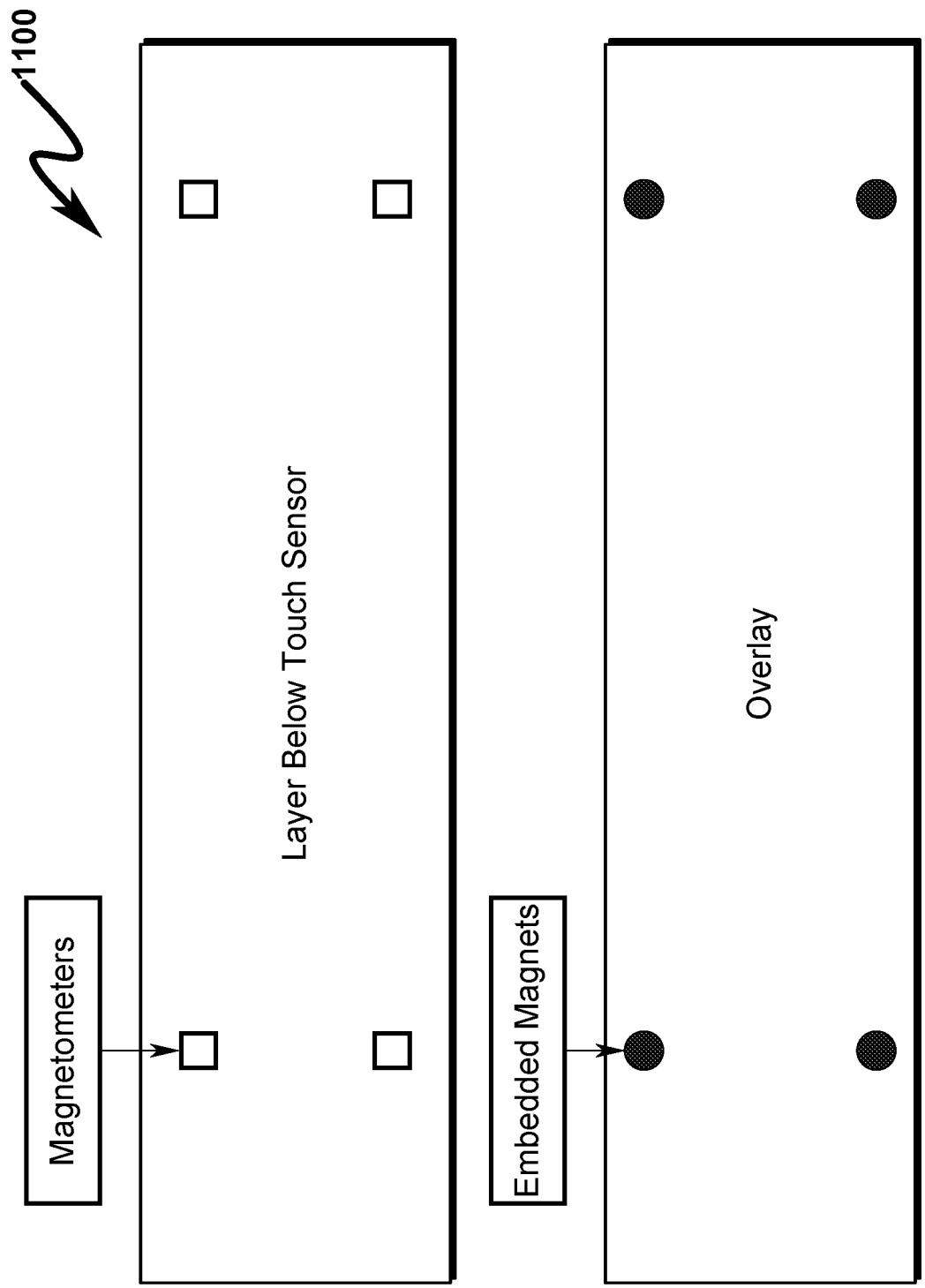
FIG. 11 illustrates a diagram depicting the use of magnets/magnetometers to detect the presence of a TPO overlay.
Figure 12:
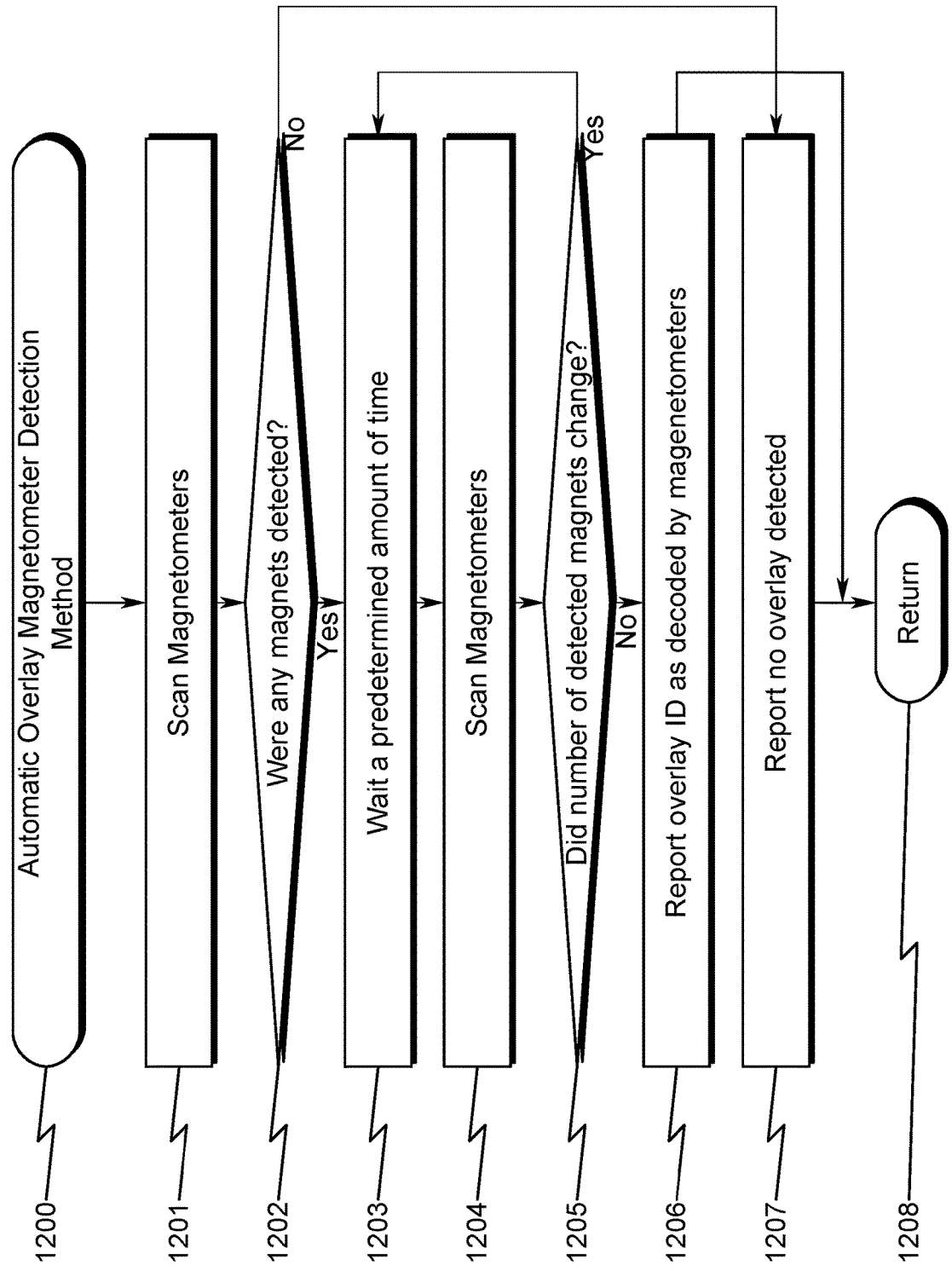
FIG. 12 illustrates a flowchart depicting a method for automatic detection of a TPO overlay using magnetometers.

The present invention may implement identification of the TPO by magnetometer sensors as generally depicted in FIG. 9 (0900)-FIG. 12 (1200). FIG. 9 (0900) depicts a typical hardware interface used within the TSA structure to individually detect magnets that are placed within the TPO for identification purposes. FIG. 10 (1000) illustrates a typical TSA/TPO pair in which magnetometers in the TSA are matched with corresponding embedded magnet positions in the TPO to provide a decoded TPO overlay identification. The magnetometers may also be used to detect the presence of the TPO overlay as generally depicted in FIG. 11 (1100) where magnetometers in the TSA are activated on the presence of detected magnets in the corresponding TPO locations.

A general method for the automatic magnetic detection of TPO overlays is generally depicted in FIG. 12 (1200) and involves the following steps:
(1) Scanning magnetometers in the TSA (1201);
(2) Determining if any magnets were detected, and if not, proceeding to step (7) (1202);
(3) Waiting a predetermined amount of time to allow settling of the TPO overlay (1203);
(4) Scanning the magnetometers in the TSA (1204);
(5) Determining if the number of detected magnets in the TPO has changed, and if so, proceeding to step (3) (1205);
(6) Reporting a TPO overlay ID as decoded by the magnetometers in the TSA and proceeding to step (8) (1206);
(7) Reporting no TPO overlays detected (1207); and
(8) Returning to the calling procedure (1208).

This general method may be modified heavily depending on a number of factors, with rearrangement and/or addition/deletion of steps anticipated by the scope of the present invention.

RFID TPO Identification (1300)-(1600)

Figure 13:
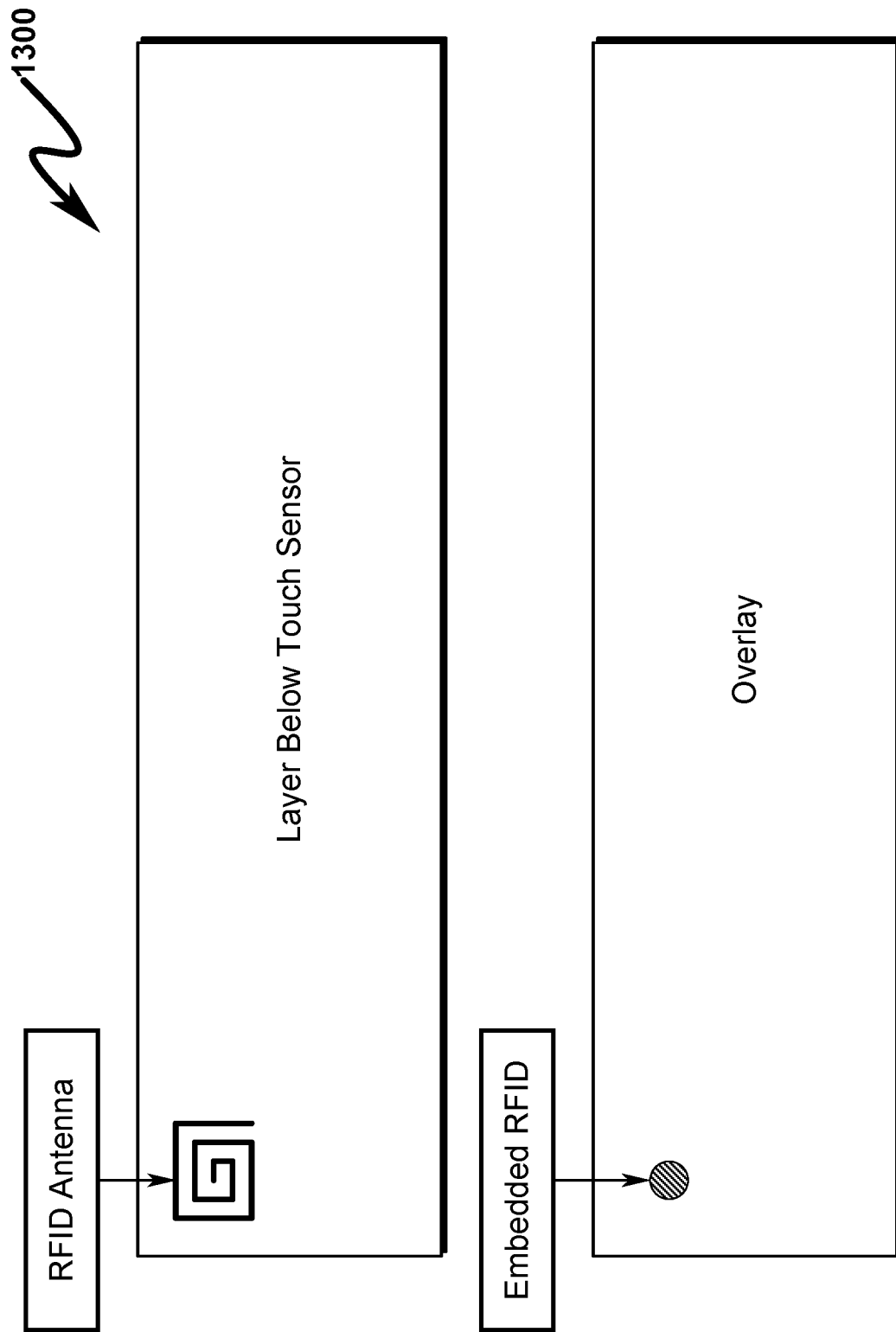
FIG. 13 illustrates a flowchart depicting a method for automatic detection of a TPO overlay using an embedded RFID device within the TPO overlay and a RFID antenna in the TSA.
Figure 14:
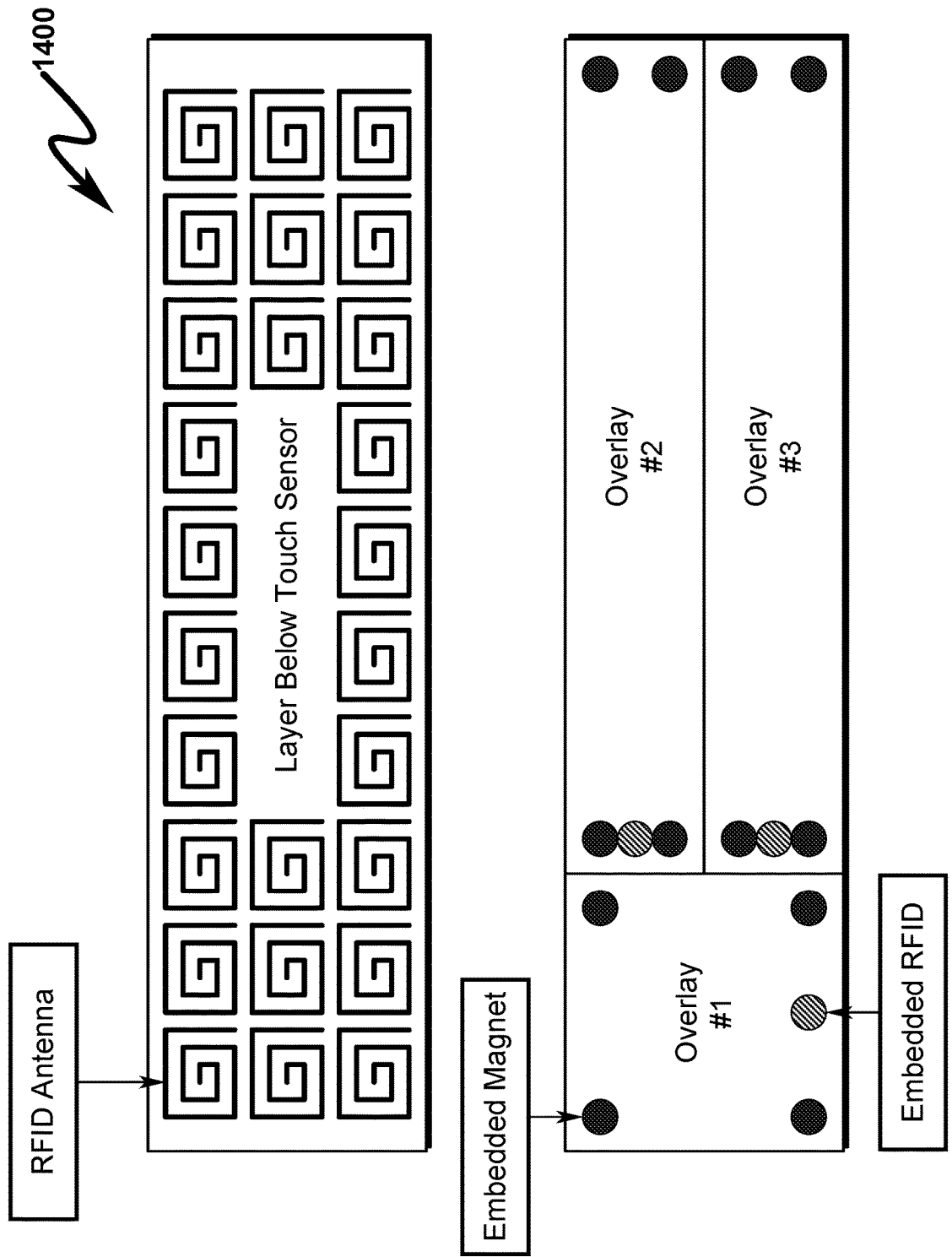
FIG. 14 illustrates a flowchart depicting a method for automatic detection of an arbitrarily placed TPO overlay using an embedded RFID device within the TPO overlay and RFID antennas in the TSA.
Figure 15:
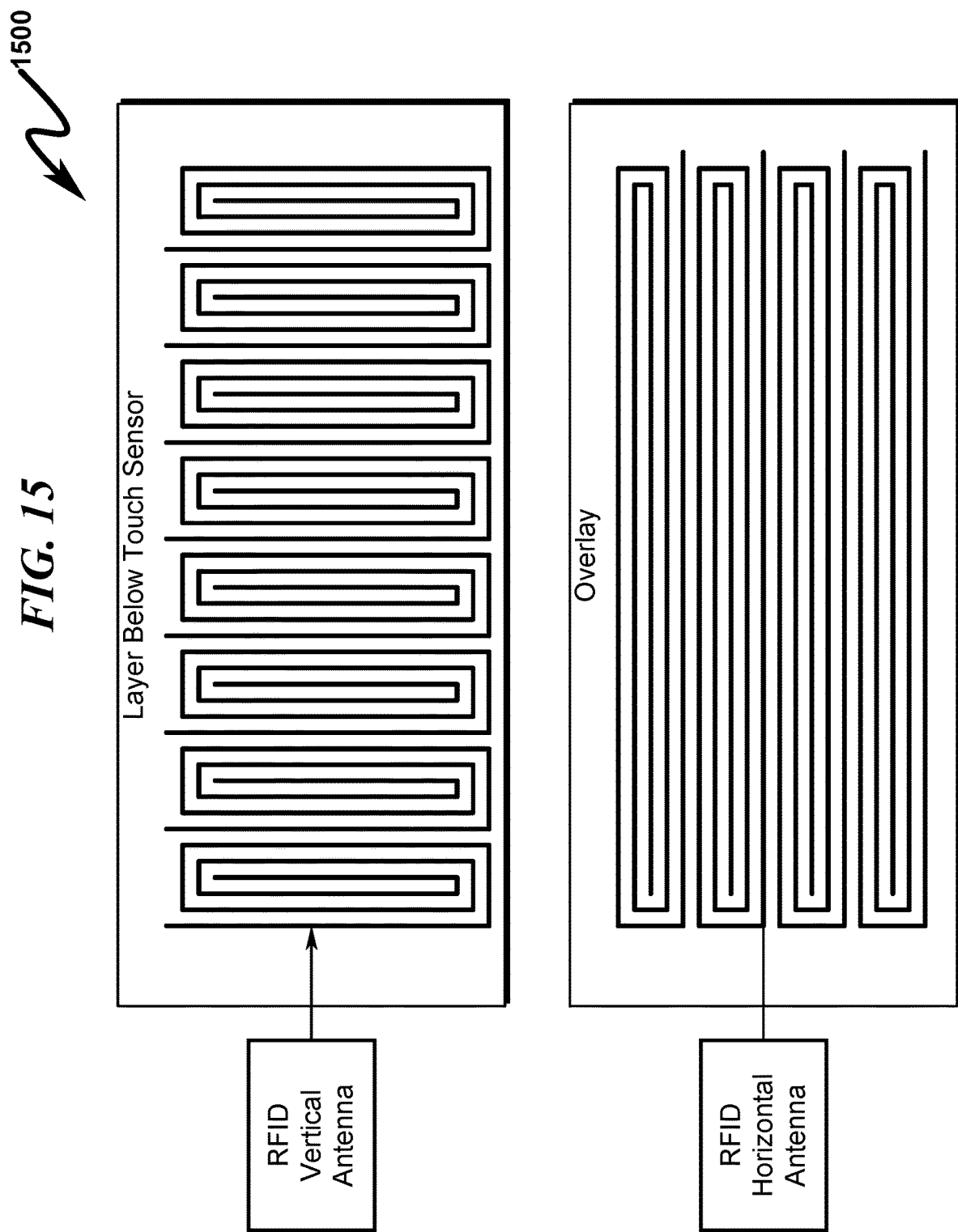
FIG. 15 illustrates a flowchart depicting vertical and horizontal antennas placed within the TSA for the purposes of automatic identification of a TPO overlay using an embedded RFID device within the TPO overlay.
Figure 16:
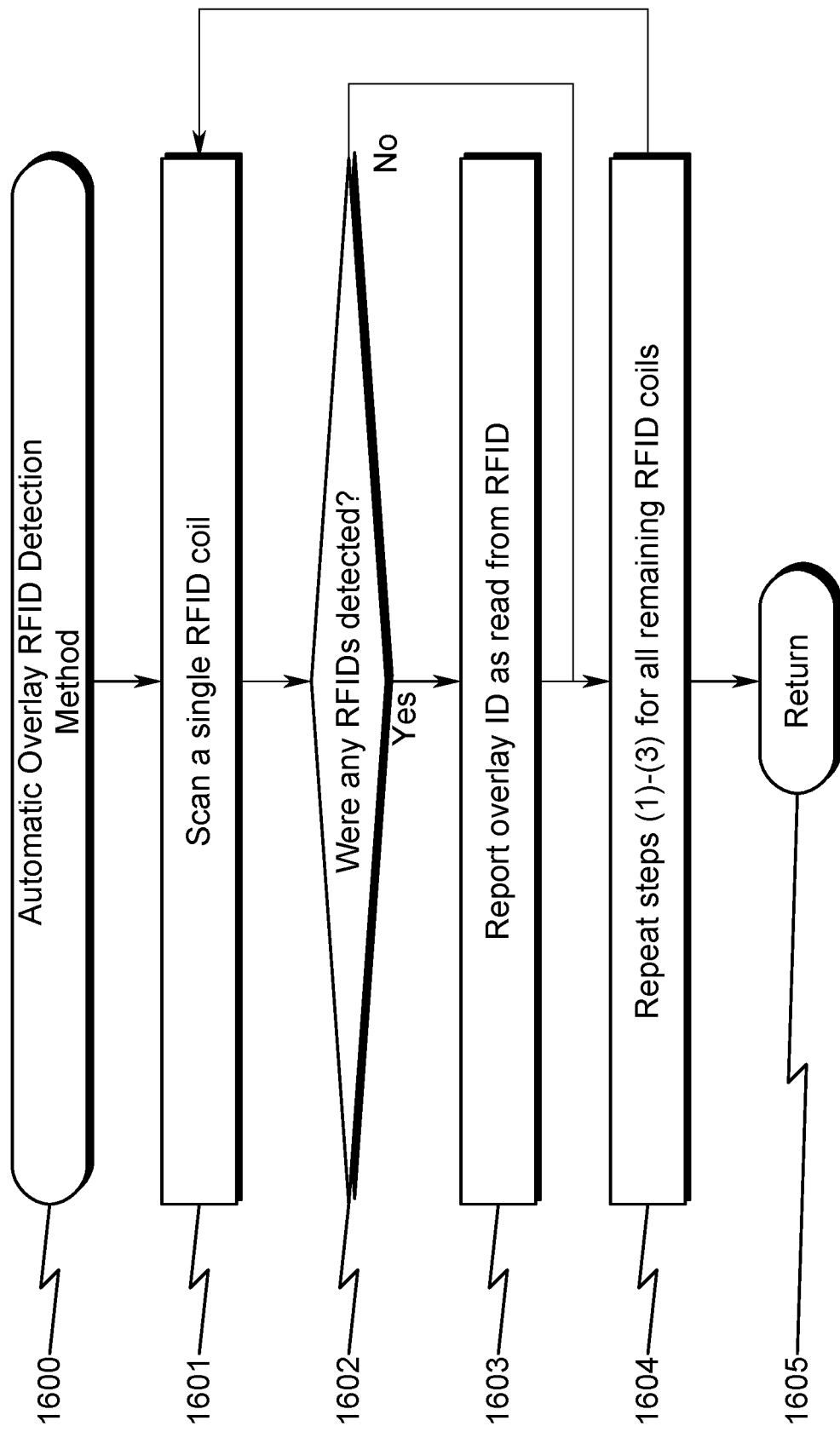
FIG. 16 illustrates a flowchart depicting a method for automatic detection of a TPO overlay using RFID communications.

The present invention may implement identification of the TPO by radio frequency identification (RFID) tag/sensors as generally depicted in FIG. 13 (1300)-FIG. 16 (1600). FIG. 13 (1300) how a RFID antenna in the TSA may be mated with a corresponding RFID tag in the TPO to allow identification and presence detection of the TPO by the TSA. FIG. 14 (1400) depicts how an array of RFID antennas within the TSA may be used to locate the position of a number of TPO structures on the TSA surface via the use of RFID tags within the various TPO structures. FIG. 15 (1500) depicts how horizontal/vertical antennas may be placed within the TSA and TPO to provide for TPO detection and communication between these two structures.

A general method for the automatic RFID detection of TPO overlays is generally depicted in FIG. 16 (1600) and involves the following steps:
(1) Scanning a single RFID coil in the TSA (1601);
(2) Determining if any RFIDs were detected, and if not, proceeding to step (4) (1602);
(3) Reporting a TPO overlay ID as read from the RFID (1603);
(4) Repeating steps (1)-(3) for all remaining RFID coils in the TSA (proceed to step (1) (1604); and
(5) Returning to the calling procedure (1605).

This general method may be modified heavily depending on a number of factors, with rearrangement and/or addition/deletion of steps anticipated by the scope of the present invention.

TSA Tablet Interface (TTI) (1700)-(2400)

Figure 17:
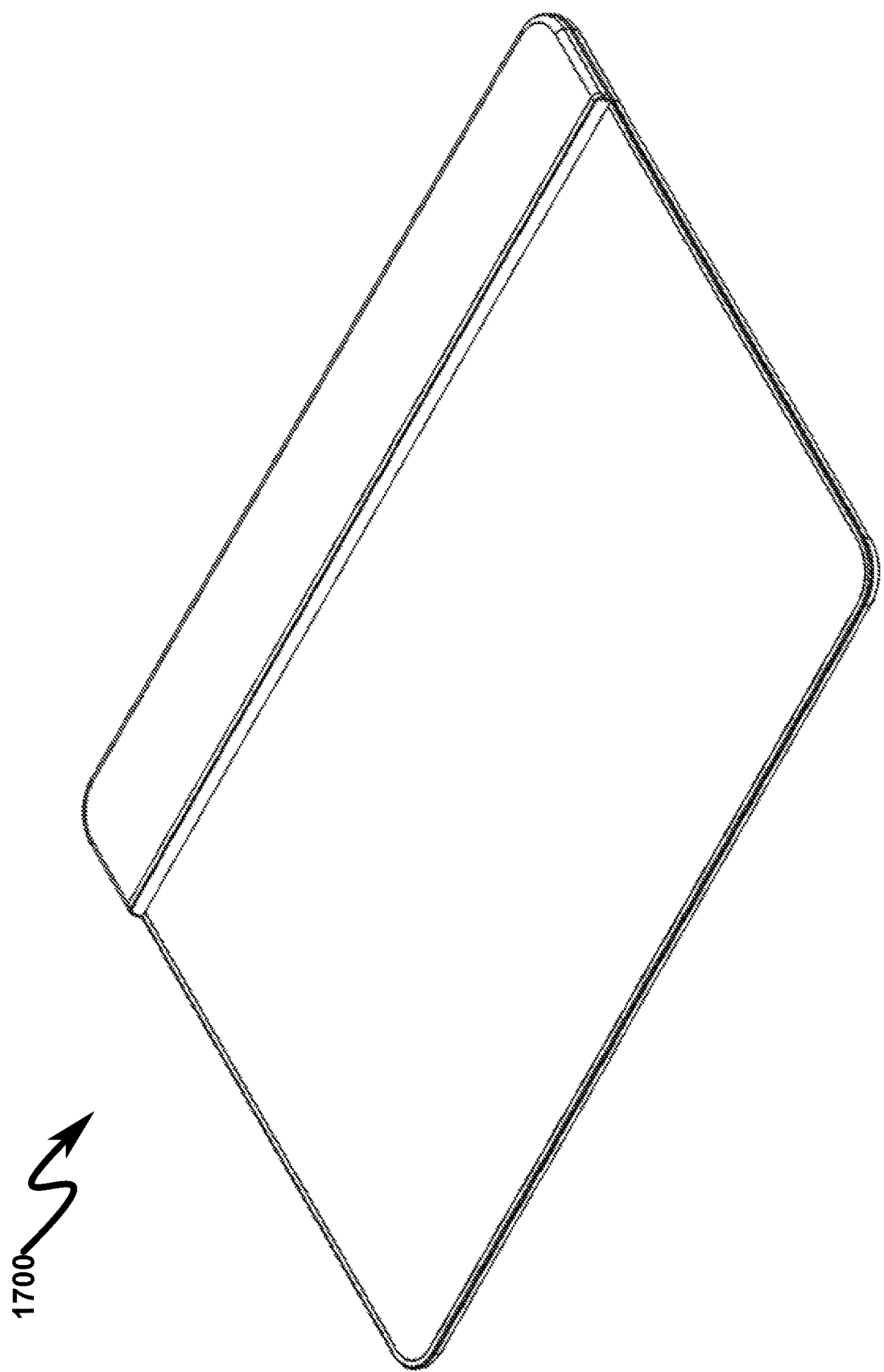
FIG. 17 illustrates a top right front perspective view of a preferred exemplary touch sensitive array (TSA) tablet interface (TTI) useful in implementing some embodiments of the present invention.
Figure 18:
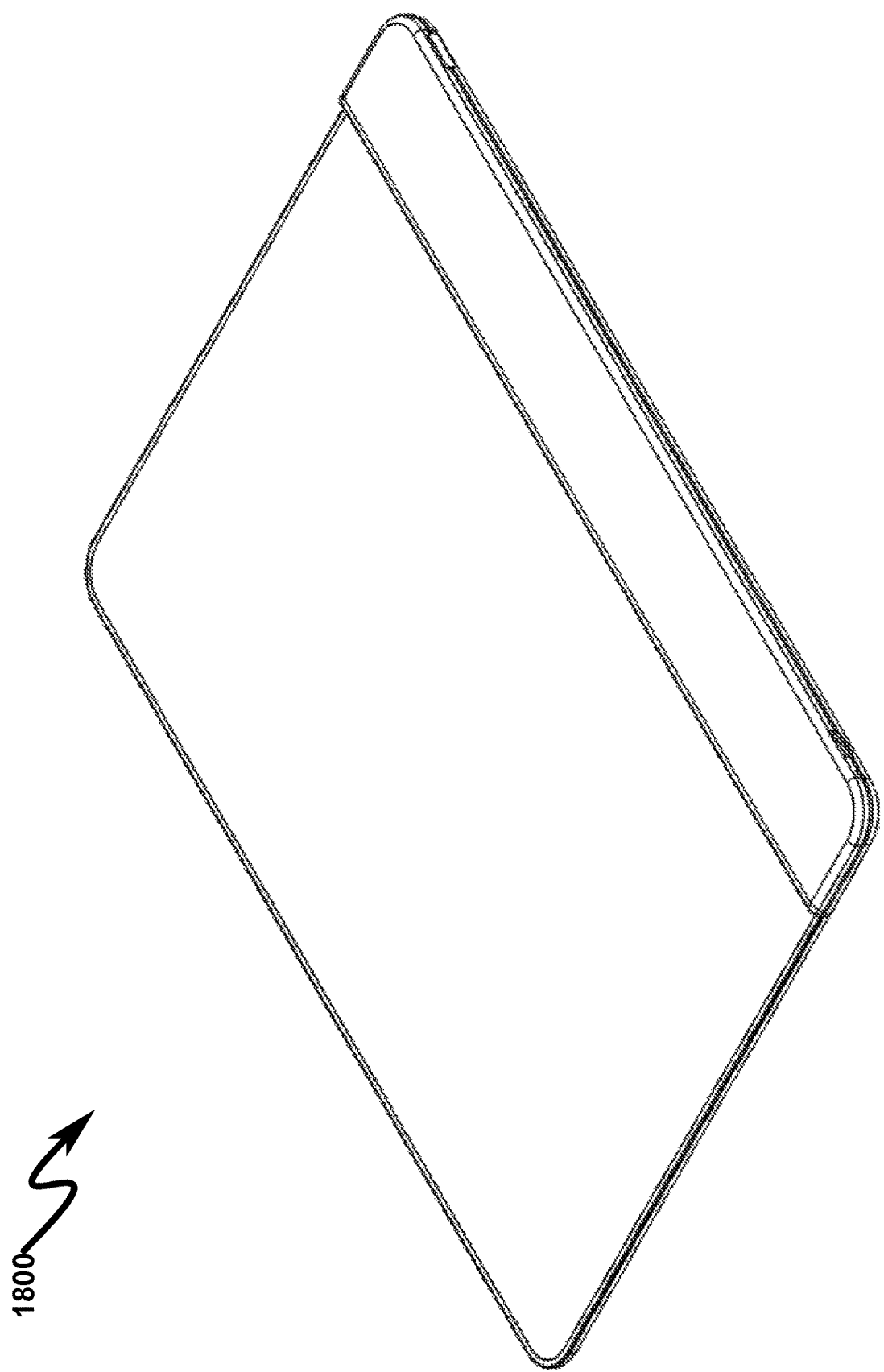
FIG. 18 illustrates a top right rear perspective view of a preferred exemplary touch sensitive array (TSA) tablet interface (TTI) useful in implementing some embodiments of the present invention.
Figure 19:
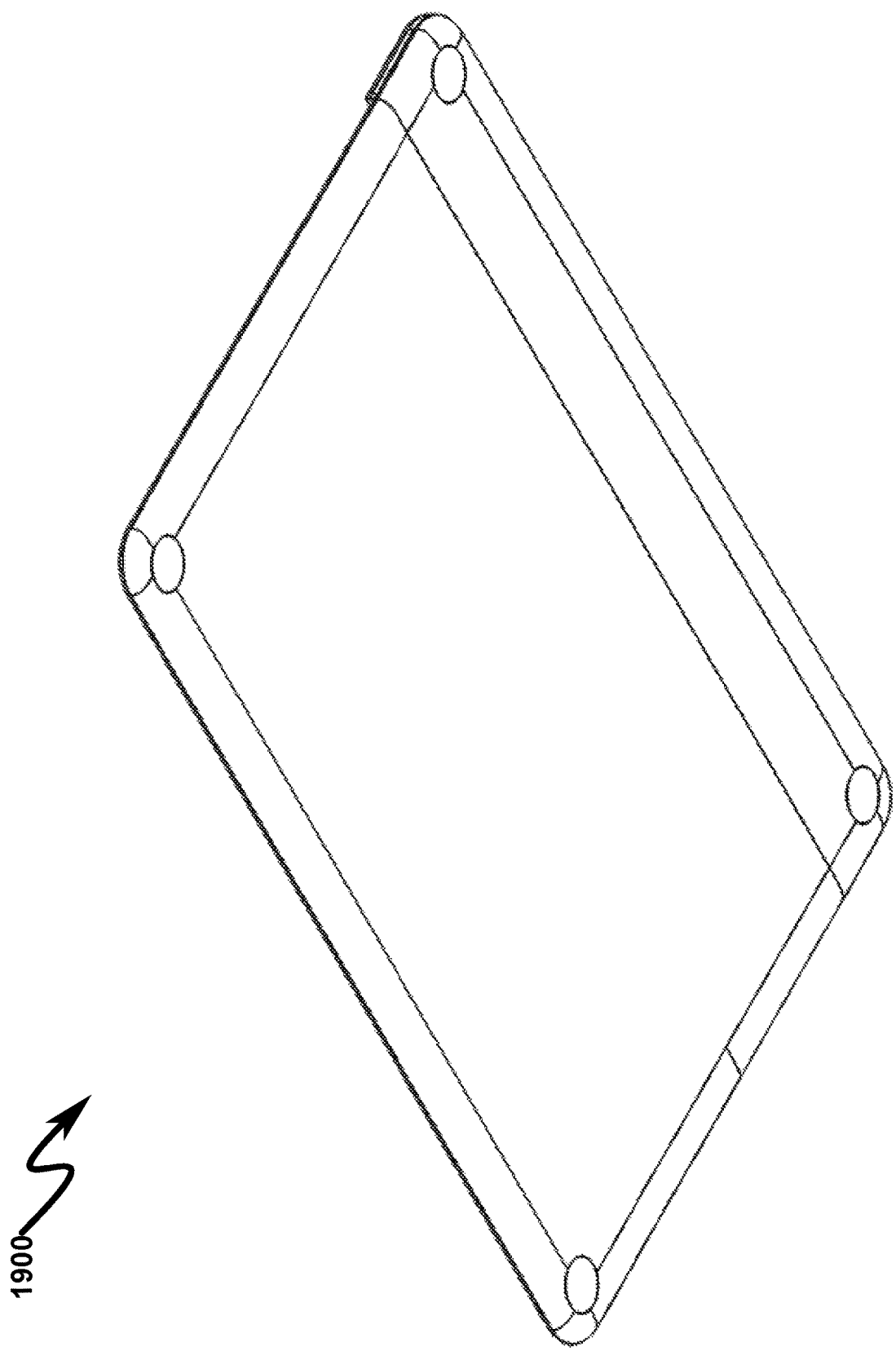
FIG. 19 illustrates a bottom right front perspective view of a preferred exemplary touch sensitive array (TSA) tablet interface (TTI) useful in implementing some embodiments of the present invention.
Figure 20:
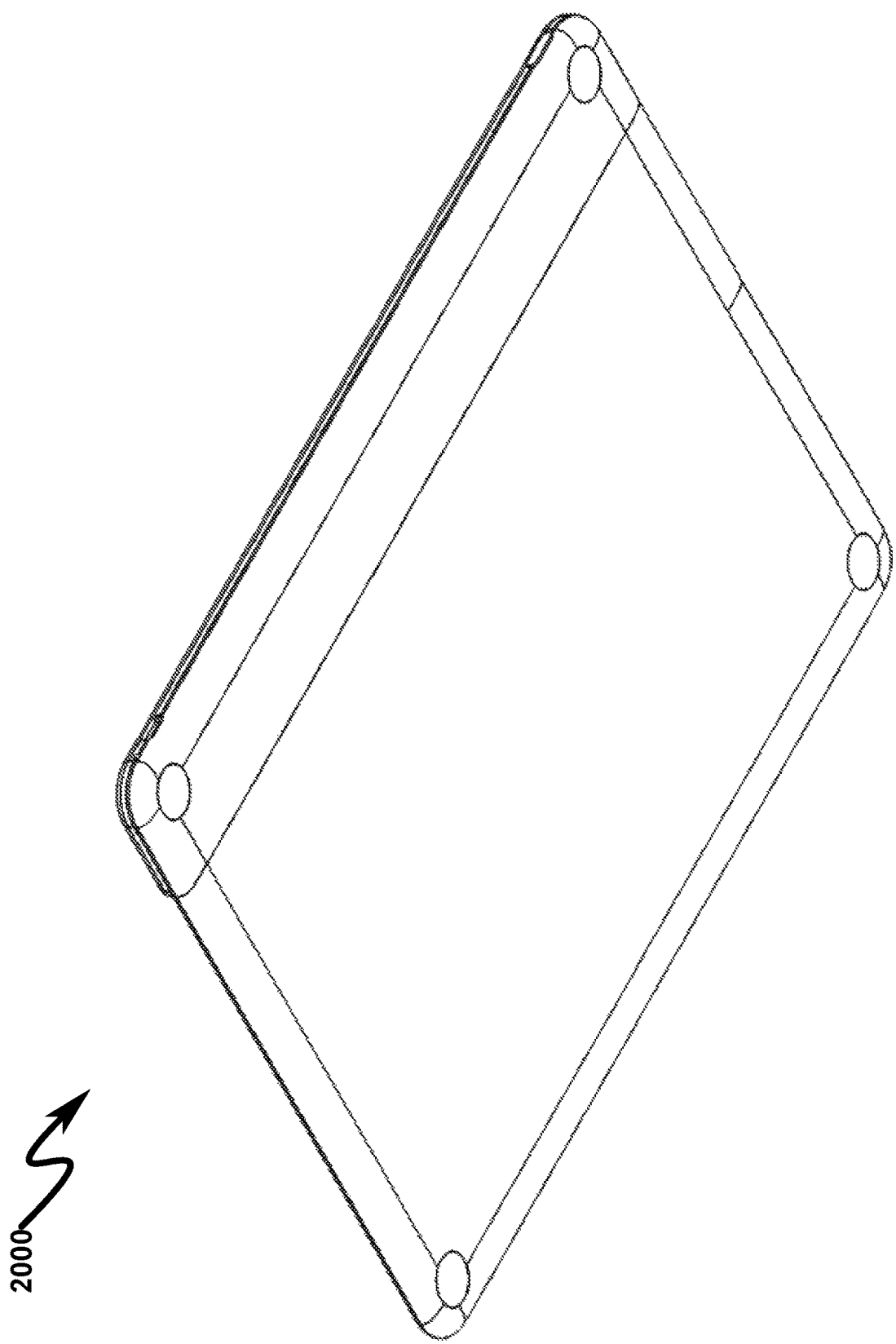
FIG. 20 illustrates a bottom right rear perspective view of a preferred exemplary touch sensitive array (TSA) tablet interface (TTI) useful in implementing some embodiments of the present invention.
Figure 21:
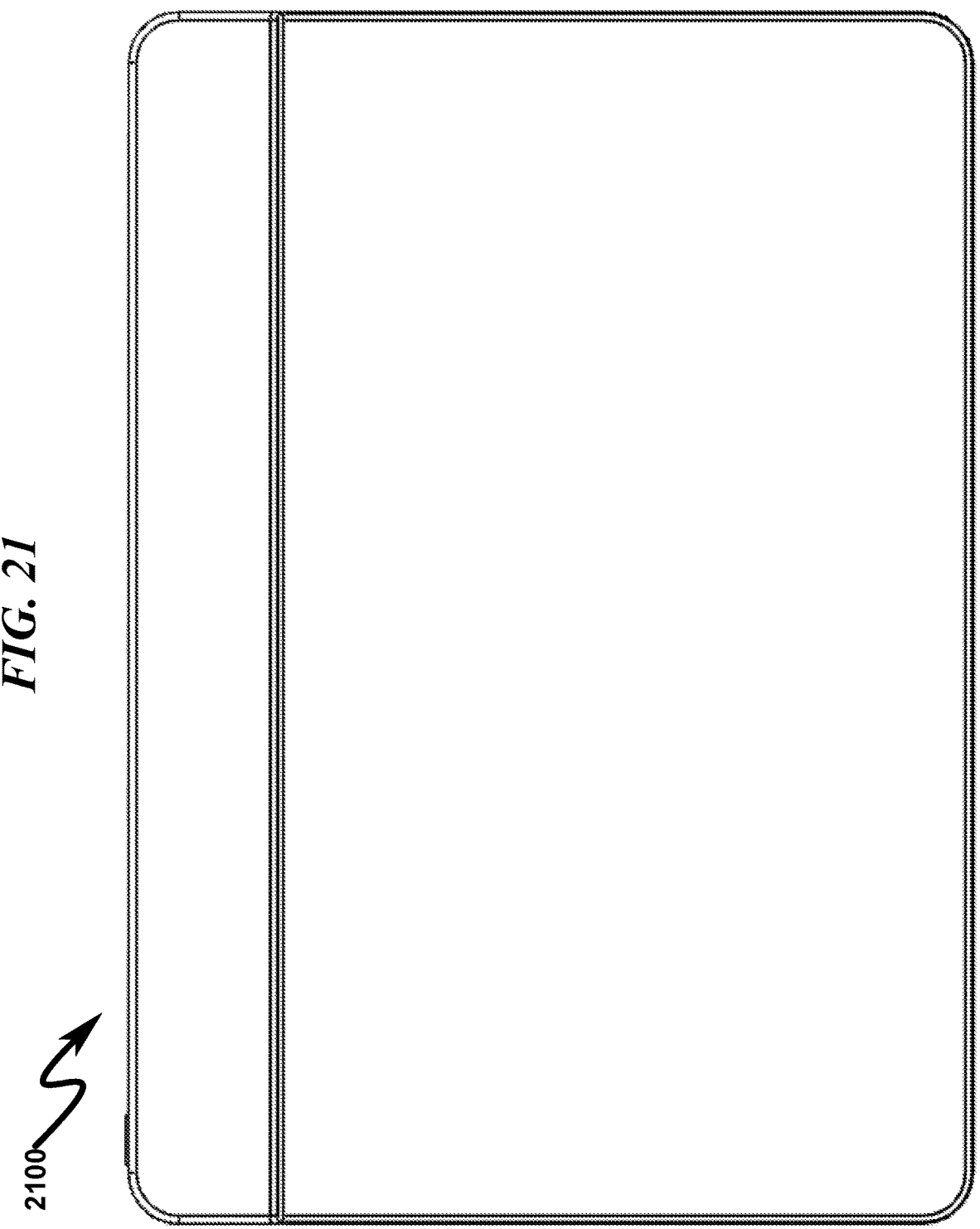
FIG. 21 illustrates a top view of a preferred exemplary touch sensitive array (TSA) tablet interface (TTI) useful in implementing some embodiments of the present invention.
Figure 22:
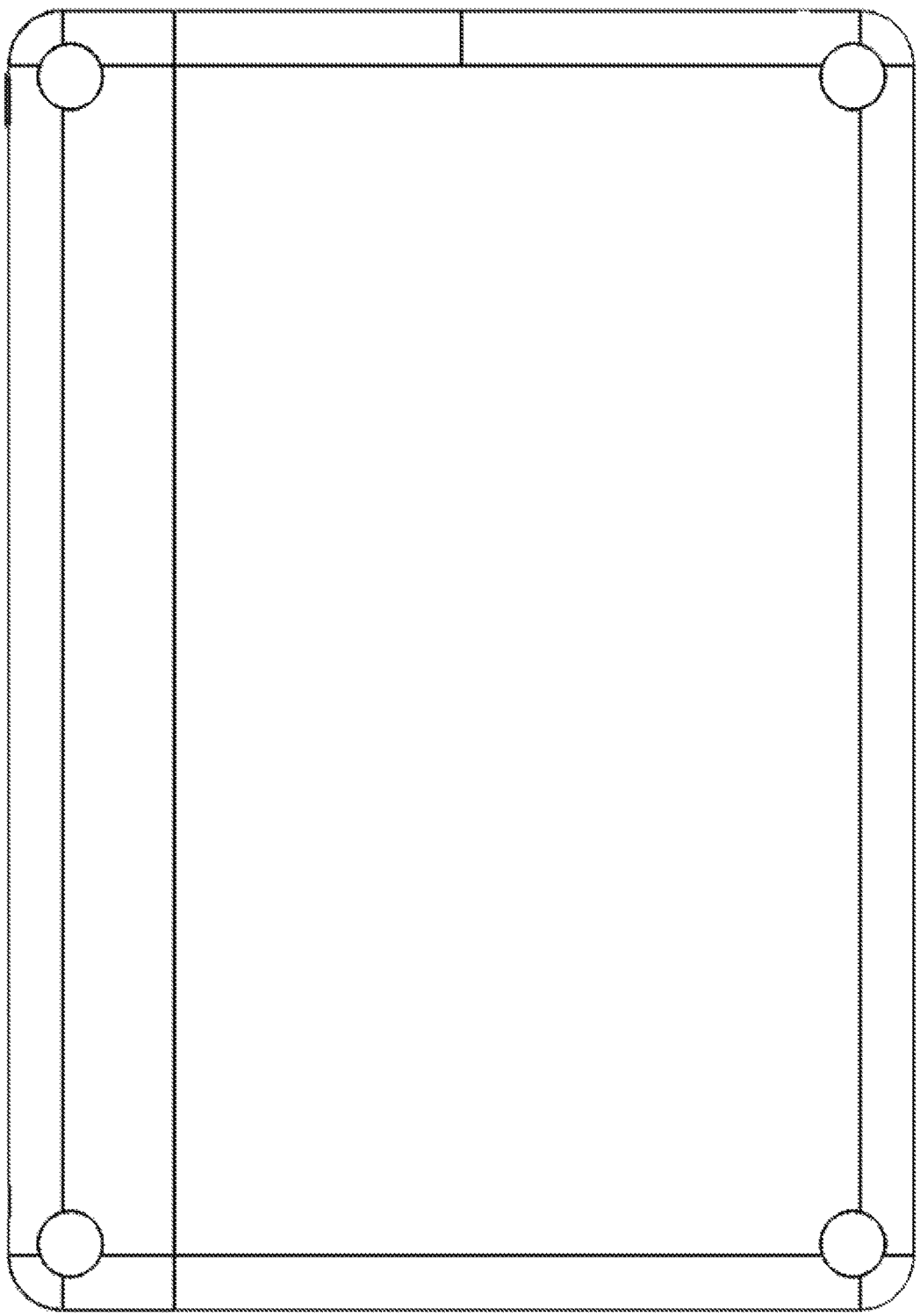
FIG. 22 illustrates a bottom view of a preferred exemplary touch sensitive array (TSA) tablet interface (TTI) useful in implementing some embodiments of the present invention.
Figure 23:
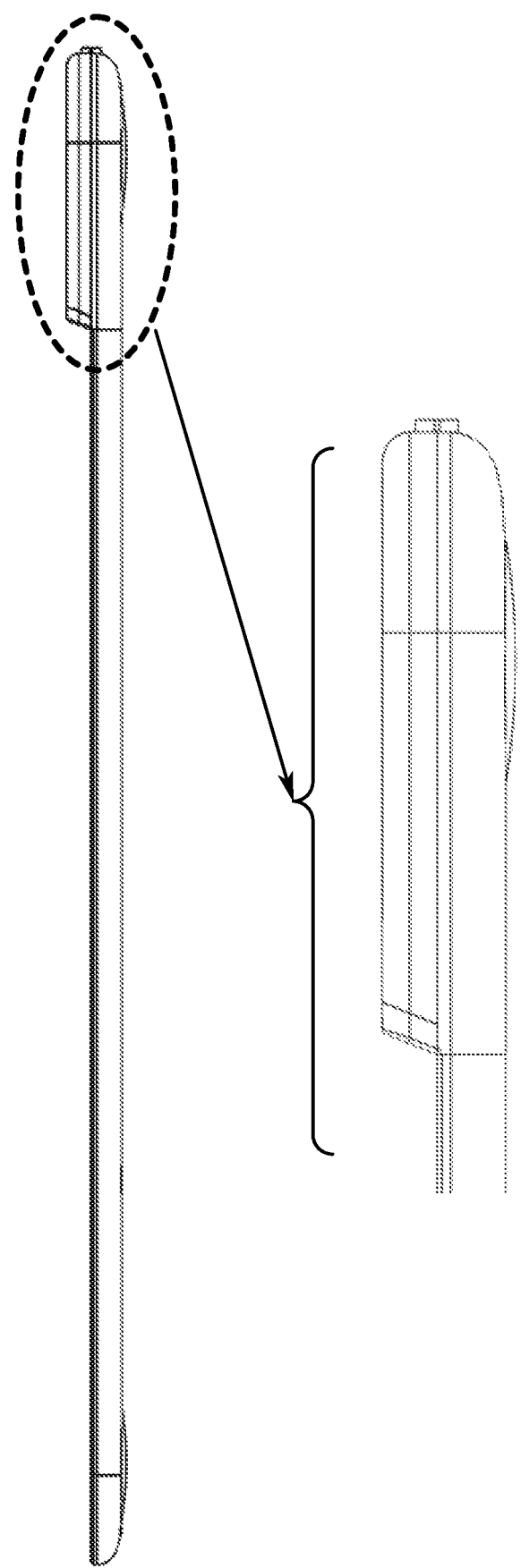
FIG. 23 illustrates a right side view of a preferred exemplary touch sensitive array (TSA) tablet interface (TTI) useful in implementing some embodiments of the present invention.
Figure 24:
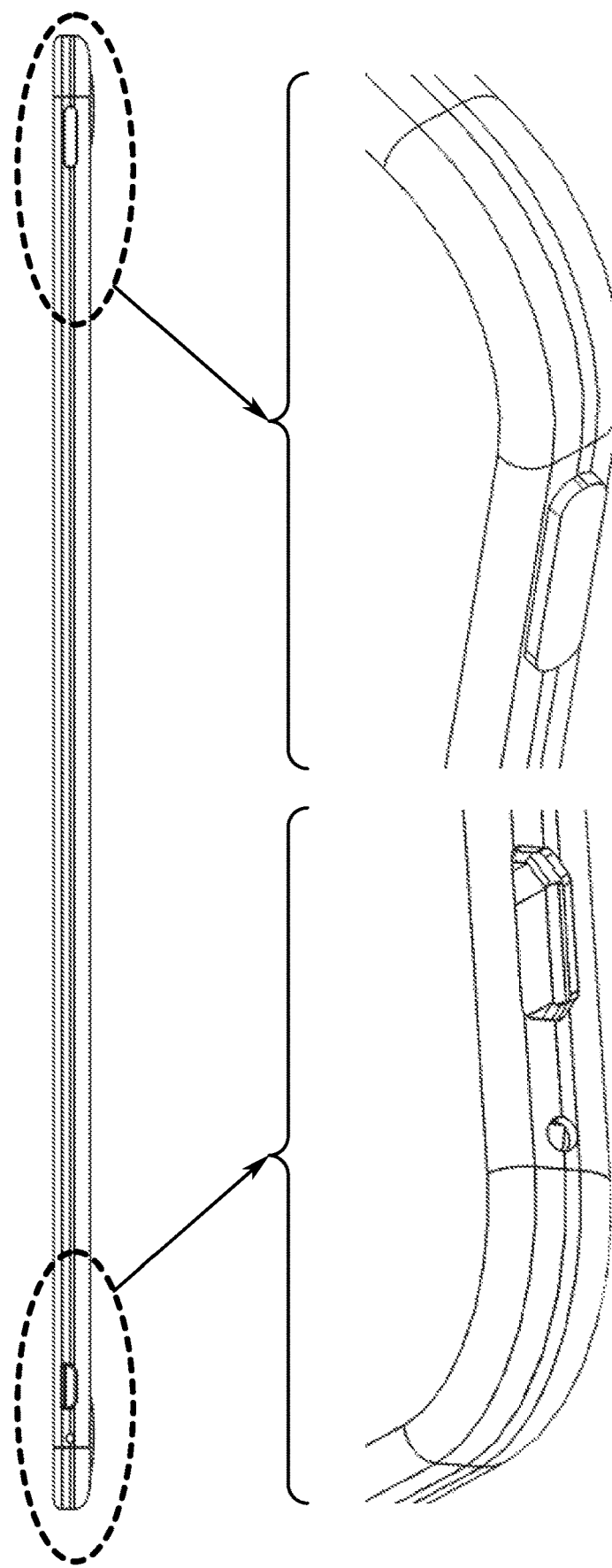
FIG. 24 illustrates a rear side view of a preferred exemplary touch sensitive array (TSA) tablet interface (TTI) useful in implementing some embodiments of the present invention.

The present invention may implement the described tactile touch sensor system/method using a touch sensitive array (TSA) tablet interface (TTI) as generally depicted in FIG. 17 (1700)-FIG. 24 (2400). This TTI provides the foundation on which many preferred invention embodiments may be constructed. A wide variety of TPO overlays as described below may be attached to the TTI active TSA pressure sensitive surface and communicate with the TSA electronics and remote host computers using a variety of wired and wireless communication protocols.

The tabled illustrated in these figures can be constructed with any type of perimeter form. Additionally while a set number of keys are depicted in the diagrams that follow, the present invention may incorporate any number of keys in based on application context. Keys represented in the figures may incorporate embossed indicia (via an embossing manufacturing process), but this is not a limitation of the present invention.

Exemplary 3D Overlays (2500)-(4000)

Figure 25:
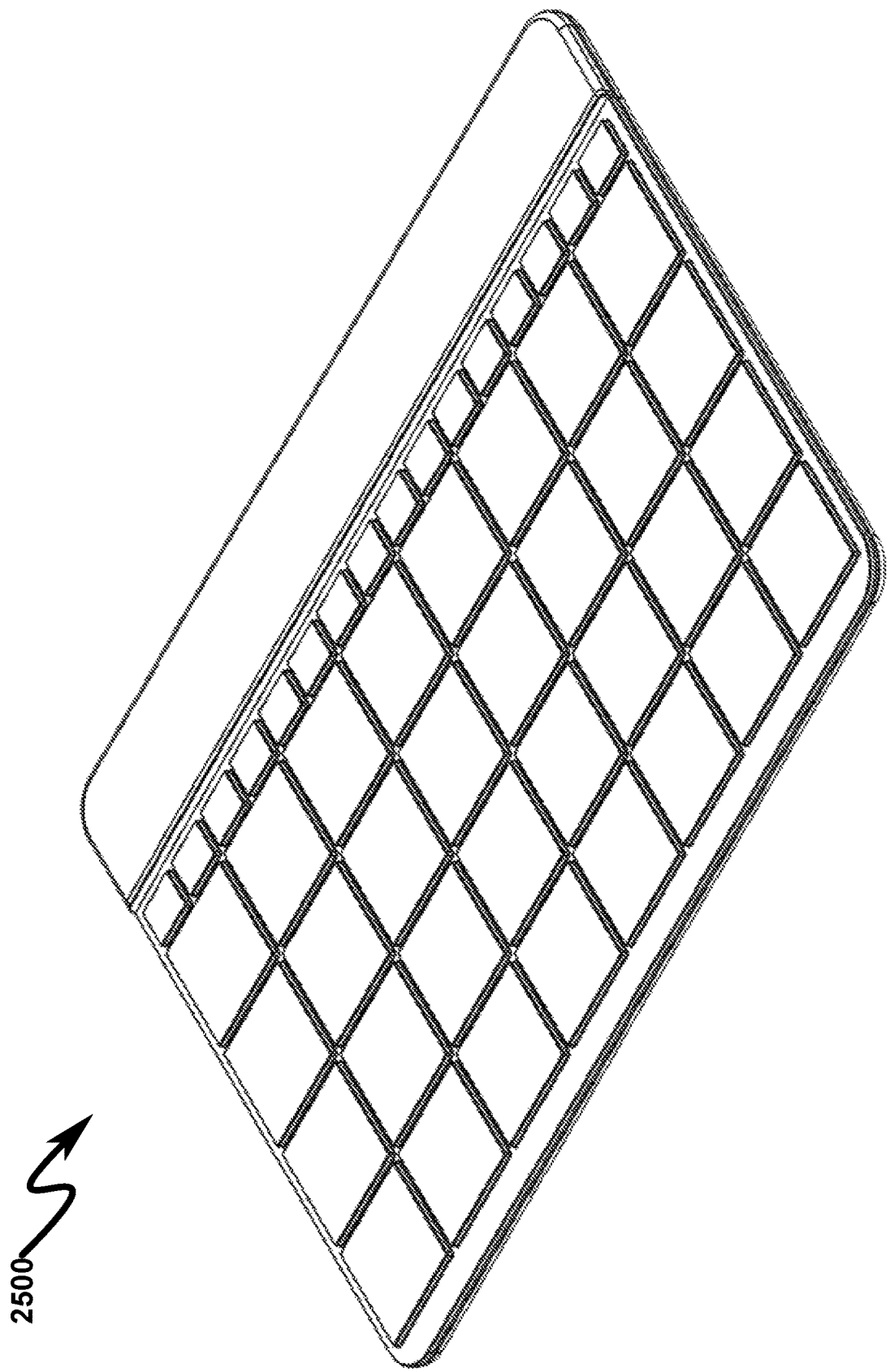
FIG. 25 illustrates a top right front perspective view of a preferred exemplary touch sensitive array (TSA) tablet interface (TTI) with a first exemplary custom TTA pressure overlay (TPO)

TPO overlays may be constructed so they are three-dimensional. This can be achieved by molding or 3D-printing a flexible material into a three-dimensional overlay. For a piano, an overlay could be created such that the black keys are taller than the white keys. The overlay could also have gaps in between the keys, so that a user can feel where piano keys start/end. This type of overlay provides both visual and tactile feedback to the user. FIG. 25 (2500)-FIG. 40 (4000) shows cross-sections of various features that can be added to an overlay when using a three-dimensional overlay manufacturing process. It should be noted that a wide variety of overall TPO thicknesses are possible using these construction techniques and several of these variants are provided in the example embodiments depicted in FIG. 25 (2500)-FIG. 40 (4000).

TPO First Generic Keypad Interface (2500)-(2600)

Figure 26:
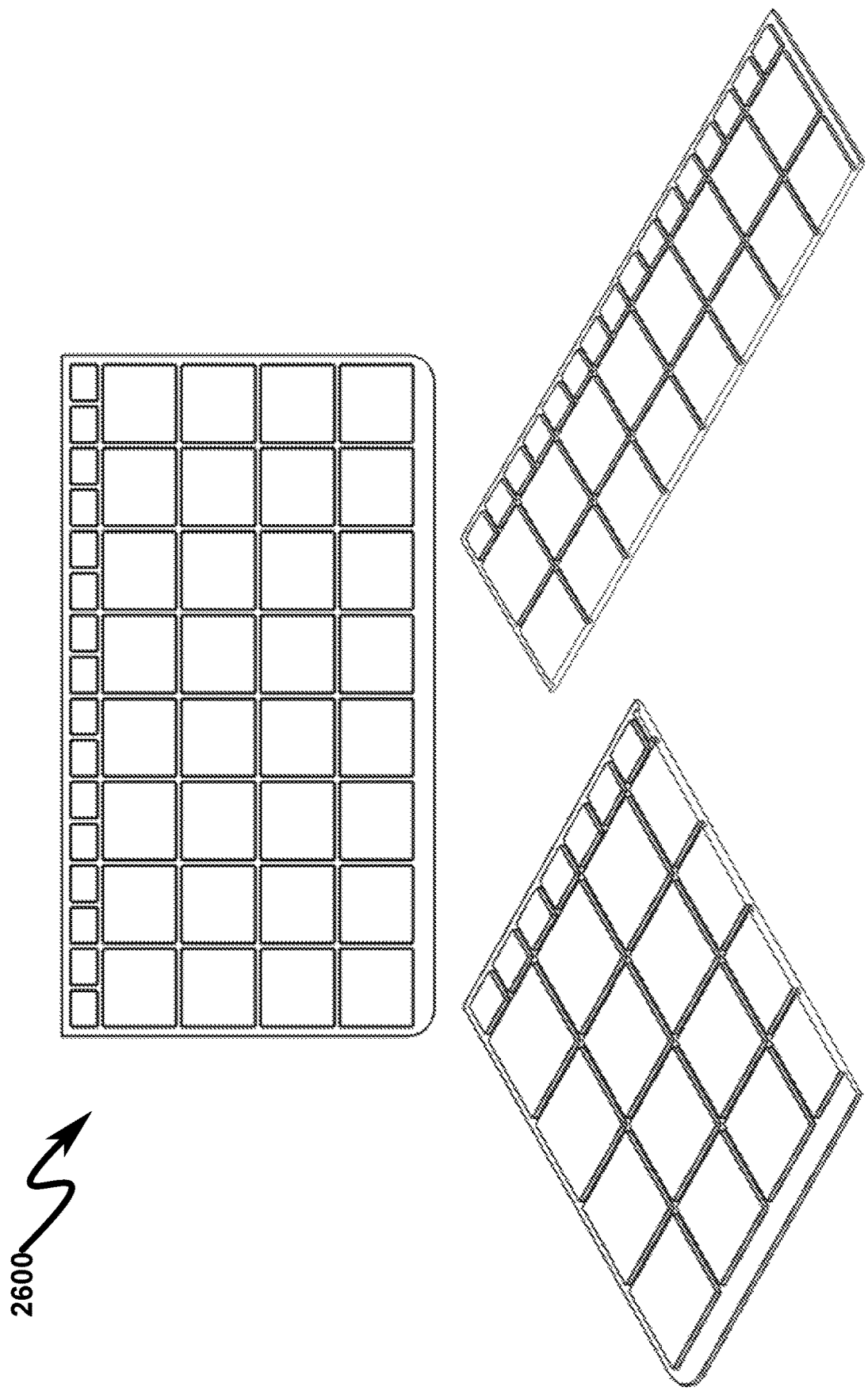
FIG. 26 illustrates a top view and right/front sectional perspective views of a preferred exemplary touch sensitive array (TSA) tablet interface (TTI) with a first exemplary custom TTA pressure overlay (TPO)

The present invention may implement the described tactile touch sensor system/method in a first generic keypad form as generally depicted in FIG. 25 (2500)-FIG. 26 (2600). This example represents a typical custom keypad interface layout.

TPO Second Generic Keypad Interface (2700)-(2800)

Figure 27:
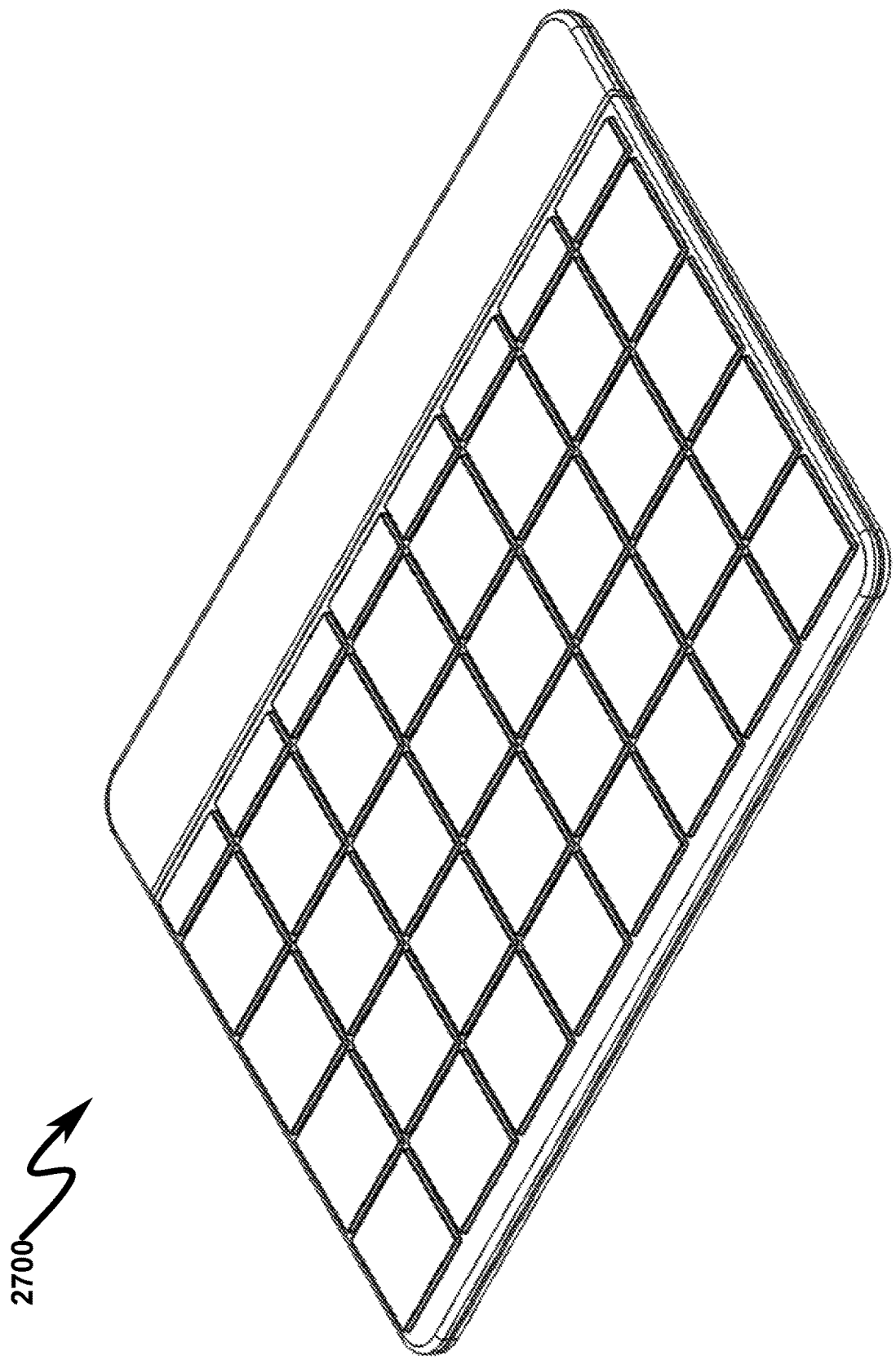
FIG. 27 illustrates a top right front perspective view of a preferred exemplary touch sensitive array (TSA) tablet interface (TTI) with a second exemplary custom TTA pressure overlay (TPO)
Figure 28:
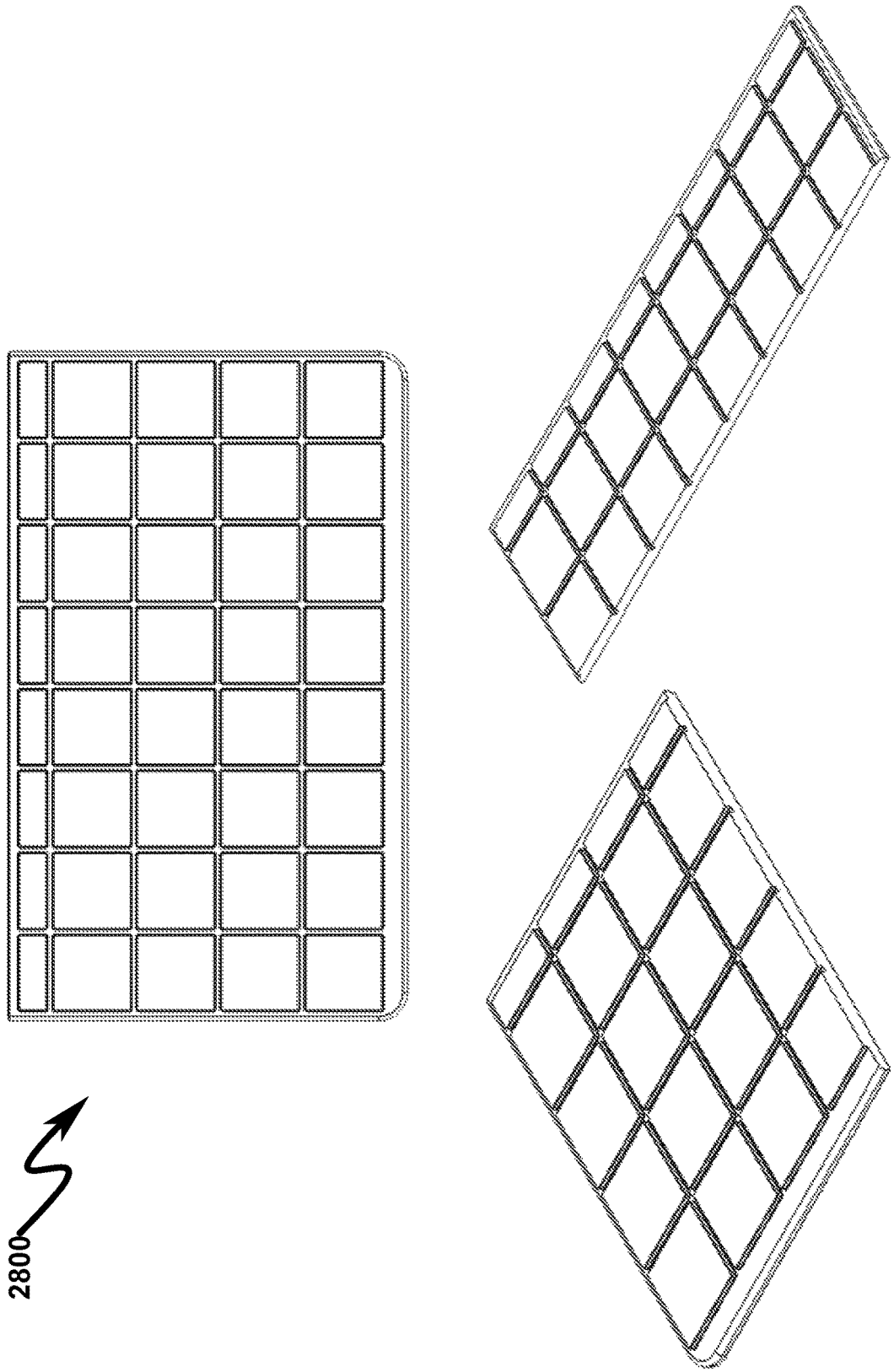
FIG. 28 illustrates a top view and right/front sectional perspective views of a preferred exemplary touch sensitive array (TSA) tablet interface (TTI) with a second exemplary custom TTA pressure overlay (TPO)

The present invention may implement the described tactile touch sensor system/method in a second generic keypad interface form as generally depicted in FIG. 27 (2700)-FIG. 28 (2800).

TPO Third Generic Keypad Interface (2900)-(3000)

Figure 29:
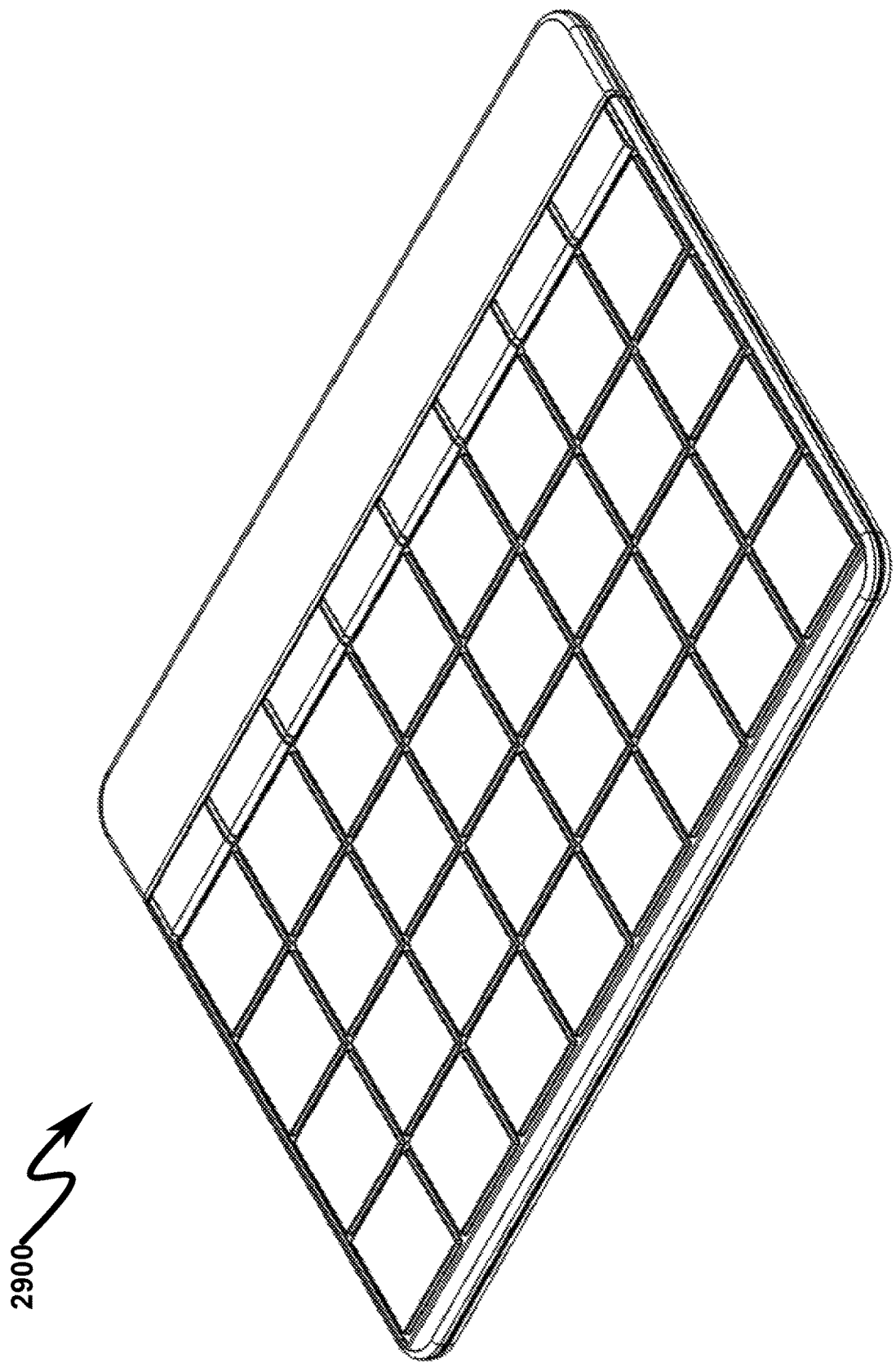
FIG. 29 illustrates a top right front perspective view of a preferred exemplary touch sensitive array (TSA) tablet interface (TTI) with a third exemplary custom TTA pressure overlay (TPO)

The present invention may implement the described tactile touch sensor system/method in a third generic keypad interface form as generally depicted in FIG. 29 (2900)-FIG. 30 (3000).

TPO First Keyboard Interface (3100)-(3200)

Figure 31:
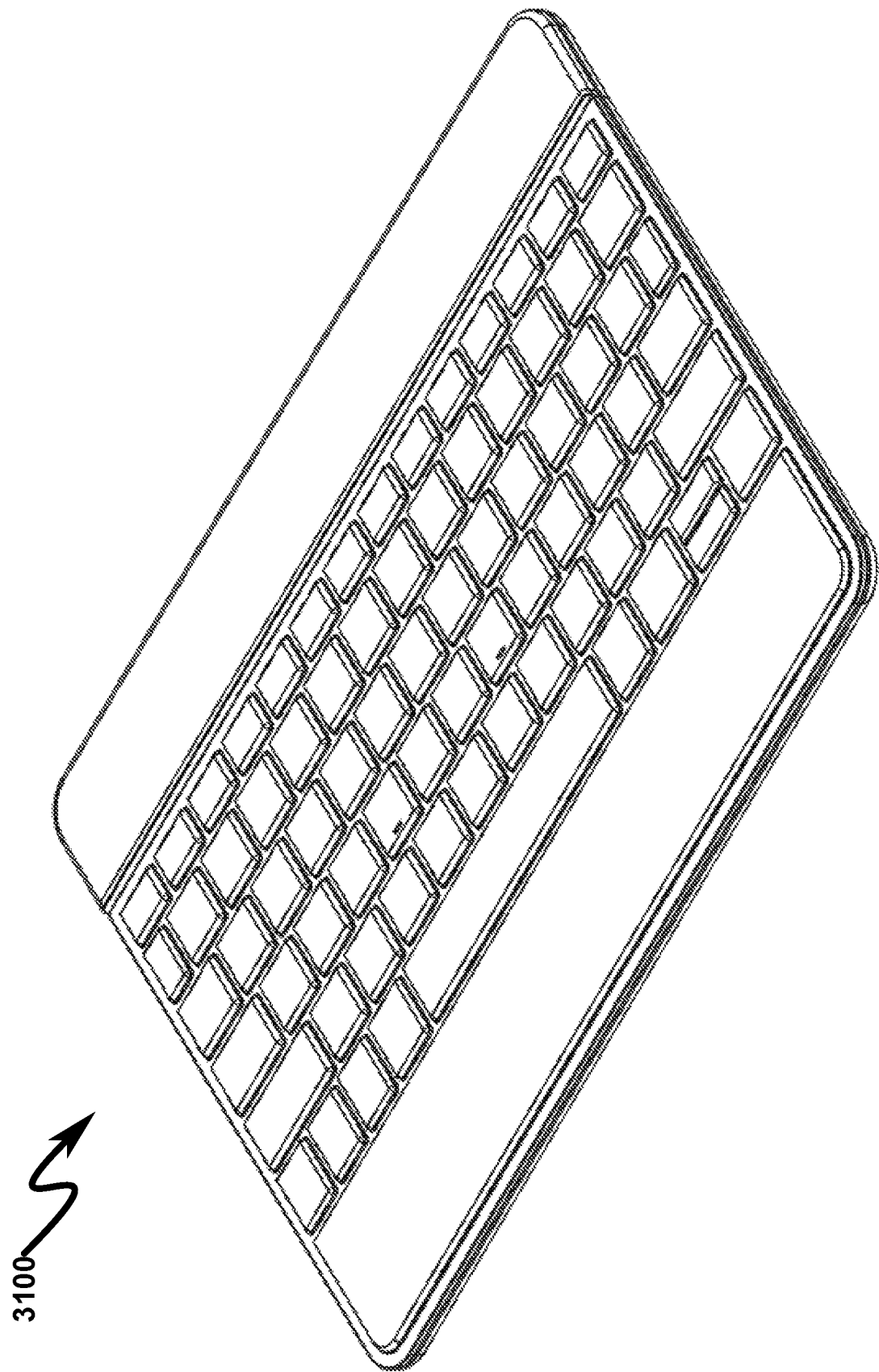
FIG. 31 illustrates a top right front perspective view of a preferred exemplary touch sensitive array (TSA) tablet interface (TTI) with a first exemplary typewriter keyboard TTA pressure overlay (TPO)

The present invention may implement the described tactile touch sensor system/method in a first keyboard form as generally depicted in FIG. 31 (3100)-FIG. 32 (3200). These figures depict a flat overlay physically augmenting a force-sensitive touch sensor. In this case, the overlay is a flat piece of flexible material. This overlay has a QWERTY keyboard printed on it to provide visual feedback to the user.

TPO Second Keyboard Interface (3300)-(3400)

Figure 33:
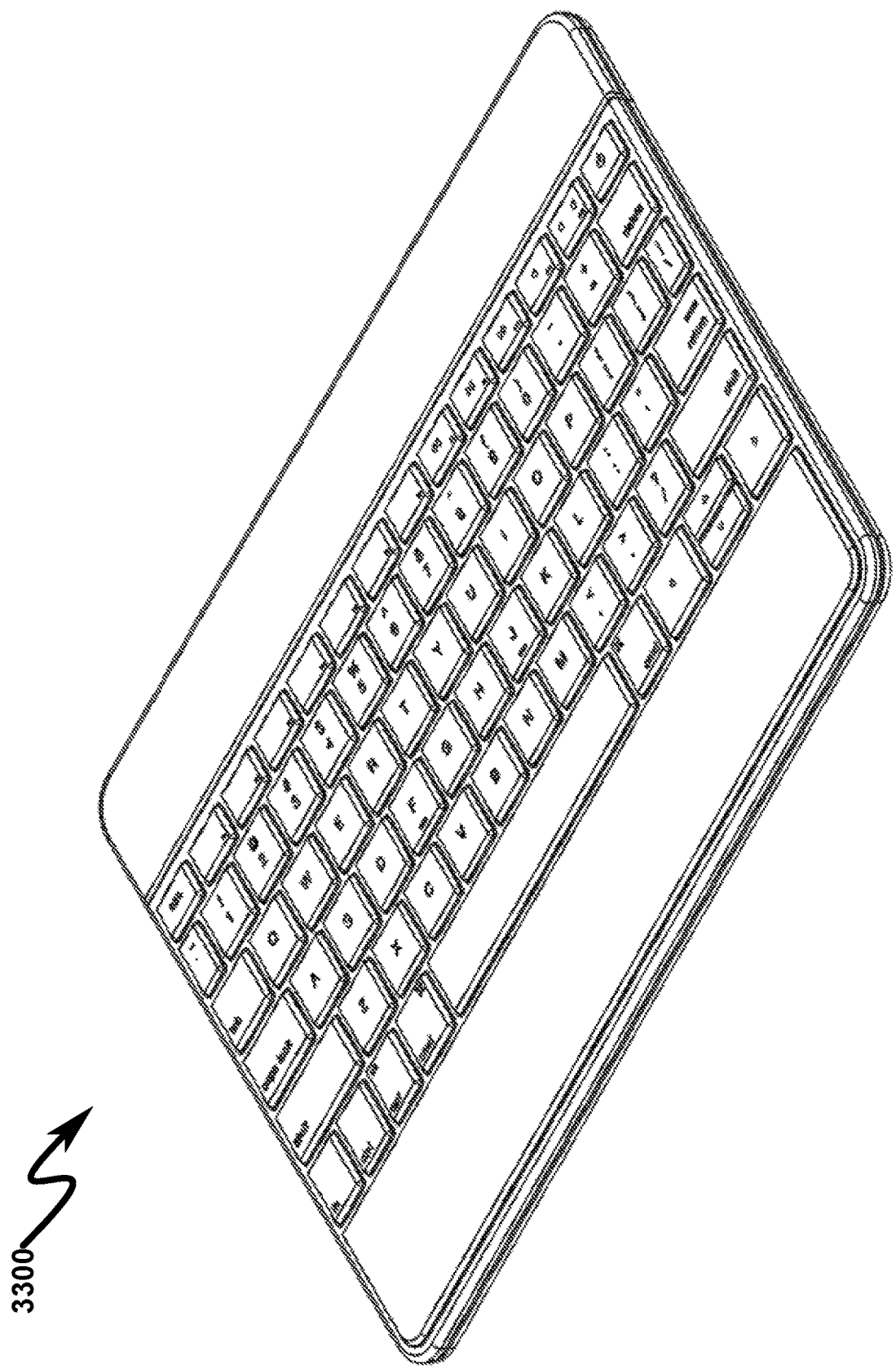
FIG. 33 illustrates a top right front perspective view of a preferred exemplary touch sensitive array (TSA) tablet interface (TTI) with a second exemplary typewriter keyboard TTA pressure overlay (TPO)
Figure 34:
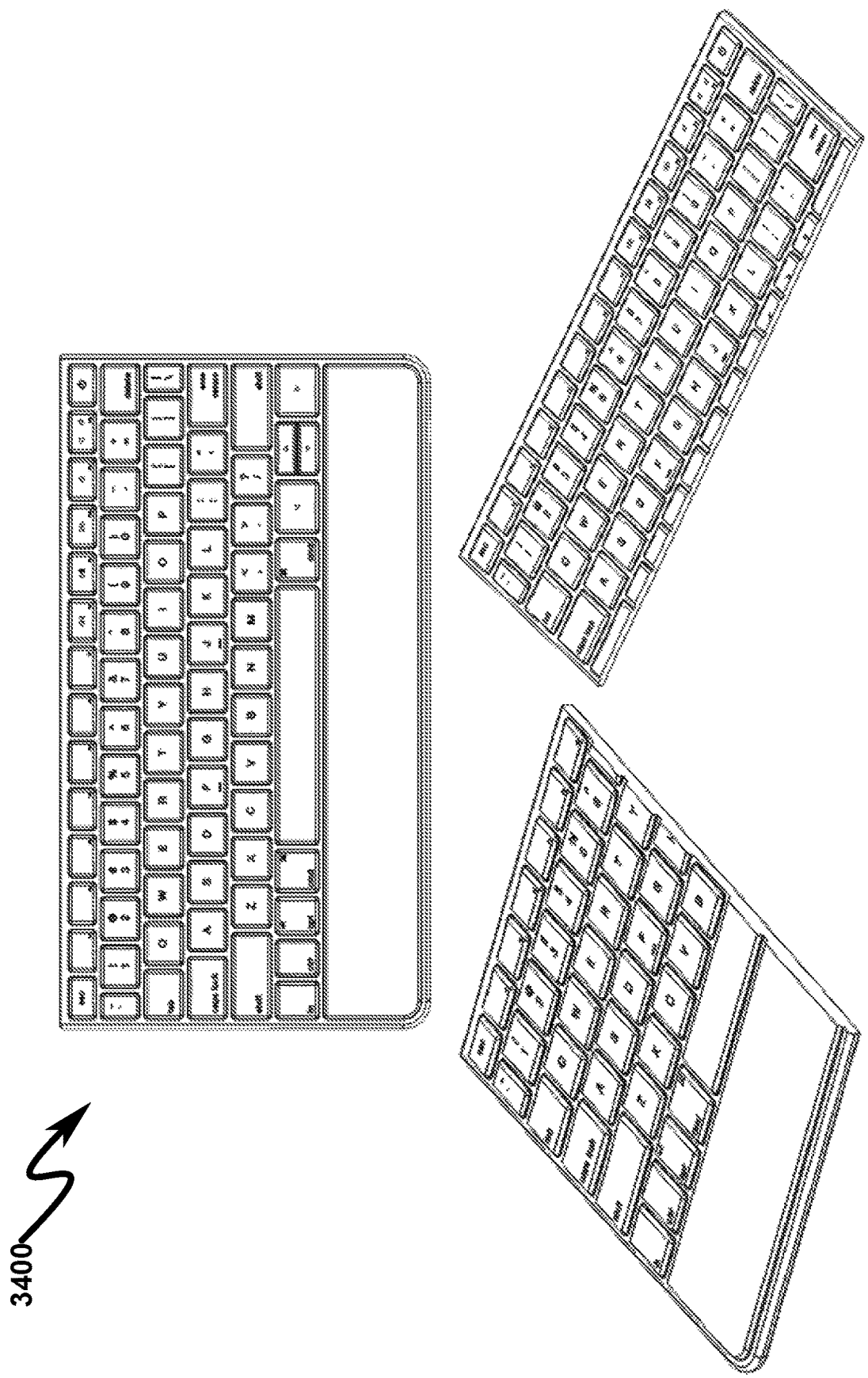
FIG. 34 illustrates a top view and right/front sectional perspective views of a preferred exemplary touch sensitive array (TSA) tablet interface (TTI) with a second exemplary typewriter keyboard TTA pressure overlay (TPO)

The present invention may implement the described tactile touch sensor system/method in a second keyboard form as generally depicted in FIG. 33 (3300)-FIG. 34 (3400). Since the TPO overlays may be substituted at will, the characters on the keyboard face may be replaced depending on the language desired by the user.

TPO Third Keyboard Interface (3500)-(3600)

Figure 35:
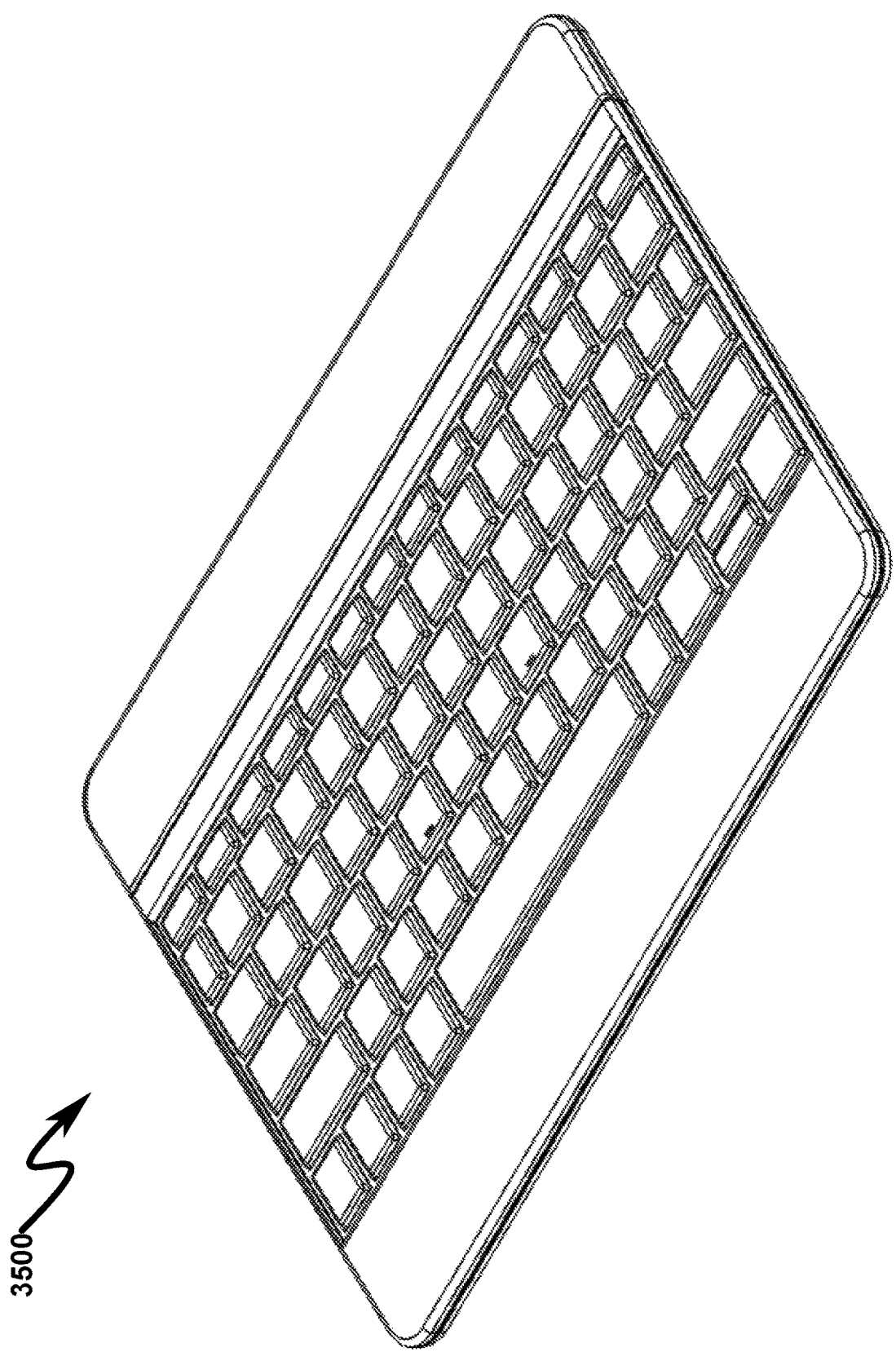
FIG. 35 illustrates a top right front perspective view of a preferred exemplary touch sensitive array (TSA) tablet interface (TTI) with a third exemplary typewriter keyboard TTA pressure overlay (TPO)
Figure 36:
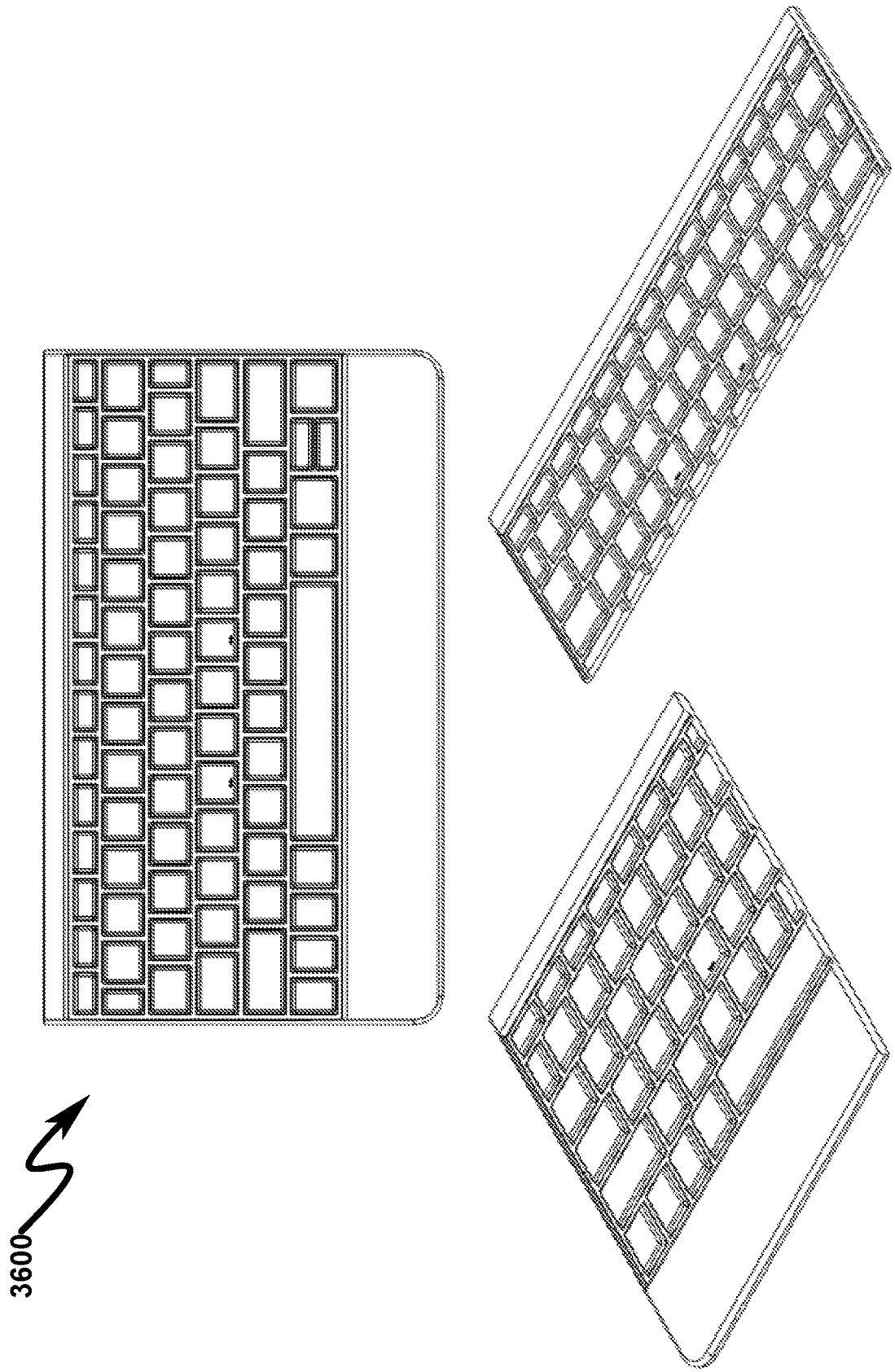
FIG. 36 illustrates a top view and right/front sectional perspective views of a preferred exemplary touch sensitive array (TSA) tablet interface (TTI) with a third exemplary typewriter keyboard TTA pressure overlay (TPO)

The present invention may implement the described tactile touch sensor system/method in a third keyboard form as generally depicted in FIG. 35 (3500)-FIG. 36 (3600). This embodiment uses thicker key forms than the previous embodiments and illustrates how the "feel" of the keyboard may be modified based on the TPO overlay selected. Thus, a single TSA tablet may support a large number of "feels" for user ergonomics.

TPO First Piano Keyboard Interface (3700)-(3800)

Figure 37:
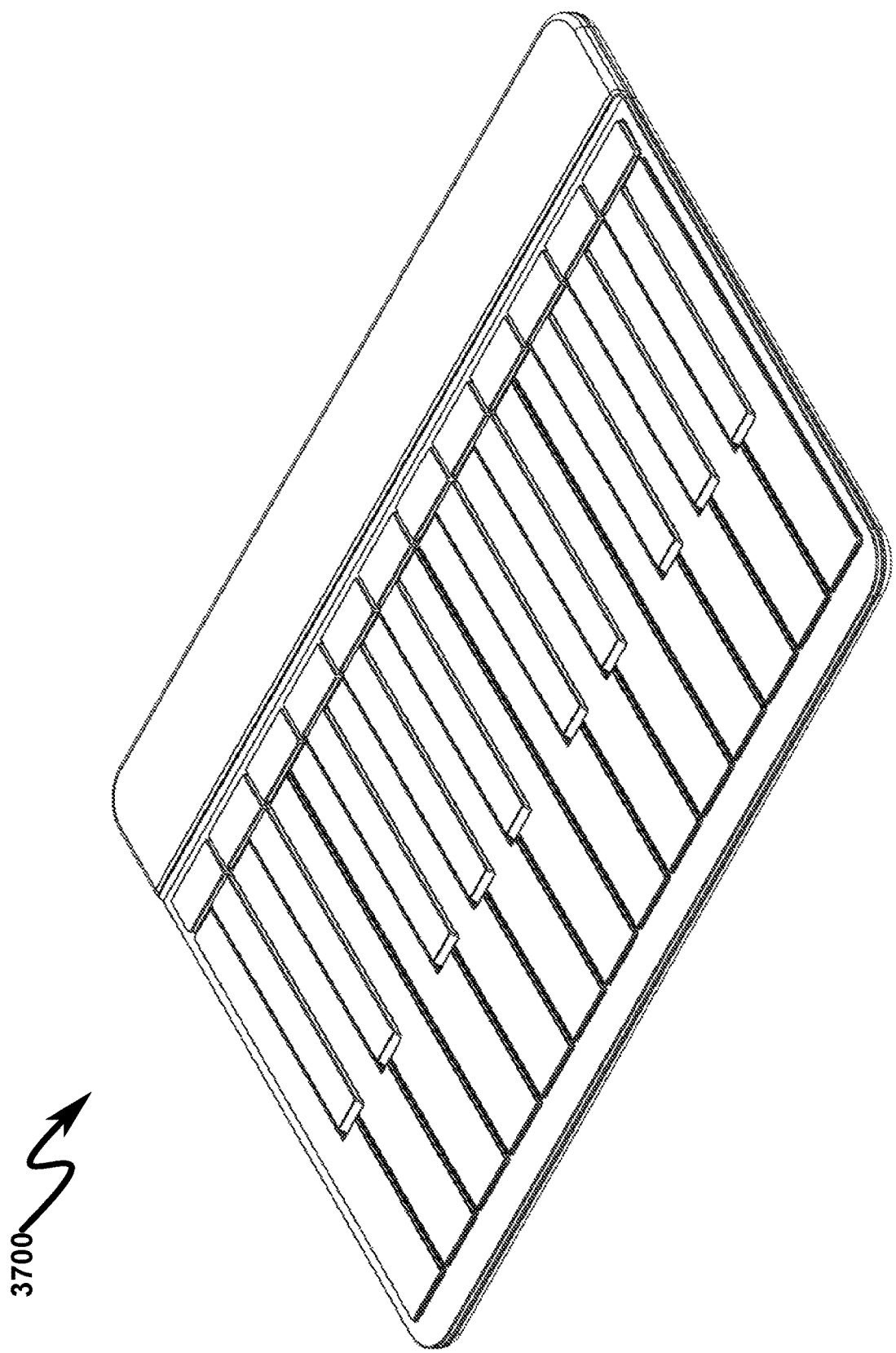
FIG. 37 illustrates a top right front perspective view of a preferred exemplary touch sensitive array (TSA) tablet interface (TTI) with a first exemplary piano keyboard TTA pressure overlay (TPO)
Figure 38:
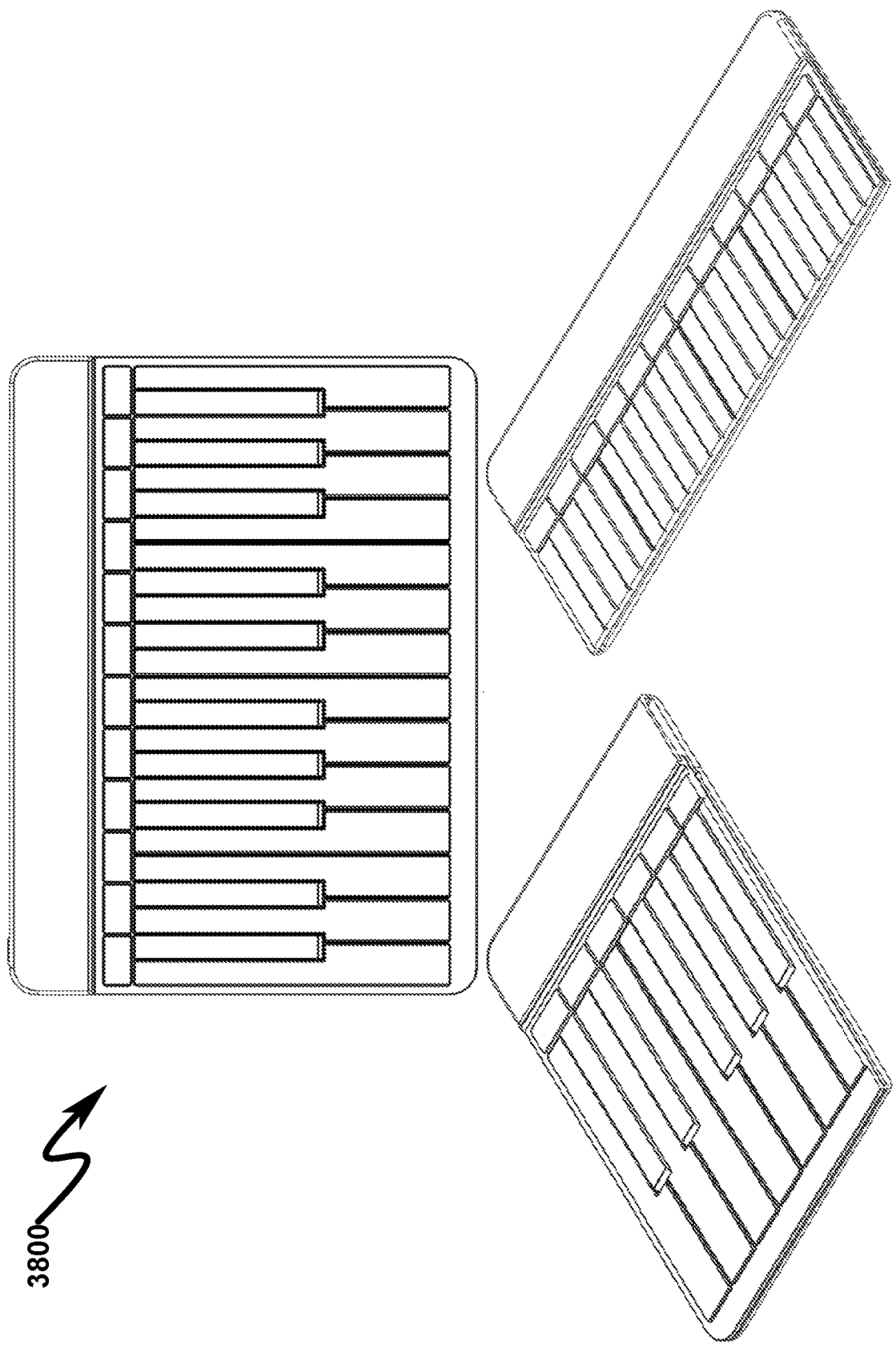
FIG. 38 illustrates a top view and right/front sectional perspective views of a preferred exemplary touch sensitive array (TSA) tablet interface (TTI) with a first exemplary piano keyboard TTA pressure overlay (TPO)

The present invention may implement the described tactile touch sensor system/method in a first piano keyboard form as generally depicted in FIG. 37 (3700)-FIG. 38 (3800). This is just an example of a large number of musical keyboards and musical sampler player keyboards that may be formed as TPO overlays for the TSA tablet interface.

TPO Second Keyboard Interface (3900)-(4000)

Figure 39:
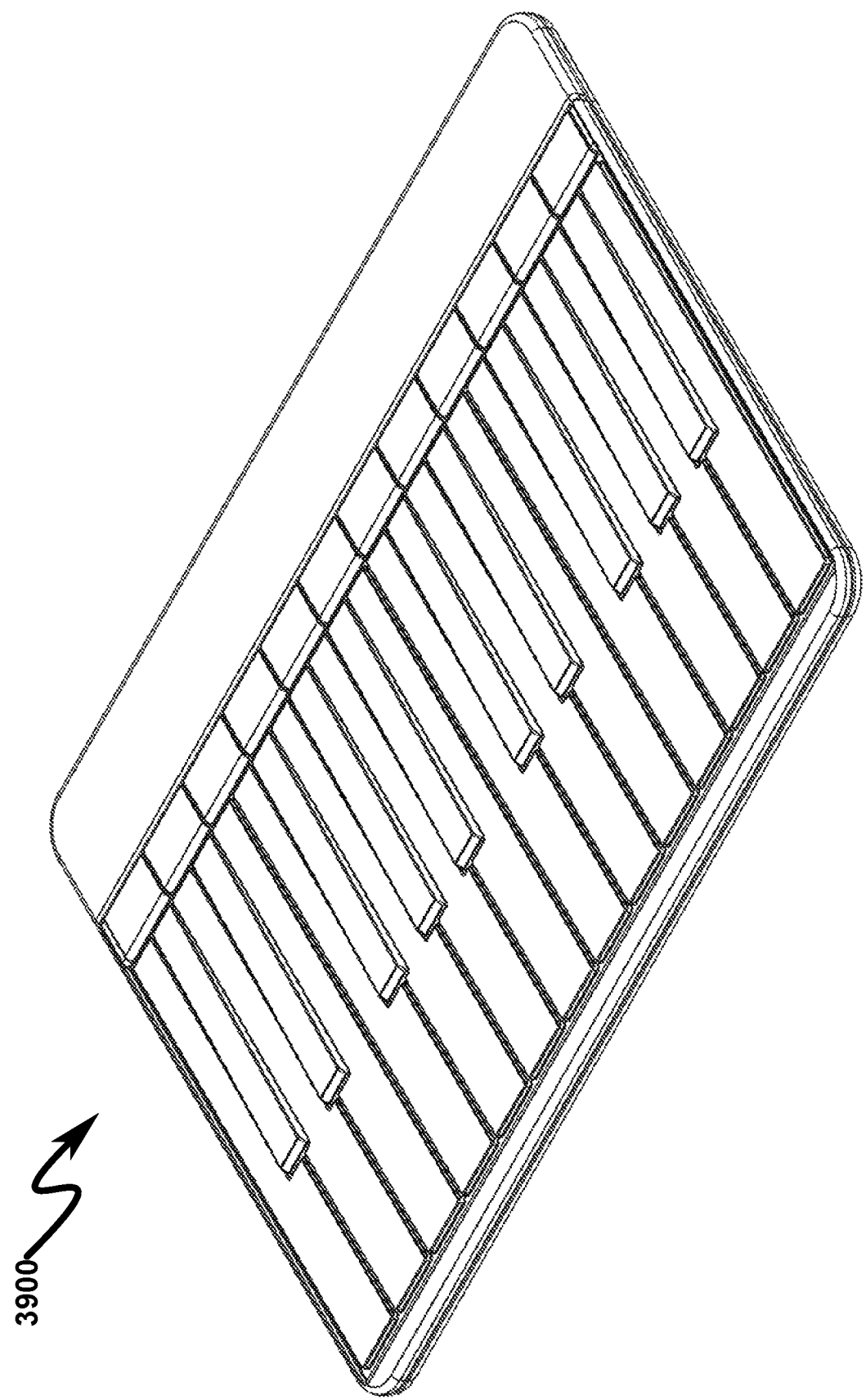
FIG. 39 illustrates a top right front perspective view of a preferred exemplary touch sensitive array (TSA) tablet interface (TTI) with a second exemplary piano keyboard TTA pressure overlay (TPO)
Figure 40:
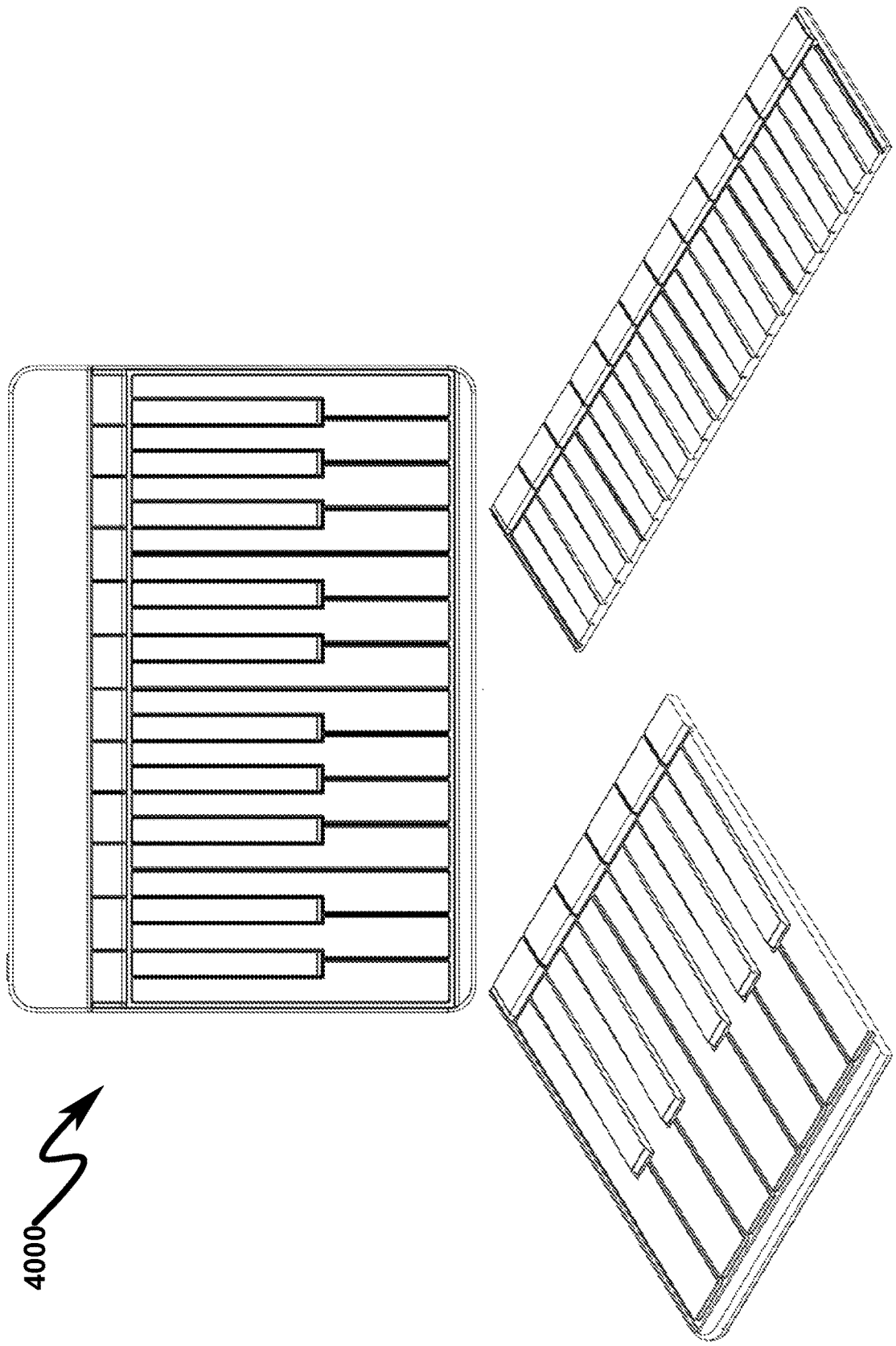
FIG. 40 illustrates a top view and right/front sectional perspective views of a preferred exemplary touch sensitive array (TSA) tablet interface (TTI) with a second exemplary piano keyboard TTA pressure overlay (TPO)

The present invention may implement the described tactile touch sensor system/method in a second piano keyboard form as generally depicted in FIG. 39 (3900)-FIG. 40 (4000). Here the key relief is higher than in the previous version and illustrates how the TPO overlay may be configured in a wide variety of forms to suit the ergonomics of musicians.

Programmable Deformable Membranes (4100)-(4300)

Figure 41:
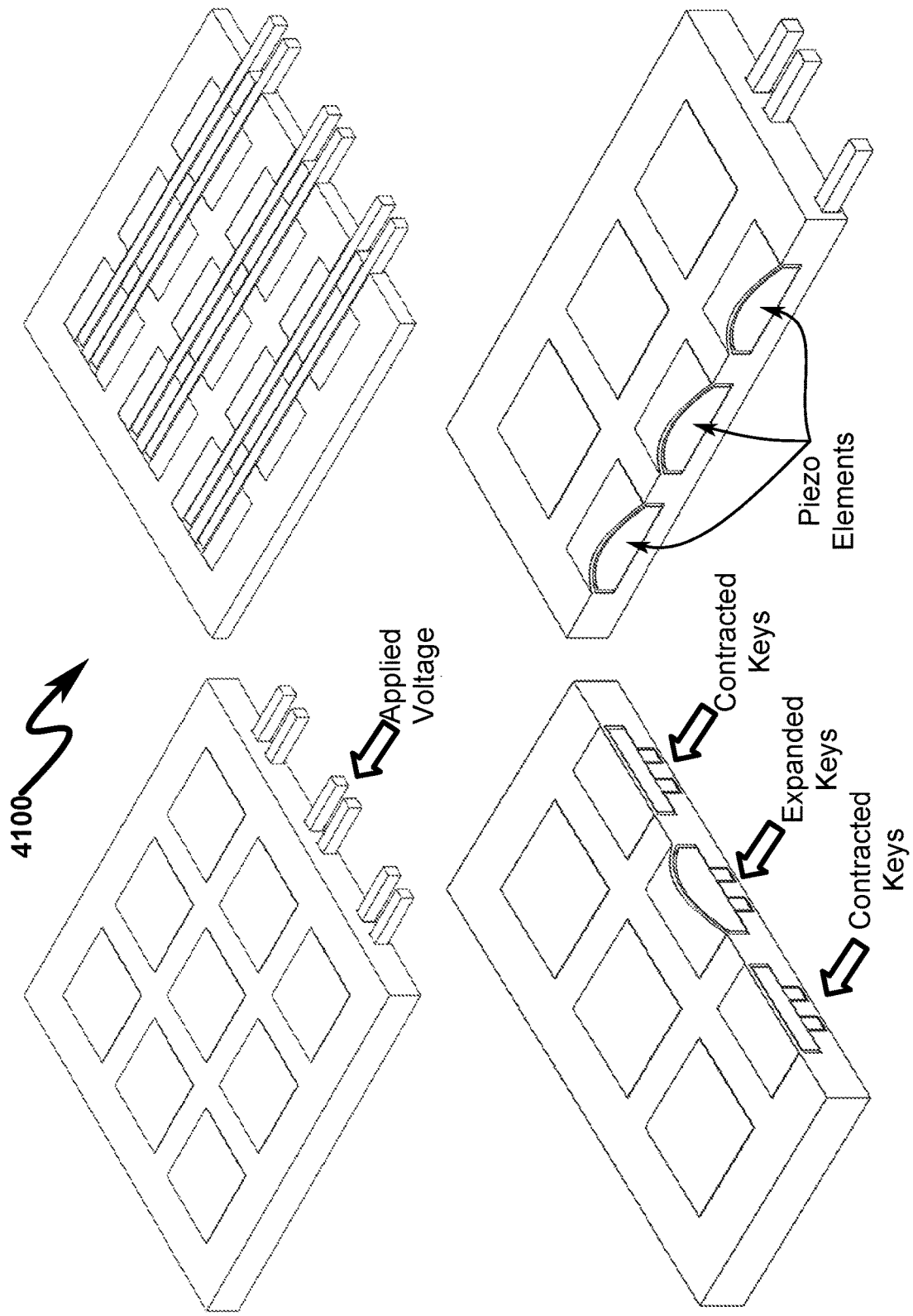
FIG. 41 illustrates perspective and sectional views of an exemplary deformable membrane activated by piezo-electric elements.
Figure 43:
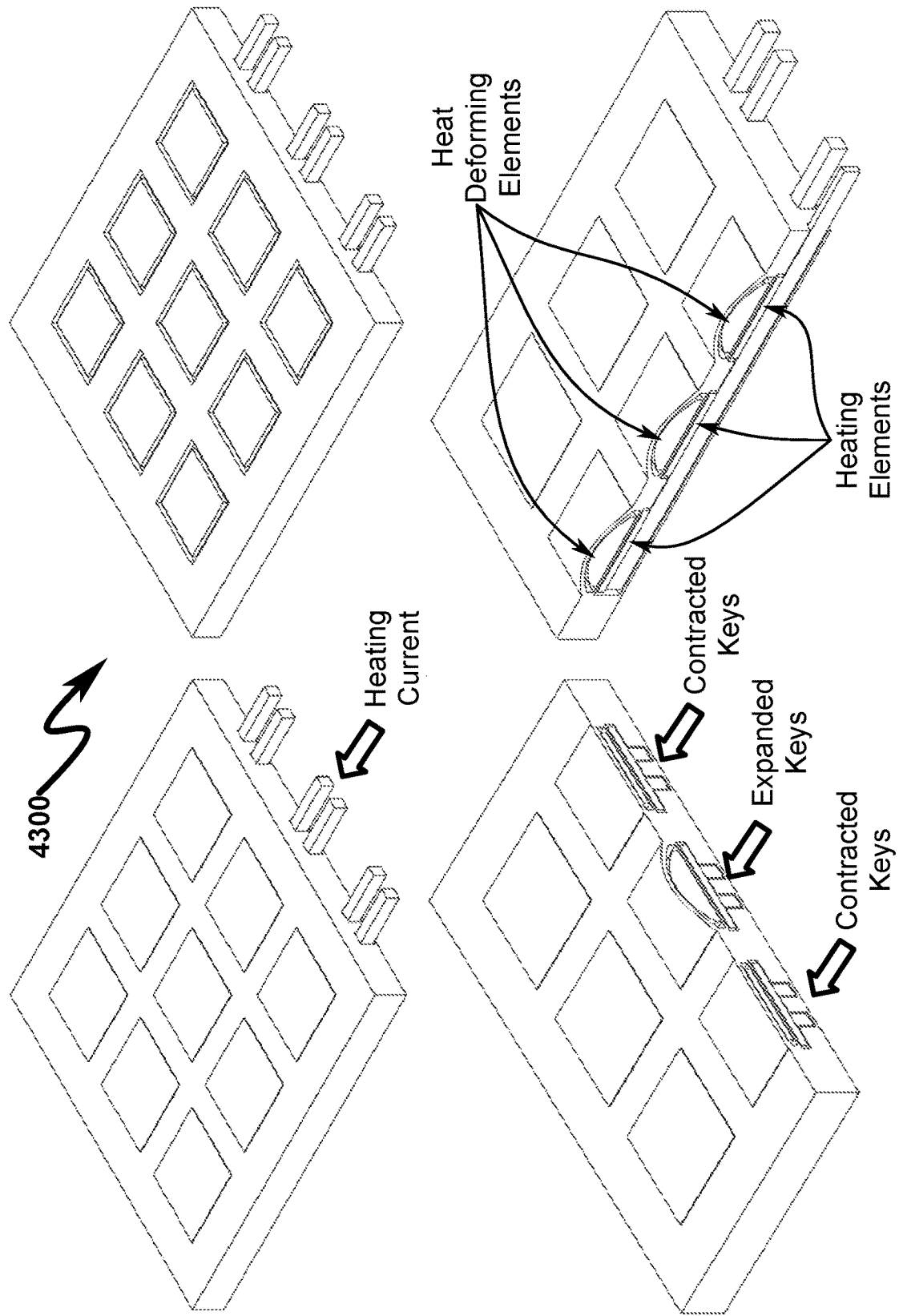
FIG. 43 illustrates perspective and sectional views of an exemplary deformable membrane activated by heat expanding elements.

The TPO structure described herein may be constructed using a programmable deformable membrane as generally depicted in FIG. 41 (4100)-FIG. 43 (4300). These figures depict cross-sections of three different programmable, deformable membranes. In addition to molded and mechanical overlays, one can also use programmable, deformable membranes for physical touch sensor augmentation. These membranes can be constructed by embedding elements in a flexible overlay that deform when activated, leading to deformation of the overlay itself.

Programmable membranes become very powerful if the system has programmatic control over which deforming elements are active at any given time, the application software can dynamically control the appearance and tactile layout of the overlay. This removes the need to actually swap out various overlays in the system. It is possible to have a single programmable membrane that takes on various shapes and provides the user with different interfaces. For this solution, the membrane can be laminated directly on the touch sensor surface.

Piezo Deformation (4100)

FIG. 41 (4100) depicts piezo or polymer-based deforming elements embedded into a flexible overlay. When a voltage is applied to the deforming elements, the embedded piezo/polymer elements deform. This deformation causes the TPO overlay surface to deform. Deforming elements can be constructed using piezo elements and/or polymers that deform as voltage is applied to them.

Air/Fluid/Vacuum Deformation (4200)

Another way to build deforming elements is to embed pockets of air or liquid into the overlay. These pockets are hooked up to a pressurized pumping system that can control the amount of air/liquid in these pockets. As air/liquid is pumped into these pockets, the overlay will expand. As air/liquid is released from these pockets, the overlay will contract.

Figure 42:
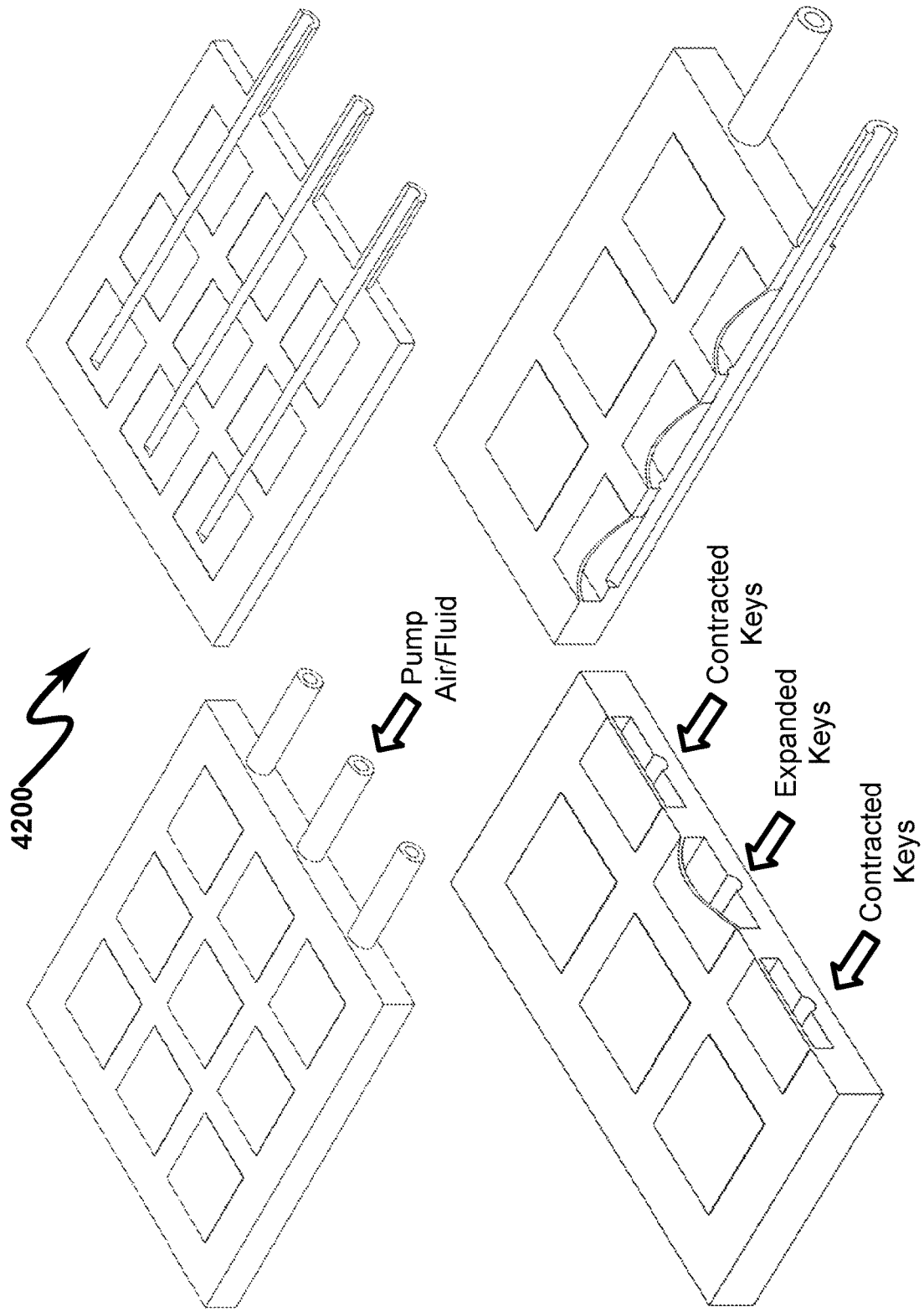
FIG. 42 illustrates perspective and sectional views of an exemplary deformable membrane activated by pumped air/fluid elements.

FIG. 42 (4200) depicts a deformable membrane system where fluid or gas is pumped into pockets which are embedded in the membrane. The amount of fluid/gas pumped in or out of these pockets determines how much the TPO overlay surface deforms.

Heat Deformation (4300)

A final method for achieving this effect is to embed heat-sensitive elements that deform when exposed to heat/cold. Heating elements can be built into the overlay in order to activate these deforming elements.

FIG. 43 (4300) depicts a deformable membrane that uses deforming elements that are activated by heat. Heating elements are placed near the deforming elements, and current is run through the heating elements. This causes the heating elements to warm up, which causes the deforming elements to expand, which deforms the membrane.

TPO Light Piping (4400)-(4500)

One way to improve the usability of overlays in a dark setting is to illuminate the overlay. For this approach, side-mounted LEDs can be placed around the bezel of the touch sensor. A TPO overlay can be designed such that it functions as a light-guide for these side-illuminating LEDs. Each overlay can tightly control where light travels within the overlay, and also which areas of the overlay appear illuminated or dark. This improves visual feedback to the user, as each overlay can use this light-guide technique to highlight specific functions presented by the overlay.

Figure 44:
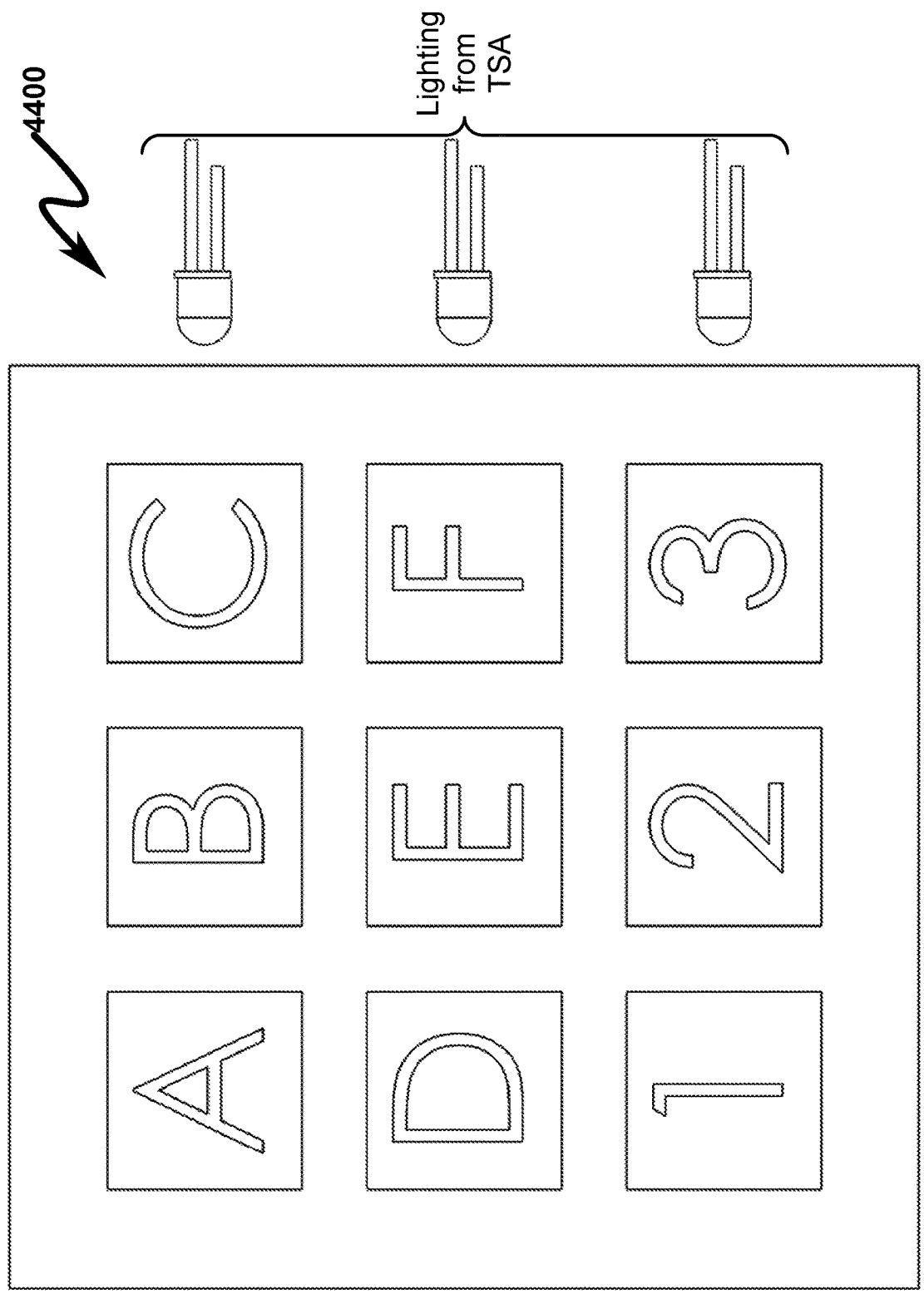
FIG. 44 illustrates an exemplary TSA/TPO configuration in which light piping is used to illuminate TPO structures.
Figure 45:
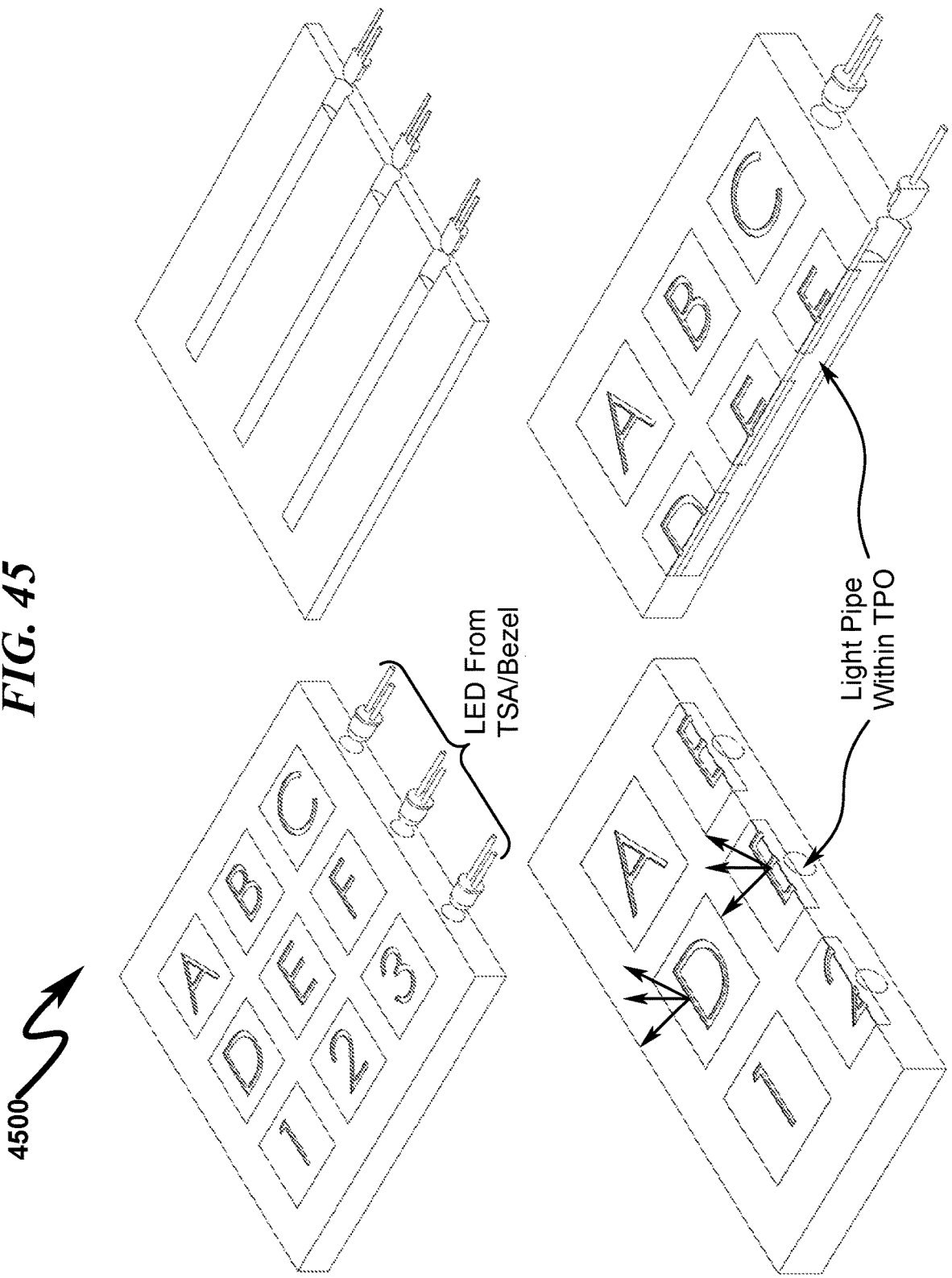
FIG. 45 illustrates an exemplary TSA/TPO configuration in which light piping is used to illuminate TPO structures.

The TPO structure described herein may incorporate light piping as generally depicted in FIG. 44 (4400)-FIG. 45 (4500). As seen by these diagrams, lighting of particular portions of the TPO supplied by the TSA tablet structure is provided by side LEDs and optical light piping within the TPO structure.

These figures show how an overlay can be used as a light guide to increase visibility of the overlay in various environments. Side-mount LEDs can be mounted around the edge of the touch sensor and can shine into an overlay that is placed on top of the touch sensor. Light injected from the side of the overlay can diffuse and exit out of designated areas. As can be seen from the drawings, some areas allow light to pass through and exit the overlay (these areas will appear illuminated), where other sections are designed to keep light inside the overlay (these areas will appear dark). Different LEDs can be used to illuminate different sets of TPO structures.

Active TPO Energy Harvesting (4600)-(4700)

So far, overlays have been described as purely passive and unpowered. However, more sophisticated overlays can be created if the overlay can receive power from the sensor. This is made possible by inductively powering the overlays that are placed on the sensor. Depending on the amount of power transferred, these overlays can have powered LEDs, segment-displays, or even play audio through small speakers. These overlays could even have small microcontrollers which are capable of talking over BLUETOOTH® or BLE to the application software directly.

The modular overlay may contain an inductive coil, capable of receiving power from an inductive charger. Touch sensors that are transparent to magnetic fields can be fitted with inductive charging coils to support charging/powering these modular overlays.

Figure 46:
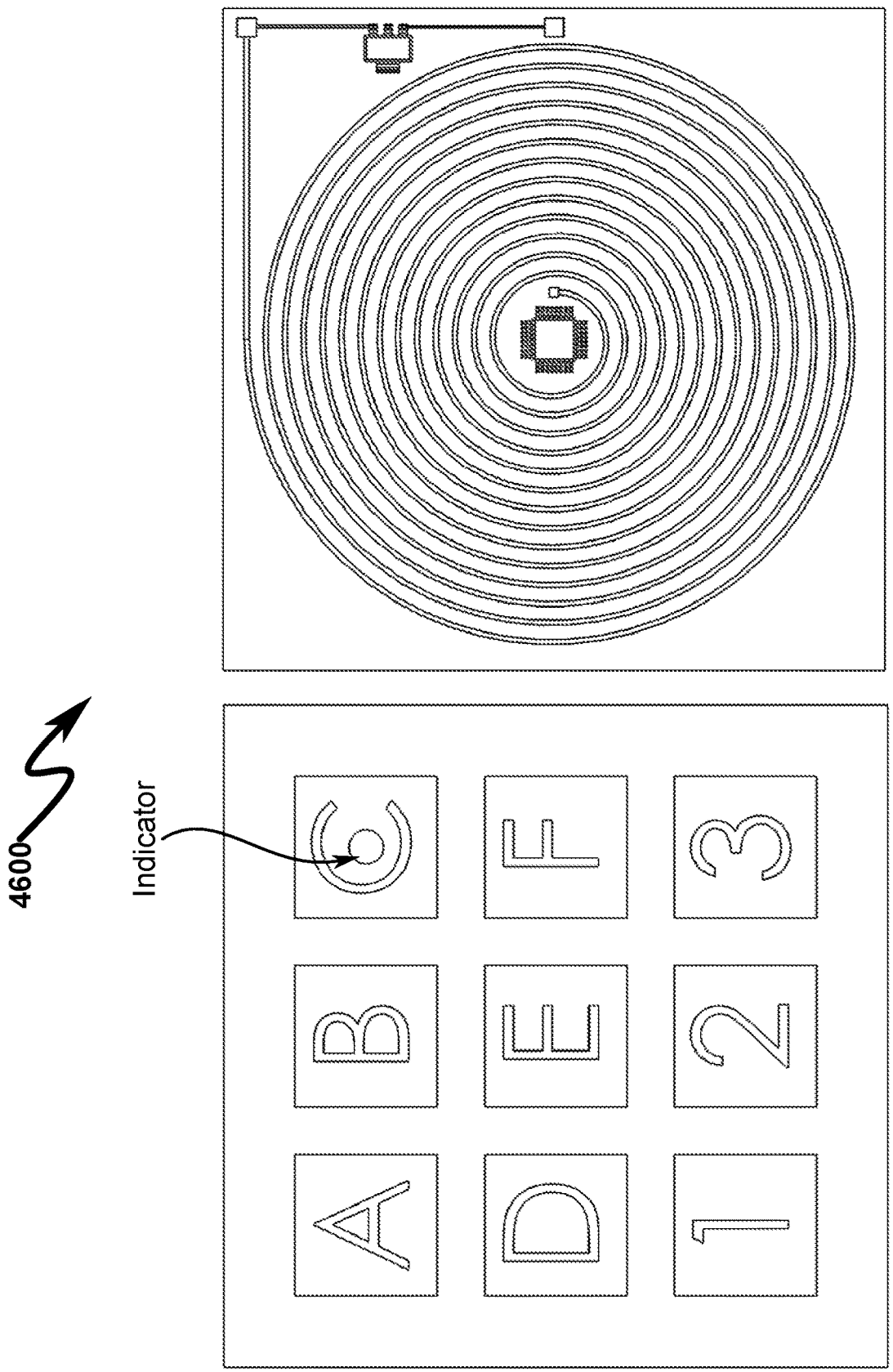
FIG. 46 illustrates an exemplary TSA/TPO configuration that implements energy harvesting for use by the TPO structure.
Figure 47:
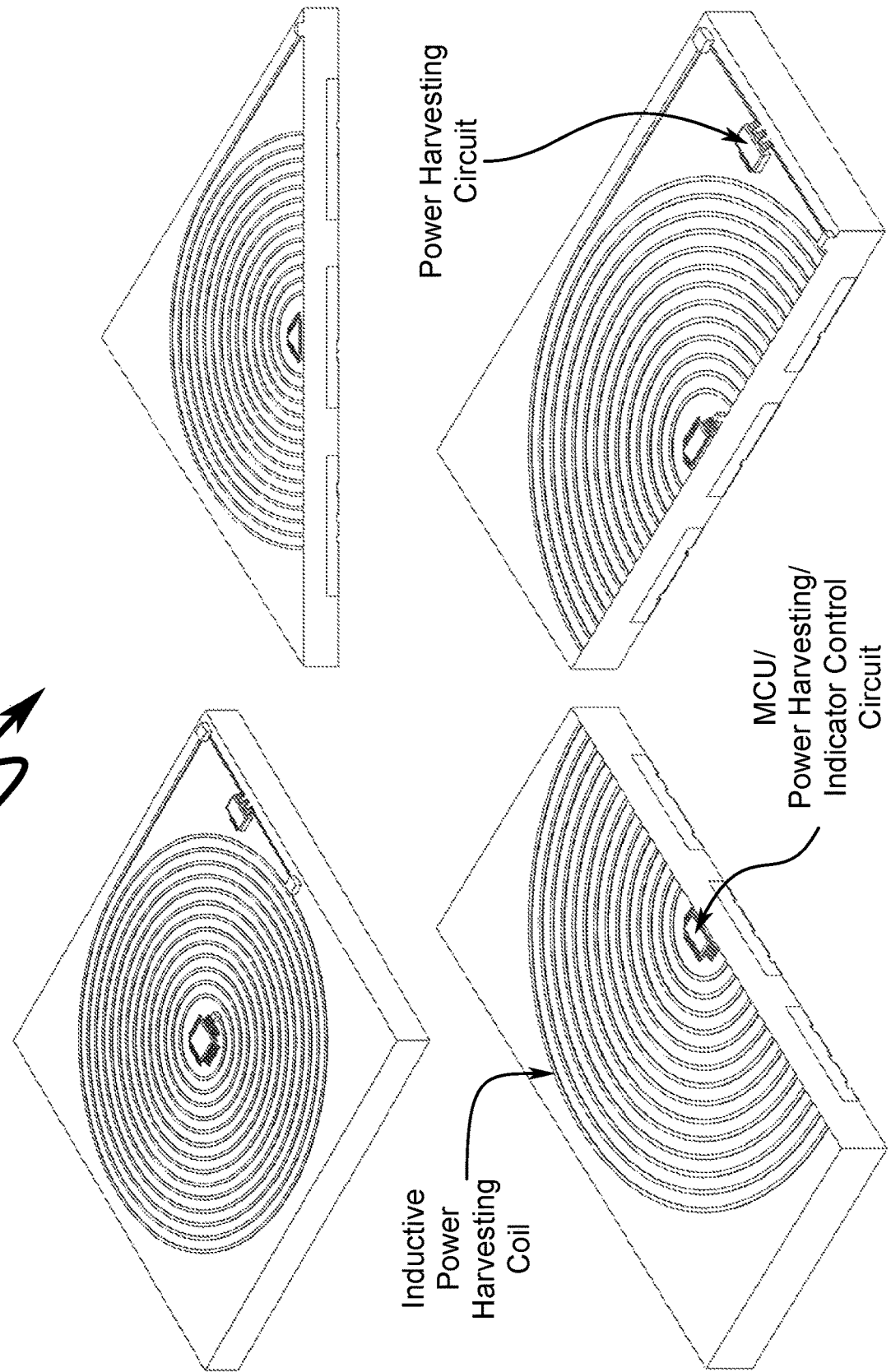
FIG. 47 illustrates an exemplary TSA/TPO configuration that implements energy harvesting for use by the TPO structure.

The TPO structures described herein may implement energy harvesting as generally depicted in FIG. 46 (4600)-FIG. 47 (4700). As seen by these diagrams, collection of energy from the environment and the TSA tablet may permit electronics within the TPO to perform a variety of functions in conjunction with activation of pressure to the TSA surface.

Exemplary TSA/TPO Integration (4800)

So far, overlays have been described as monolithic entities, covering the entirety of the touch sensor. However, it is equally beneficial to build smaller overlays that can be placed in different areas of the sensor. If the bottom of the touch sensor is layered with a ferromagnetic material, the magnetic attachment method can be used to mount each overlay reliably to the sensor. If a force-profile, RFID, optical, capacitive, inductive, or resistive identification scheme is implemented, the various overlays can be identified and tracked across the sensor. This is important so that the software can automatically configure itself to translate touch data into overlay-dependent functional output. With this modular overlay approach, one can mix and match flat, 3D, mechanical, and deformable overlays to create new, custom interfaces. These modular overlays are described in more detail in FIG. 65 (6500)-FIG. 128 (12800).

Figure 48:
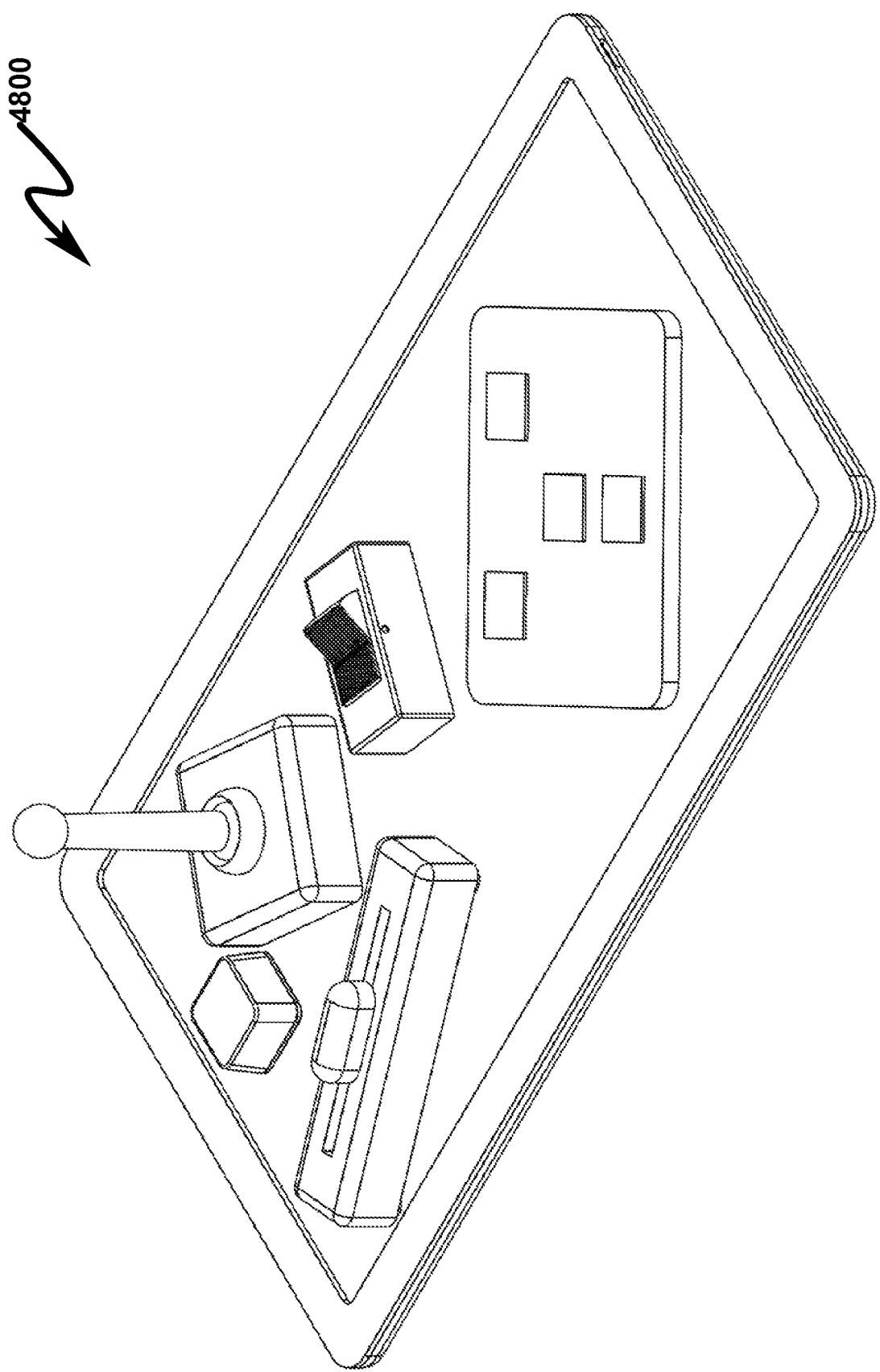
FIG. 48 illustrates an exemplary TSA tablet structure on which a variety of TPO elements are attached.

An example of a TSA tablet interfaced with a variety of modular TPO structures as described herein is generally depicted in FIG. 48 (4800). The surface of the TSA tablet has been reduced in scale for this illustration but may in some applications be quite large, and include surfaces having many square feet of surface area. As depicted, the TPO structures may be aligned in any orientation on the surface and in some applications with a number of disparate individuals operating the TPO structures, the TPO structures may be aligned to for a proper orientation to each individual cooperating on a singular large TSA tablet.

TSA/TPO Attachment Mechanisms (4900)-(5600)

Figure 49:
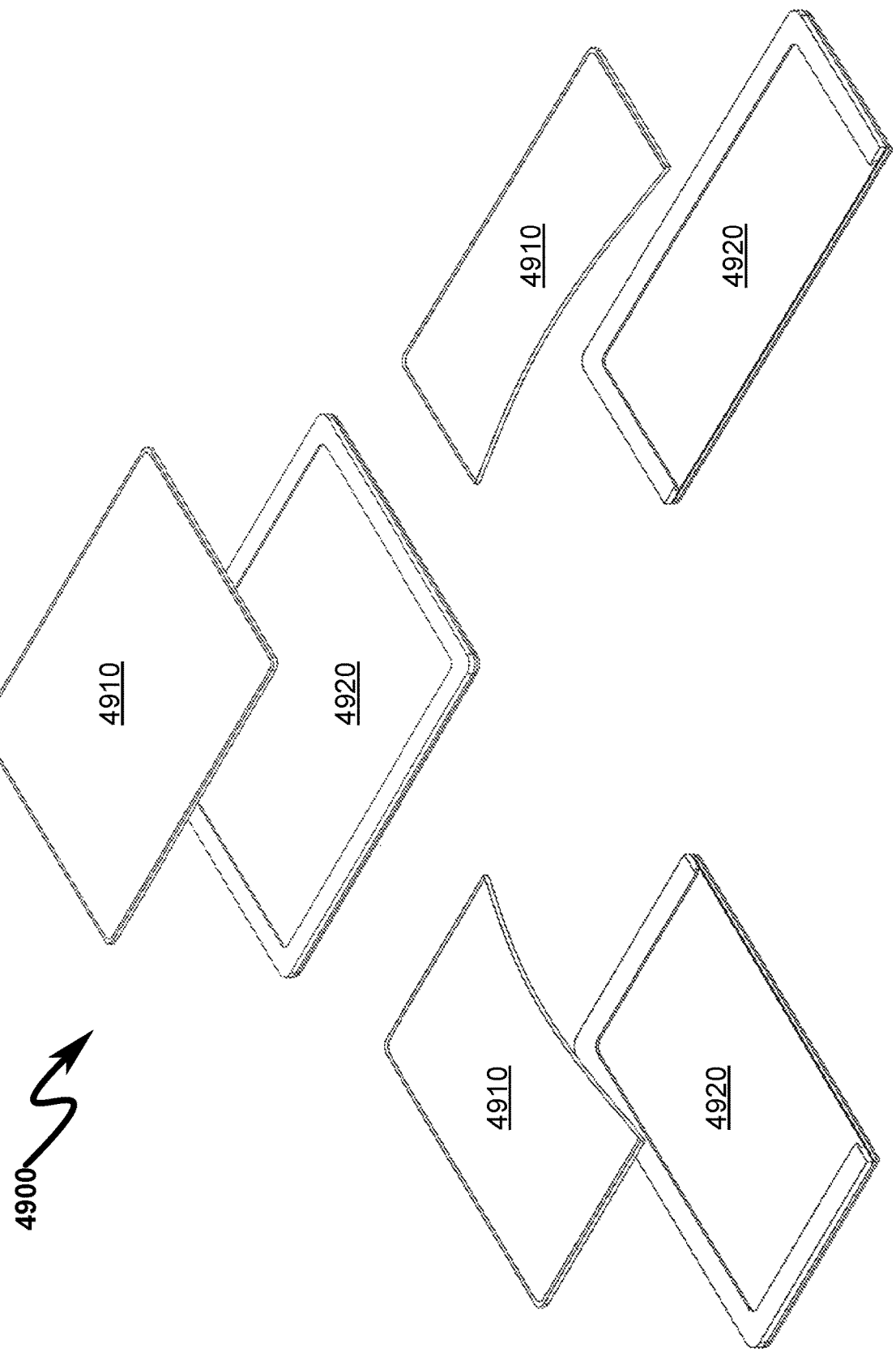
FIG. 49 illustrates top perspective and top perspective sectional views of a TPO peripheral edge insertion attachment mechanism between the TPO and the TSA assembly.
Figure 56:
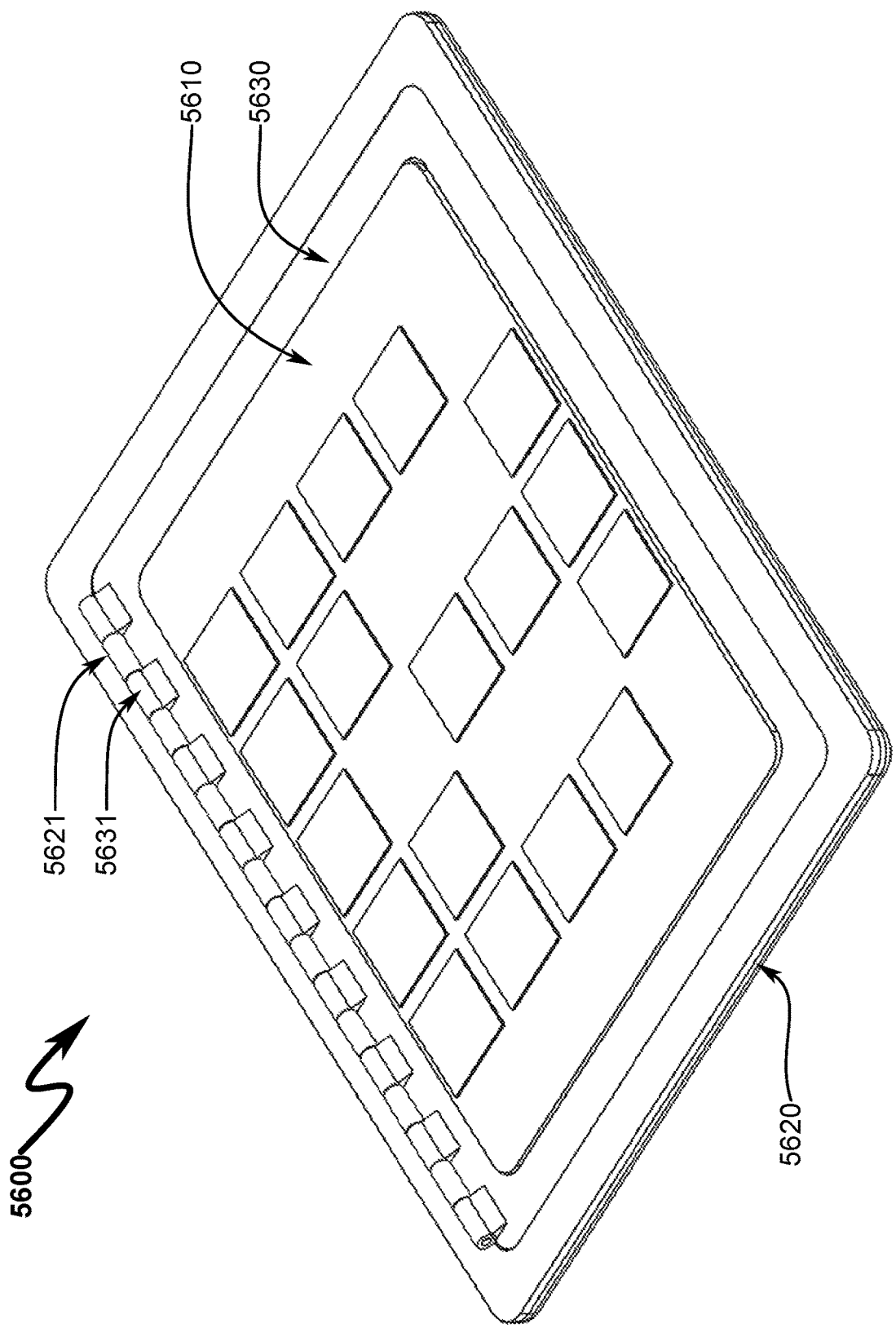
FIG. 56 illustrates a top perspective assembled view of a TPO hinged bezel attachment mechanism between the TPO and the TSA assembly.

The TPO structure described herein may be attached to the TSA using a variety of techniques as generally depicted in FIG. 49 (4900)-FIG. 56 (5600). There are many different ways to couple an overlay with a touch sensor. The simplest method is to simply place the overlay on top of the sensor. However, this method is not very reliable as the overlay is free to move around. The following sections describe better methods for attaching sensor overlays.

TPO Peripheral Edge Insertion into TPA (4900)-(5000)

Figure 50:
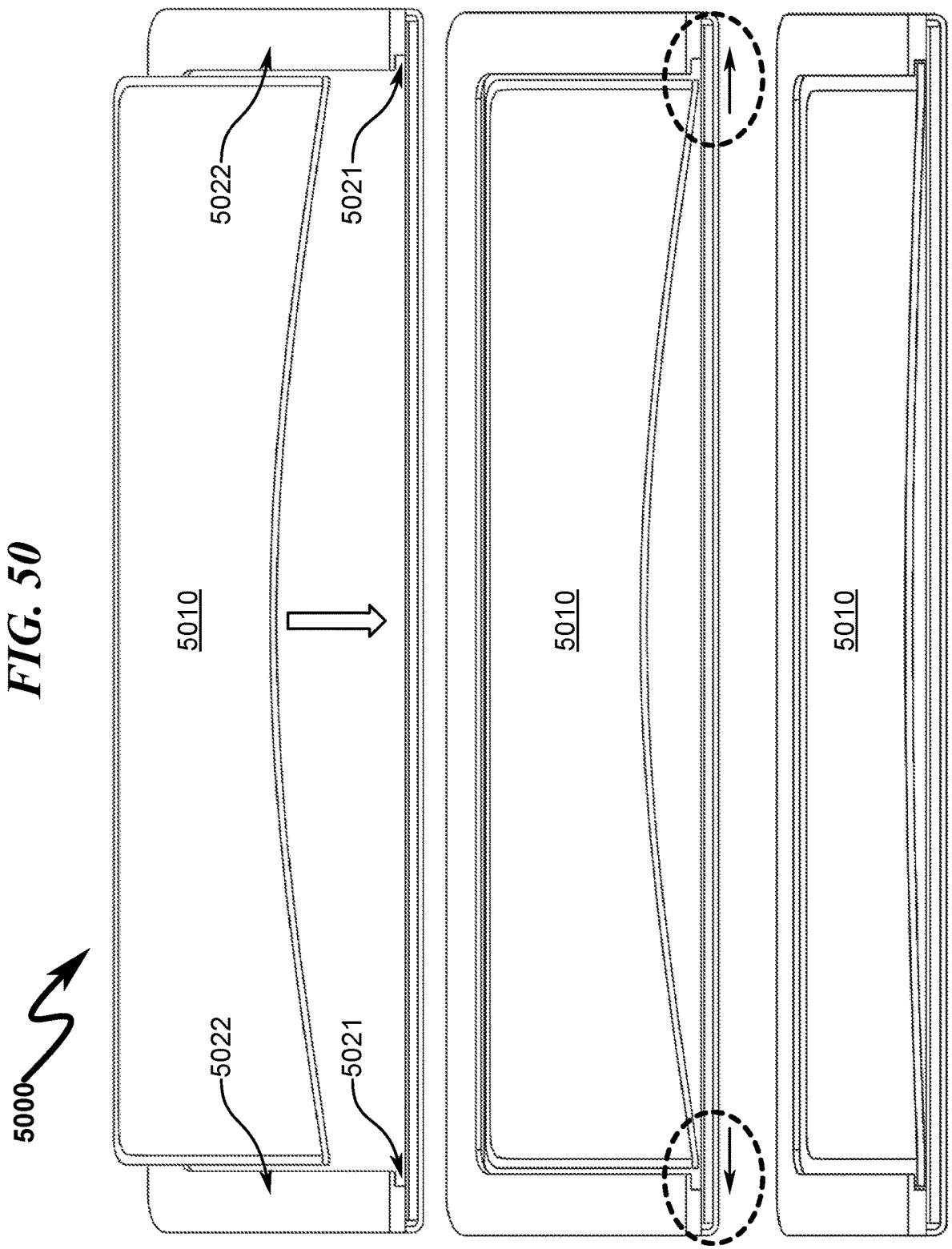
FIG. 50 illustrates front perspective sectional views of a TPO peripheral edge insertion attachment mechanism sequence between the TPO and the TSA assembly.

A touch sensor housing can be constructed so that its bezel is rigid but has enough overhang to hold an overlay in place. FIG. 49 (4900)-FIG. 50 (5000) shows how an overlay can be integrated into such a design. As generally depicted in FIG. 49 (4900)-FIG. 50 (5000), the TPO (4910) may be flexed to allow peripheral edge insertion into the bezel covering the TSA (4920). This insertion sequence is detailed in FIG. 50 (5000) wherein the TPO (5010) edges are inserted into recesses (5021) in the bezel (5022) covering the TSA surface.

As discussed above, a bezel can be designed to hold an overlay without hinges or magnets. This configuration may incorporate a rigid bezel designed to have an overhang capable of holding a flexible overlay. In this configuration, an overlay can be folded and slid into the housing such that the overlay edges fall beneath the bezel overhang. This configuration works for flexible overlays, but not for rigid overlays.

TPO Side Edge Insertion into TPA (5100)-(5200)

Figure 51:
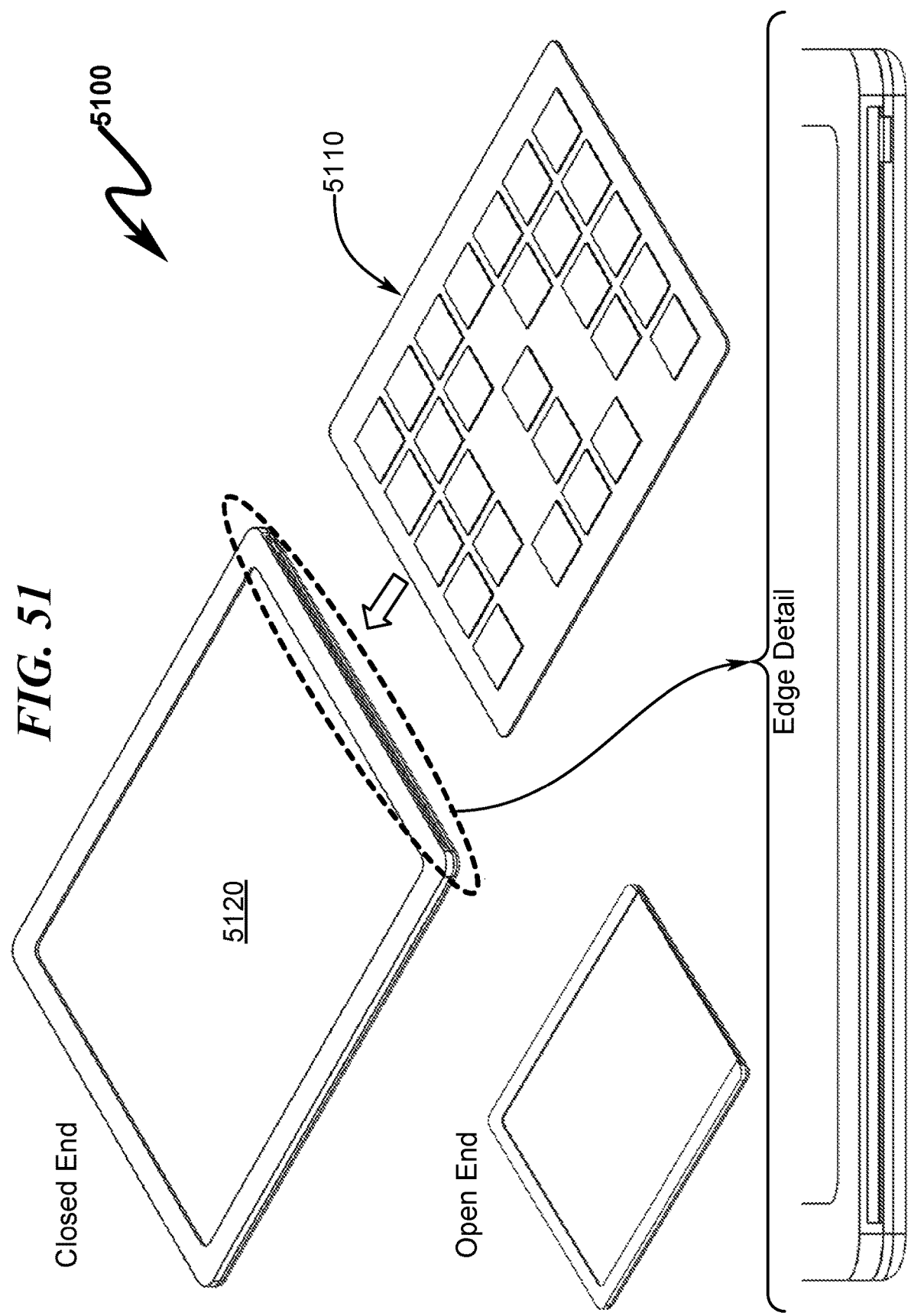
FIG. 51 illustrates top perspective and top perspective sectional views of a TPO side edge insertion attachment mechanism between the TPO and the TSA assembly.

A touch sensor housing can be constructed so that its bezel is rigid but has enough overhang to hold an overlay in place. FIG. 51 (5100)-FIG. 52 (5200) shows how an overlay can be integrated into such a design. As generally depicted in FIG. 51 (5100)-FIG. 52 (5200), the TPO (5110) may be configured to permit side edge insertion into the bezel covering the TSA (5120). Within this TPO attachment embodiment as detailed in FIG. 52 (5200) the TSA bezel may be configured have closed ends (5222) or to be open ended (5223). While the depiction in FIG. 51 (5100) depicts a closed-ended bezel (5222) configuration, the open-ended bezel (5223) configuration may be substituted with no loss of invention scope. Depending on the embossed key height of the TPO (5110), the choice of the bezel type will be application specific and in some circumstances the bezel may be mated with the TPO as separate or unitary structures.

FIG. 51 (5100)-FIG. 52 (5200) shows an attachment solution that works for both flexible and rigid overlays. This touch sensor housing has a rigid bezel on three sides. This allows a sensor to be slid into the housing. Optionally, a bezel can be snapped into place to secure the overlay on the side from which it was inserted into the housing. Details of this snap attachment feature are not shown but one skilled in the art will recognize that many plastic snap attachment methodologies are compatible with this embodiment teaching.

TPO Magnetic Bezel Attachment to TPA (5300)-(5400)

It is also possible to attach an overlay to a touch sensor with magnets. These magnets can be placed in the bezel of a device to help with sensor/overlay alignment. A touch sensor housing can also be constructed so that the bezel completely detaches from the housing. This is similar to the hinged frame approach, except that both sides detach. With a drop-in frame, the bezel can either snap into the sensor housing or connect via magnets to the top of the overlay.

Figure 53:
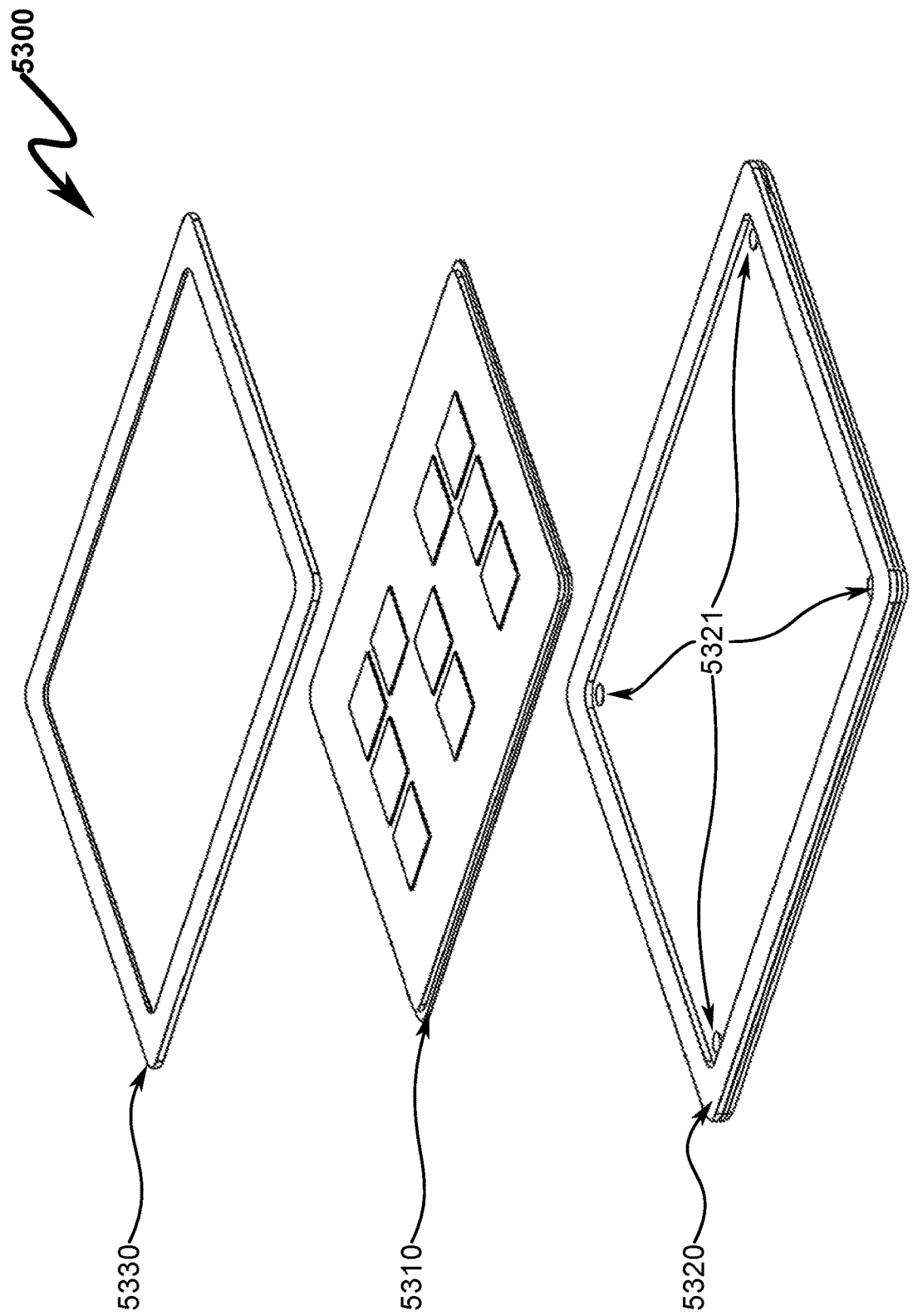
FIG. 53 illustrates a top perspective view of a TPO magnetic bezel attachment mechanism between the TPO and the TSA assembly.
Figure 54:
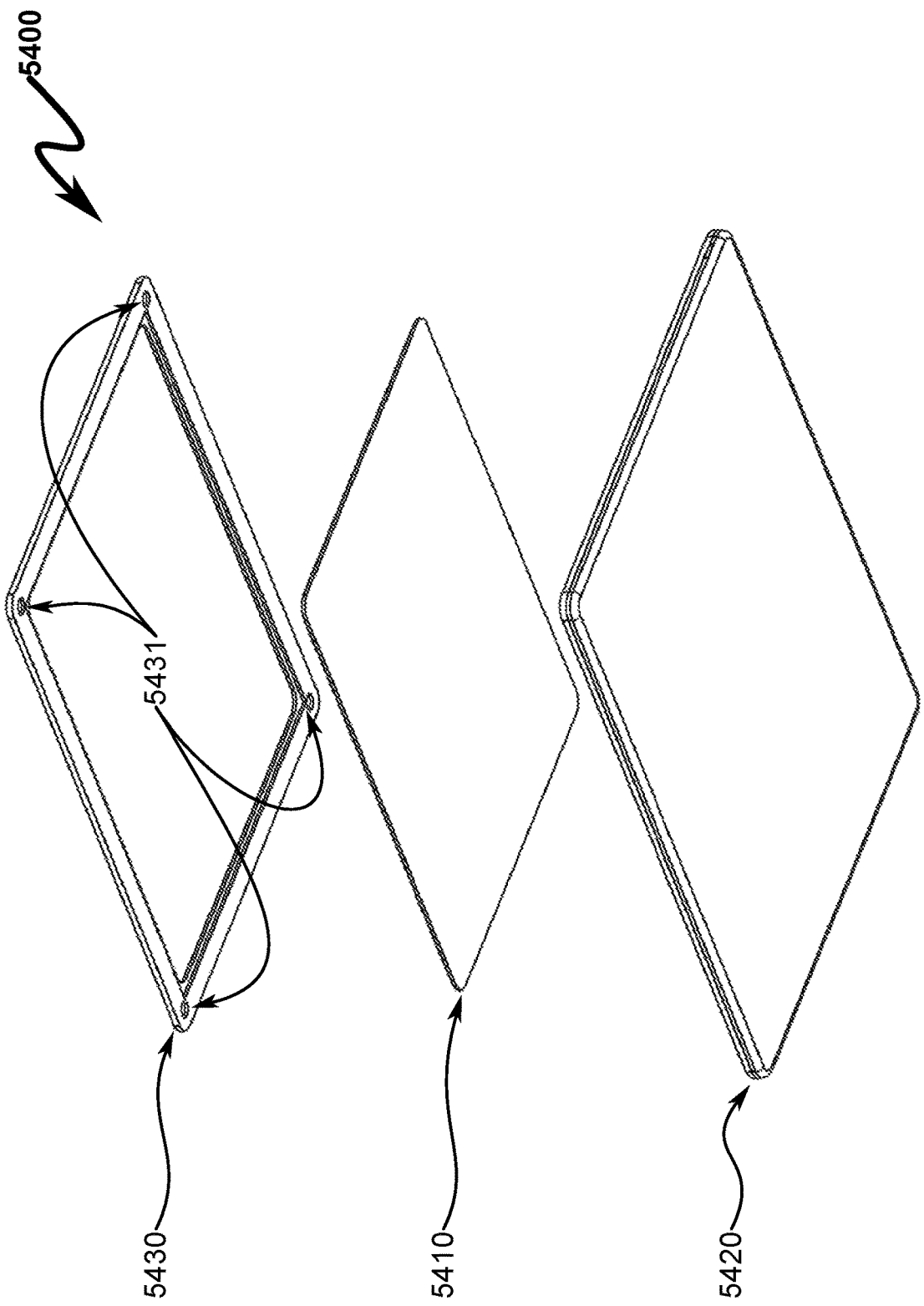
FIG. 54 illustrates a bottom perspective view of a TPO magnetic bezel attachment mechanism between the TPO and the TSA assembly.

As generally depicted in FIG. 53 (5300)-FIG. 54 (5400), the TPO (5310) may be configured to permit attachment to the TSA (5320) using a TPO magnetic retention bezel (5330). These figures show how a drop-in frame (5330) can be used to secure an overlay to a touch sensor. A drop-in frame may use either magnets or plastic snaps/indents in order to securely couple to the sensor housing. A TPO overlay can be placed on top of the touch sensor, and the drop-in frame will come down on top of the overlay to secure it to the touch sensor.

Magnets (5321) contained within the TSA (5320) mate with corresponding magnets (5431) within the magnetic TPO retention bezel (5430). The TPO (5310, 5410) depicted in these drawings is designed to be retained at the edges by the TPO magnetic retention bezel (5330, 5430).

TPO Attachment Using Thru-Hole Magnets (5500)-(5600)

Figure 55:
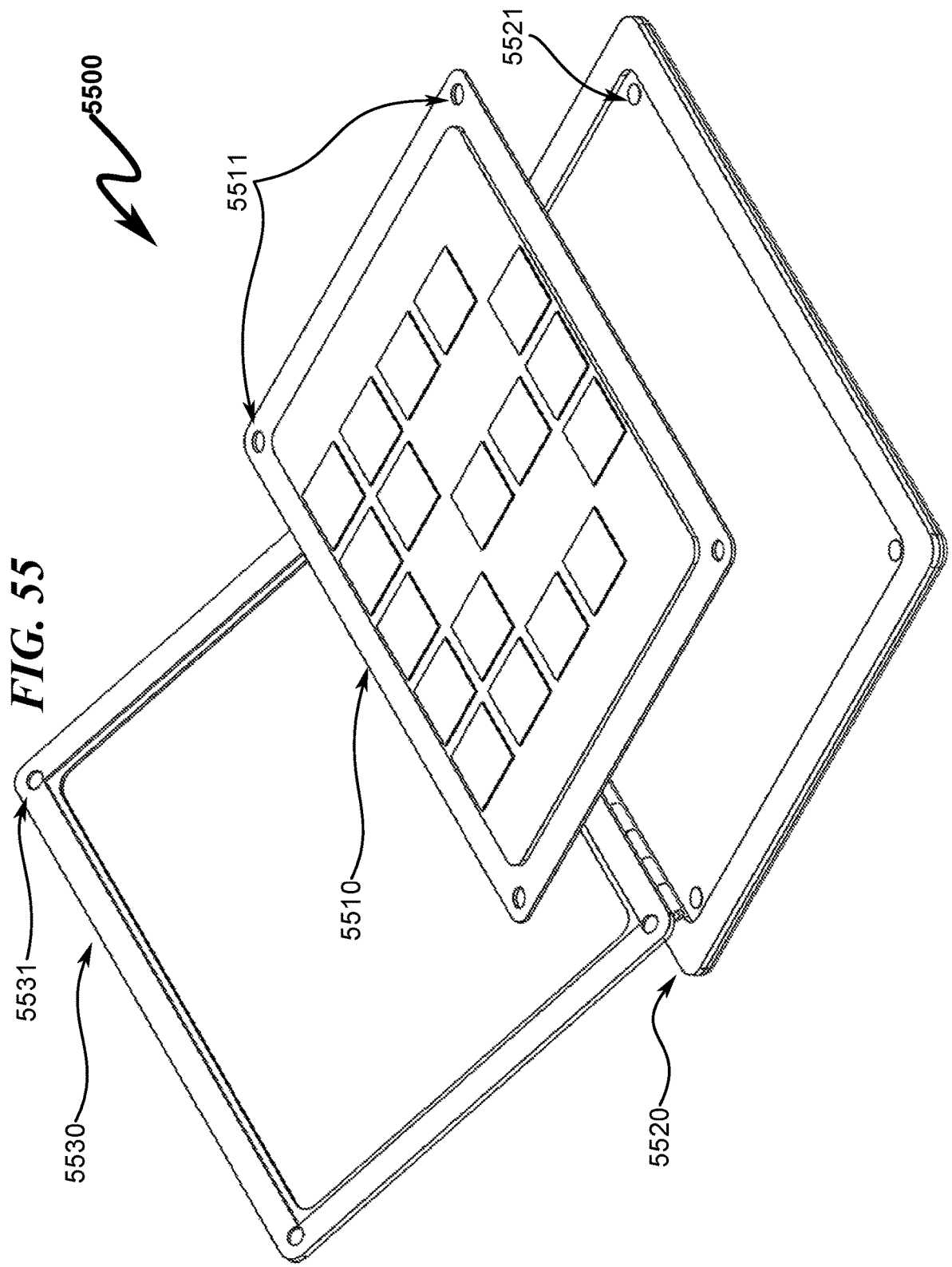
FIG. 55 illustrates a top perspective exploded view of a TPO hinged bezel attachment mechanism between the TPO and the TSA assembly.

As generally depicted in an alternate embodiment depicted in FIG. 55 (5500)-FIG. 56 (5600), other variants of this construction technique may incorporate holes (5511) in the TPO (5510, 5610) corresponding to TSA (5520, 5620) magnets (5521) and magnets (5531) in the TPO magnetic retention bezel (5530, 5630) such that retention of the TPO (5510, 5610) is accomplished by the magnets (5521, 5531) at the corners of the TPO (5510, 5610) and TPO magnetic retention bezel (5530, 5630). This variant requires a larger footprint for the TPO (5510, 5610) that allows overlap of the magnets (5521, 5531) at the corners of the TPO (5510, 5610), TSA (5520, 6620), and TPO magnetic retention bezel (5530, 5630).

TPO Hinged Bezel Attachment to TPA (5500)-(5600)

A touch sensor housing can be constructed so that an area of the bezel opens up on hinges. An overlay can be placed on the touch sensor, and the bezel can be closed back down, securing the overlay to the underlying sensor. As generally depicted in FIG. 55 (5500)-FIG. 56 (5600), the TPO (5510) may be configured to permit attachment to the TSA (5520) using a TPO hinged retention bezel (5530). Hinges (5621) contained within the TSA assembly (5620) mate with corresponding hinge elements (5631) within the TPO retention bezel (5630). As with previously described embodiments, the TPO retention bezel (5630) may be secured to the TSA assembly (5620) using magnets that may be placed at one or more of the assembly corners as depicted. Some alternate embodiments may utilize a latching mechanism on the front of the TSA assembly (5620) to secure the TPO retention bezel (5630).

FIG. 55 (5500)-FIG. 56 (5600) show how a hinged frame can be used to secure an overlay to a touch sensor. To install an overlay, one simply opens up the frame, lays a new overlay on top of the touch sensor, and close the frame. The overlay will extend underneath the hinged frame so it will be securely held against the touch sensor. The hinged frame may be secured on one side via hinges and can be secured on the other side with magnets. Note that the touch sensor is integrated into this housing and is not removable (only the overlay is removable). The hinged frame may be secured with a hook/catch system instead of magnets. Springs can be used to pop open the hinged frame when the hook is slid open. With this construction, the hinges may also be replaced with tabs to create a removable frame.

TPO Identification Mechanisms (5700)-(6400)

Overview

As mentioned previously in the SOFTWARE section, it is important to keep application software "in sync" with the TPO overlay that is currently on top of the TSA sensor. If software is mismatched with the overlay, the overlay will not function as the user expects. It can be a difficult task to constantly make sure that the application software is matched with the current overlay. One way to solve this problem is to build a system where the software can check to see which overlay is currently on the touch sensor. Methods for achieving this functionality are described in the following sections.

Figure 57:
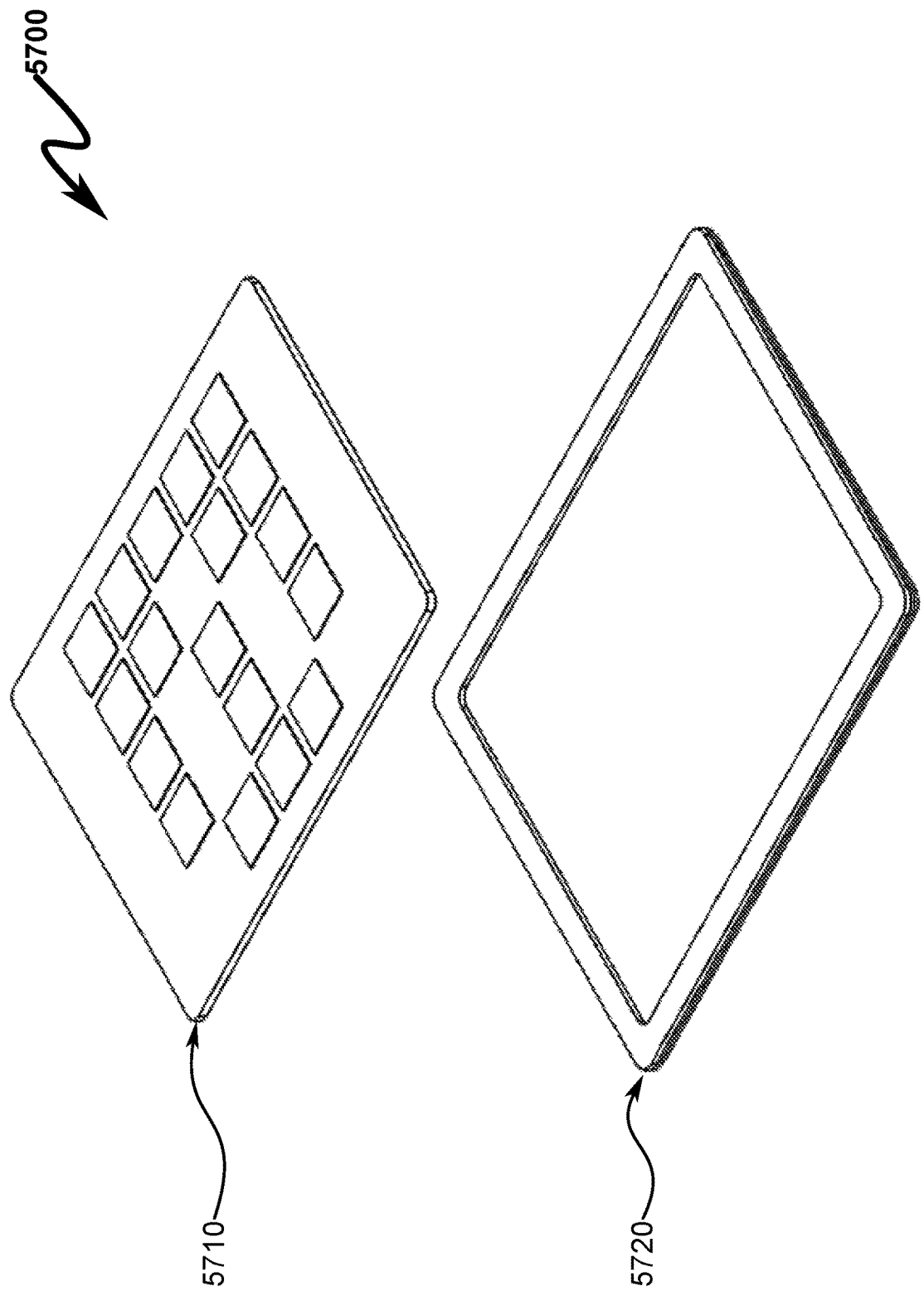
FIG. 57 illustrates a perspective view of an exemplary TPO and TSA assembly for use in describing TPO identification methodologies taught by the present invention.
Figure 64:
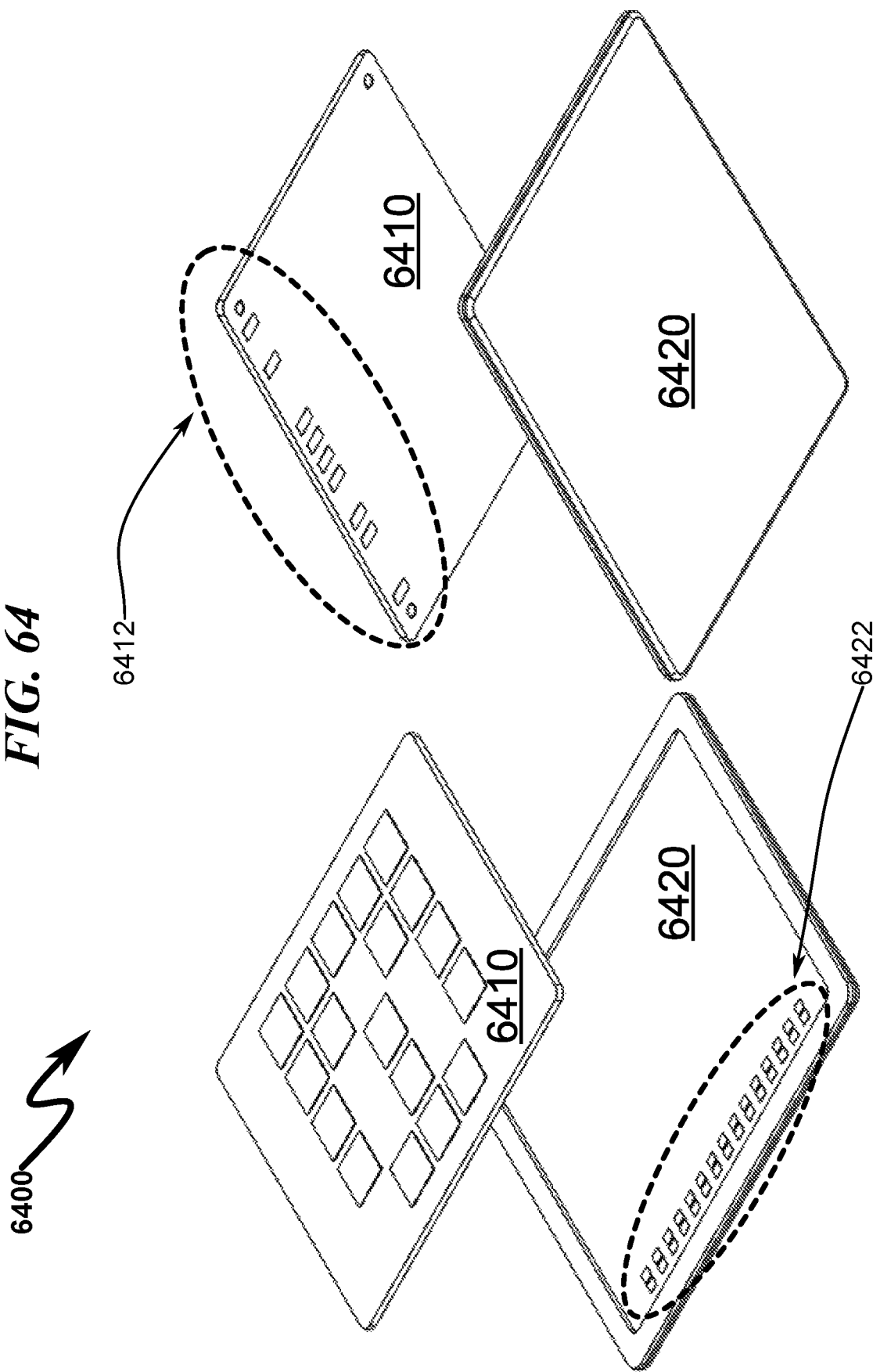
FIG. 64 illustrates perspective views of an exemplary TPO incorporating magnetic attachment means and switched TPO identification using shorting strips on the TPO and corresponding switch contacts on the surface of the TSA.

FIG. 57 (5700)-FIG. 64 (6400) show how an overlay can be constructed so that the sensor can detect which overlay is presently placed on top of the sensor. A dot pattern being used with the force profile overlay identification method. An overlay with an embedded RFID tag may also be used. As described earlier, the touch sensor can be constructed with an RFID reader capable of reading an ID from this tag. Also, an RFID tag can be replaced with an antenna and generic microcontroller that is programmed to modulate the electromagnetic waves sent from the RFID reader. The microcontroller can receive power from the RFID reader and respond to ID requests. Optical identification of the TPO is using a barcode and/or QR code is also anticipated. A conductive pattern may also be used for identification using capacitance, conductance, or inductance measurement. It should be noted that the optical and capacitive identification markers can be placed on either side of the overlay. These marks could also be placed on the edge of the overlay as well. The marker position depends on how the ID sense electronics are positioned within the sensor housing.

The TPO structure in many preferred invention embodiments may incorporate some form of unique identification mechanism as generally depicted in FIG. 57 (5700)-FIG. 64 (6400). These TPO unique identifiers (TPI) permit software controlling the TSS to automatically reconfigure operation when a given TPO is applied to the surface of the TSA. A variety of TPI identification methodologies are anticipated by the present invention and will now be discussed.

Exemplary TPO/TSA Assembly (5700)

FIG. 57 (5700) illustrates an exemplary TPO (5710) that has been configured to mate with a TSA tablet (5720). This exemplary TSA+TPO configuration will be used as the baseline example for the various TPO identification methodologies described below.

Embedded TPO Magnets (5800)

Figure 58:
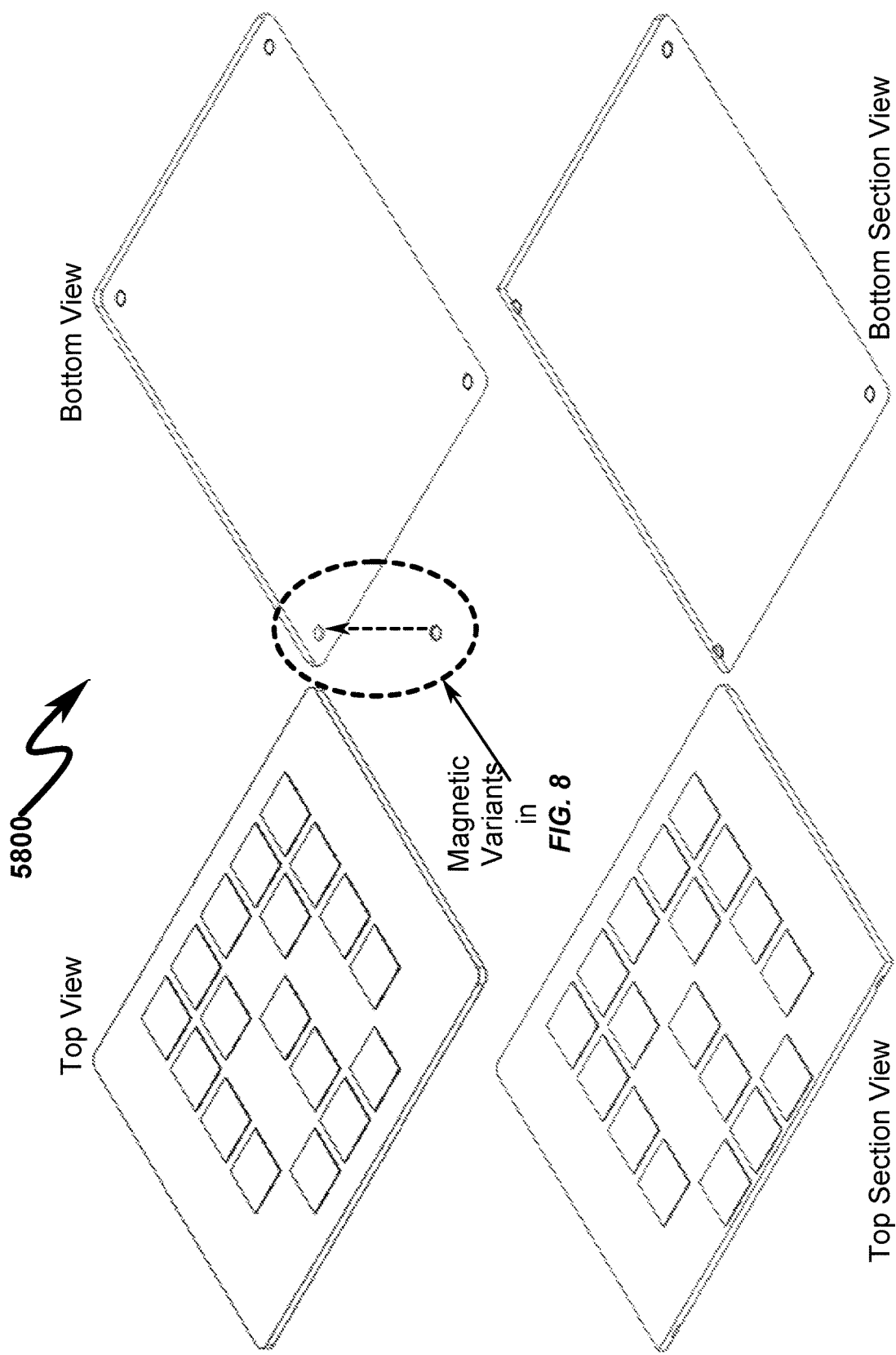
FIG. 58 illustrates perspective views of an exemplary TPO incorporating magnetic attachment means.

FIG. 58 (5800) illustrates the use of embedded magnets in the TPO to uniquely identify the TPO when placed on the TSA. Here the magnets may be positioned within the TPO to mate to corresponding magnets embedded in the TSA (not shown). This allows the TPO structure to be positively mated to the TSA surface allowing registration alignment of the TPO and the TSA surface. This figure shows how magnets can be embedded in an overlay itself. If the touch sensor housing has complementary magnets in the same positions, the overlay can be directly attached to the top of the sensor.

TPO Magnetic Identification (5900)

Figure 59:
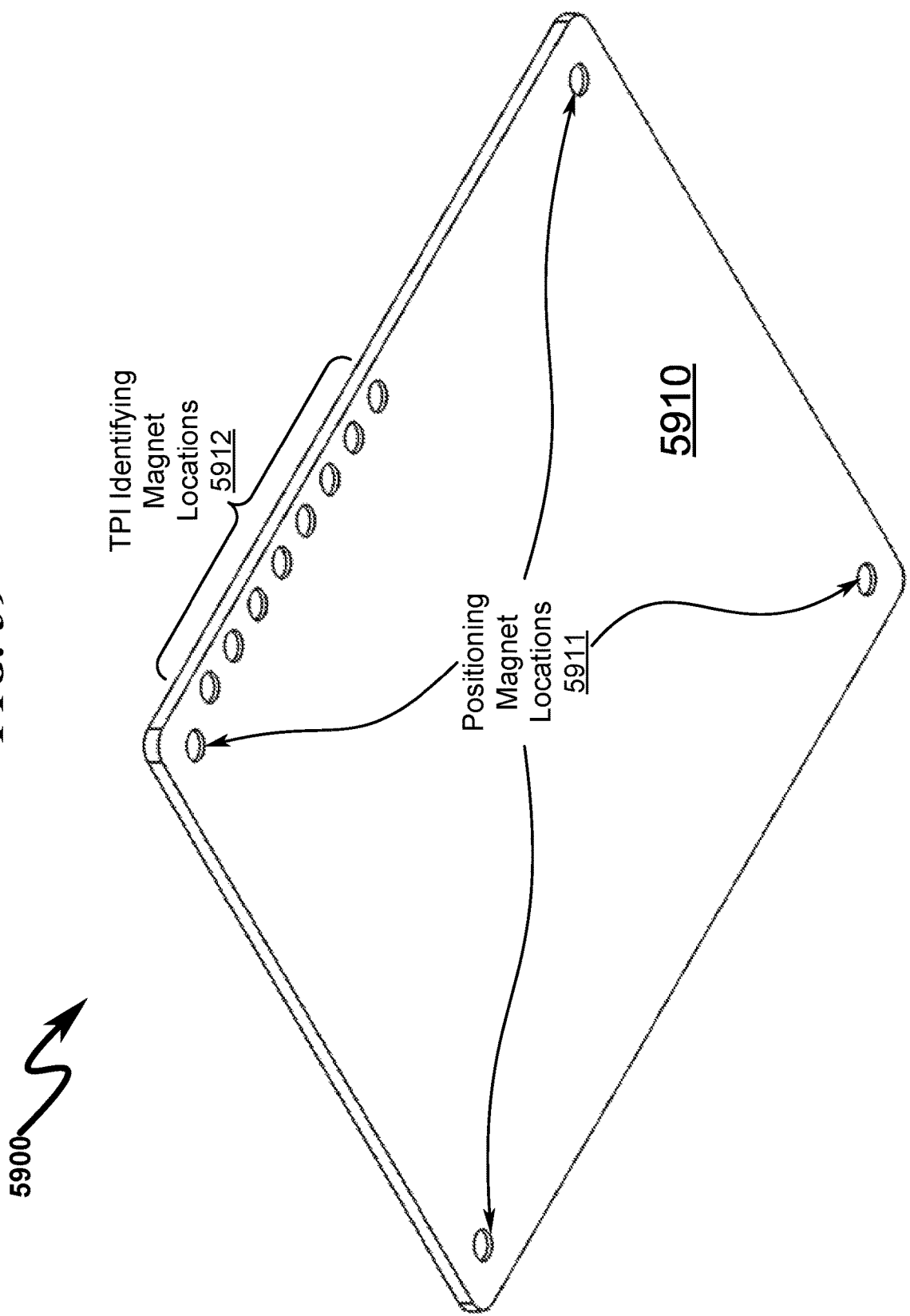
FIG. 59 illustrates a perspective view of an exemplary TPO incorporating magnetic attachment means and TPO magnetic identification means.

FIG. 59 (5900) illustrates a TPO structure (5910) incorporating TPO positioning magnet locations (5911) as described above and also incorporating a number of TPI identification magnet locations (5912) which may be populated with magnets that are detected by corresponding magnetometers (e.g., Hall effect sensors or equivalent detectors) within the TSA. By selectively populating the TPI identification magnet locations (5912), the TSA magnetometers may identify a bit stream that is unique to the particular TPO and thus load appropriate software drivers and application software to process information received from the depression pressures sensed by the TSA. This identification mechanism can also be utilized without the use of magnetometers by embedding corresponding magnets for each of the TPI identification magnet locations (5912) within the TSA and measuring the pressures detected at each TPI location. TPI positions that do not have magnets installed will register little or no detected pressure whereas TPI locations in the TPO that have magnets installed will detect a measureable increase in TSA pressure that can be converted to a corresponding TPI identification bit stream.

Raised TPO Pressure Indicia (Force-Profile Identification) (6000)

Figure 60:
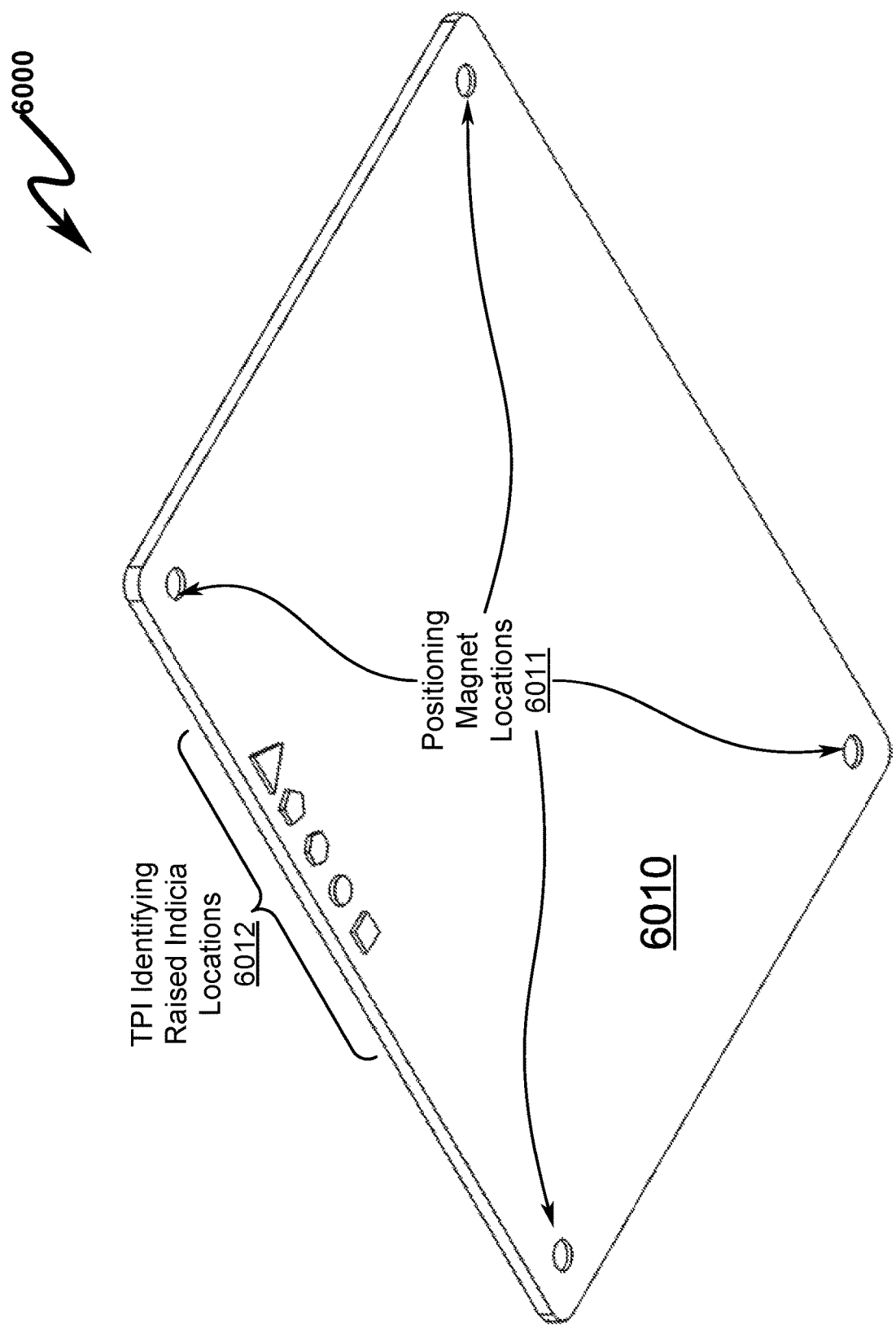
FIG. 60 illustrates a perspective view of an exemplary TPO incorporating magnetic attachment means and raised indicia identification means.

Since the overlays are placed against a force-sensitive touch sensor, it is possible to modify an overlay so that it exerts a unique force profile against the sensor. It is possible to form this force profile so that it is unique, which will allow the software to distinguish different overlays from each other. FIG. 60 (6000) shows one way to achieve this by placing small protrusions on the bottom side of the overlay. These protrusions will push into the touch sensor, creating a detectable force profile pattern. A scheme can be generated where all overlays have a designated region of the sensor where these protrusions are present. If this is the case, one can use a binary encoding to assign a unique ID to each overlay. The presence of a protrusion can map to a "1" and the absence of a protrusion can be a "0." This binary scheme can be decoded into an overlay ID. When a new overlay is placed on the sensor, the sensor can read the ID of the new overlay, and intelligently load the correct software that matches the functionality presented in the overlay.

As an example, FIG. 60 (6000) illustrates a TPO structure (6010) incorporating TPO positioning magnet locations (6011) as described above and also incorporating a number of raised TPI identification indicia locations (6012) which may incorporate a variety of shapes that are raised above the plane of the TPO and which exert a defined pressure profile on the surface of the TSA. By providing the correct shape and/or position at the TPI identification indicia locations (6012), the TSA can inspect this area of the pressure-sensitive surface and determine the identification of the TPO (6010) by virtue of the unique pressure profiles presented above the back surface plane of the TPO (6010). Note here that the pressure profile shape and/or position of the TPI identification indicia locations (6012) may be used in this identification process. Thus a particular shape may uniquely identify the TPO and/or a binary encoding of data from the pressure profile may be used to accomplish this identification. It should be noted that this technique of identification by the use pressure profile perimeter information can also be used with the magnetic approach detailed in FIG. 59 (5900).

Figure 121:
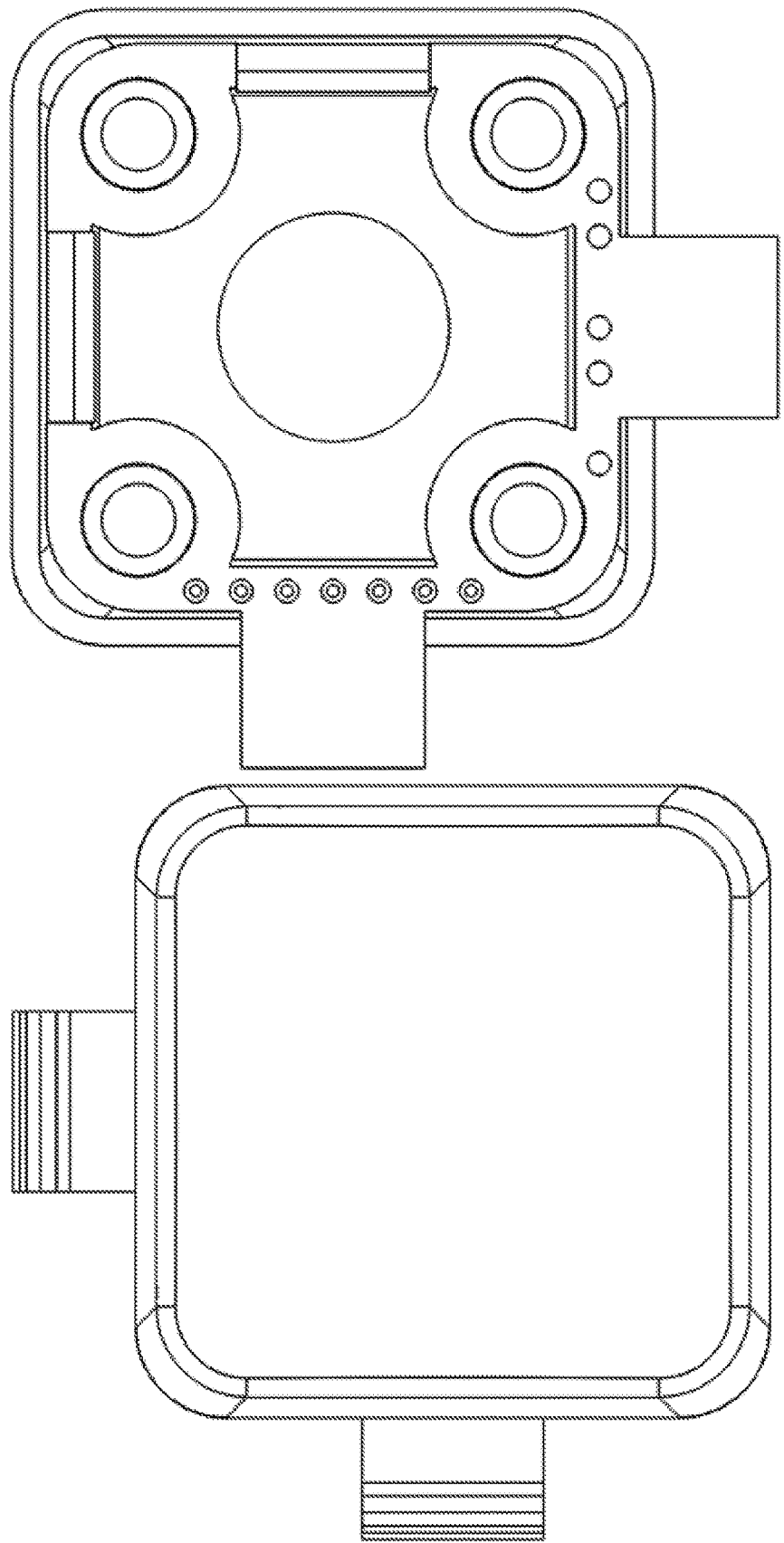
Figure 122:
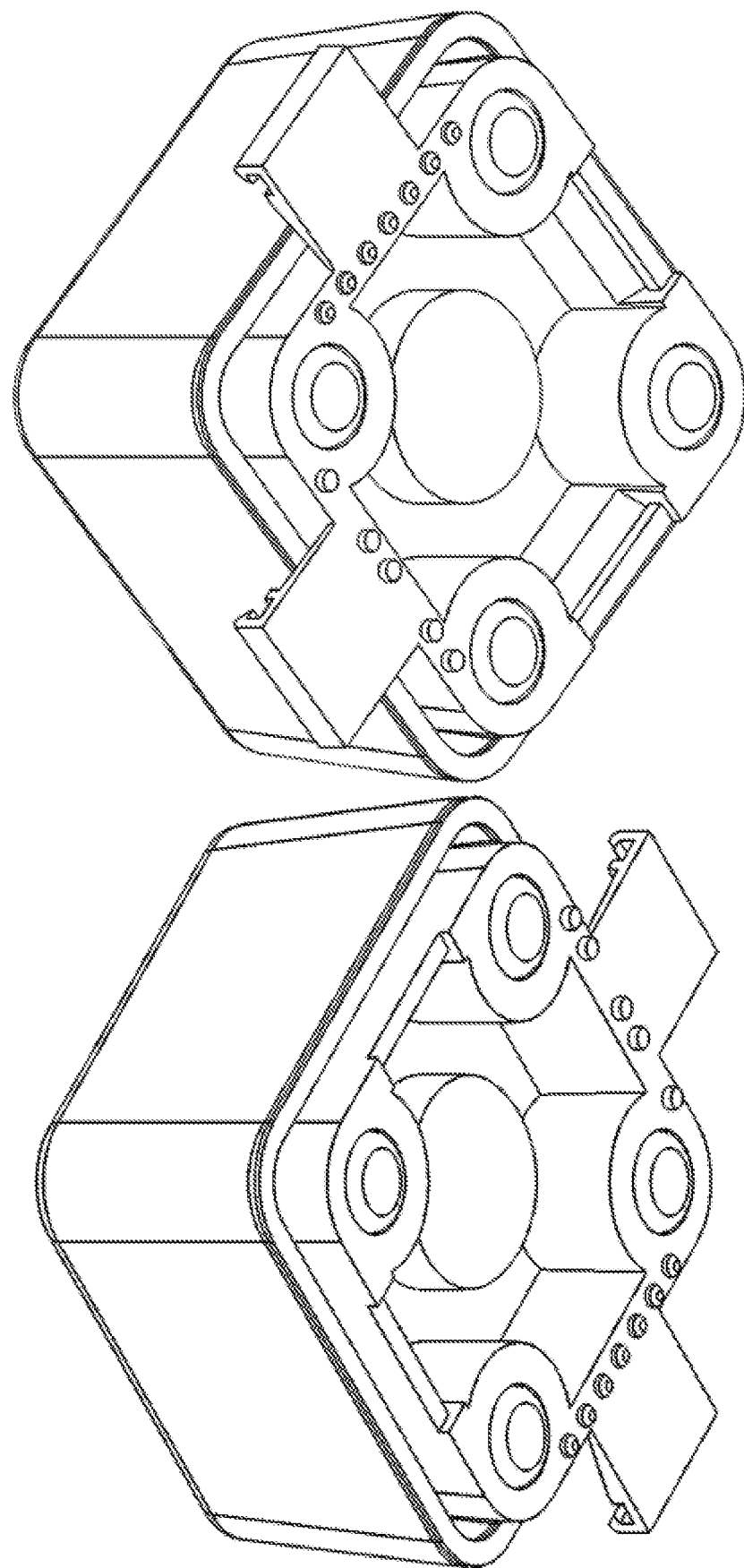
Figure 123:
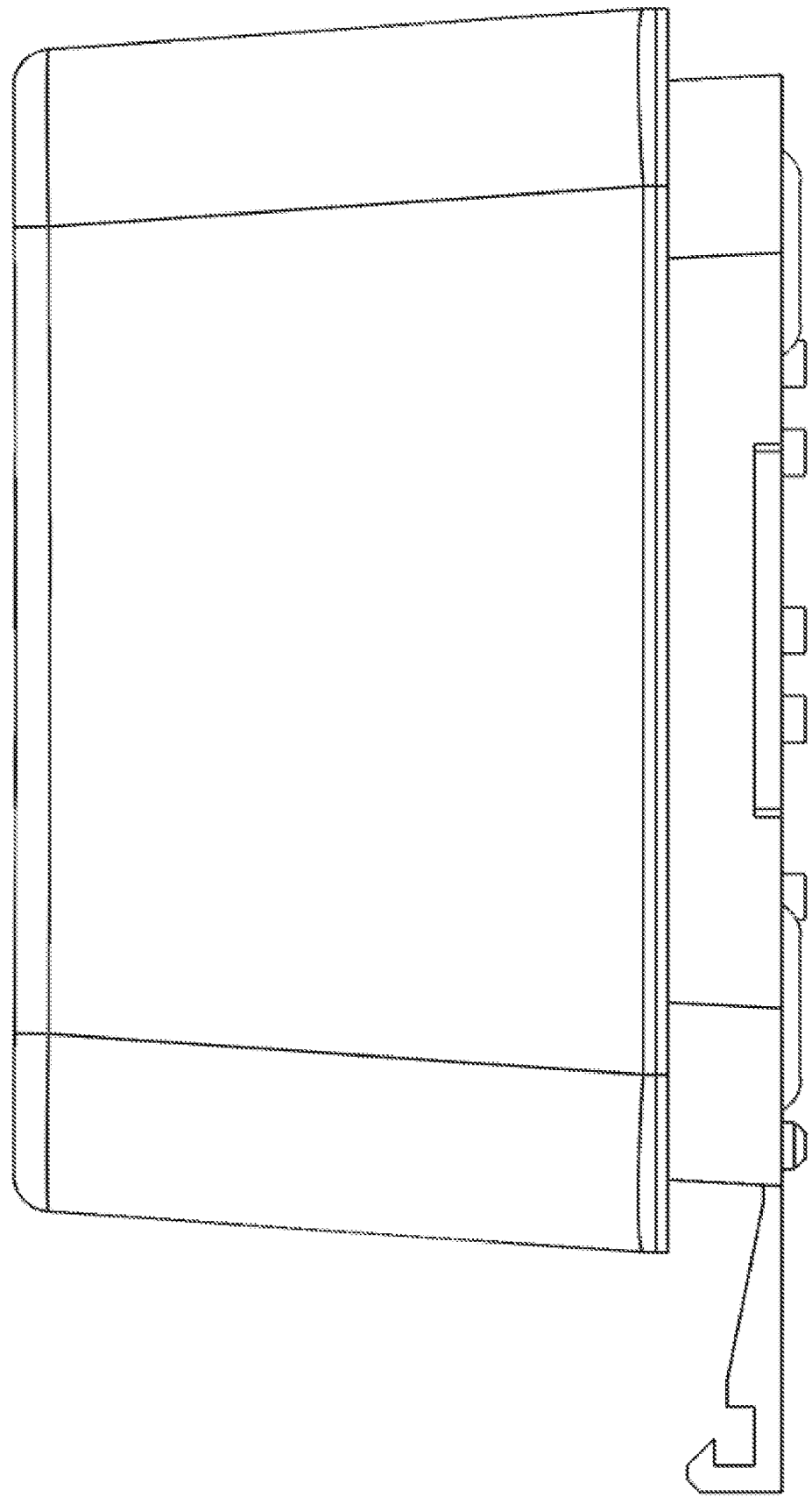
Figure 124:
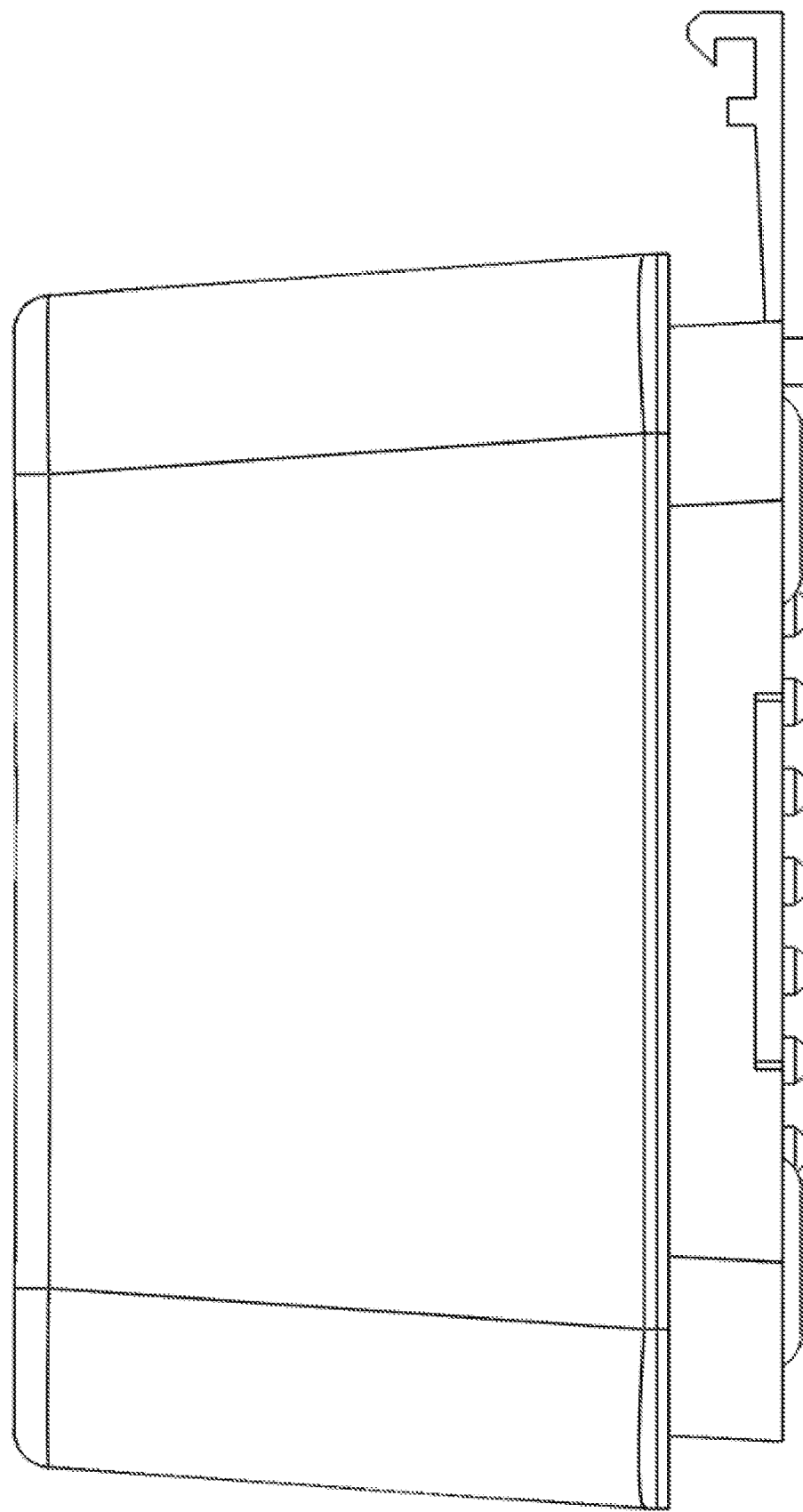
Figure 125:
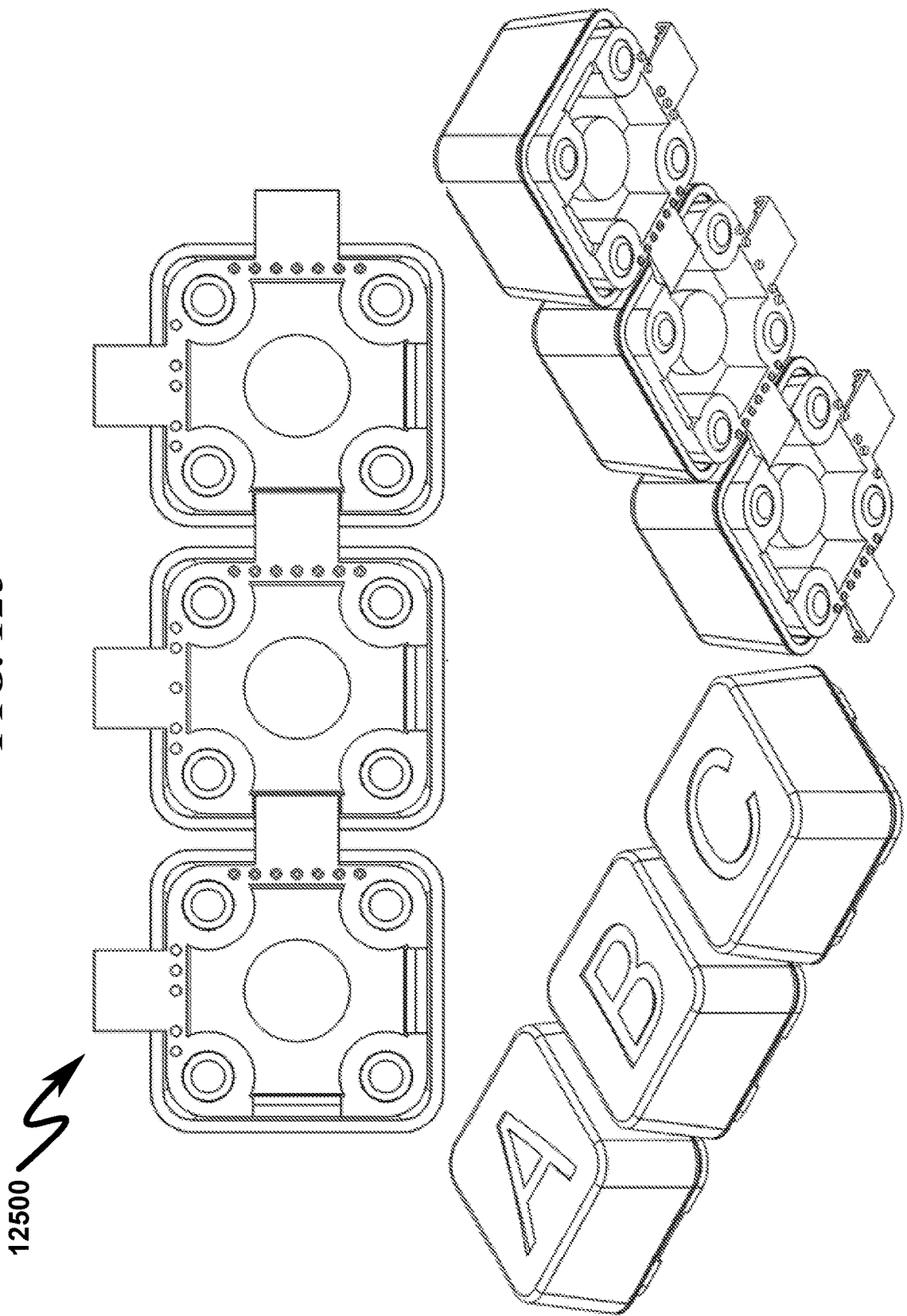
Figure 128:
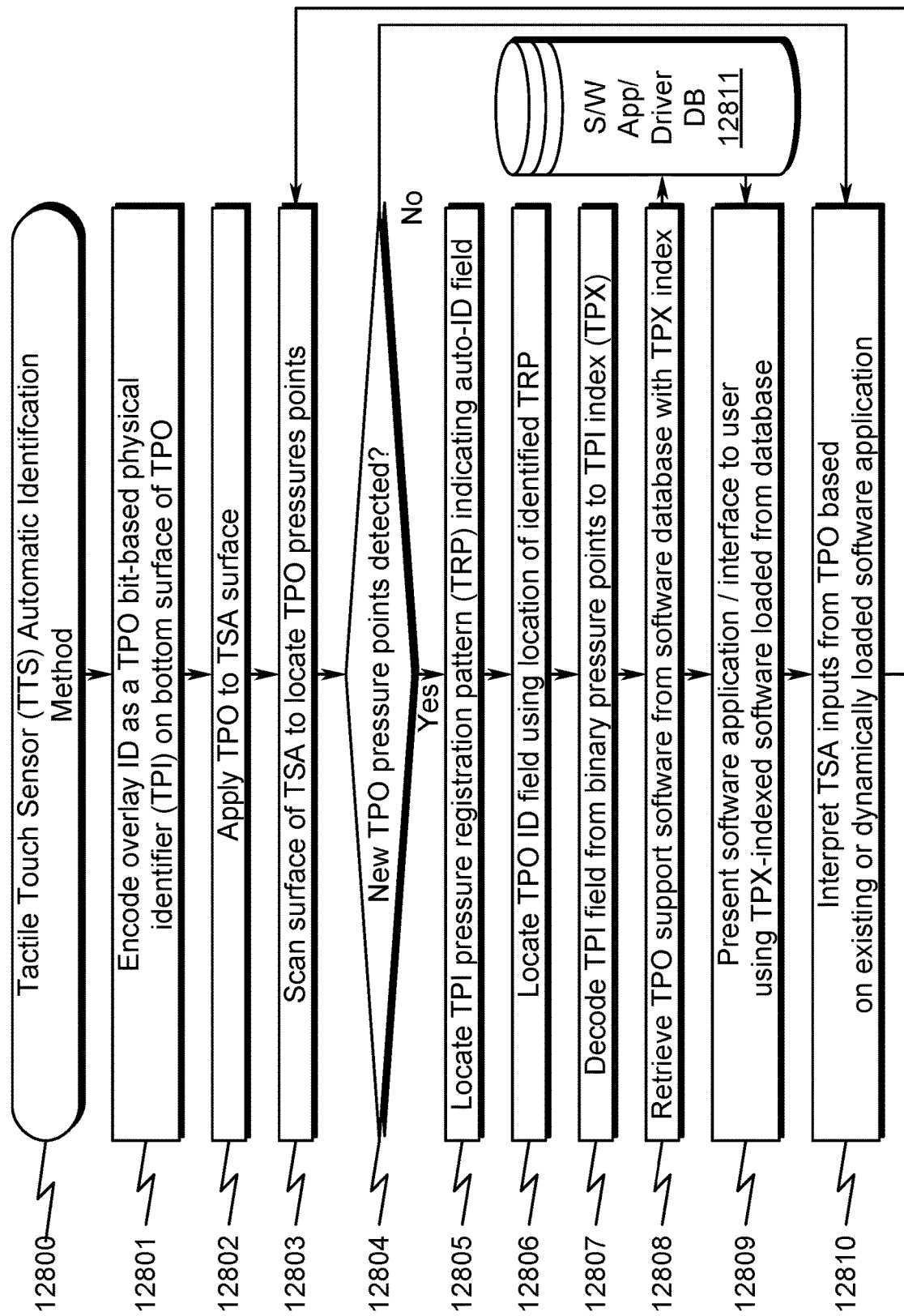

Further examples of the use of pressure indicia identification for TPO structures is depicted in more detail in FIG. 121 (12100)-FIG. 125 (12500) with a corresponding method identification provided in the flowchart of FIG. 128 (12800).

Tactile Bar Code Identification (6100)-(6200)

Figure 61:
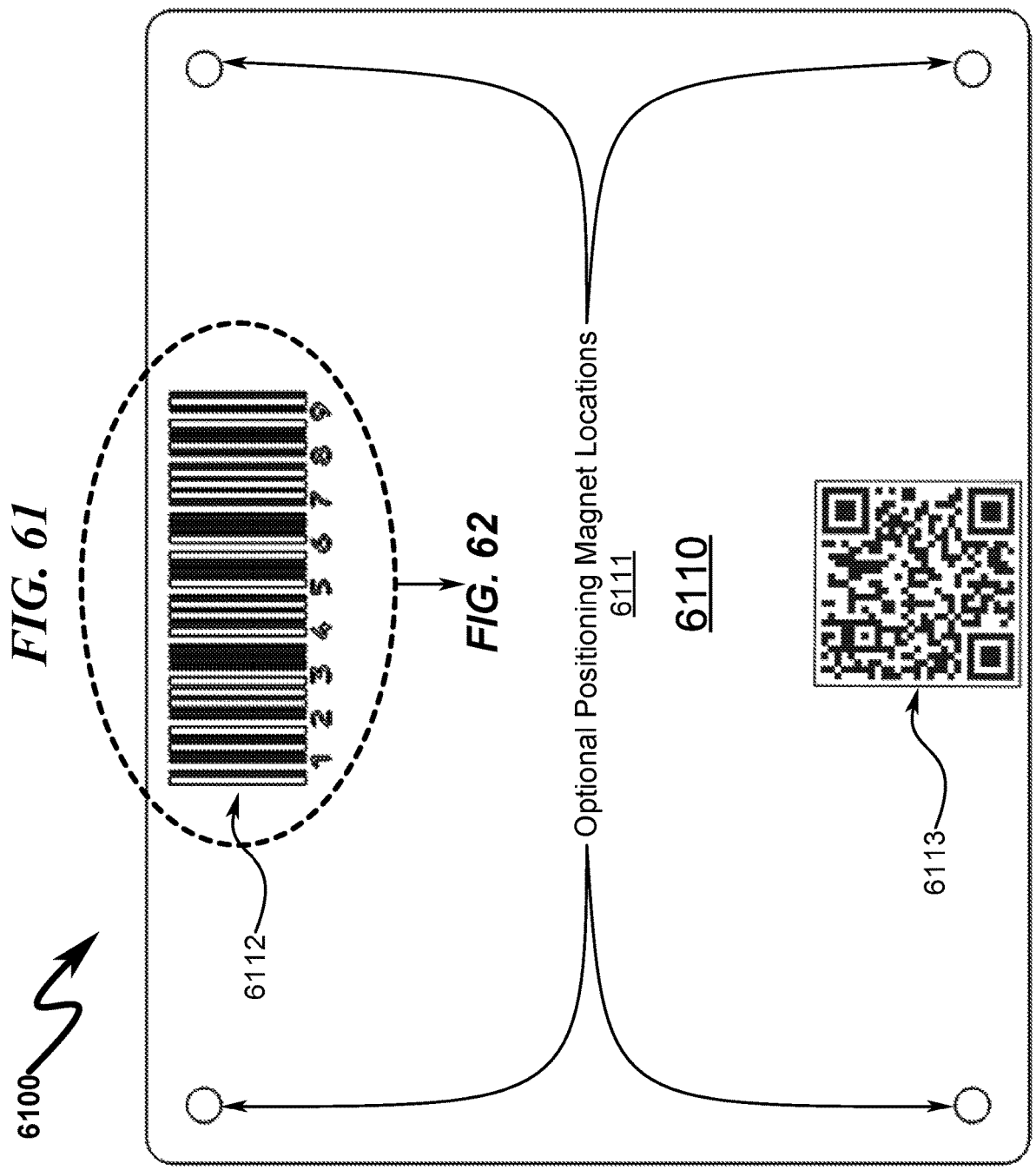
FIG. 61 illustrates a bottom view of an exemplary TPO incorporating magnetic attachment means with bar code identification means and QR-code identification means.
Figure 62:
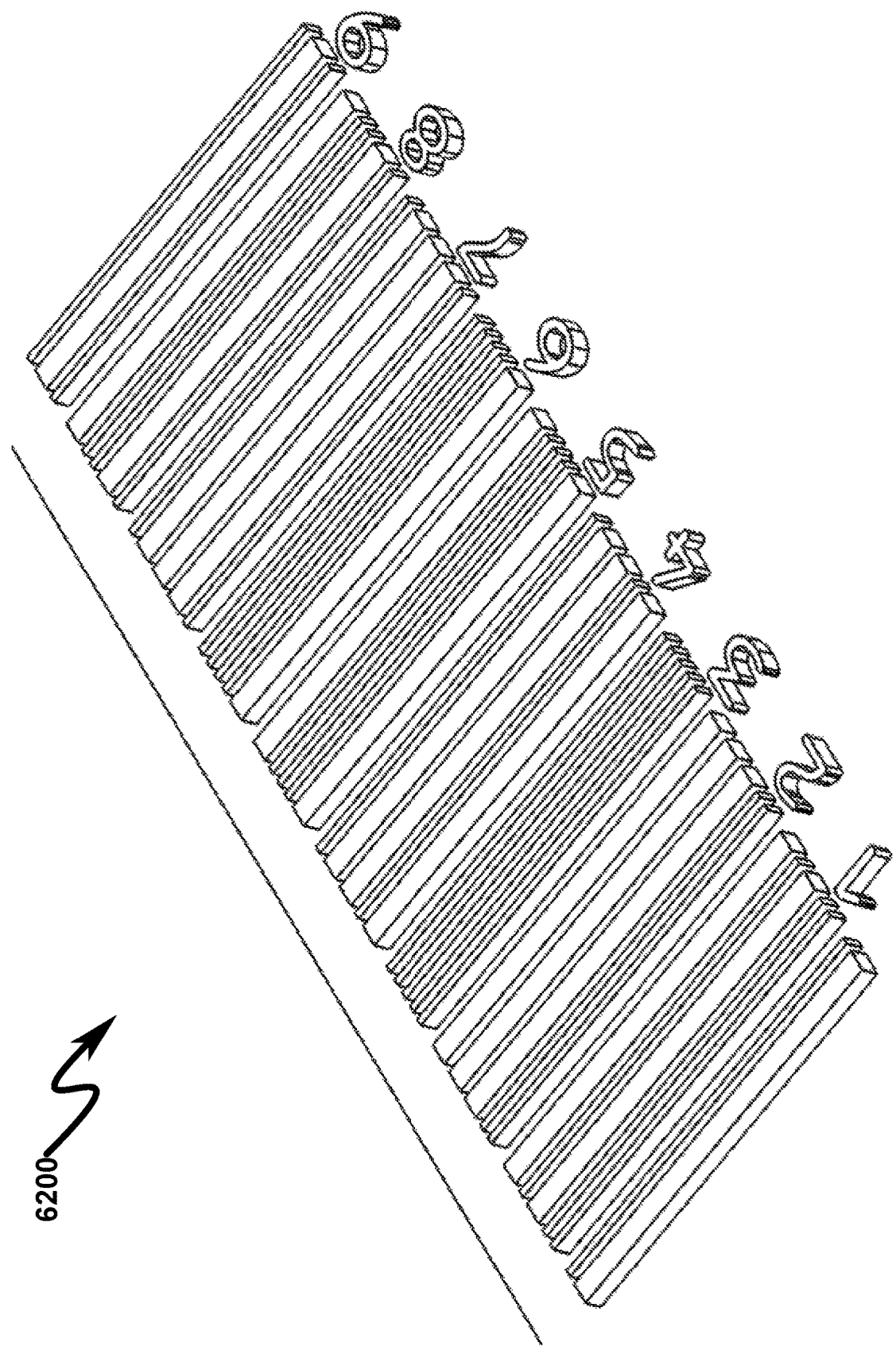
FIG. 62 illustrates a perspective view of an exemplary TPO incorporating raised bar code identification means.

FIG. 61 (6100)-FIG. 62 (6200) illustrate the use of a tactile bar code (6112) to identify the TPO (6110). This pressure-sensitive approach is similar to that described in FIG. 60 (6000) and optionally incorporates registration magnets (6111) with the exception that the tactile bar code (6112) typically contains sufficient internal registration information such that it can be placed on any position on the TPO and still be properly recognized by the TSA without the need for registration magnets (6111). In some circumstances the TPO recognition process may be enhanced by "swiping" the TPO to press the bar code onto the surface of the TSA and thus affect identification of the bar code by the TSA scanning logic. Also depicted in FIG. 61 (6100) is the use of a raised-texture quick response (QR) code (6113) that may also be used in a similar fashion as the illustrated bar code to provide TPO identification information and possibly source information for application software and/or drivers for the TPO configuration.

Optical Identification (6100)-(6200)

Alternatively, optical solutions can be employed to identify overlays that are lying on top of the sensor. For instance, barcodes or QR codes may be placed on the bottom side of TPO overlays (FIG. 61 (6100)-FIG. 62 (6200)). The TSA force sensor may be equipped have a barcode scanner/camera that reads the unique bar/QR code and determines what particular TPO overlay is on top of the sensor. It is also possible to use a mounted camera looking down on the TSA sensor to identify different overlays.

TPO RFID Identification (6300)

Another way to identify which overlay is on top of the sensor is to embed an RFID tag into each overlay. As long as the touch sensor is transparent to magnetic fields, an RFID antenna can be placed directly underneath the touch sensor. This antenna can be connected to electronics capable of reading the RFID tag in the overlay. For molded overlays, an RFID tag can be embedded into the mold itself. For mechanical and deformable overlays, the RFID tag can be placed on the bottom of the overlay. Care must be taken so that the RFID layer continues to allow the transmission of forces to the underlying touch sensor.

Figure 63:
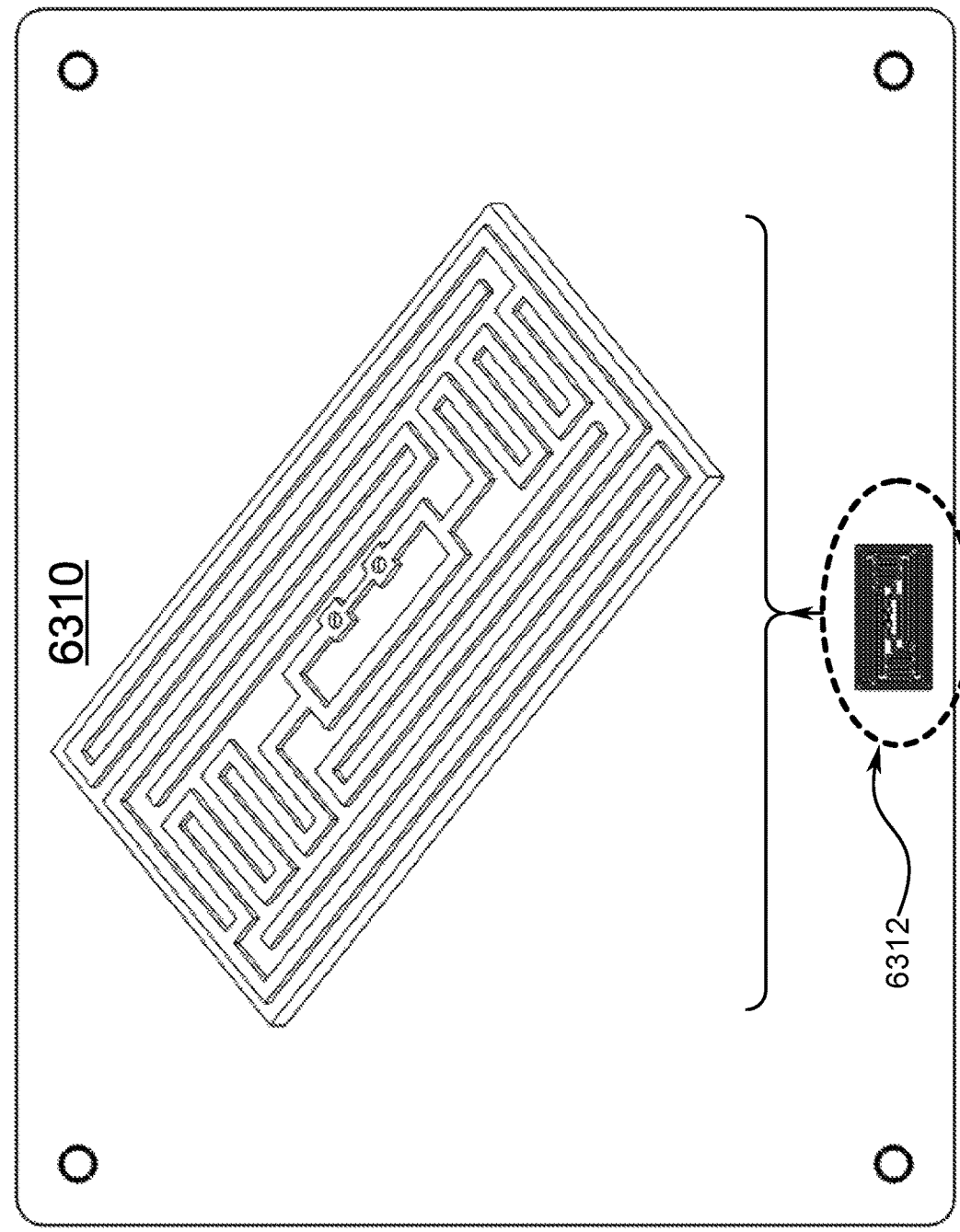
FIG. 63 illustrates bottom and perspective views of an exemplary TPO incorporating magnetic attachment means and RFID identification means.

FIG. 63 (6300) illustrates a TPO (6310) incorporating a RFID (6312) embedded within the TPO (6310) that may passively communicate the identification of the TPO (6310) to a corresponding RFID communication interface present within the TSA. One skilled in the art will recognize that the form factor of the RFID (6312) may vary widely based on application context and choice of particular RFID technology. The RFID (6312) may be a separate component as illustrated or in some preferred embodiments it may be incorporated within the internal construction of the TPO (6310).

TPO Shorting Bar Identification (6400)

FIG. 64 (6400) illustrates a TPO (6410) mated with a TSA (6420) wherein the TPO identification occurs as a result of shorting bars (6412) present in the TPO (6410) that mate with corresponding switch contacts (6422) in the TSA (6420) surface. Proper placement of shorting bars (6412) on the TPO (6410) allows a binary code to be interpreted by the TSA (6420) and identification of the TPO (6410) to occur.

TPO Capacitive and/or Inductive Identification (6400)

Additionally, conductive electrodes can be attached, printed, or embedded into the TPO overlay. An array of capacitance and/or inductance sensors can be placed along the edge of the touch sensor. These capacitance and/or inductance sensors can detect the presence/absences of these electrodes. Once again, these electrodes can be used as a binary encoding to distinguish different overlays.

As an example, other variants of the configuration depicted in FIG. 64 (6400) may use capacitive and/or inductive coupling differentials between the contacts (6422) in the TSA (6420) and the corresponding conductive bars (6412) present in the TPO (6410) to detect changes in capacitance and/or inductance as the TPO (6410) is mated to the TSA (6420) to identify the encoded TPO identification by the presence/absence of the conductive bars (6412) present in the TPO (6410). These changes in capacitance and/or inductance may be detected using differentials in conductive materials on the surface or embedded within the TPO.

Exemplary TPO Detection Hardware

While a number of hardware approaches may be taken to affect automatic detection of TPO overlays, the following list of exemplary non-exclusive hardware provides typical interfacing hardware that may be used with many invention embodiments.

Capacitive Detection
    ANALOG DEVICES model AD7147A—CapTouch Programmable Controller for Single-Electrode Capacitance Sensors.
    ATMEL model AT42QT2120—QTouch 12-channel Touch Sensor IC.

Inductive Detection
    TEXAS INSTRUMENTS model LDC1000—Inductance-to-Digital Converter.
    TEXAS INSTRUMENTS model LDC1312/1314—Multi-Channel 12-bit Inductance to Digital Converter (LDC) for Inductive Sensing.

Magnetic Detection
    TEXAS INSTRUMENTS model DRV5053—Analog-Bipolar Hall Effect Sensor.

TOSHIBA model TCS20DLR—CMOS Digital Integrated Circuit Silicon Monolithic Digital Output Magnetic Sensor.

Exemplary TPO Forms

The following discussion details a variety of anticipated exemplary TPO forms. One skilled in the art will no doubt be able to expand on these functional forms to include a wide variety of structures using the teachings presented. While the forms presented have been provided exaggerated horizontal and vertical dimensions for the purposes of illustrating the concepts herein, these dimensions and proportions are not limitive of the invention scope. Many application contexts will incorporate the functionality of the disclosed TPO structures but in a more compact form factor to support thin custom console structures or predefined console interfaces having a thin portable form factor.

Mechanical Overlays

The previously discussed types of overlays (flat and 3D) both require the use of flexible materials in order to effectively transmit forces from the user to the touch sensor. There is a way, however, to build an overlay with rigid materials. This type of overlay is referred to in the invention disclosure as a mechanical overlay. This type of overlay can be made of any material, as long as it effectively translates user input of interest through to the underlying touch sensor. For instance, an overlay with a physical button, switch, knob, slider, and joystick could be constructed such that interaction with these features translates to distinguishable input on the touch sensor. Examples of mechanical TPO overlays are depicted in FIG. 65 (6500)-FIG. 104 (10400) and described in detail below.

Figure 65:
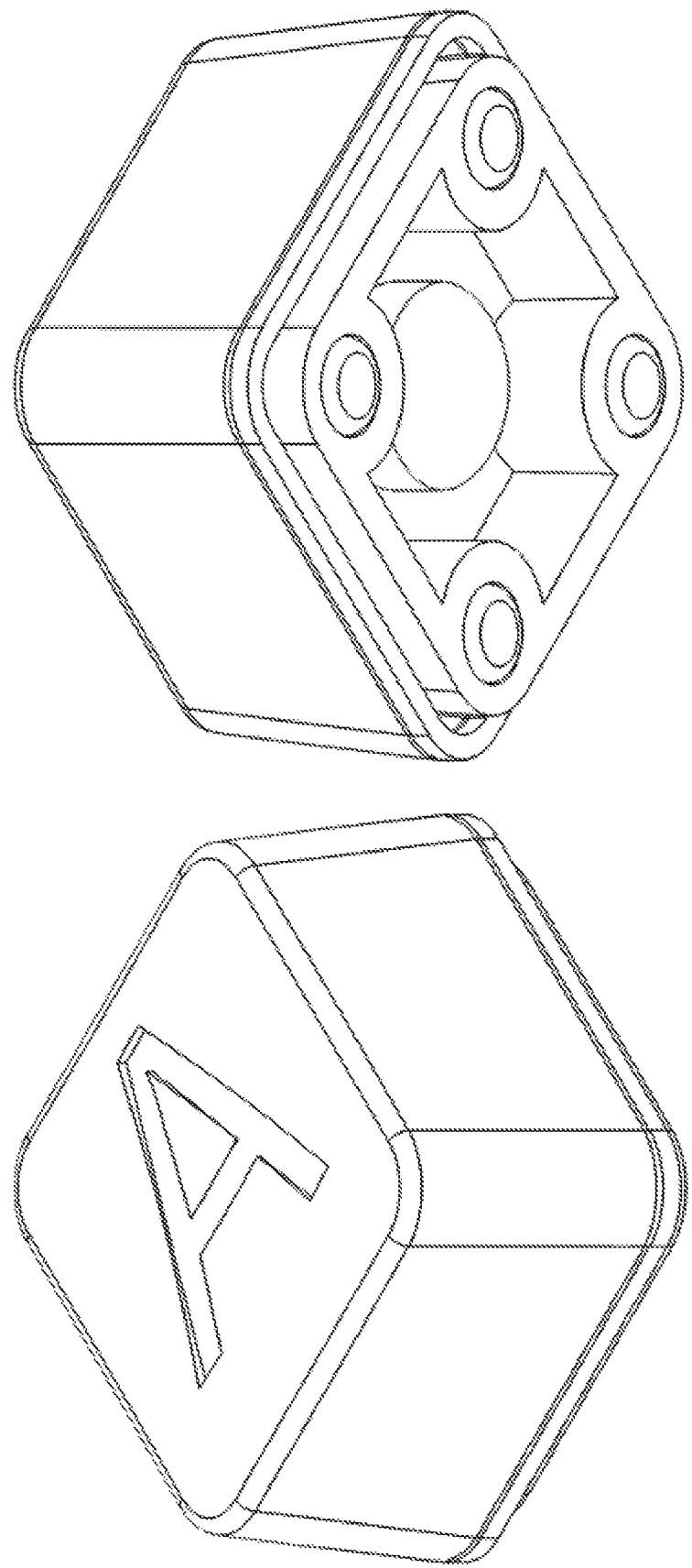
FIG. 65 illustrates top perspective and bottom perspective views of an exemplary TPO key embodiment.
Figure 66:
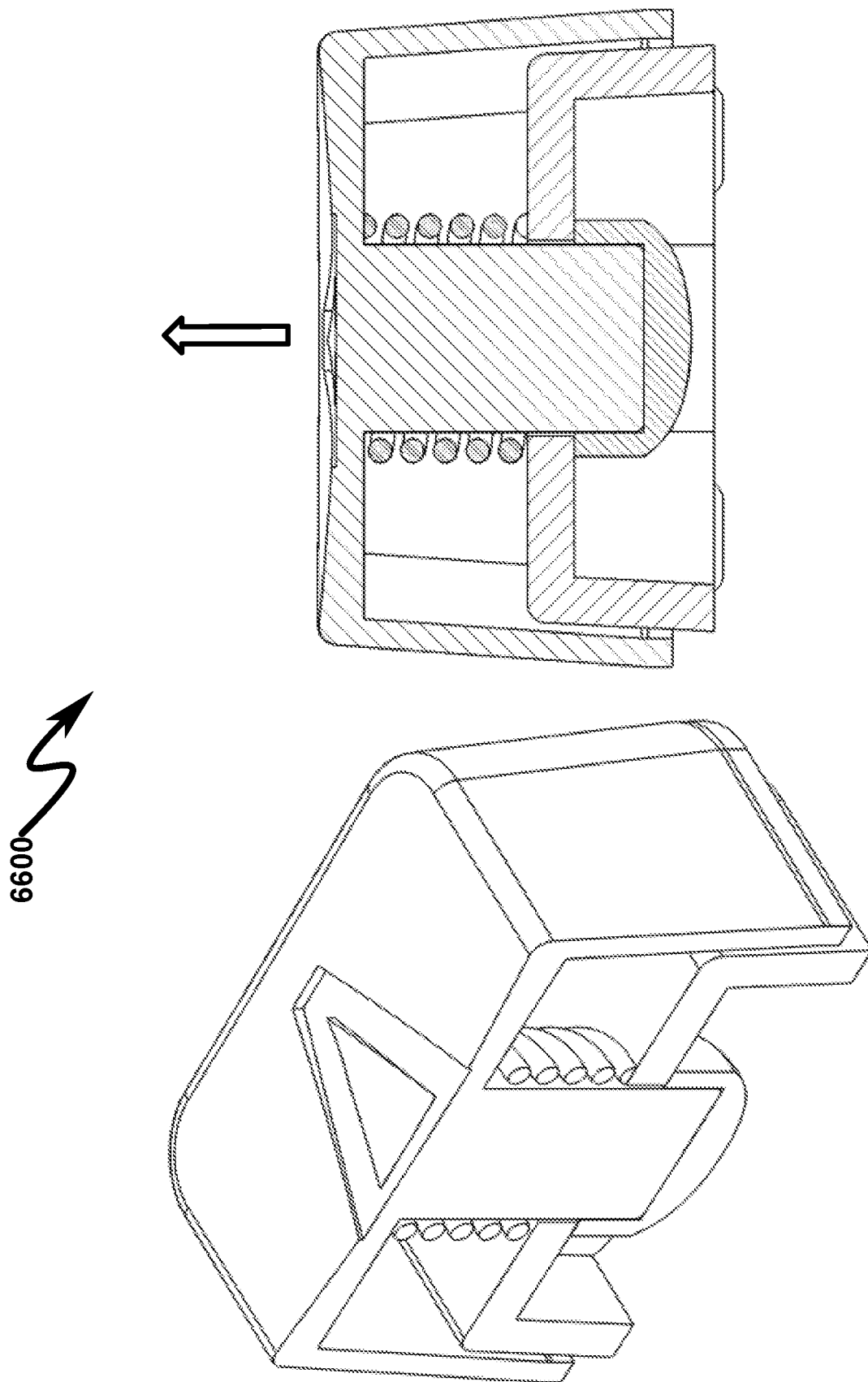
FIG. 66 illustrates top front perspective and front sectional views of an exemplary TPO key embodiment with the key in an un-depressed state.
Figure 104:
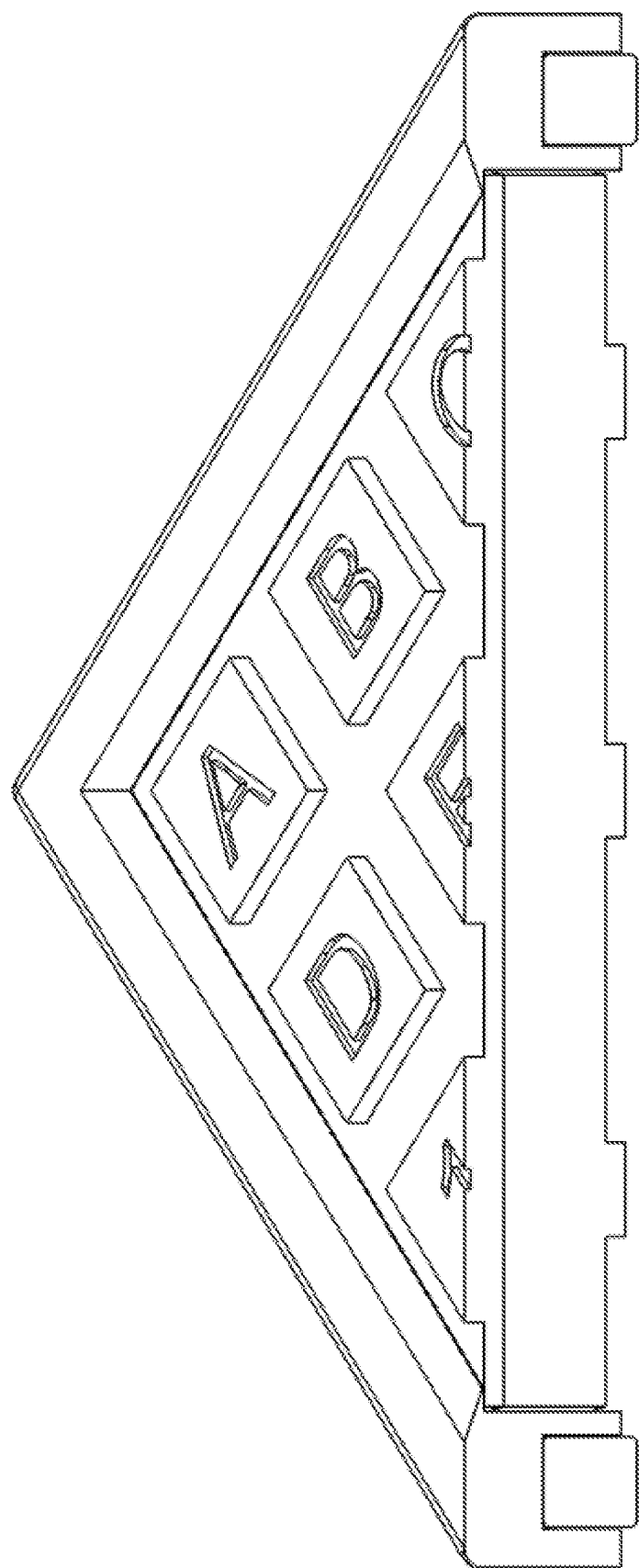
FIG. 104 illustrates a top perspective diagonal section view of an exemplary TPO keypad embodiment.

FIG. 65 (6500)-FIG. 104 (10400) depict an examples of mechanical overlays. In these examples, no flexible materials are used. Instead, mechanical widgets (sliders, knobs, toggle switches, and buttons) are designed such that they transmit forces from a user's input to the underlying touch sensor. The various views show the mechanical overlay cross-sections, and depict how slider and a button are implemented in these embodiments. The slider is constructed so that the bottom of the sliding element is always in contact with the touch sensor. This allows the sensor to continually read a slider position, which is updated when the user moves the slider back and forth. The button, on the other hand, does not touch the sensor by default. When a user presses the button, the touch sensor is able to detect the button activation by sensing the force exerted by the traveling button shaft.

These figures show how modular overlays can be created. These overlays each contain magnets and can be mounted to a touch sensor that has a ferromagnetic material behind it. This allows the overlays to be placed anywhere on the touch sensor. In some circumstances the implementation of a flat, flexible, modular overlay is anticipated. This overlay can be used to indicate generic touch input, or could indicate that a certain region of the sensor is designated for drawing. In the latter case, the top material of this overlay could be specially selected to enhance the writing experience. FIG. 48 (4800) and FIG. 126 (12600)-FIG. 127 (12700) show what a touch sensor might look like when it is populated with a variety of different modular overlays. Since these overlays are magnetic, they can be rearranged in any way. This allows a user to create custom, powerful, yet intuitive physical interfaces.

TPO Pushbutton (6500)-(6800)

The present invention may in some preferred embodiments be implemented in a TPO pushbutton form as generally depicted in FIG. 65 (6500)-FIG. 68 (6800). This general type of pushbutton may have a wide variety of forms, but as illustrated incorporates magnets at the four bottom corners of the device and a spring-loaded pressure contact that initiates a pressure reading on the TSA.

TPO Rocker Switch (6900)-(7200)

Figure 72:
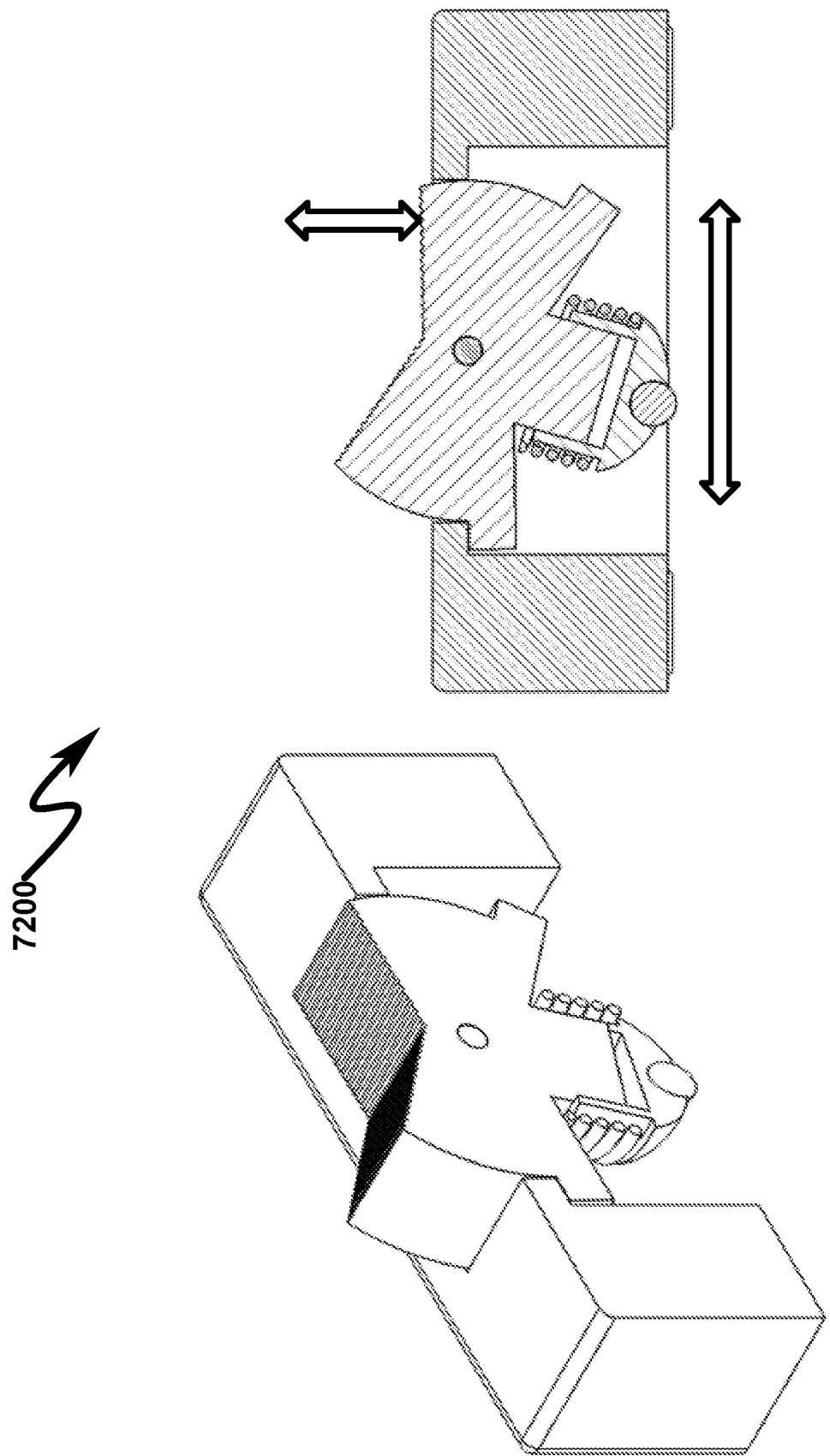
FIG. 72 illustrates side sectional perspective and side sectional views of an exemplary TPO rocker switch embodiment in a second switch position.

The present invention may in some preferred embodiments be implemented in a TPO rocker switch form as generally depicted in FIG. 69 (6900)-FIG. 72 (7200). The embodiment illustrated provides for four magnets to secure the rocker switch to the TSA and a two position rocker that articulates a spring-loaded contactor that provides pressure to the surface of the TSA. A ball bearing may be incorporated as shown to reduce the frictional drag associated with the change in rocker switch position.

TPO Slider (7300)-(7600)

Figure 73:
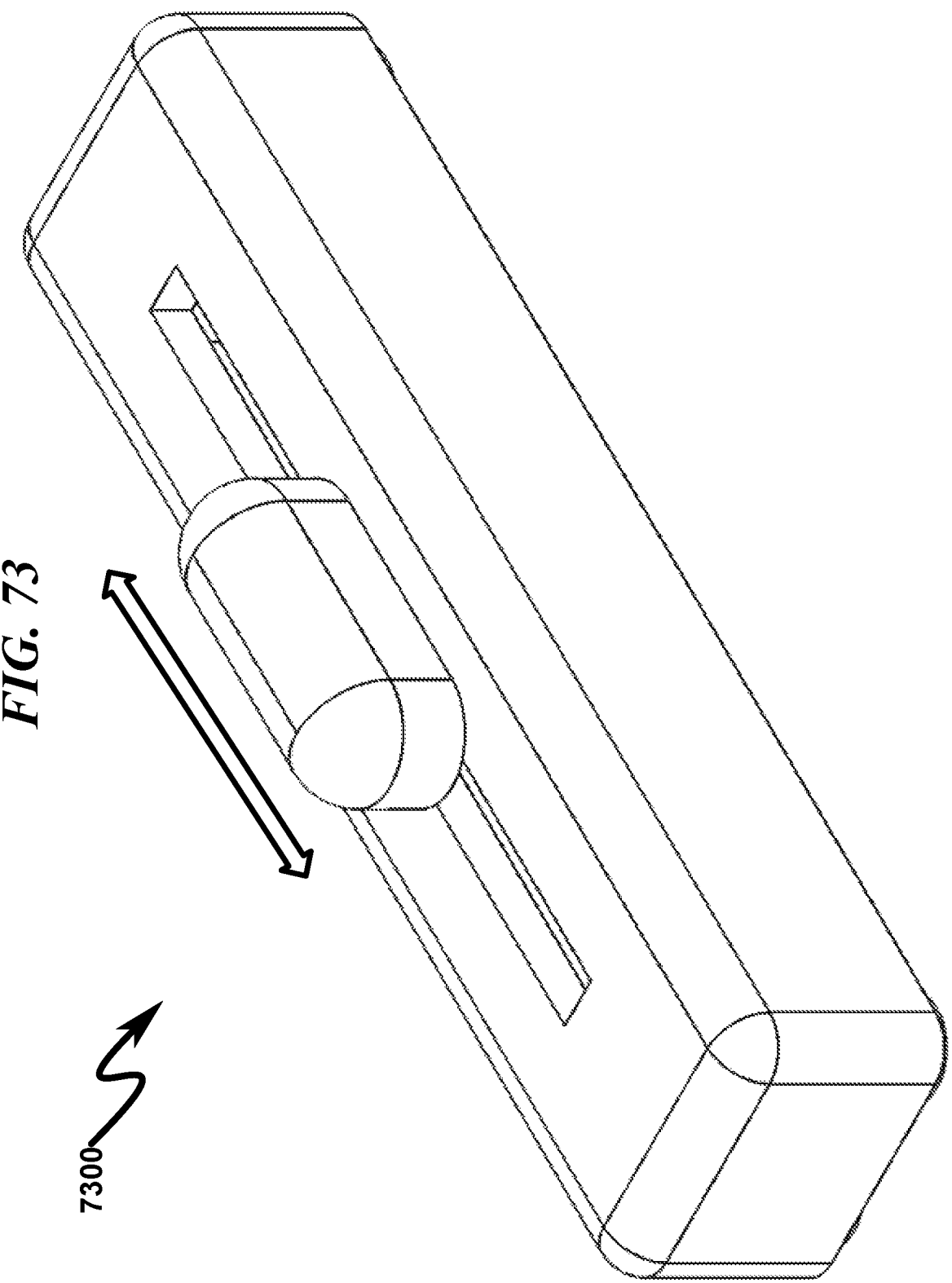
FIG. 73 illustrates a top perspective view of an exemplary TPO slider embodiment.
Figure 74:
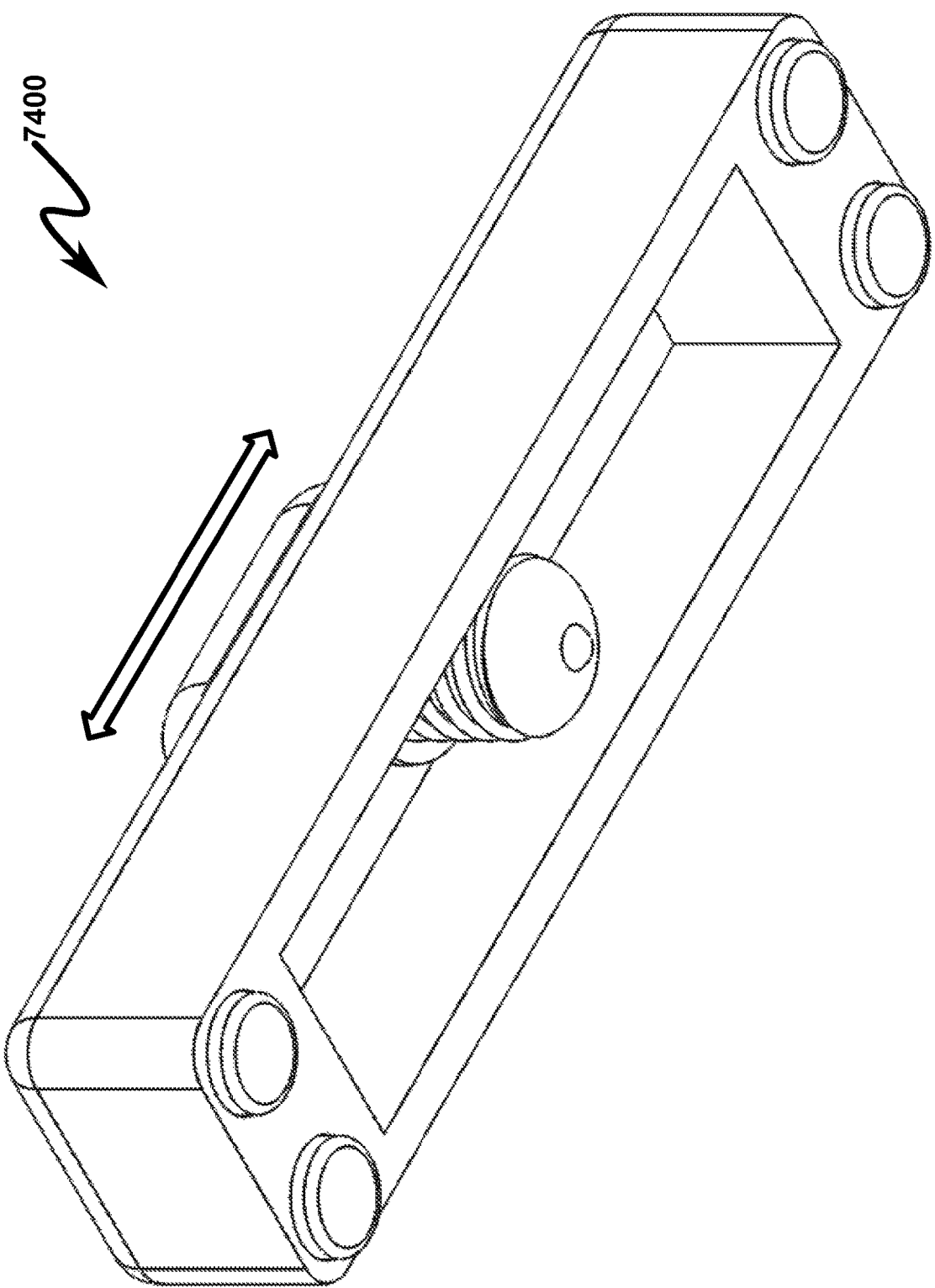
FIG. 74 illustrates a bottom perspective view of an exemplary TPO slider embodiment.
Figure 75:
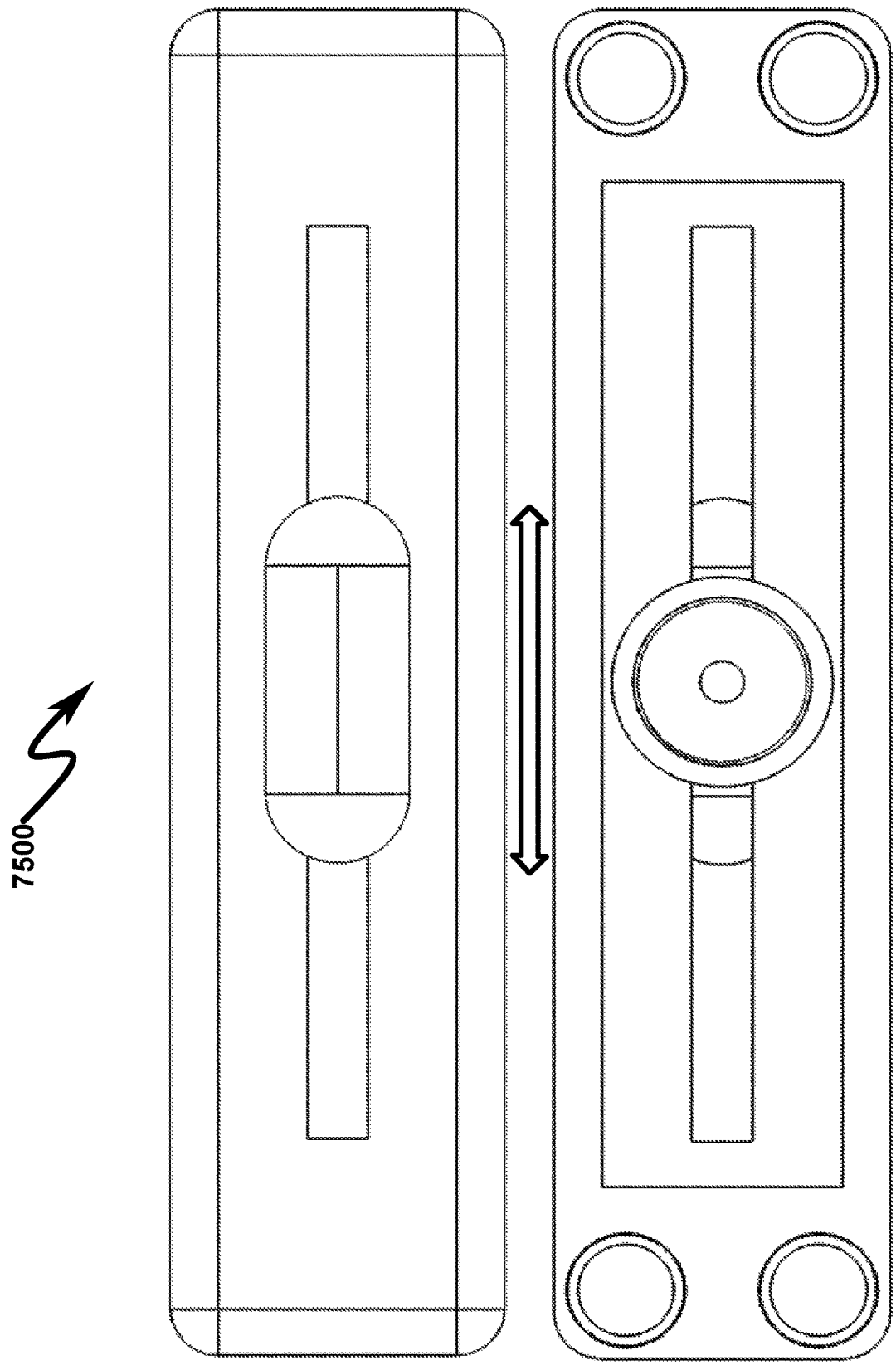
FIG. 75 illustrates top and bottom views of an exemplary TPO slider embodiment.
Figure 76:
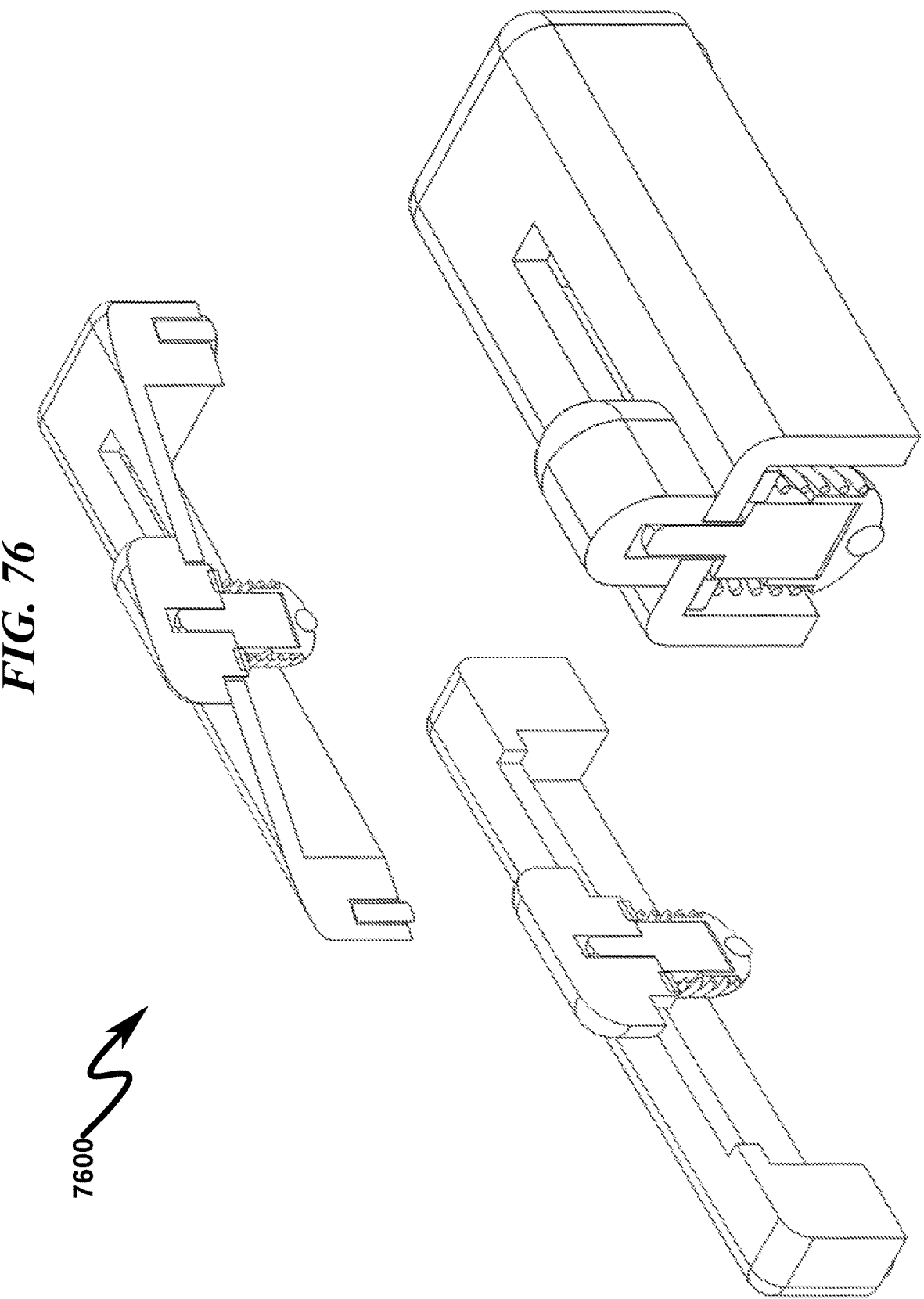
FIG. 76 illustrates front, side, and diagonal perspective sectional views of an exemplary TPO slider embodiment.

The present invention may in some preferred embodiments be implemented in a TPO slider form as generally depicted in FIG. 73 (7300)-FIG. 76 (7600). This slider provides an analog linear contactor that has one degree of freedom in movement. This may implement a variety of linear and digital inputs as interpreted by the TSA pressure sensor.

TPO Knob (7700)-(8000)

Figure 77:
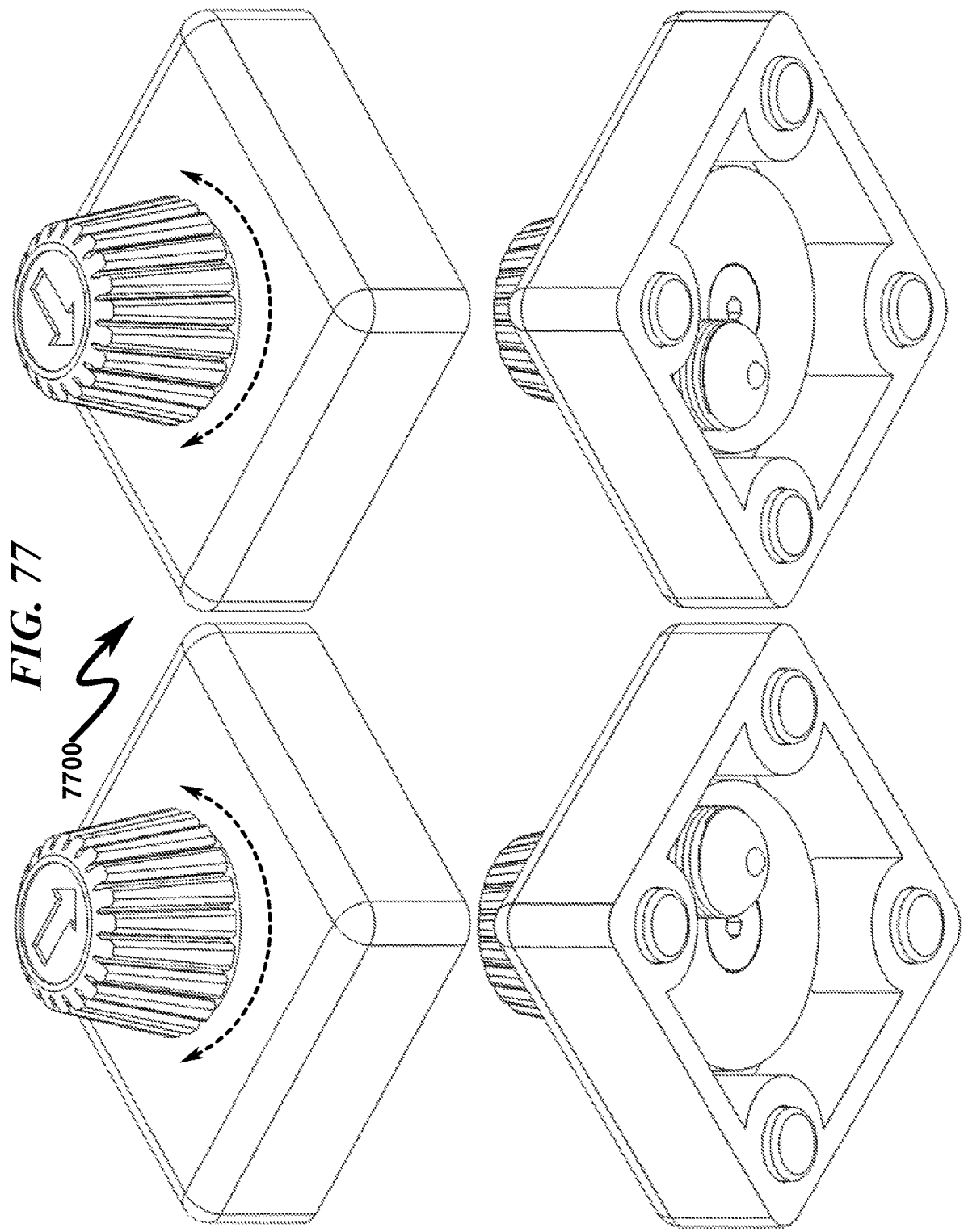
FIG. 77 illustrates top and bottom perspective views of an exemplary TPO dial knob embodiment.
Figure 78:
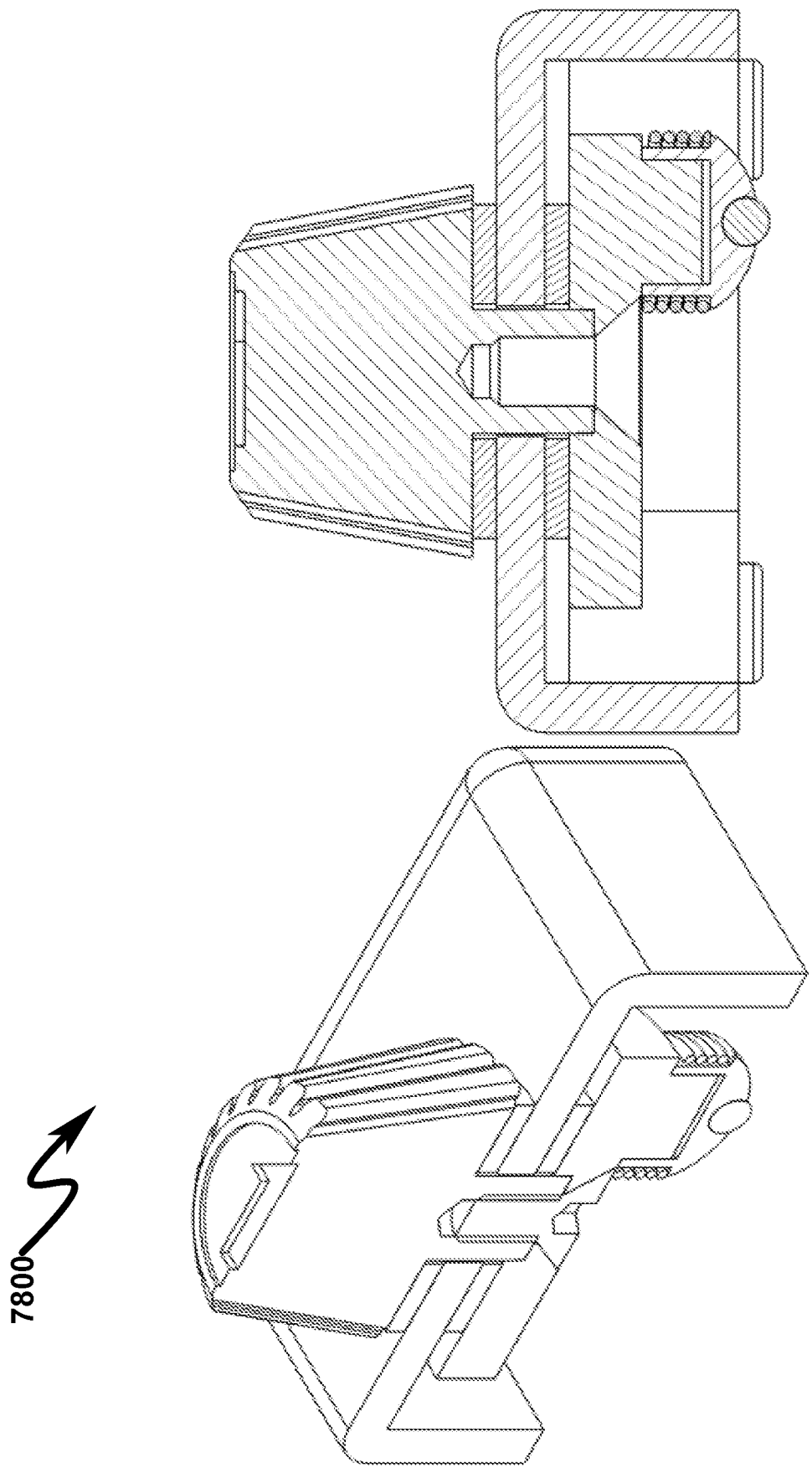
FIG. 78 illustrates front sectional views of an exemplary TPO dial knob embodiment.
Figure 79:
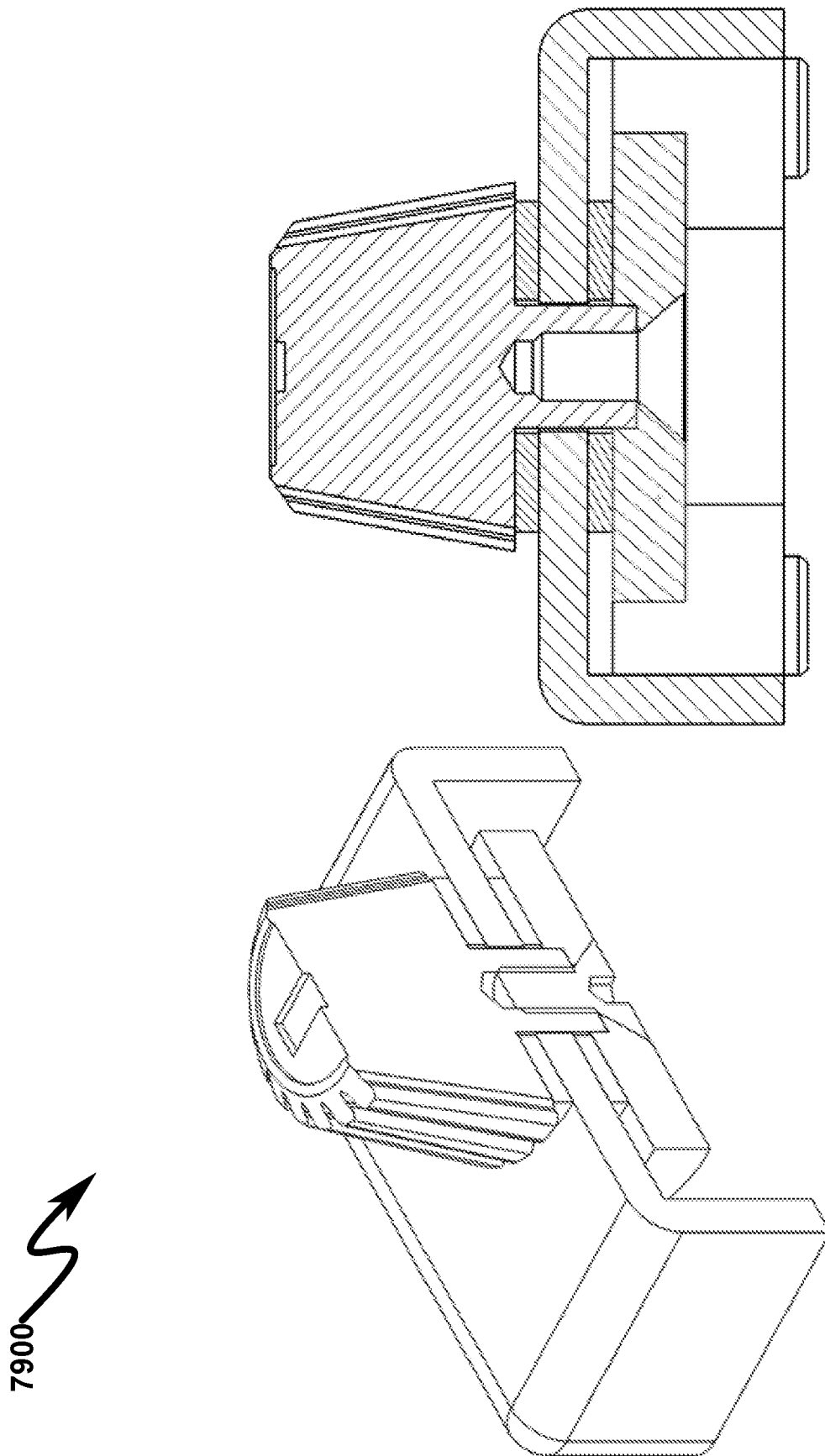
FIG. 79 illustrates side sectional views of an exemplary TPO dial knob embodiment.
Figure 80:
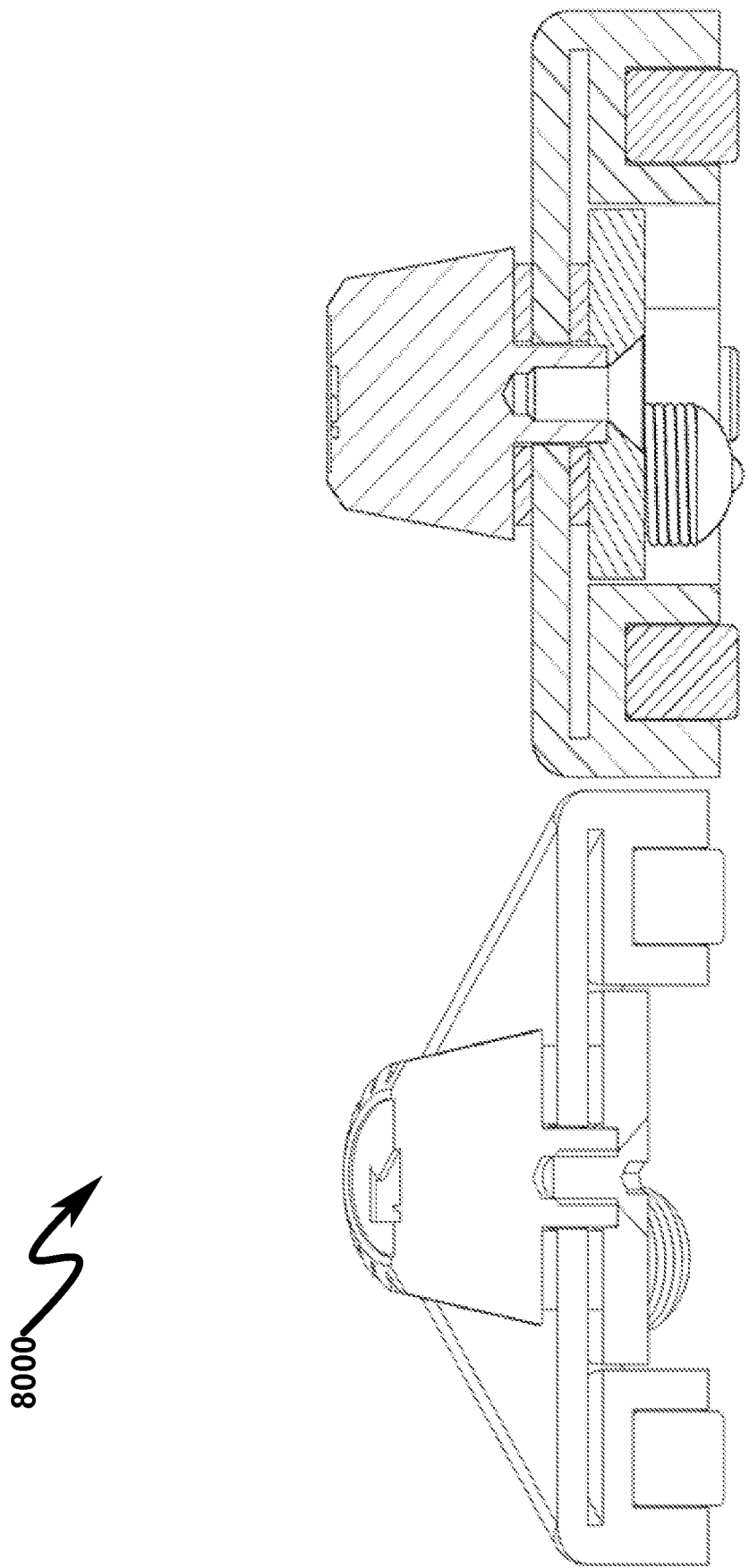
FIG. 80 illustrates diagonal sectional views of an exemplary TPO dial knob embodiment.

The present invention may in some preferred embodiments be implemented in a TPO knob form as generally depicted in FIG. 77 (7700)-FIG. 80 (8000). The TPO knob embodiment operates in a manner similar to that of the slider with the exception that a rotating knob indicator is used to provide radial pressure to the TPA about the rotational axis of the knob. Spacing foam washers and a retaining fastener provide the necessary friction to maintain the knob position once rotated. As with the slider, a spring-actuated contactor with optional ball bearing contact point provides the TPA pressure necessary to detect the knob displacement.

The knob as indicated provides for fully linear circular travel about an axis of rotation. However, it is possible to incorporate detents in the positioning mechanism to provide for a rotary switch function as compared to a traditional potentiometer functionality.

TPO Mouse/Puck (8100)-(8800)

Figure 81:
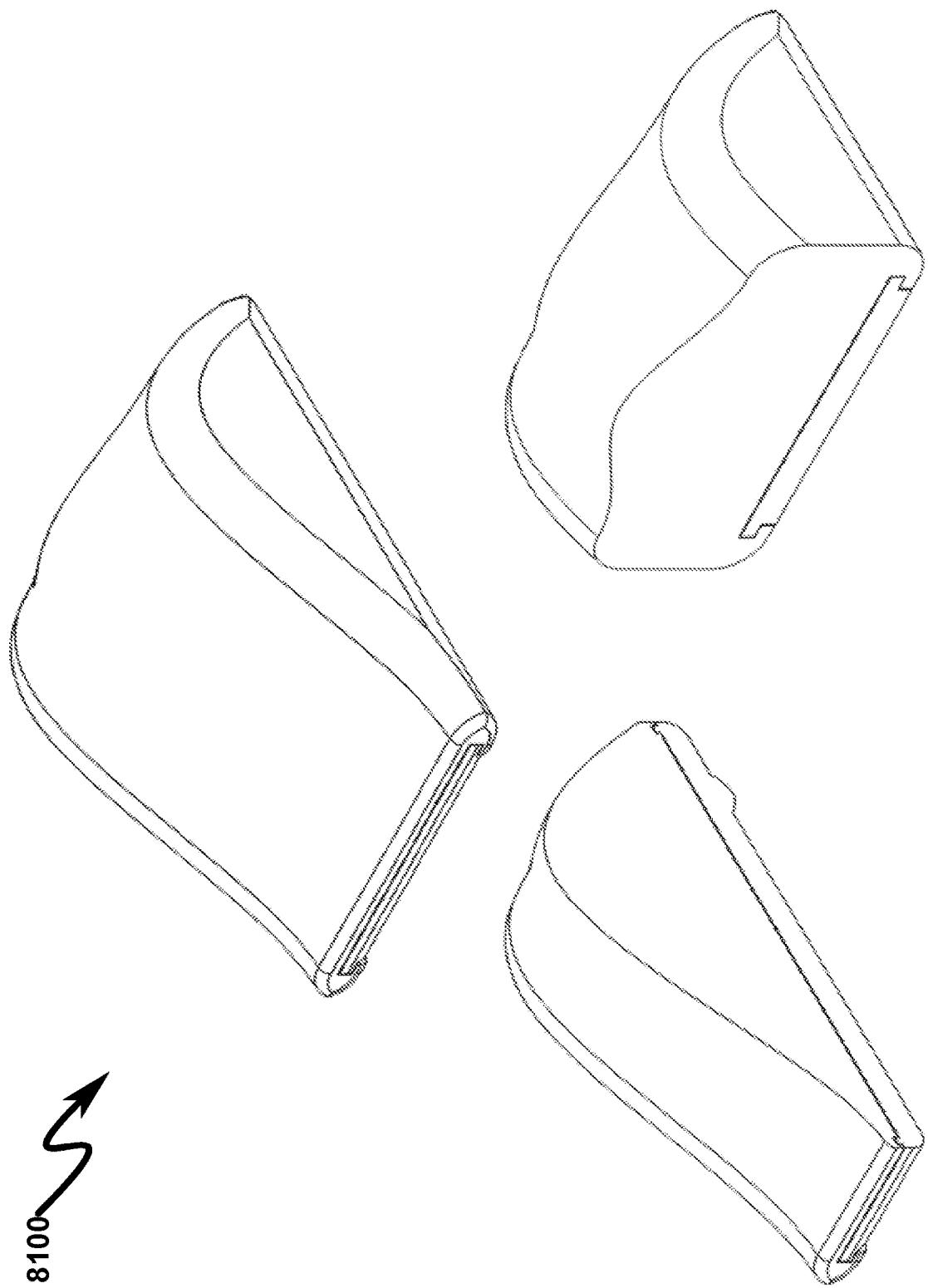
FIG. 81 illustrates a top right front perspective view of an exemplary two-piece TPO mouse/puck embodiment.
Figure 82:
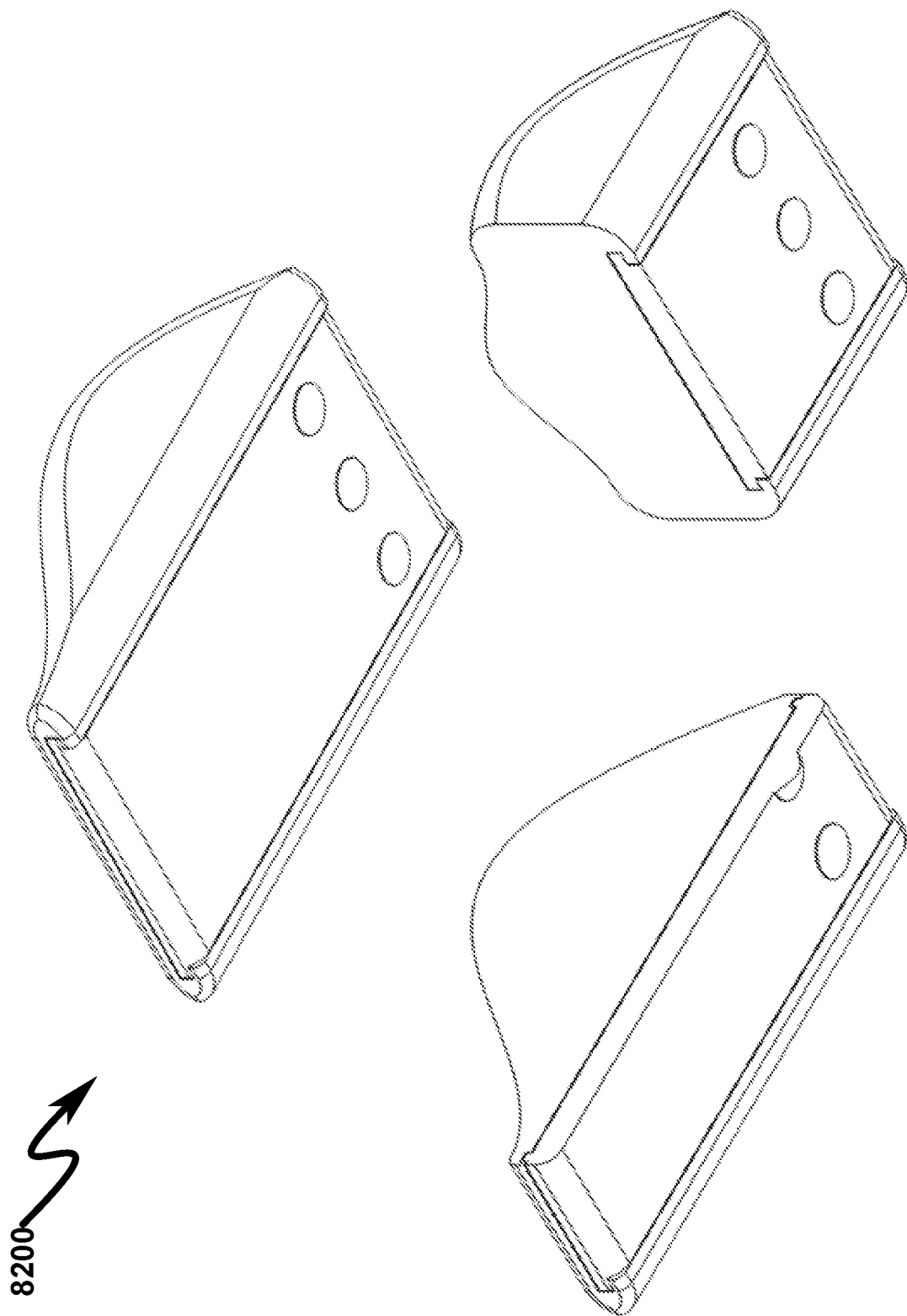
FIG. 82 illustrates a bottom right front perspective view of an exemplary two-piece TPO mouse/puck embodiment.
Figure 83:
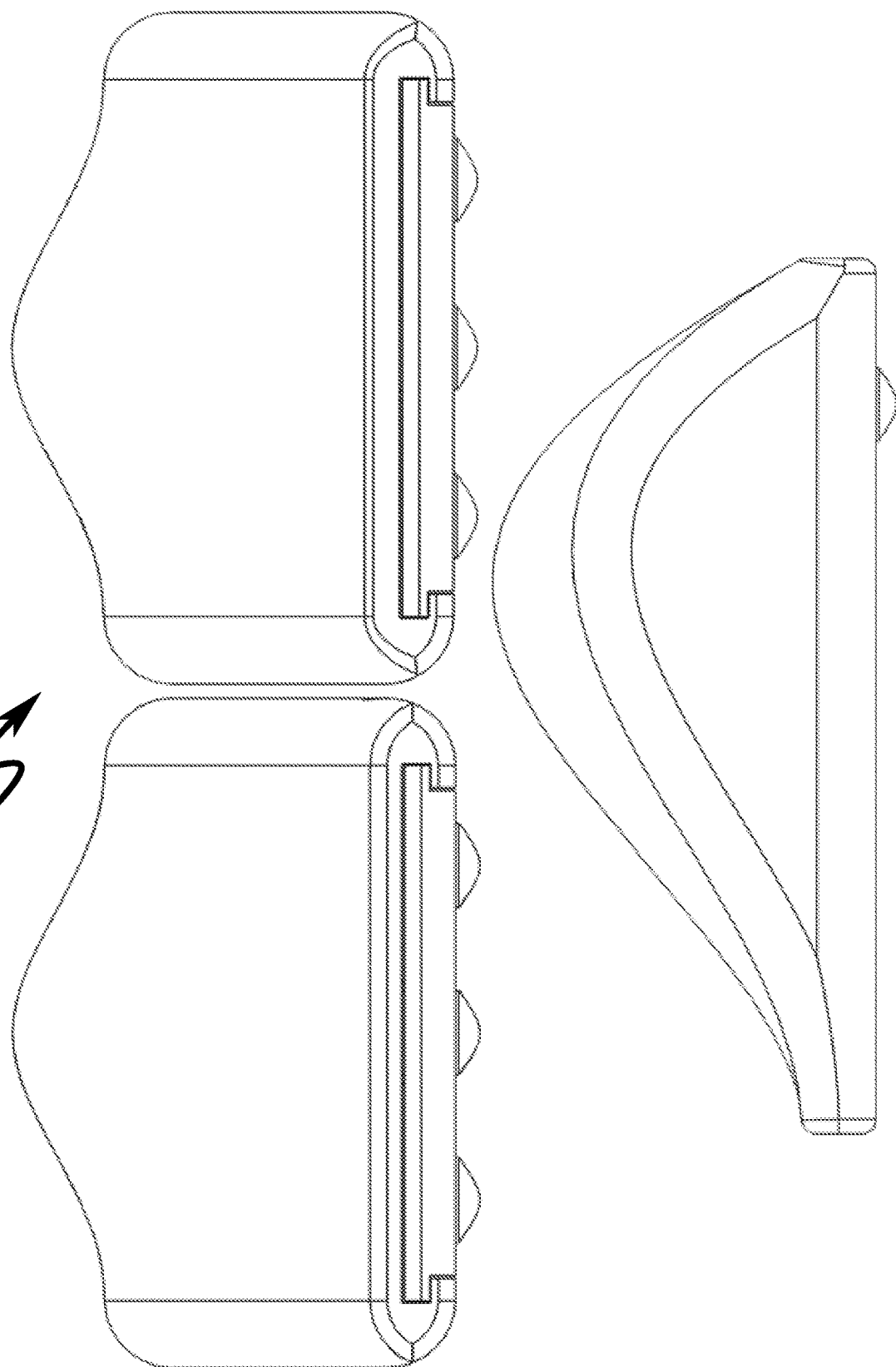
FIG. 83 illustrates front, rear, and side views of an exemplary two-piece TPO mouse/puck embodiment.
Figure 84:
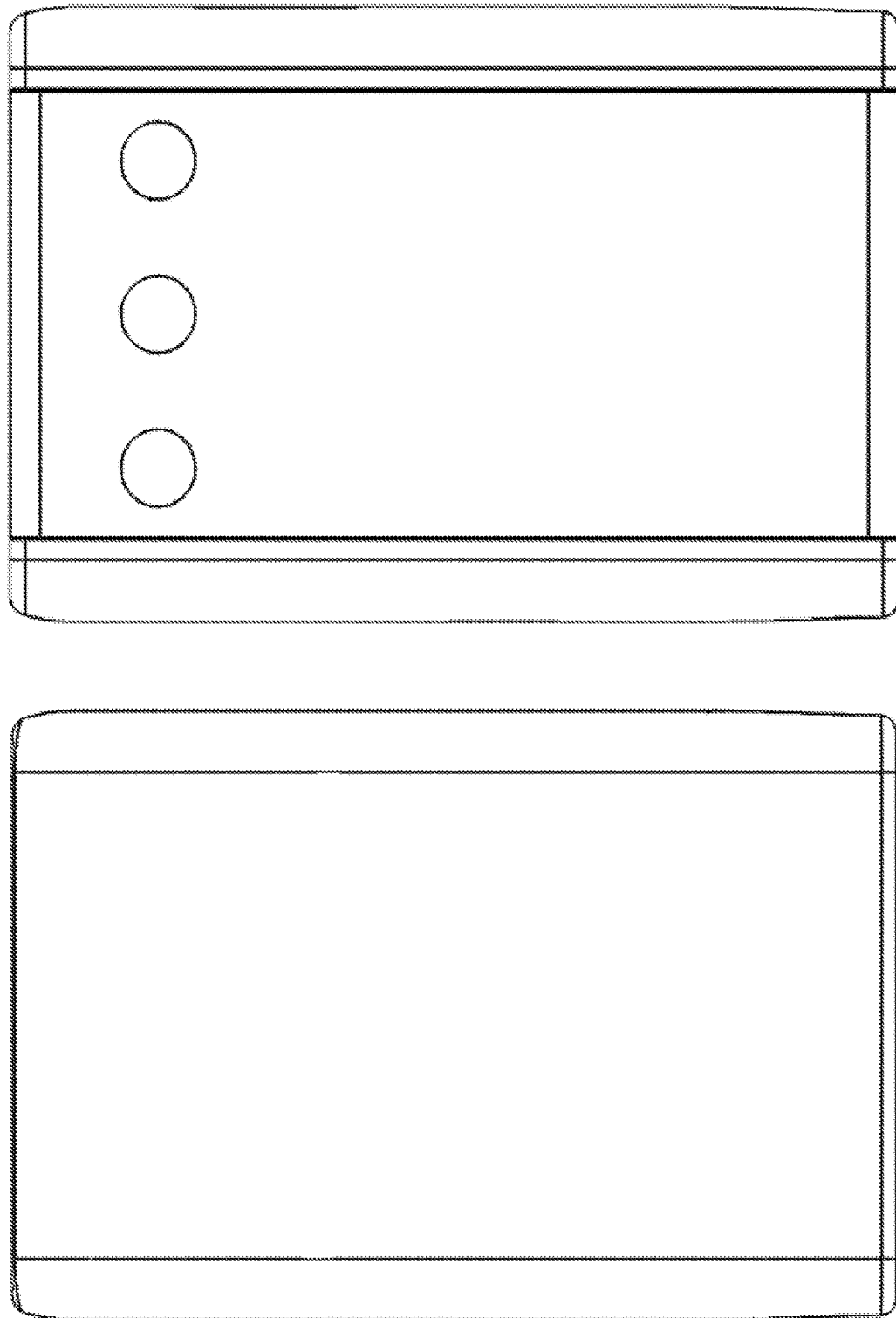
FIG. 84 illustrates top and bottom views of an exemplary two-piece TPO mouse/puck embodiment.
Figure 85:
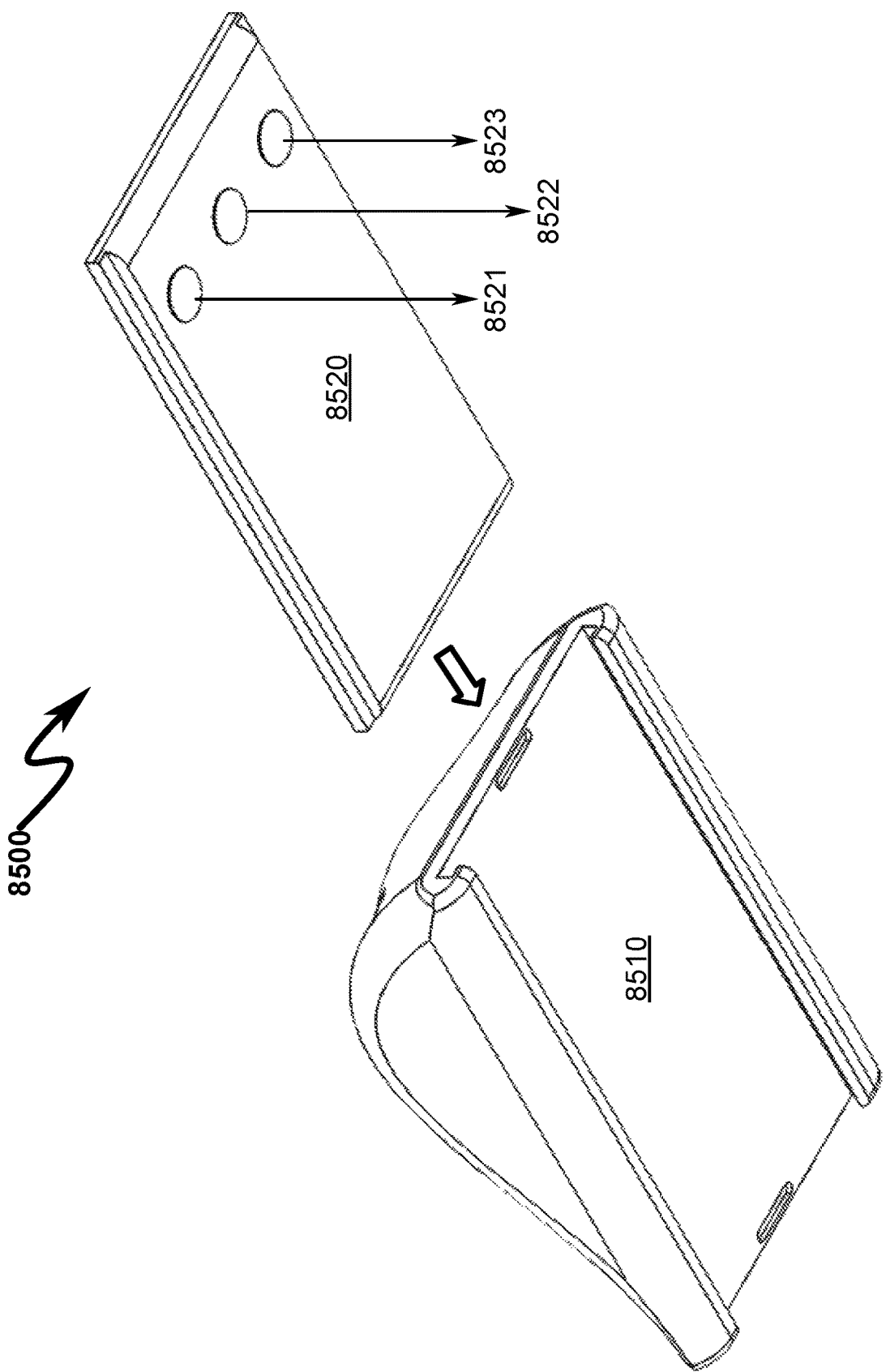
FIG. 85 illustrates an assembly view of an exemplary two-piece TPO mouse/puck embodiment.
Figure 86:
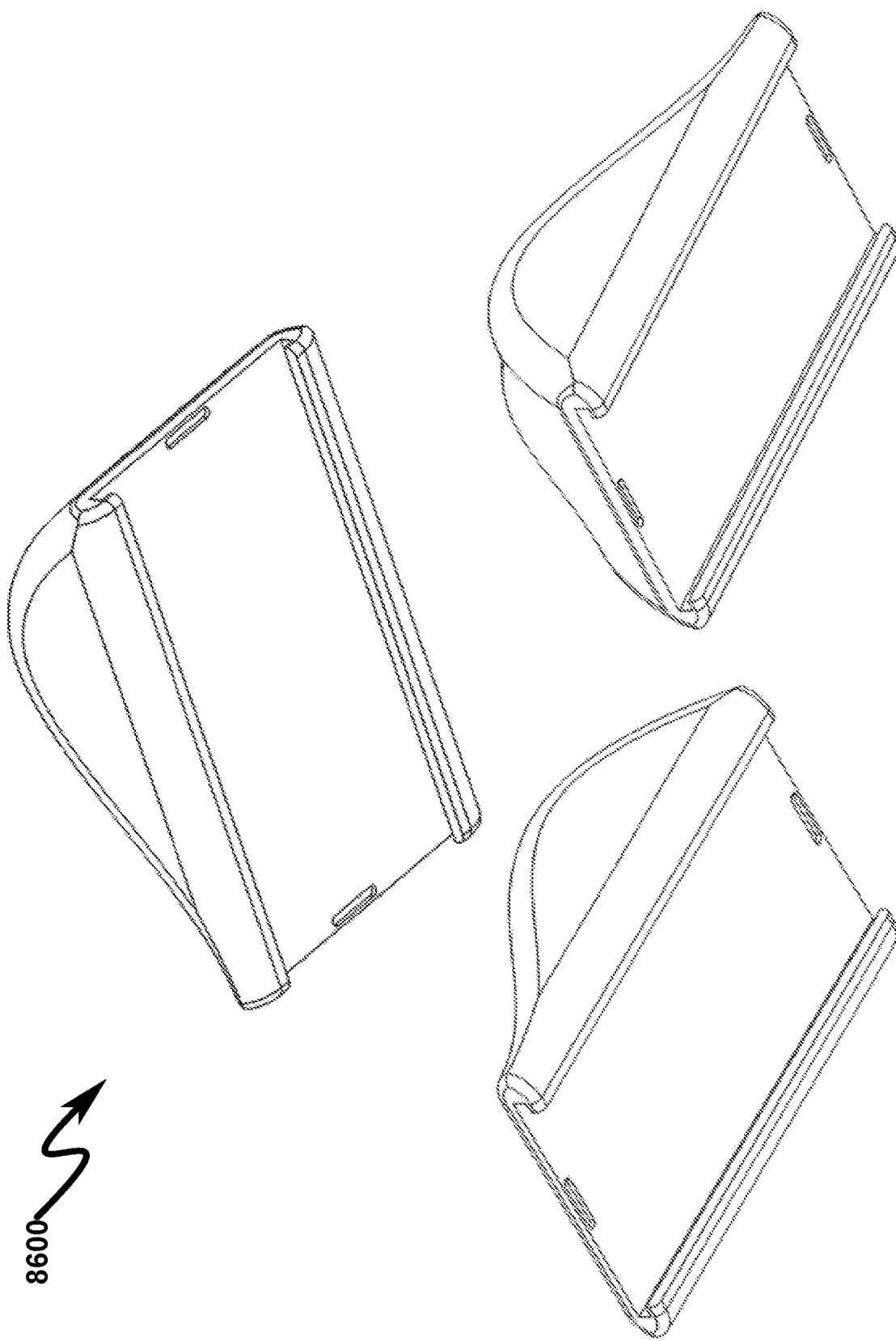
FIG. 86 illustrates perspective isolation views of the mouse/puck shell in an exemplary two-piece TPO mouse/puck embodiment.

The present invention may in some preferred embodiments be implemented in a TPO mouse/puck form as generally depicted in FIG. 81 (8100)-FIG. 88 (8800). This exemplary TPO embodiment depicts a two-piece mouse/puck assembly in which the mouse/puck shell (8510) is mated to a replaceable contact surface plate (8520) that makes pressure contact with the TSA surface via protrusions on its bottom surface. As generally depicted in FIG. 85 (8500), the mouse/puck shell (8510) is designed to receive a correspondingly indexed replaceable contact surface plate (8520) via a sliding channel extruded within the body of the mouse/puck shell (8510).

Figure 87:
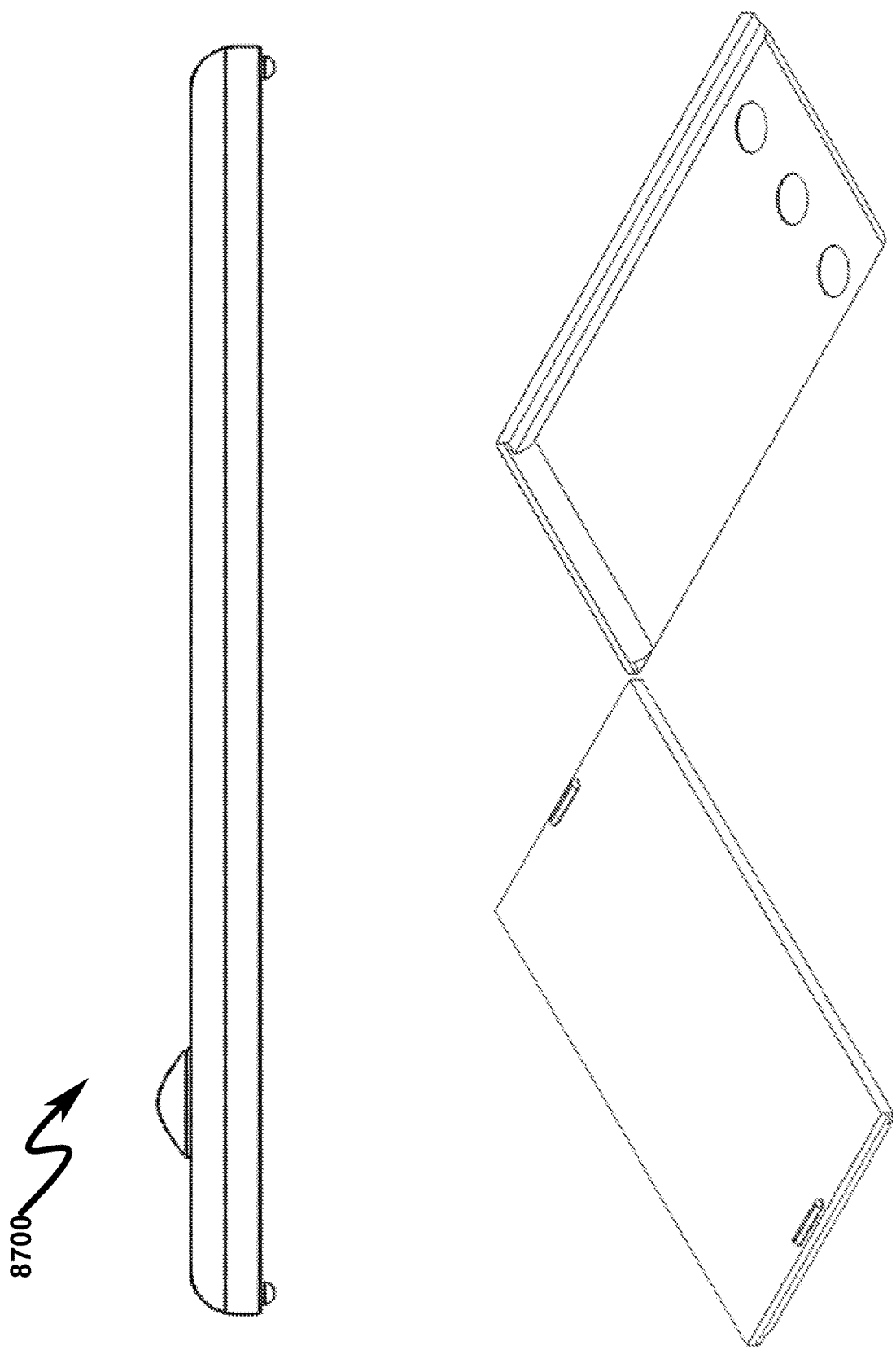
FIG. 87 illustrates perspective isolation views of the mouse/puck contact surface in an exemplary two-piece TPO mouse/puck embodiment.

As indicated in the variants depicted in FIG. 87 (8700)-FIG. 88 (8800), the contact surface plate may be configured in a wide variety of ways to provide a number of different pressure patterns that uniquely identify the mouse/puck. Of course, it would be possible to generate single-piece mouse/ puck configurations using these teachings. However, the ability to select an ergonomic mouse shell (8510) and reconfigure this with a number of replaceable contact surface plates (8520) allows a great degree of freedom for the user when interfacing with software such as gaming applications and the like.

The formations of the mouse/puck TPO as depicted in FIG. 81 (8100)-FIG. 88 (8800) permit lateral pressure differentials on the top of the mouse/puck to be translated to sensed pressure differentials on the TSA. For example, as pressure is redistributed among the various surface contact pads (8521, 8522, 8523) on the bottom of the replaceable contact surface plate (8520), this may be interpreted by software as equivalent mouse clicks or other GUI messaging information. Other contact pad formations as depicted in FIG. 88 (8800) permit pressure differentials to be detected in two or more axes, depending on the number and type of contact pads provided on the bottom surface of the contact plate. Variations in the number and placement of various contact points provides for a wide variety of actions associated with user input activity.

TPO Joystick (8900)-(9600)

Figure 89:
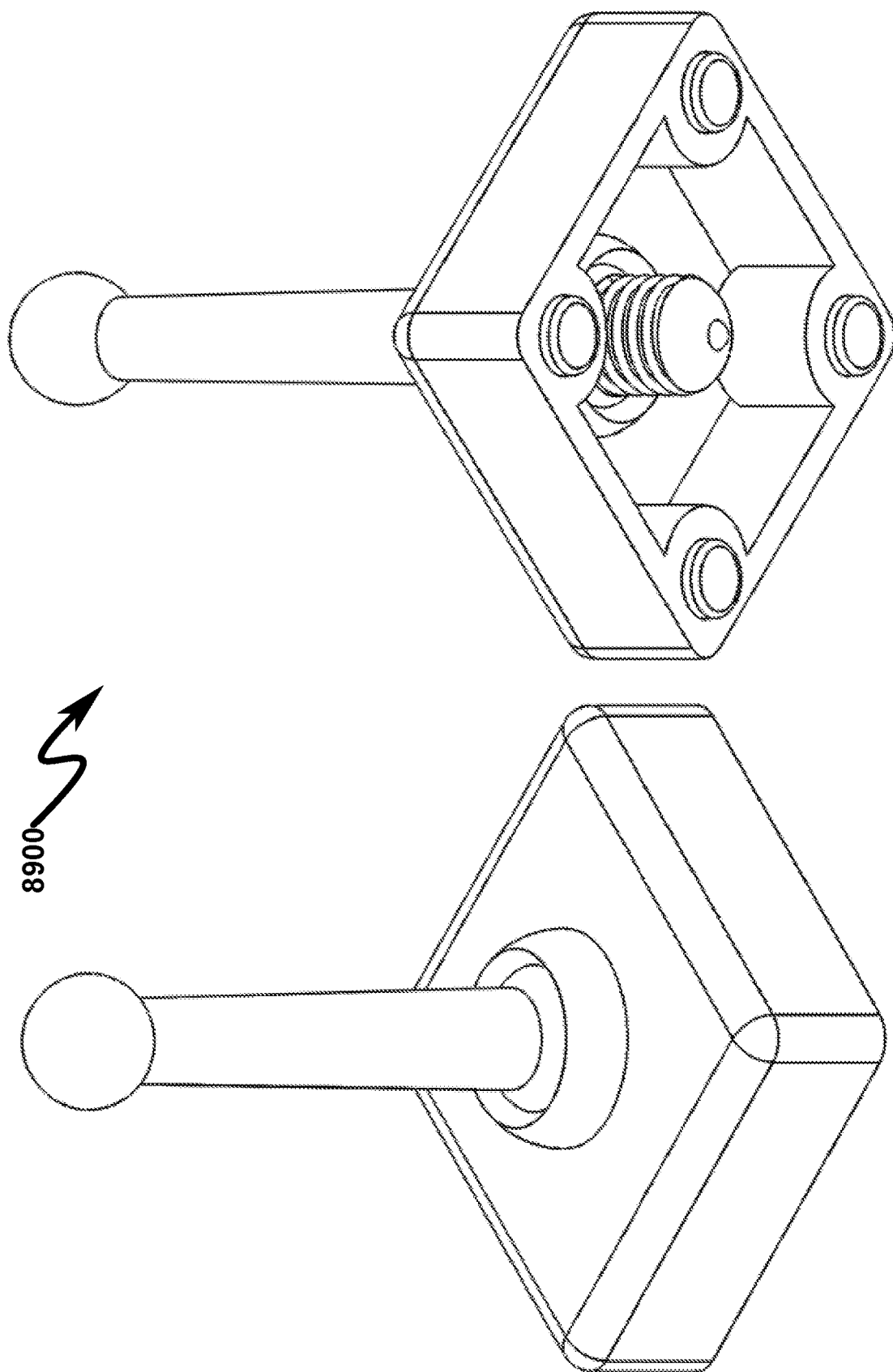
FIG. 89 illustrates top and bottom perspective views of an exemplary TPO joystick embodiment.
Figure 92:
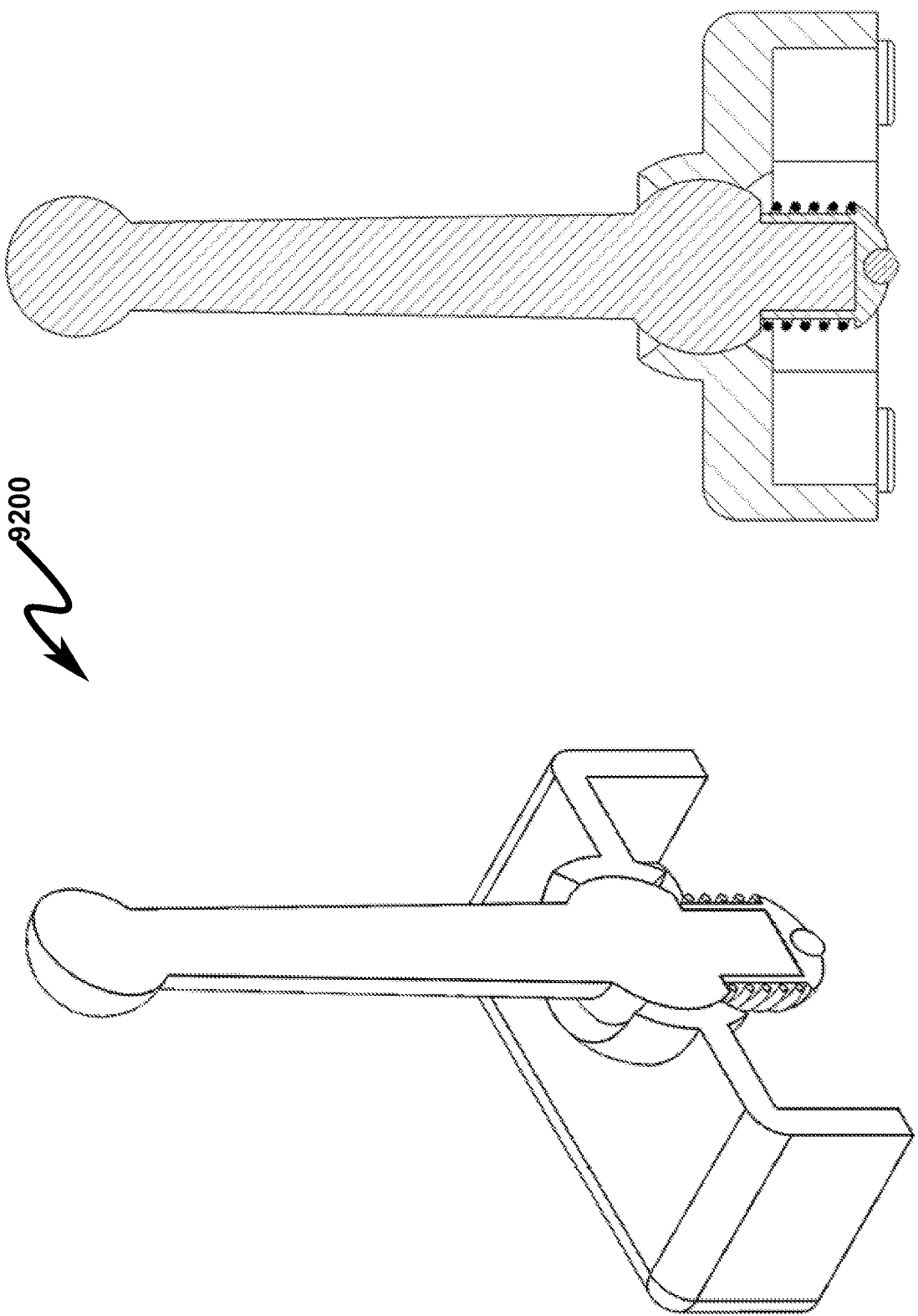
FIG. 92 illustrates side perspective sectional and side sectional views of an exemplary TPO joystick embodiment.
Figure 93:
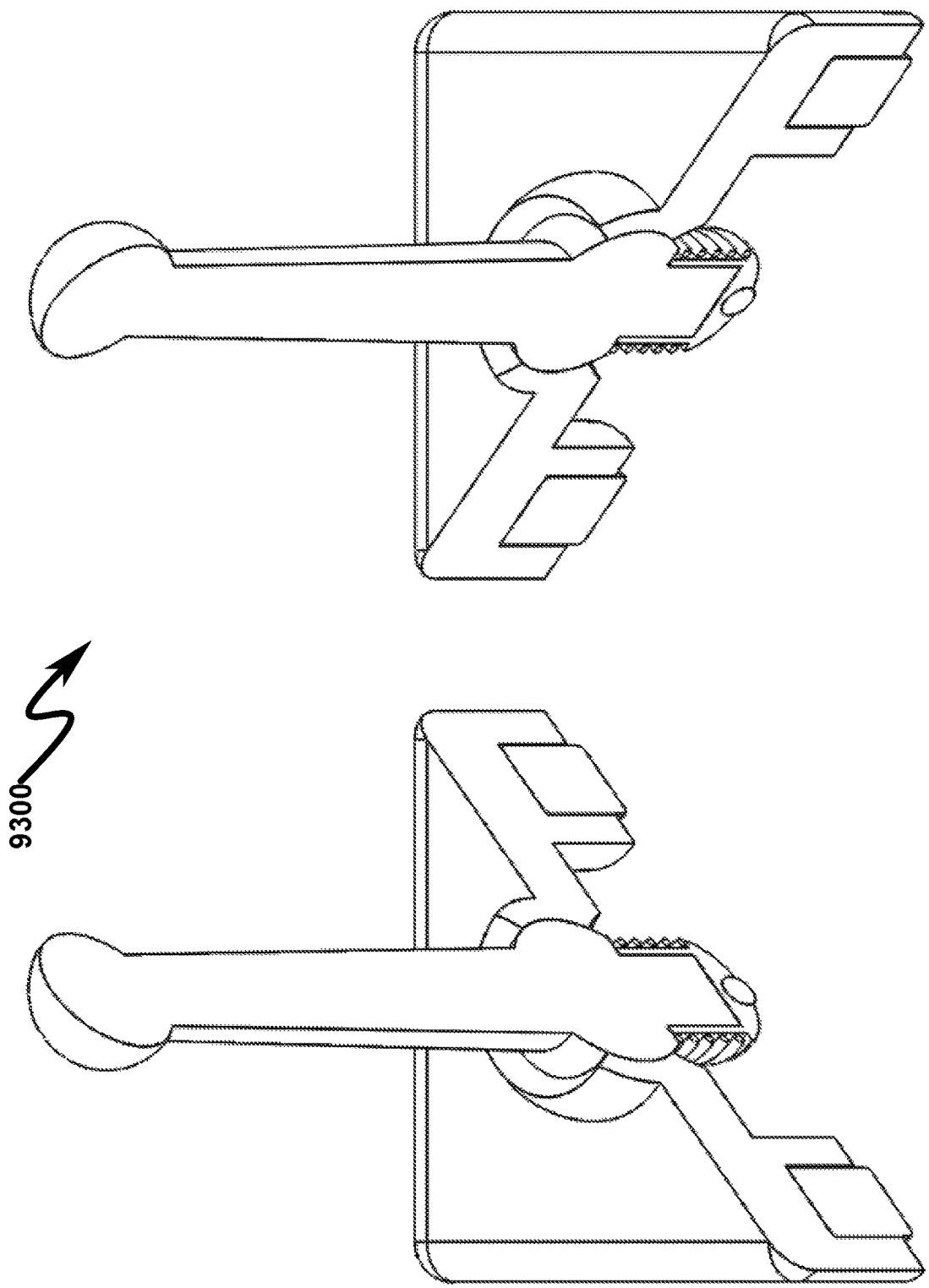
FIG. 93 illustrates diagonal perspective sectional views of an exemplary TPO joystick embodiment.
Figure 94:
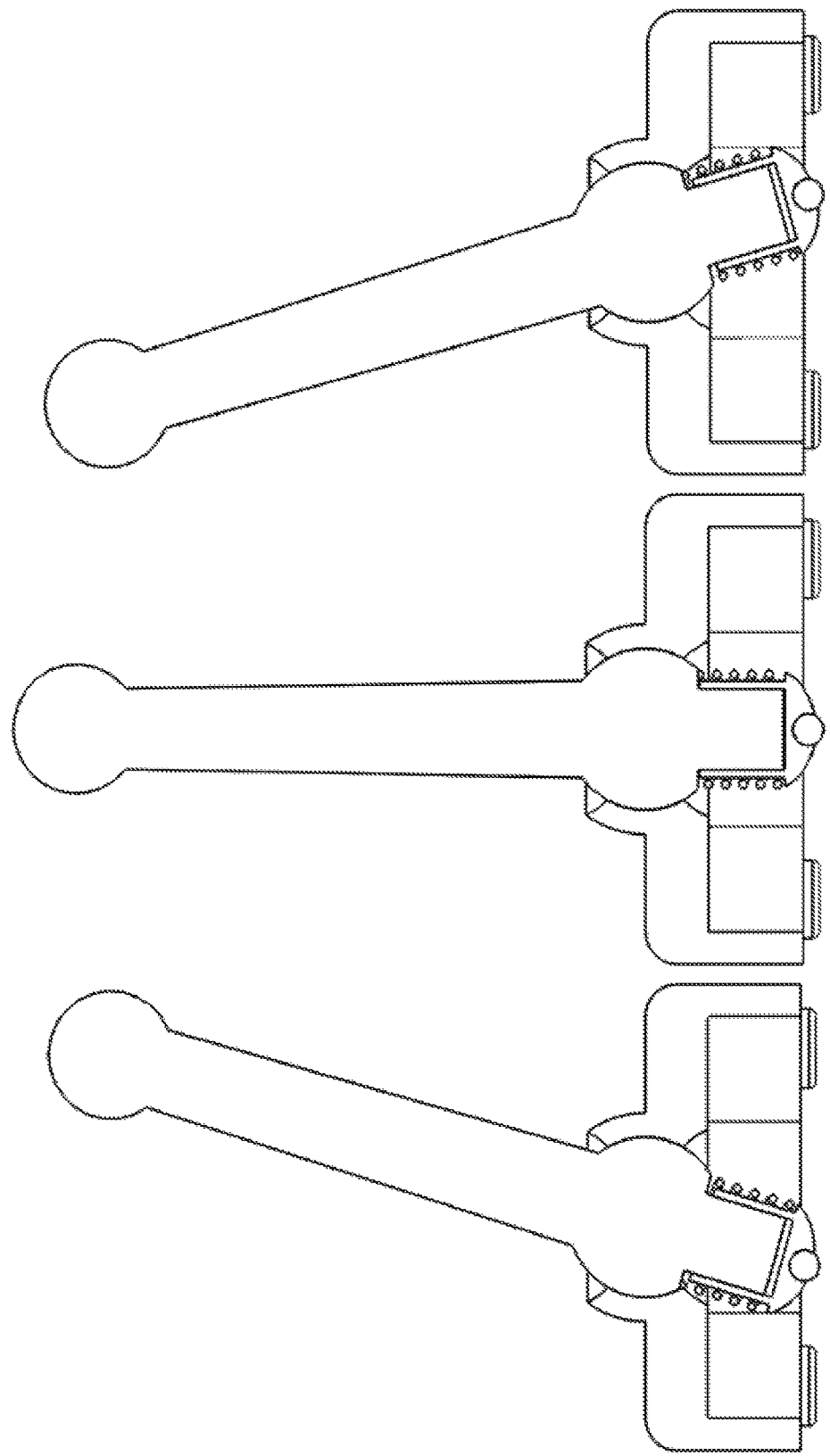
FIG. 94 illustrates side sectional views of an exemplary TPO joystick embodiment illustrating various joystick positions and spring conditions.
Figure 95:
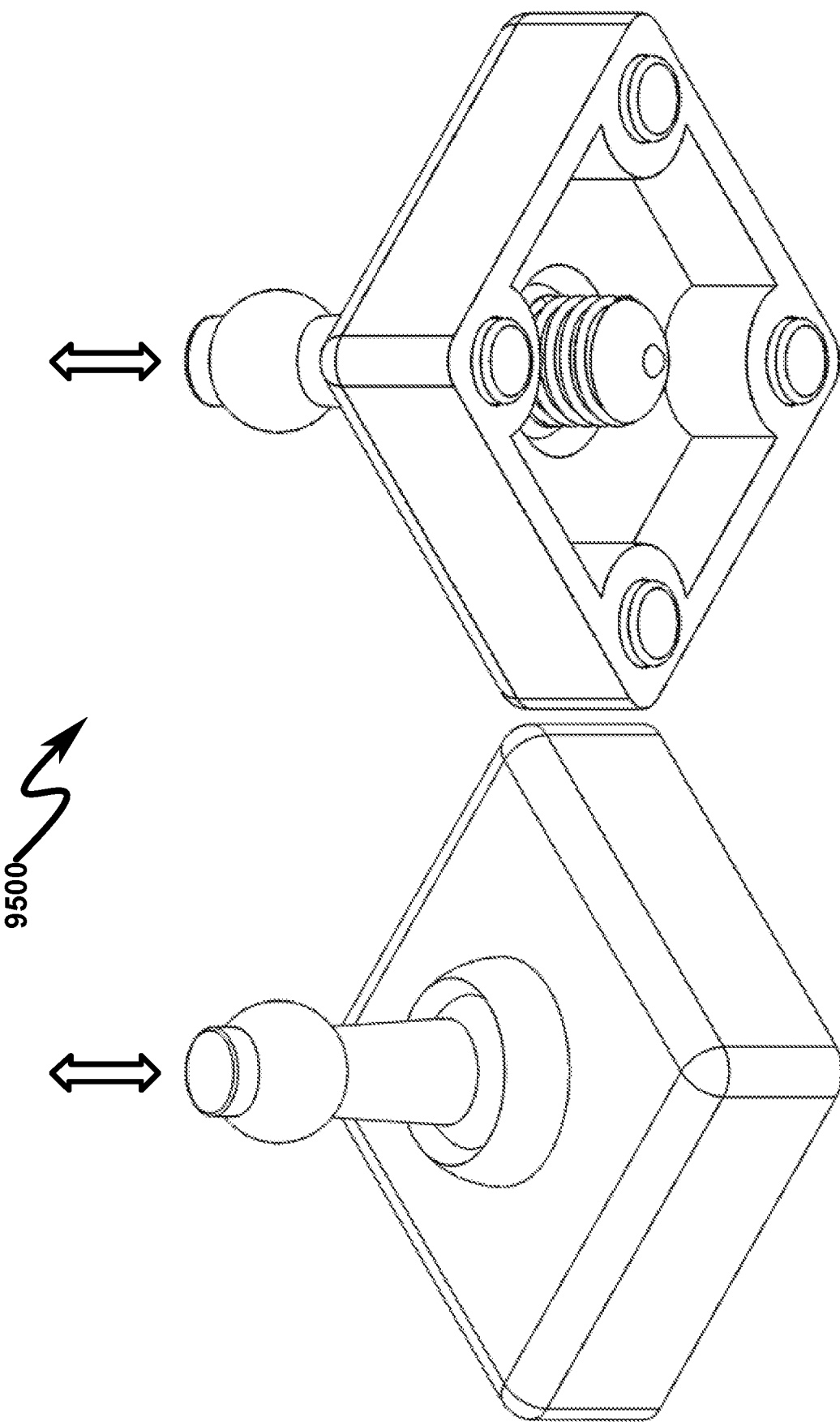
FIG. 95 illustrates top and bottom perspective views of an exemplary TPO joystick embodiment incorporating a pushbutton selector.
Figure 96:
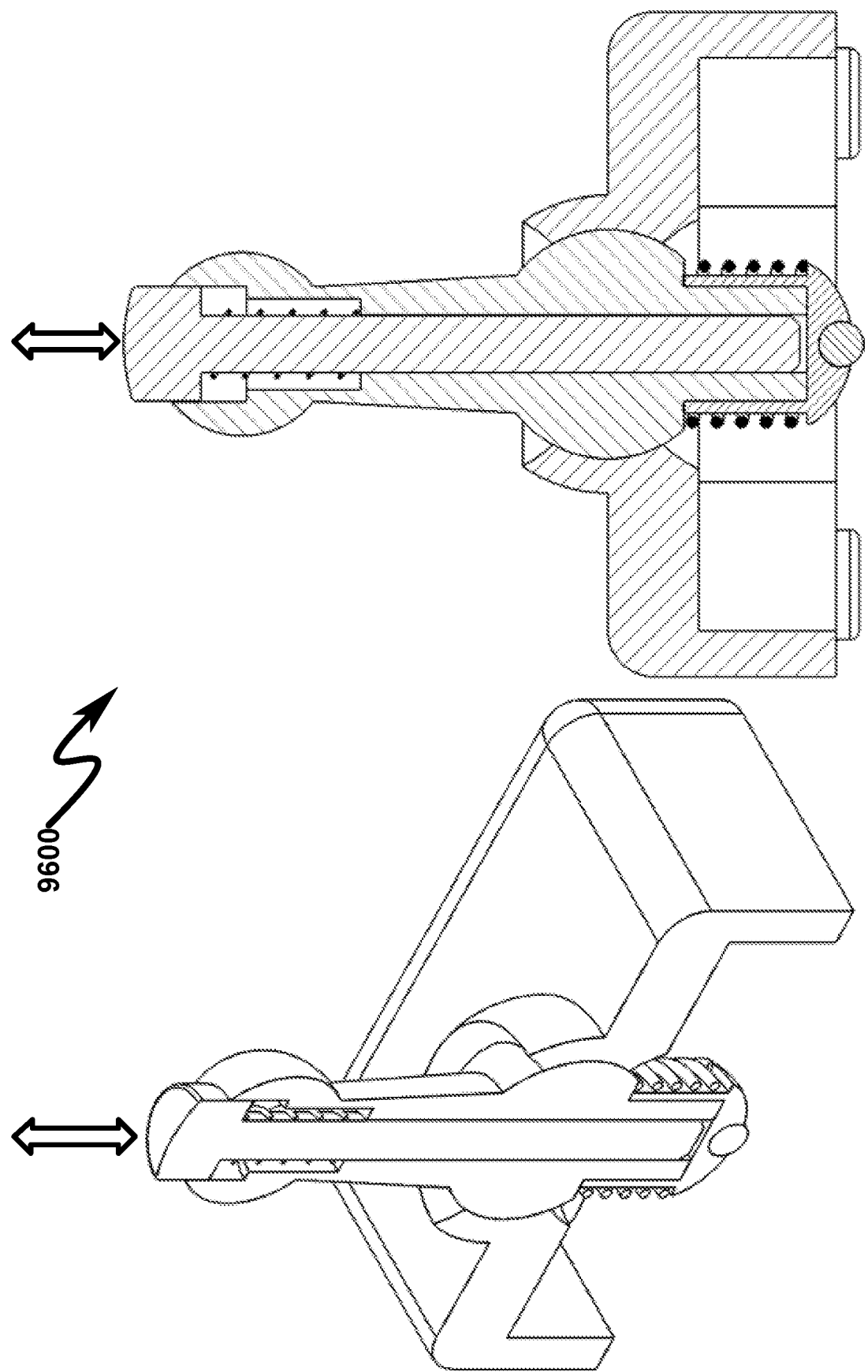
FIG. 96 illustrates front perspective sectional and front sectional views of an exemplary TPO joystick embodiment incorporating a pushbutton selector.

The present invention may in some preferred embodiments be implemented in a TPO joystick form as generally depicted in FIG. 89 (8900)-FIG. 96 (9600). These diagrams disclose a joystick that may be mated to the TSA surface via magnetic attraction and allow the joystick to be articulated in a wide variety of positions. The contact point between the TSA and the joystick may optimally be a spring loaded contactor having an optional integrated ball bearing. As generally depicted in FIG. 95 (9500)-FIG. 96 (9600), the joystick may also incorporate a spring-loaded pushbutton (and corresponding pressure contact shaft) that may act as a selector at a given joystick position. This action may mimic the function of a mouse key. As the coordinate position of the joystick is a non-linear function of the joystick radial angle, software may be used to correct the relationship between the measured TSA pressure position and the user-positioned angle of the joystick.

TPO Trackpad (9700)-(10000)

Figure 97:
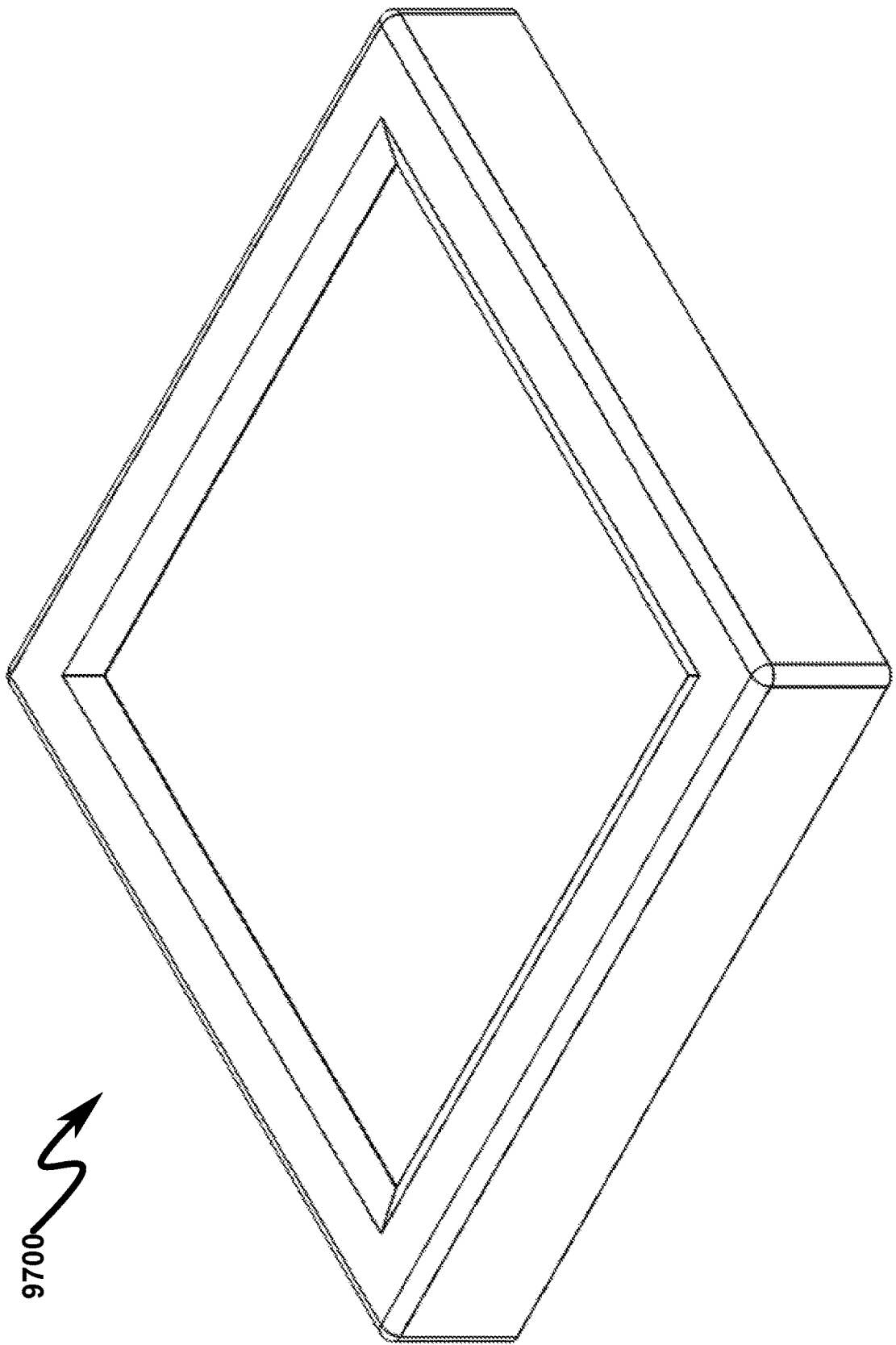
FIG. 97 illustrates a top perspective view of an exemplary TPO trackpad embodiment.
Figure 98:
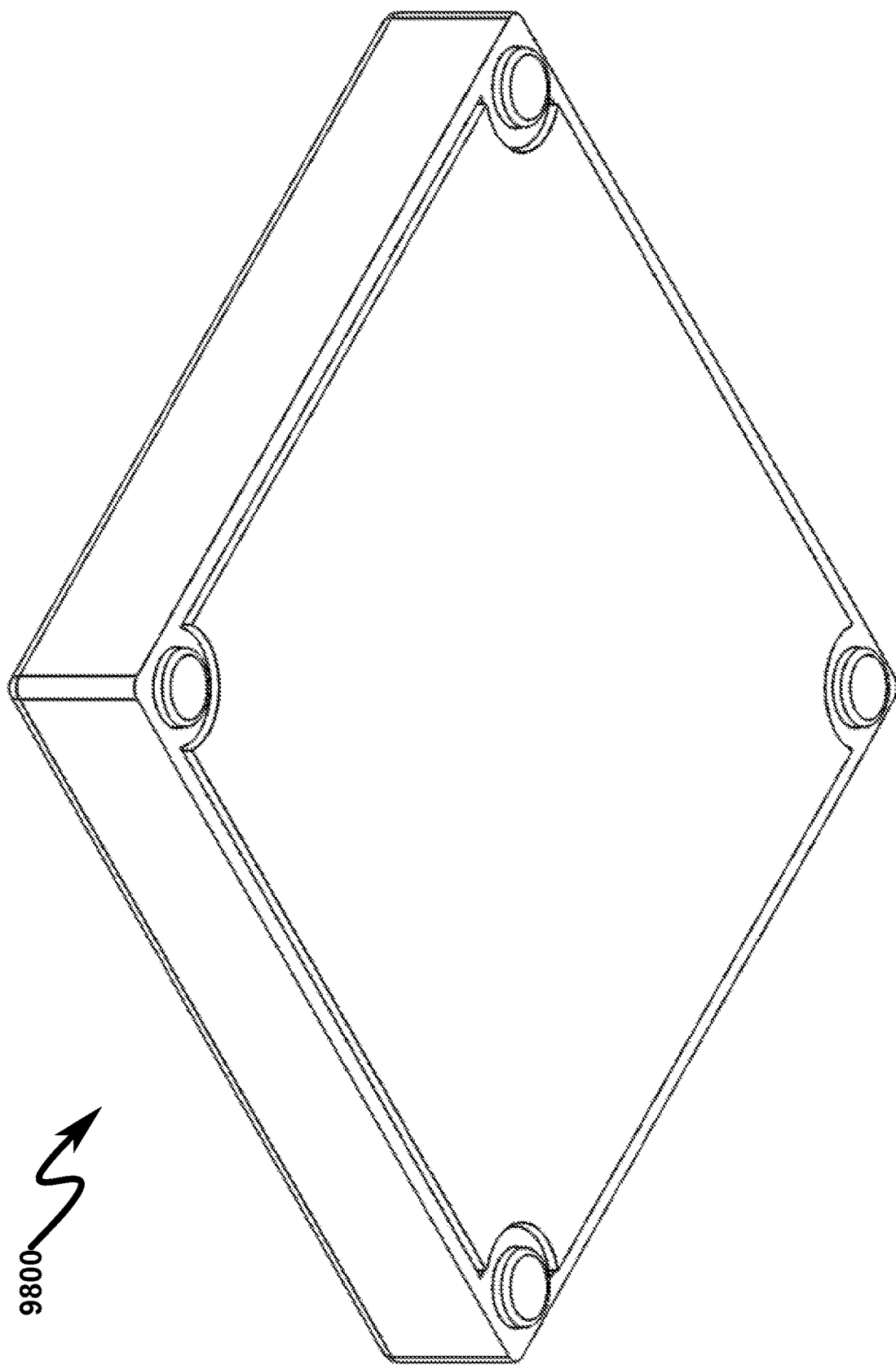
FIG. 98 illustrates a bottom perspective view of an exemplary TPO trackpad embodiment.
Figure 99:
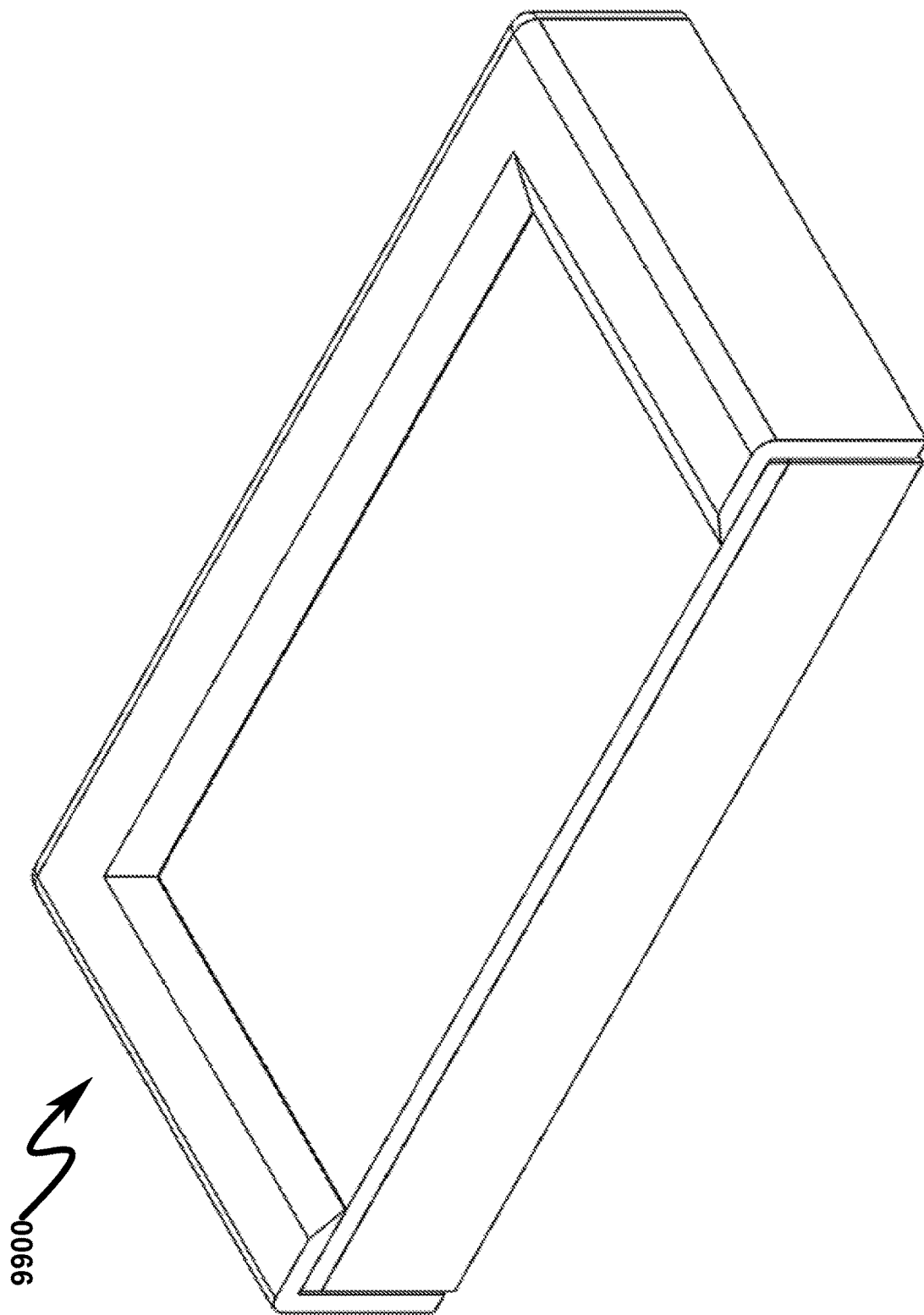
FIG. 99 illustrates a top perspective front section view of an exemplary TPO trackpad embodiment.
Figure 100:
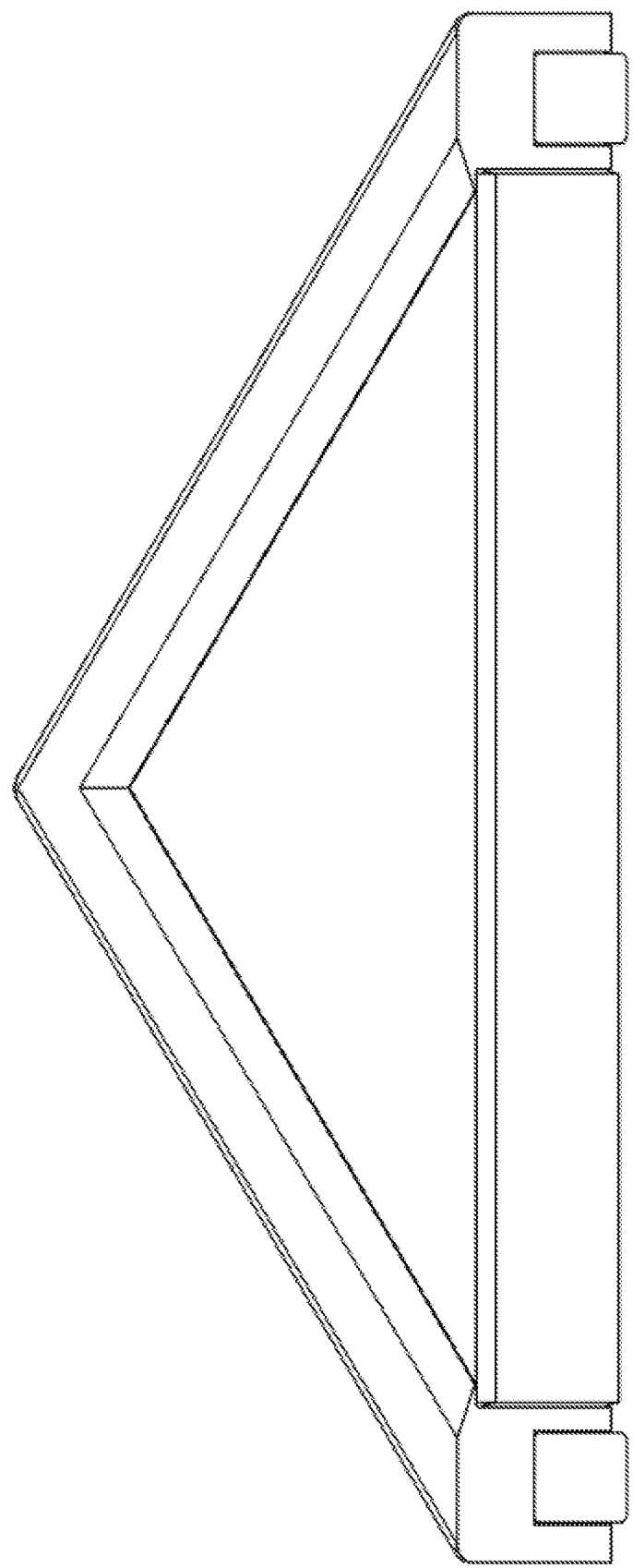
FIG. 100 illustrates a top perspective diagonal section view of an exemplary TPO trackpad embodiment.

The present invention may in some preferred embodiments be implemented in a TPO trackpad form as generally depicted in FIG. 97 (9700)-FIG. 100 (10000). This form of TPO may have special indicia or other tactile forms on the surface of the TPO that are application specific. As such, it represents a very generic method of incorporating software-specific functionality into the TSA.

TPO Keypad (10100)-(10400)

Figure 101:
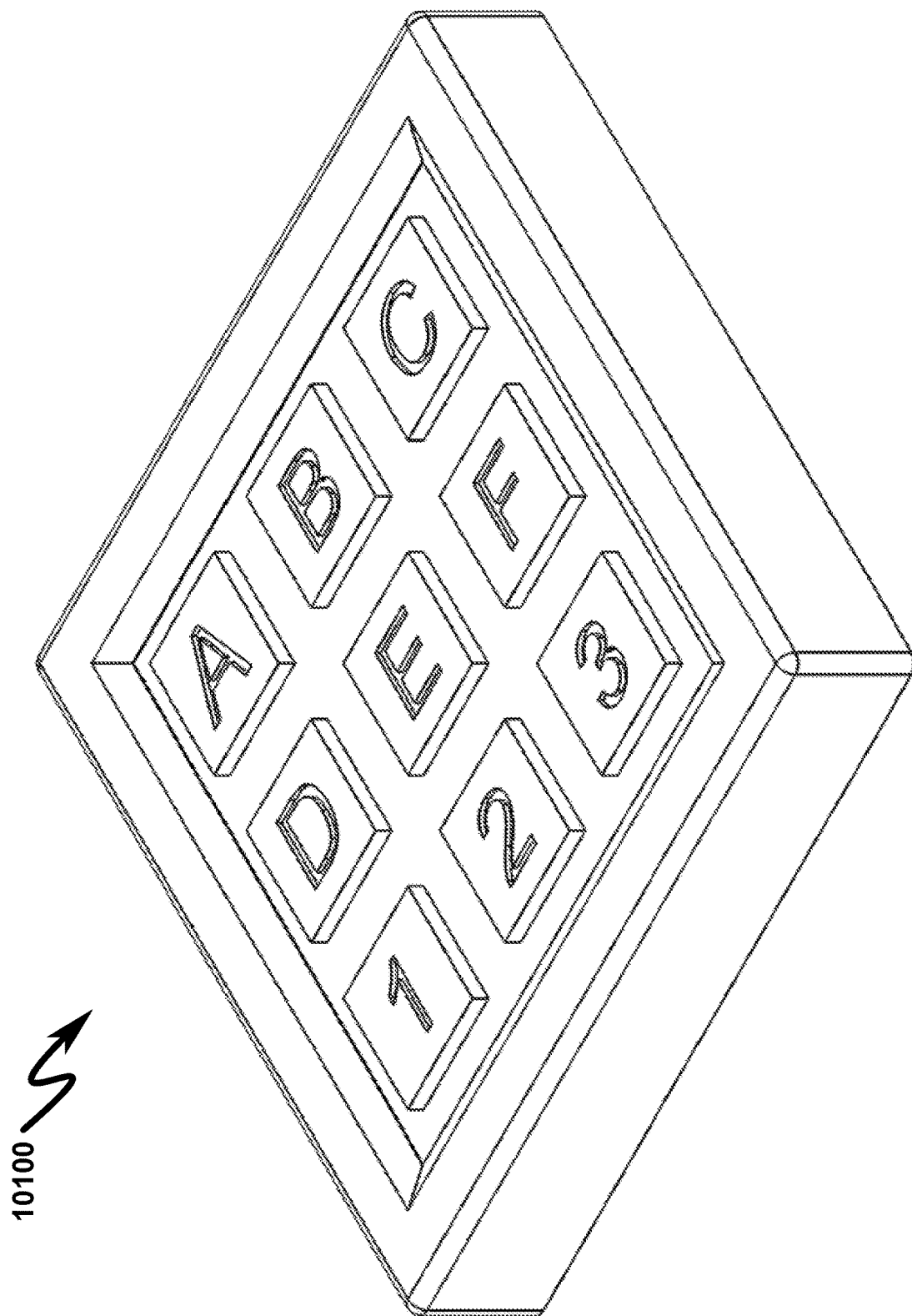
FIG. 101 illustrates a top perspective view of an exemplary TPO keypad embodiment.
Figure 102:
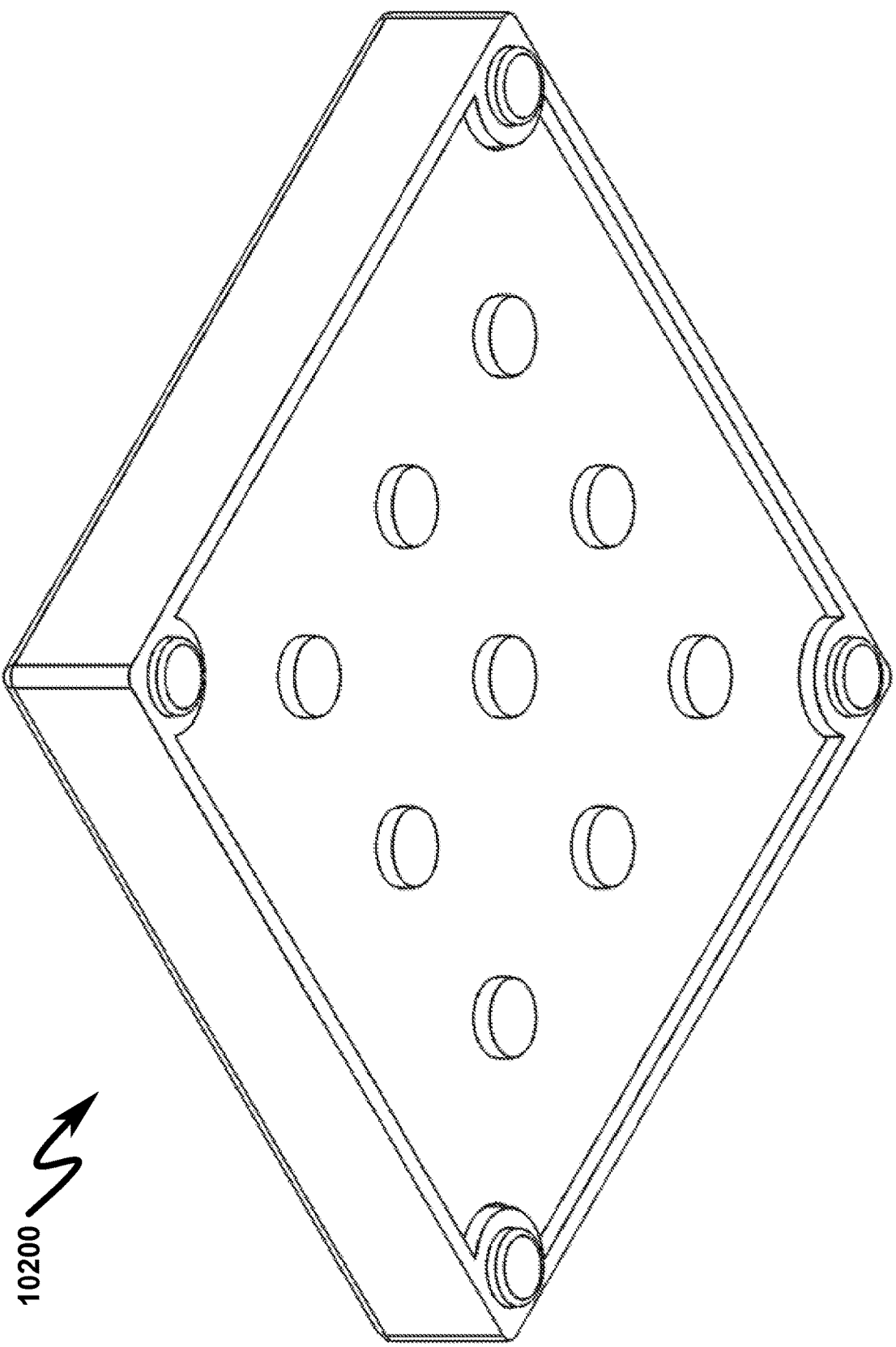
FIG. 102 illustrates a bottom perspective view of an exemplary TPO keypad embodiment.
Figure 103:
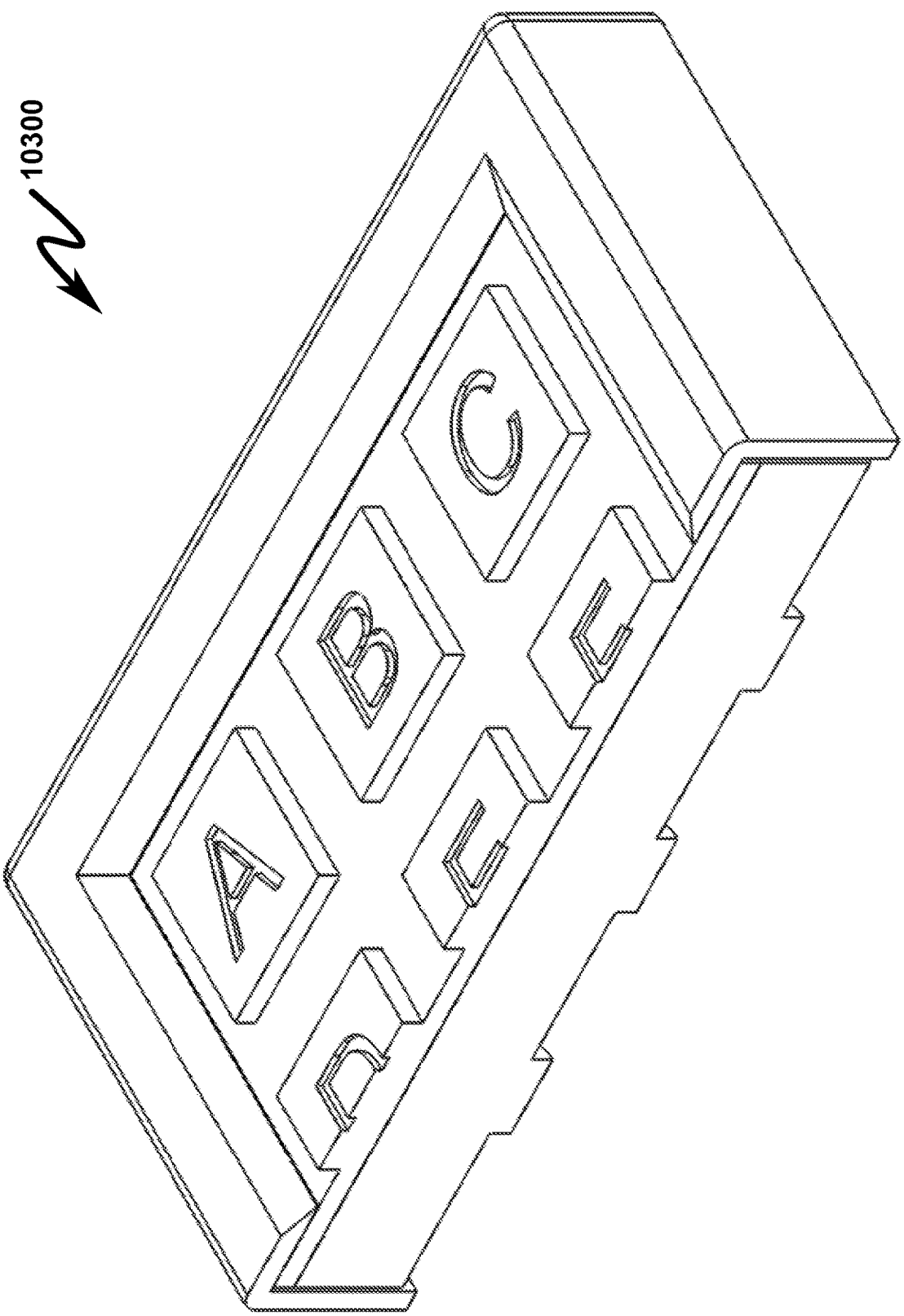
FIG. 103 illustrates a top perspective front section view of an exemplary TPO keypad embodiment.

The present invention may in some preferred embodiments be implemented in a TPO keypad form as generally depicted in FIG. 101 (10100)-FIG. 104 (10400). Here the TPO trackpad described above may be augmented with a custom overlay and associated custom indexed pressure contactor (IPC) that is configured with contact points associated with each key in the keypad overlay.

Flat Overlays (10500)

The simplest form of physical touch sensor augmentation is achieved with a flat, flexible overlay. This overlay can be printed with markings that indicate different sensor functions. For instance, a QWERTY keyboard overlay could just be a thin, flexible plastic membrane with a keyboard pattern printed on its top surface. When placed on a sensor, the sensor can turn into a functional keyboard, capable of turning touch data into keyboard keystrokes (assuming the correct software is also enabled). The overlay provides visual feedback to the user, increasing usability of the keyboard functionality. Various examples of these flat TPO overlays with a number of tactile surface patterns are depicted in FIG. 105 (10500).

TPO Trackpad/Keypad Overlay Construction (10500)-(11200)

Figure 105:
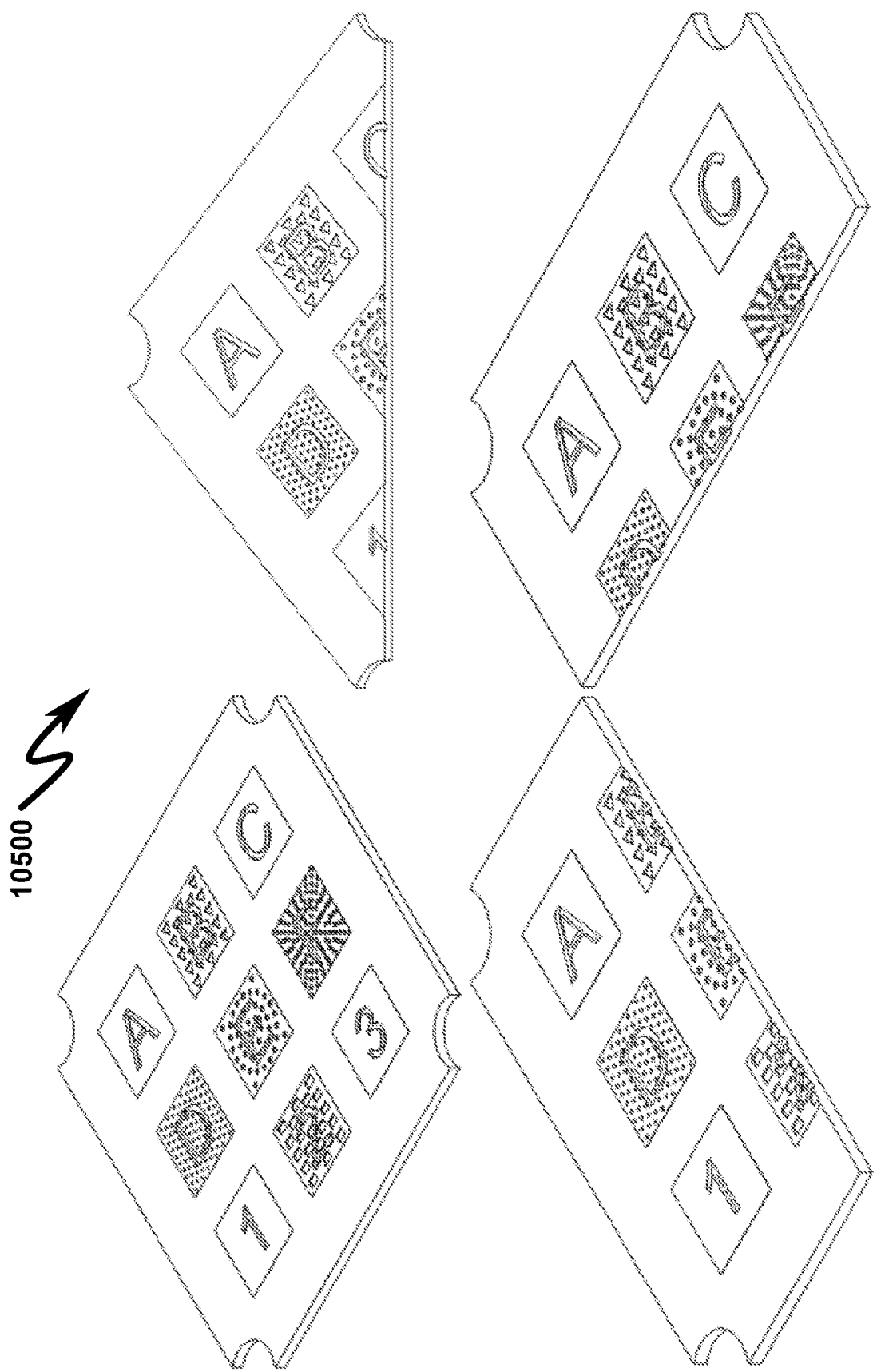
FIG. 105 illustrates a top perspective view and top perspective front/side sectional views of a basic flat trackpad/keypad overlay that may or may not have printed text or surface key texturing associated with its construction.
Figure 112:
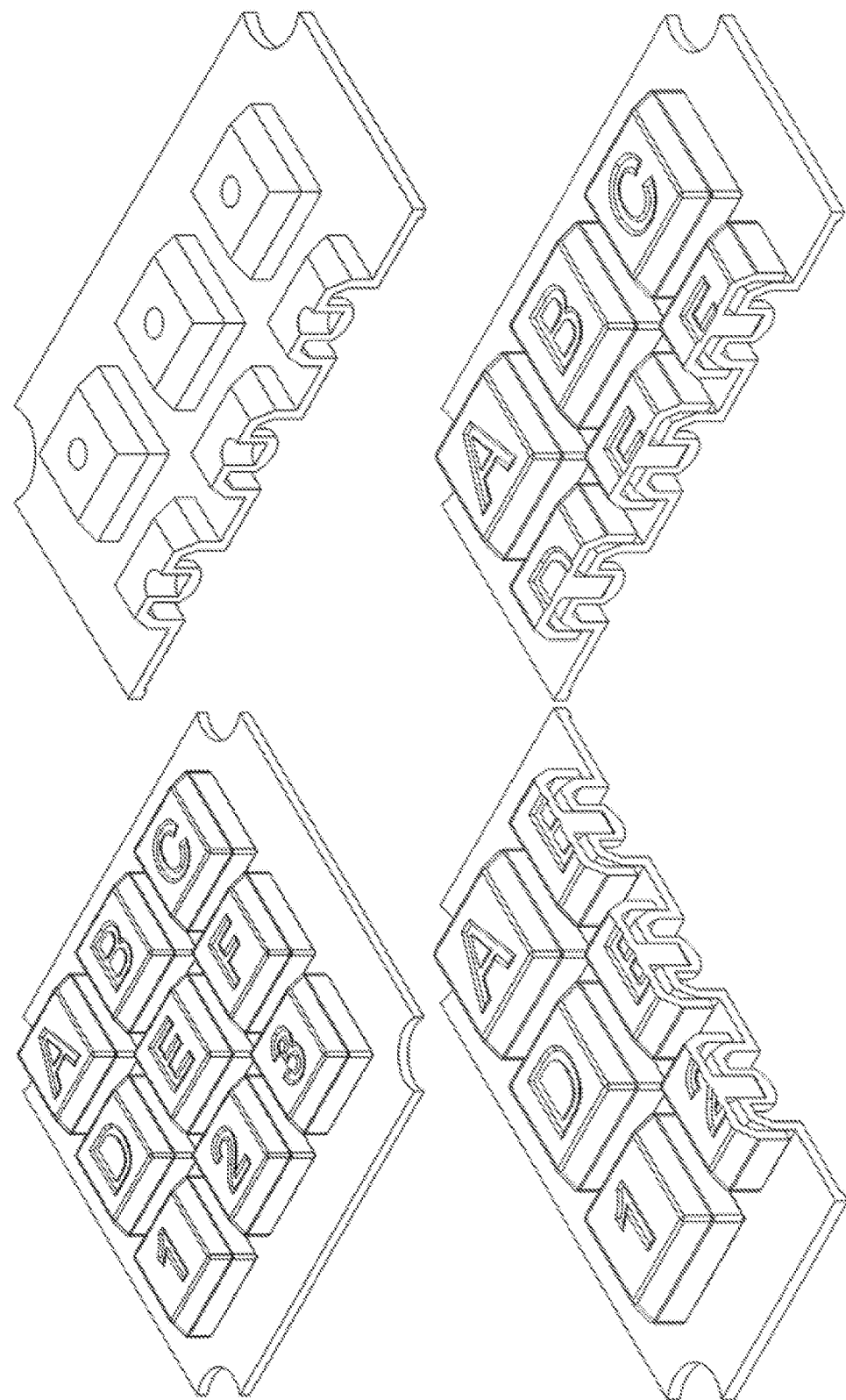
FIG. 112 illustrates a top perspective view and top perspective front/side sectional views of a domed key/button trackpad/keypad overlay with key caps.

The present invention may implement TPO trackpad/ keypad overlays in a wide variety of as generally depicted in FIG. 105 (10500)-FIG. 112 (11200). The examples provided in these figures are depicted in a square configuration, but can be constructed with any type of perimeter form. Additionally while nine keys are depicted in the diagrams, the present invention may incorporate any number of keys in based on application context. Keys represented in the figures incorporate embossed indicia, but this is not a limitation of the present invention.

These figures depict overlay cross-sections of various features that are made possible with the use of a three-dimensional, flexible overlay. Texture can be added to provide the user with tactile feedback. It is also possible to add indentations or ridges around features to increase usability. It is also possible to create standalone raised/lowered buttons. Subtle indicators can be implemented with small, raised bumps. Finally, dome-switch buttons can be molded with a three-dimensional overlay to give users a button "feel" when using the device.

Figure 106:
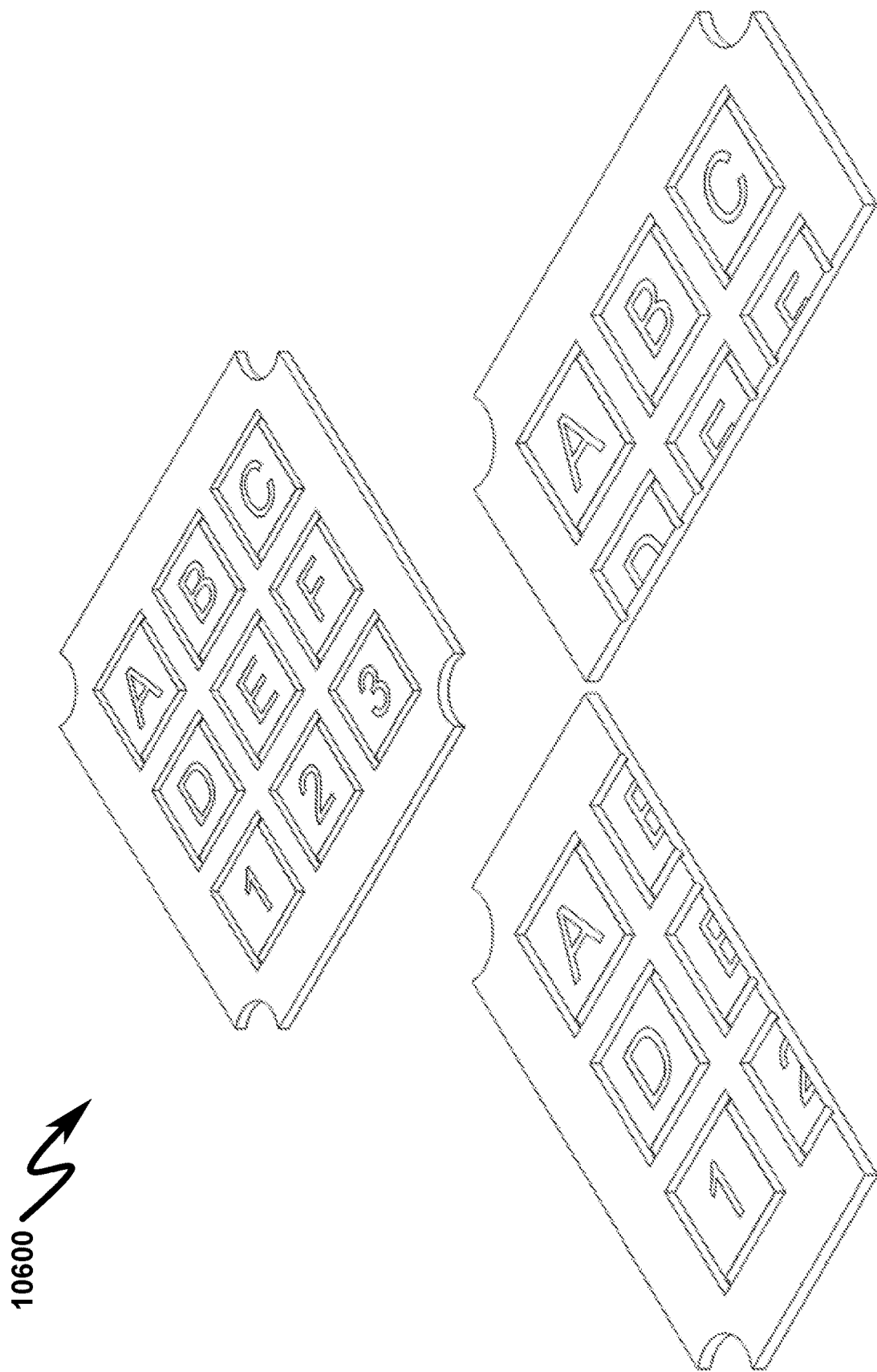
FIG. 106 illustrates a top perspective view and top perspective front/side sectional views of a trackpad/keypad overlay that incorporates edge indentations around buttons/keys.
Figure 107:
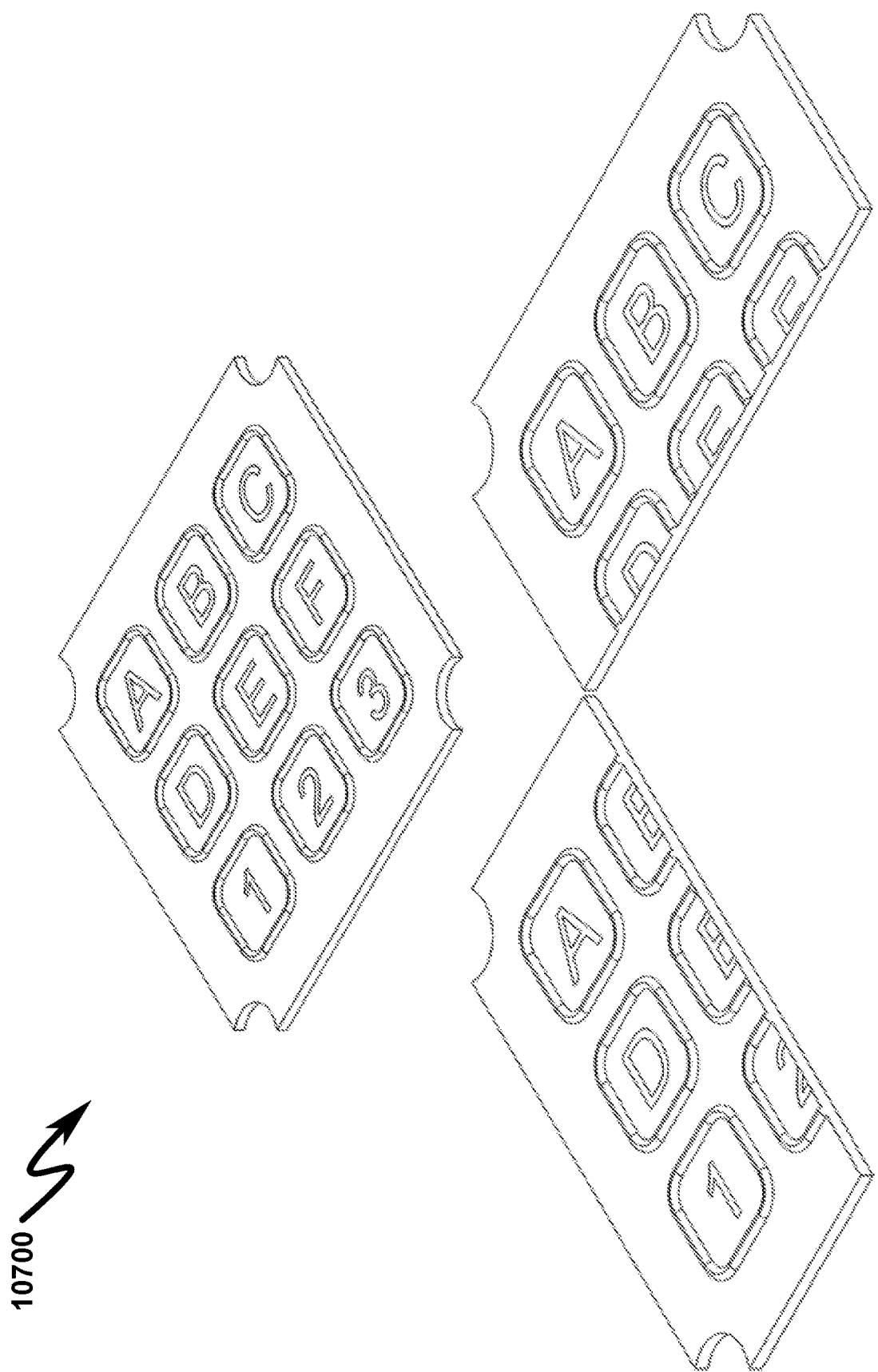
FIG. 107 illustrates a top perspective view and top perspective front/side sectional views of a trackpad/keypad overlay that incorporates edge ridges around buttons/keys.
Figure 108:
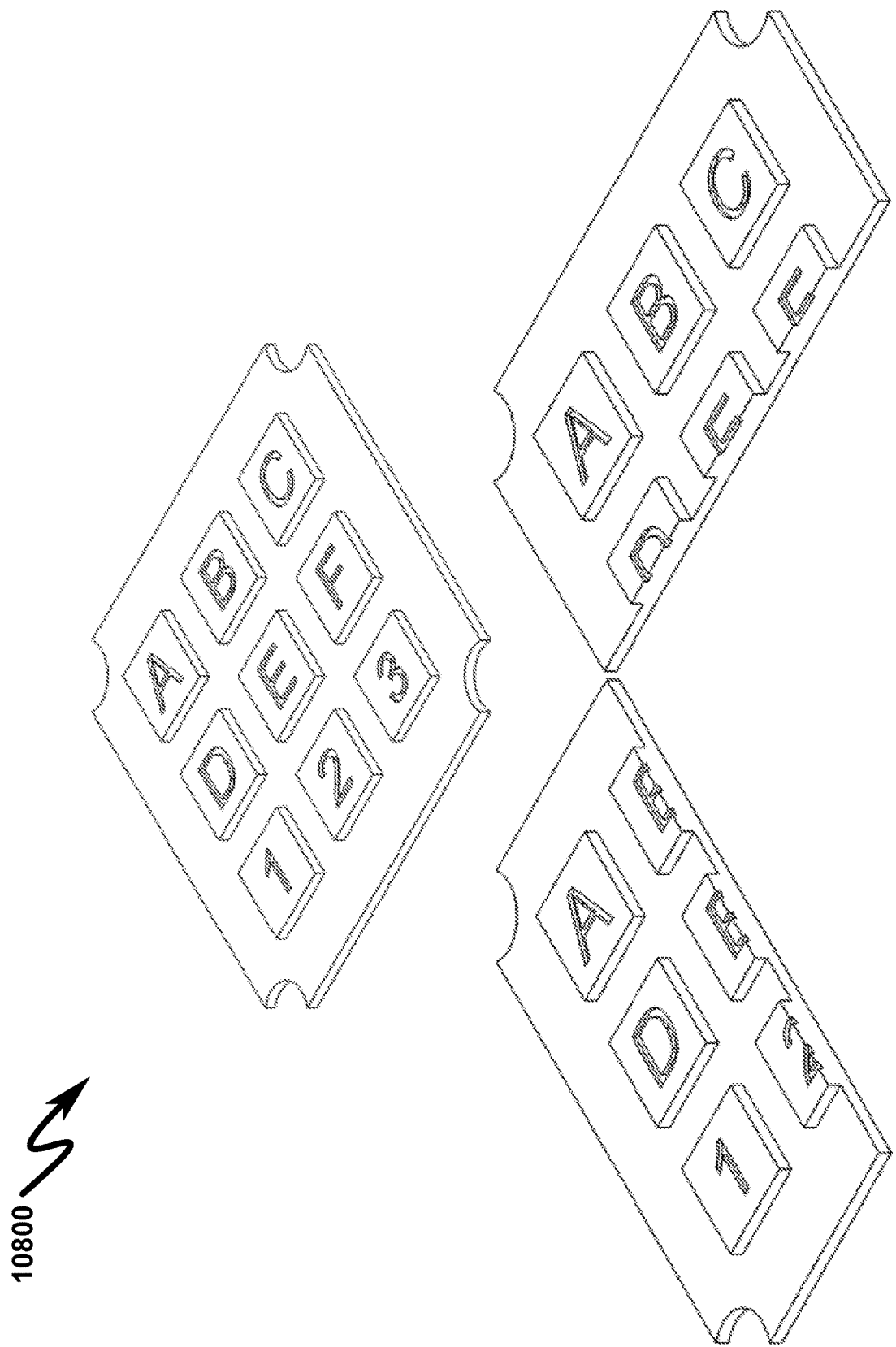
FIG. 108 illustrates a top perspective view and top perspective front/side sectional views of a raised key/button trackpad/keypad overlay.
Figure 109:
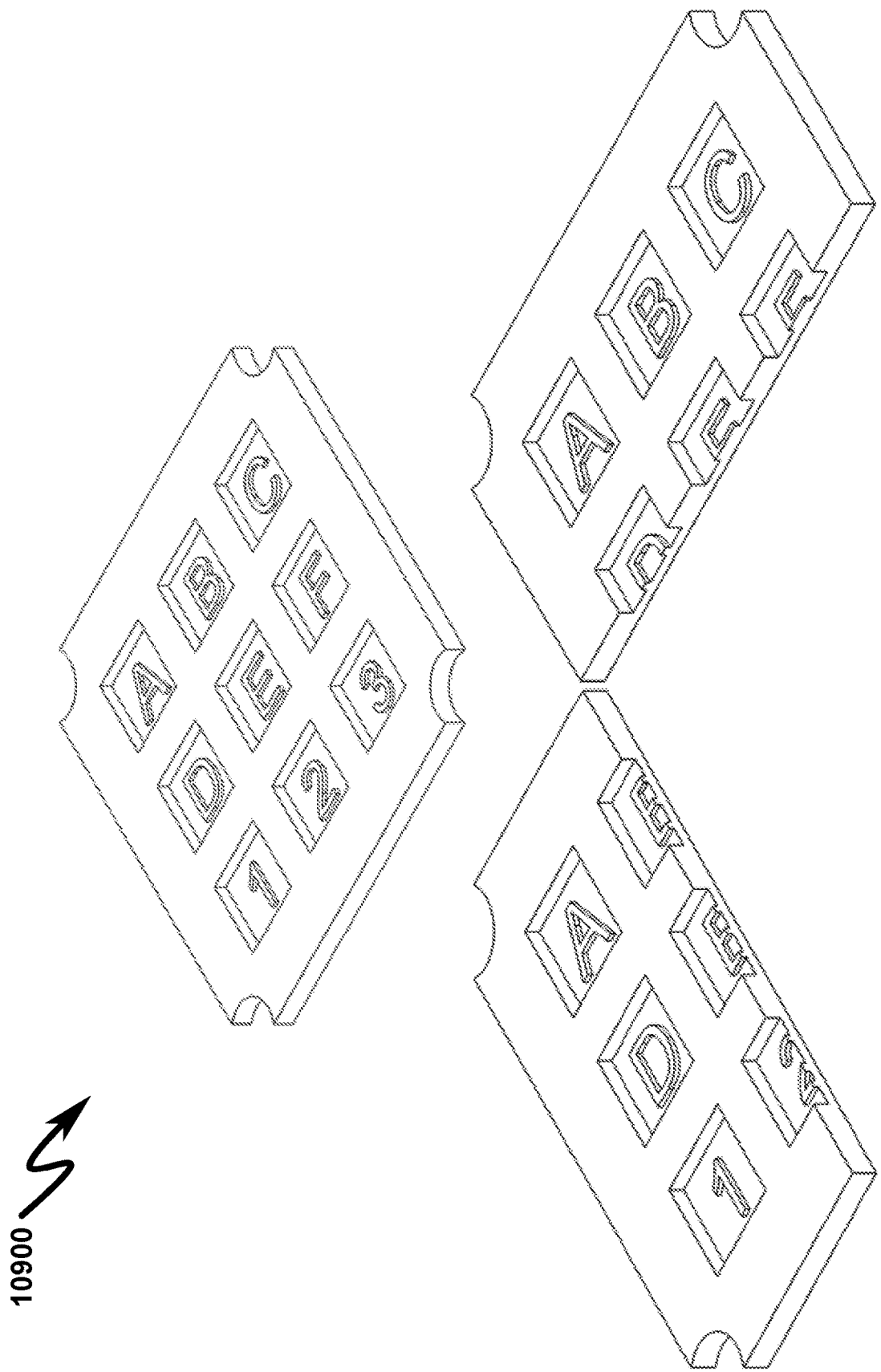
FIG. 109 illustrates a top perspective view and top perspective front/side sectional views of a depressed/lowered key/button trackpad/keypad overlay.
Figure 110:
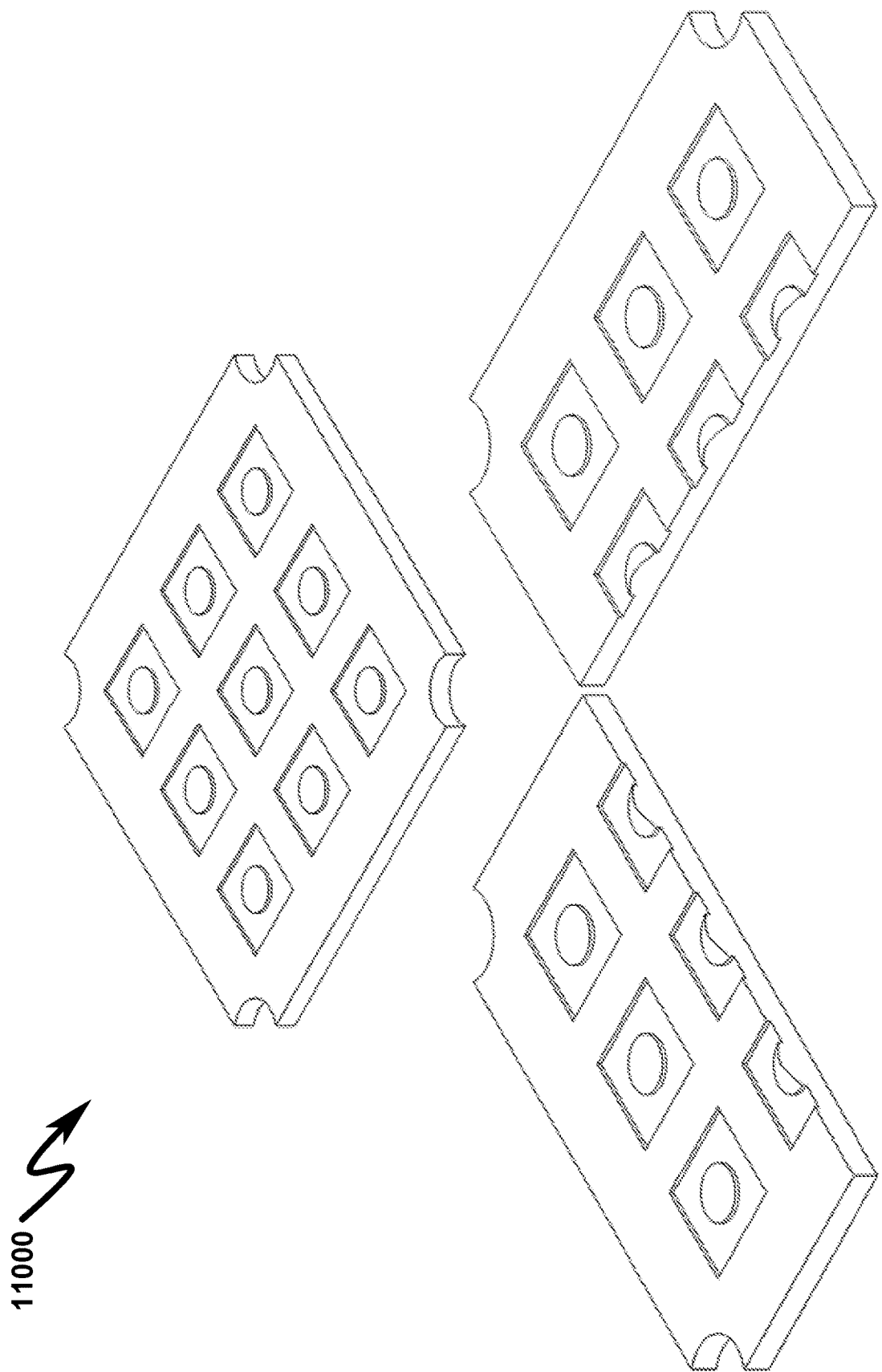
FIG. 110 illustrates a top perspective view and top perspective front/side sectional views of a depressed/lowered key/button trackpad/keypad overlay with raised bump indicia.

FIG. 105 (10500) depicts a basic flat trackpad/keypad overlay that may or may not have printed text and/or key surface texturing associated with its construction. FIG. 106 (10600) depicts a trackpad/keypad overlay that incorporates edge indentations around buttons/keys. FIG. 107 (10700) depicts a trackpad/keypad overlay that incorporates edge ridges around buttons/keys. FIG. 108 (10800) depicts a raised key/button trackpad/keypad overlay. FIG. 109 (10900) depicts a depressed/lowered key/button trackpad/ keypad overlay. FIG. 110 (11000) depicts a depressed/ lowered key/button trackpad/keypad overlay with raised bump indicia.

Figure 111:
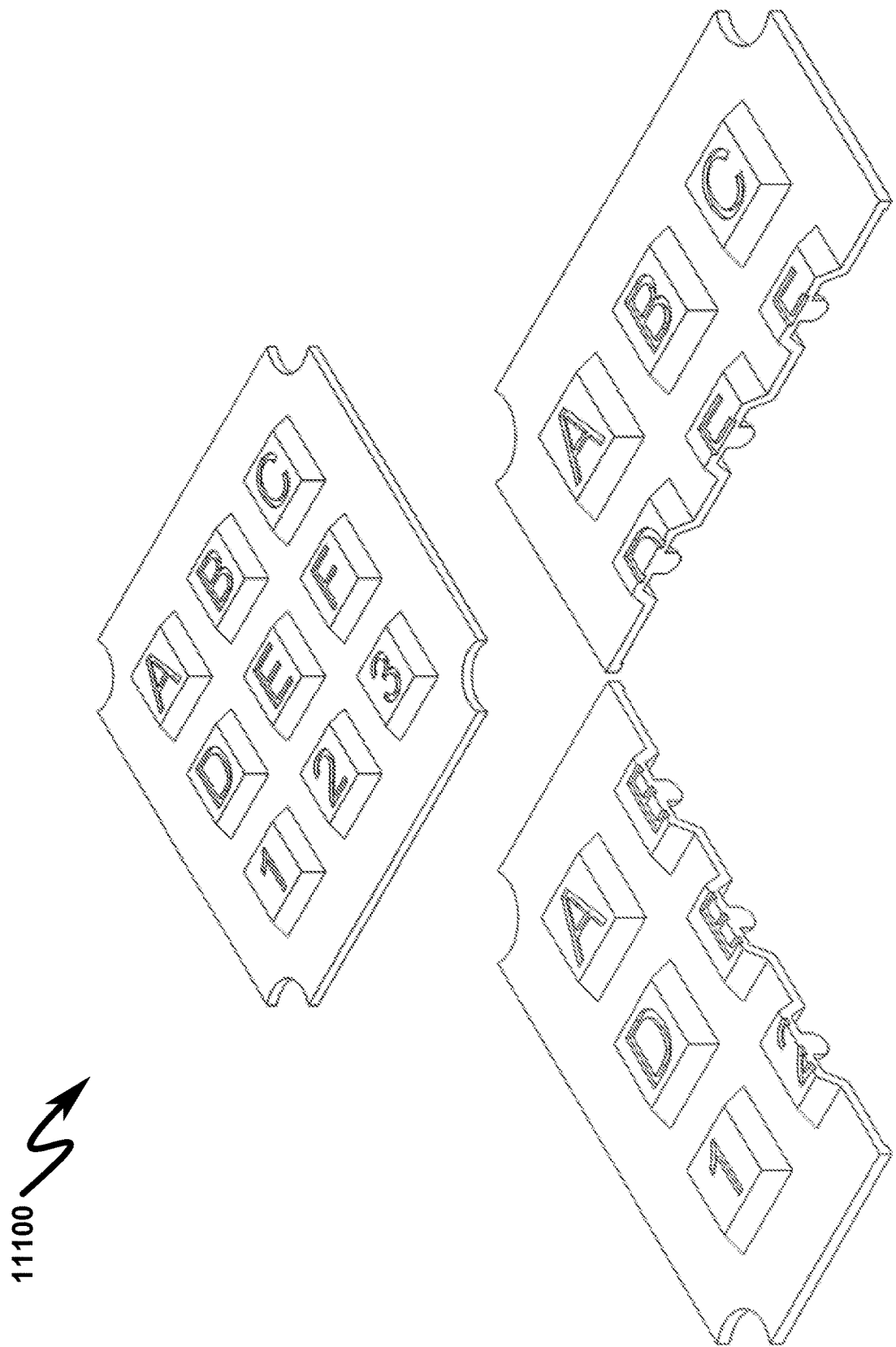
FIG. 111 illustrates a top perspective view and top perspective front/side sectional views of a domed key/button trackpad/keypad overlay.

FIG. 111 (11100) depicts a domed key/button trackpad/ keypad overlay. FIG. 112 (11200) depicts a domed key/ button trackpad/keypad overlay with key caps. With a 3D overlay, it is possible to make the backside of the overlay non-flat. This allows the overlay to control the level of forces required to activate the sensor. For instance, a dome switch construction can be created, so that a minimum level of force is required to actually transmit forces through to the sensor (FIG. 111 (11100)-FIG. 112 (11200)).

Modular TPO Construction (11300)-(12000)

Figure 113:
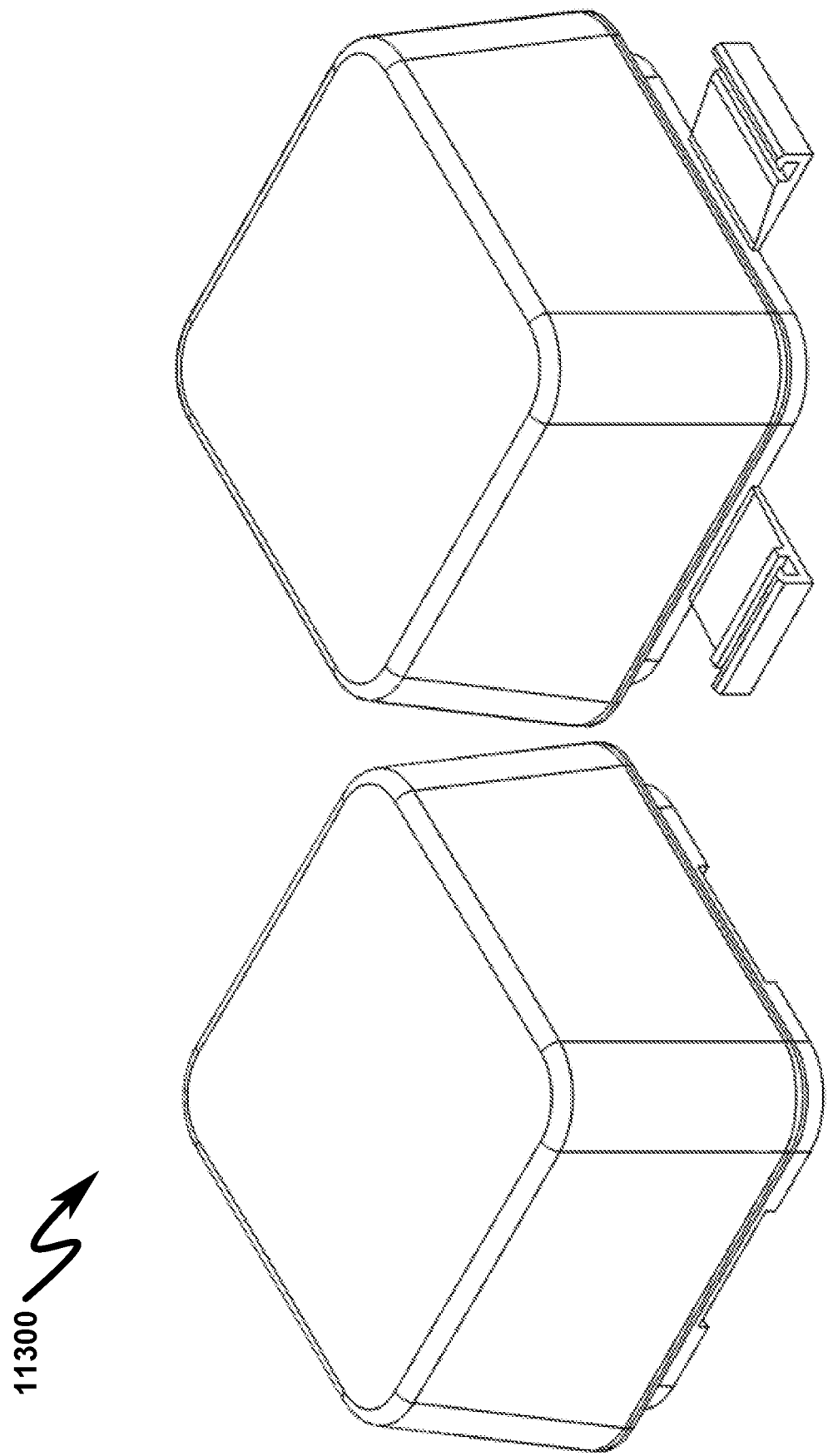
FIG. 113 illustrates top front right and top rear left perspective views of an exemplary TPO key structure incorporating modular construction features.
Figure 114:
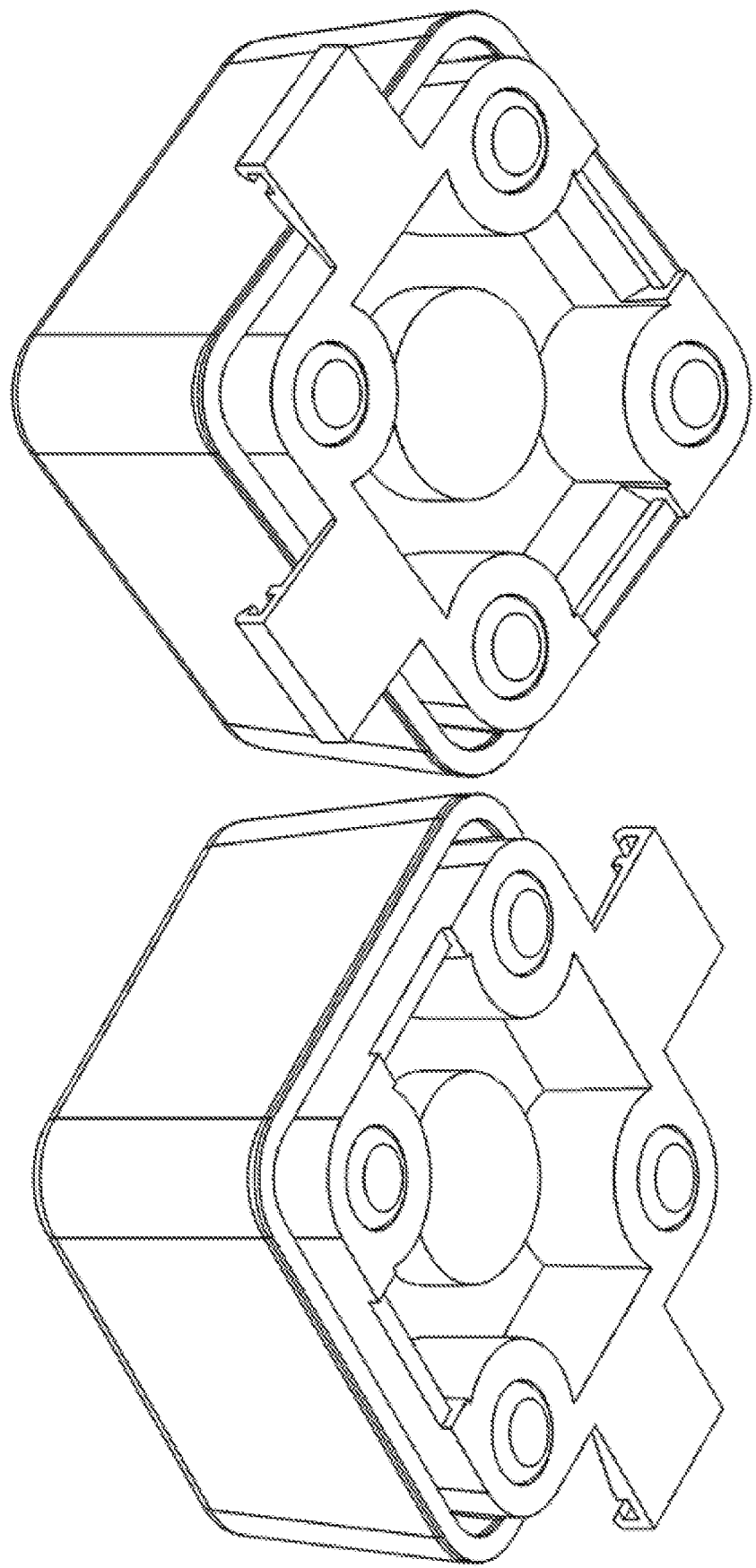
FIG. 114 illustrates bottom front right and bottom rear left perspective views of an exemplary TPO key structure incorporating modular construction features.
Figure 115:
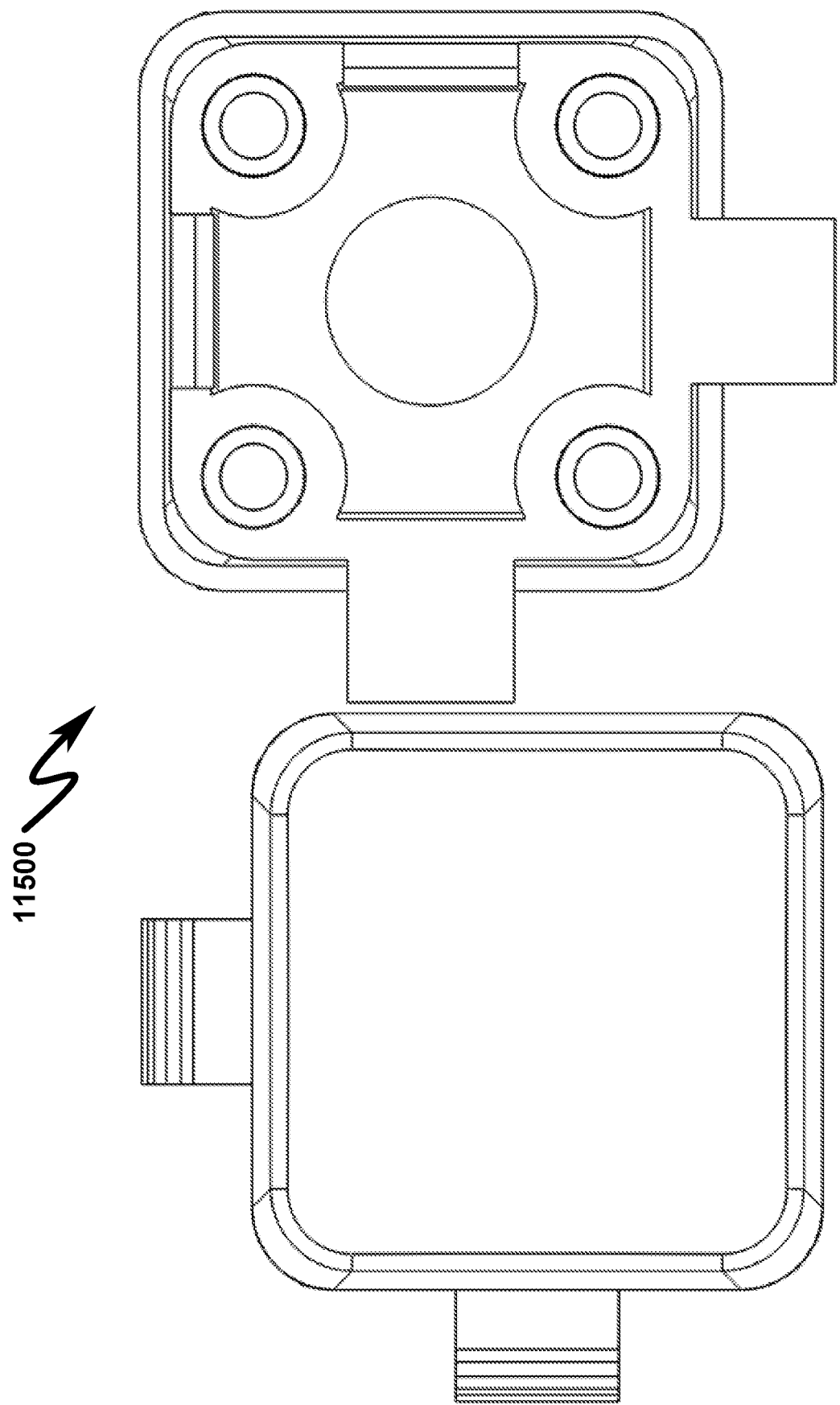
FIG. 115 illustrates top and bottom views of an exemplary TPO key structure incorporating modular construction features.
Figure 120:
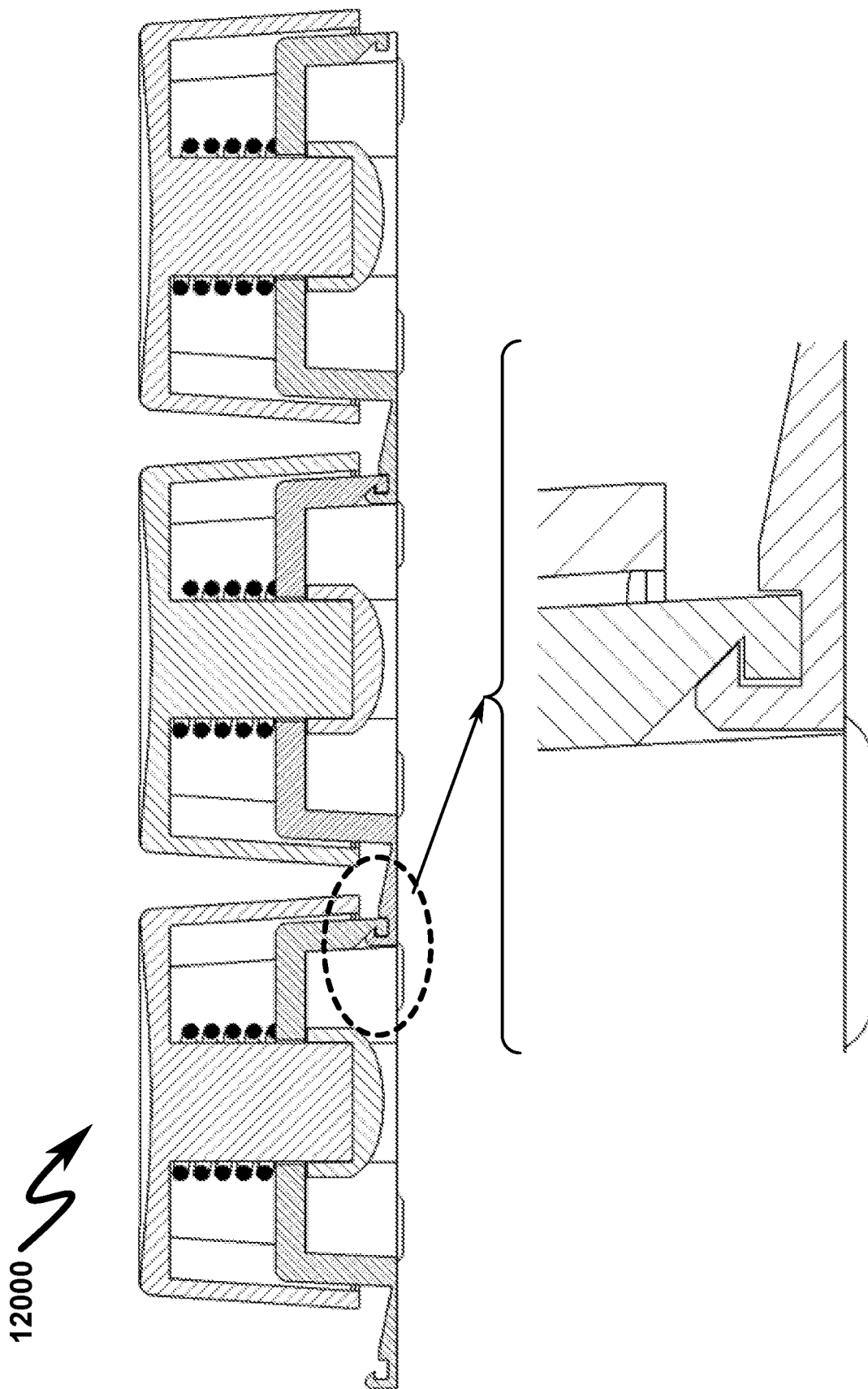

The present invention may in some preferred embodiments implement a TPO in modular construction form as generally depicted in FIG. 113 (11300)-FIG. 120 (12000). These exemplary embodiments incorporate symmetric latch-and-clasp mechanisms along the X-axis and Y-axis of the TPO structure. These symmetric latch-and-clasp structures allow a variety of TPO structures to be mated and placed on a TSA to form an integrated tactile touch sensor interface to the TSA.

Figure 116:
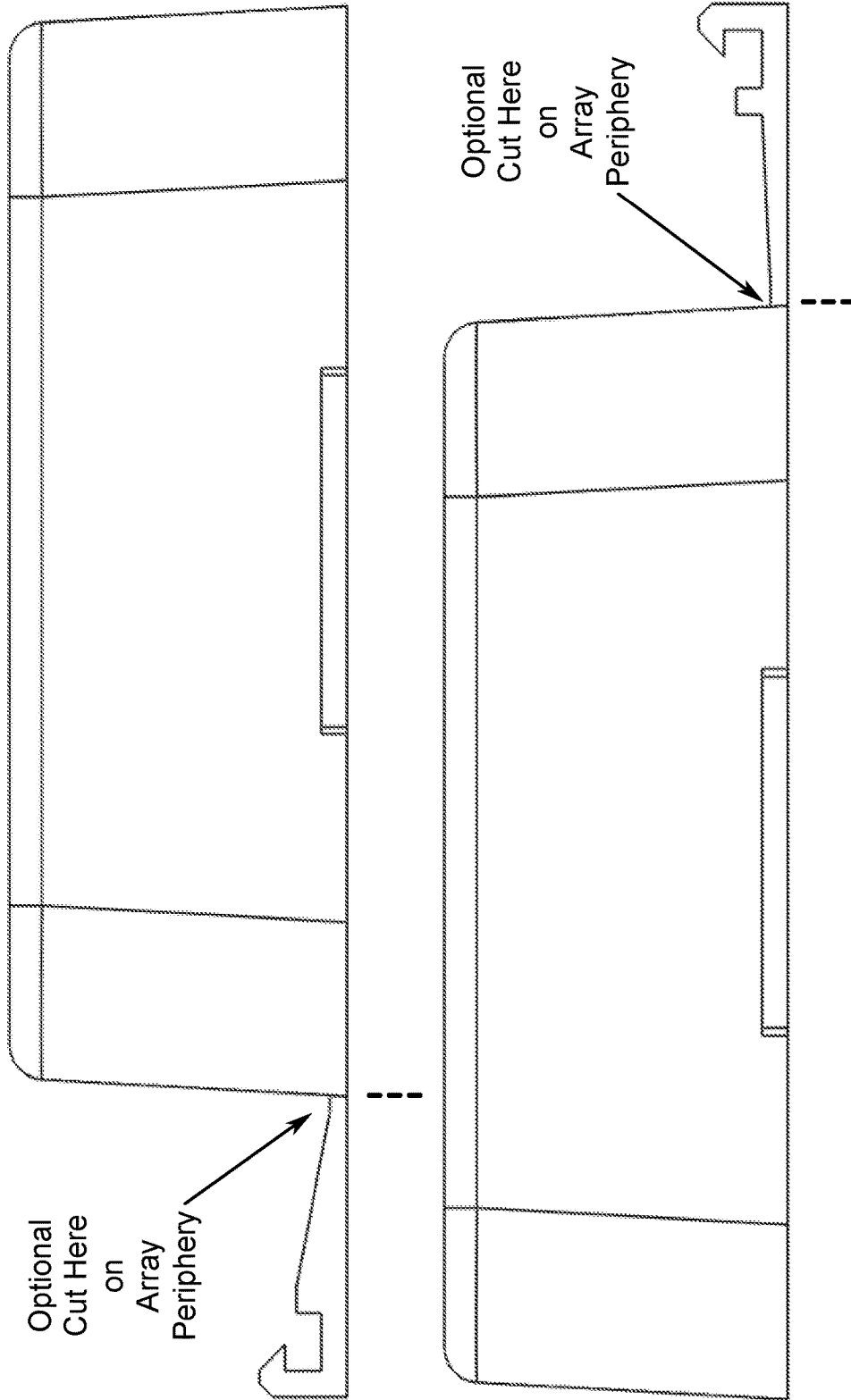
FIG. 116 illustrates front and side views of an exemplary TPO key structure incorporating modular construction features.
Figure 117:
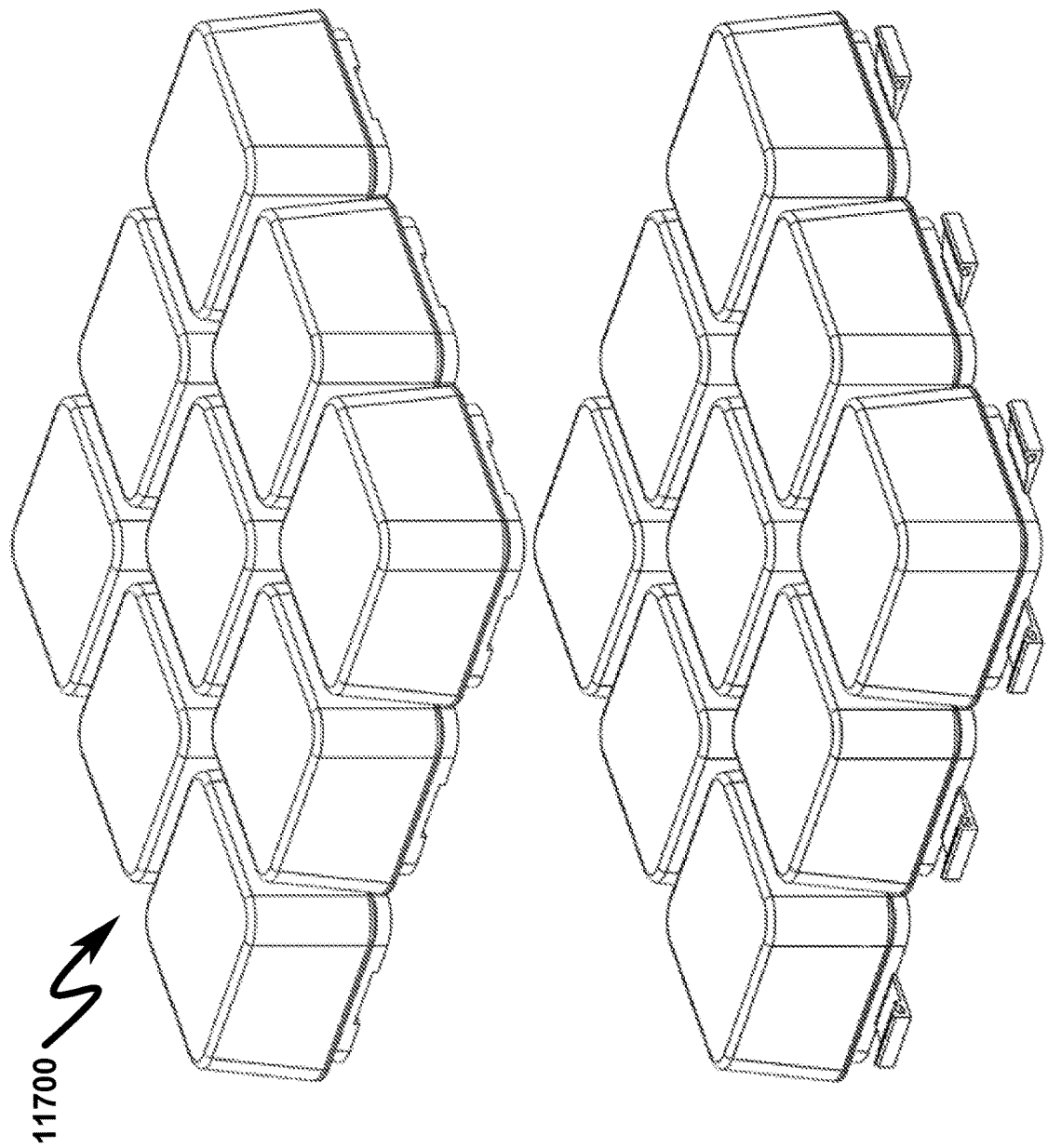
FIG. 117 illustrates top front right and top rear left perspective views of an exemplary assembled TPO keyboard structure incorporating modular construction features.
Figure 118:
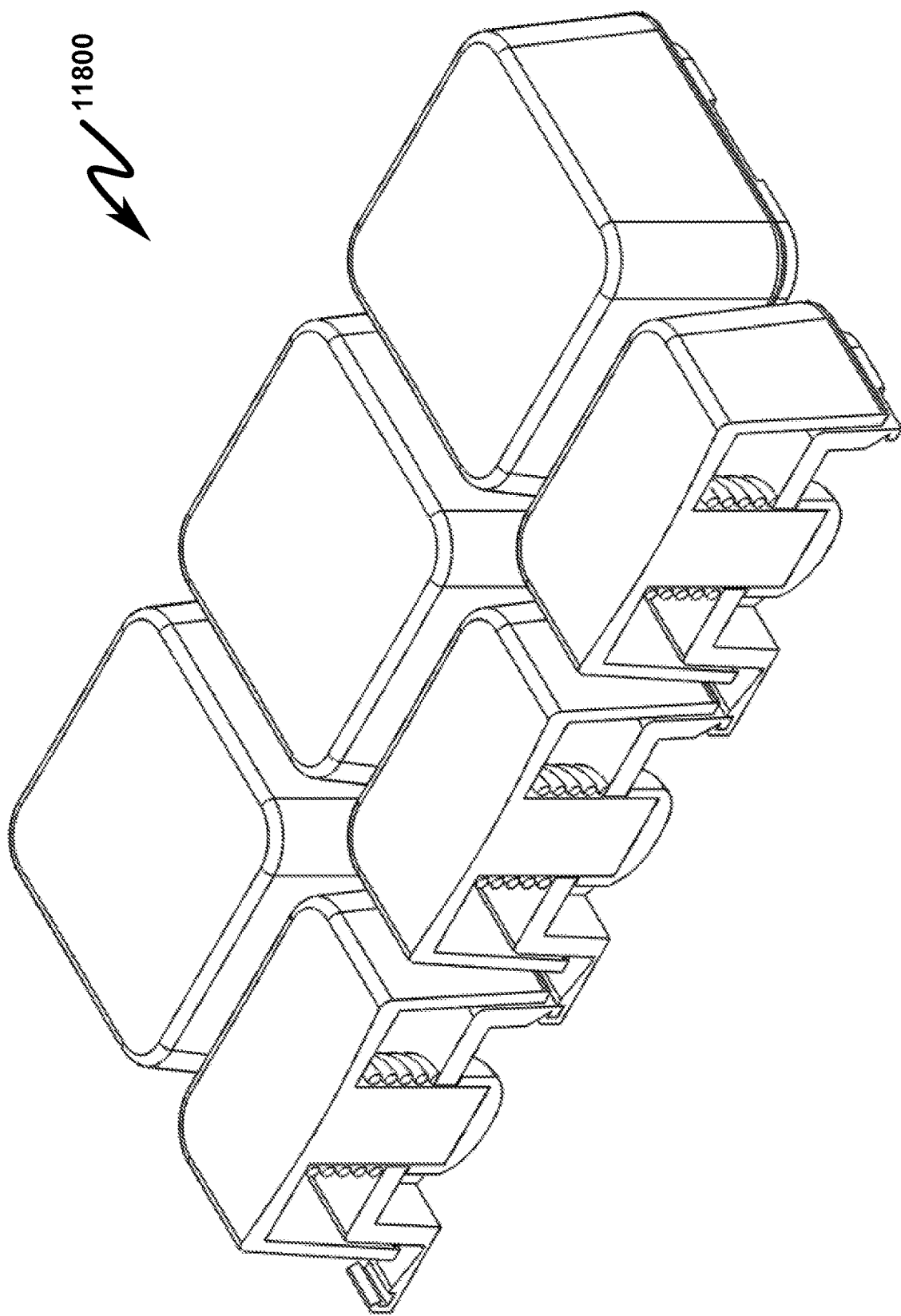
FIG. 118 illustrates a top front side sectional perspective view of an exemplary assembled TPO keyboard structure incorporating modular construction features.
Figure 119:
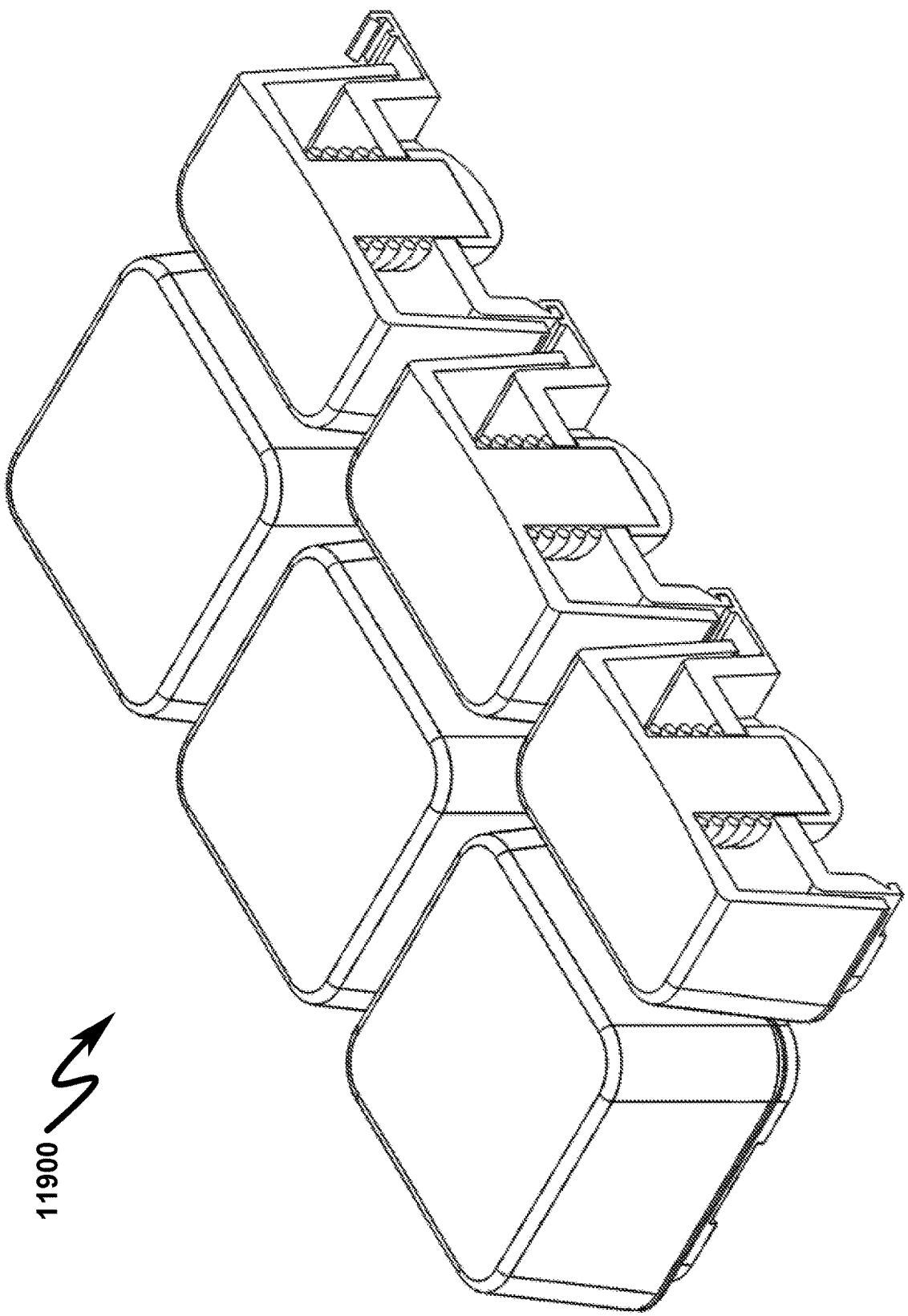

As depicted in the single key diagrams of FIG. 113 (11300)-FIG. 116 (11600), each TPO structure incorporates horizontal/vertical latch-and-clasp male portions that mate with corresponding female portions in adjacent TPO structures. As indicated in FIG. 116 (11600), these latch-and-clasp male portions may be trimmed or cut off at the peripheral edges of TPO arrays containing these structures for aesthetic purposes. When corresponding male and female latch-and-clasp portions are mated, a unified TPO structure may be formed in which a variety of TPO structures as defined here may be combined to form a singular interface to the TSA. A 3×3 example of this is provided in FIG. 117 (11700)-FIG. 120 (12000).

Auto-Identified Modular TPO Construction (12100)-(12800)

The present invention may in some preferred embodiments implement a TPO with integrated automatic identification mechanisms as generally depicted in FIG. 121 (12100)-FIG. 128 (12800). These exemplary embodiments incorporate TPO identifier (TPI) bit-based identification codes on the bottom of each TPO that is sensed by the TSA when the TPO is magnetically attached to the surface of the TSA. In this manner, software interrogating the TSA may look for particular pressure bit sequences on the surface of the TSA and automatically identify the type of TPO located at that particular TSA position. This automatic TPO identification may then load appropriate software drivers and/or application software automatically without the need for user intervention.

While the exemplary TPO structures depicted in FIG. 121 (12100)-FIG. 128 (12800) utilize the modular TPO connection features described above, the automatic identification of TPO structures based on pressure sensing by the TSA of encoded bit patterns does not require this feature. However, it is thought that the embodiment in these figures represents a preferred embodiment of the present invention.

Exemplary TSA+TPO Assembled Keyboard (12600)-(12700)

Figure 126:
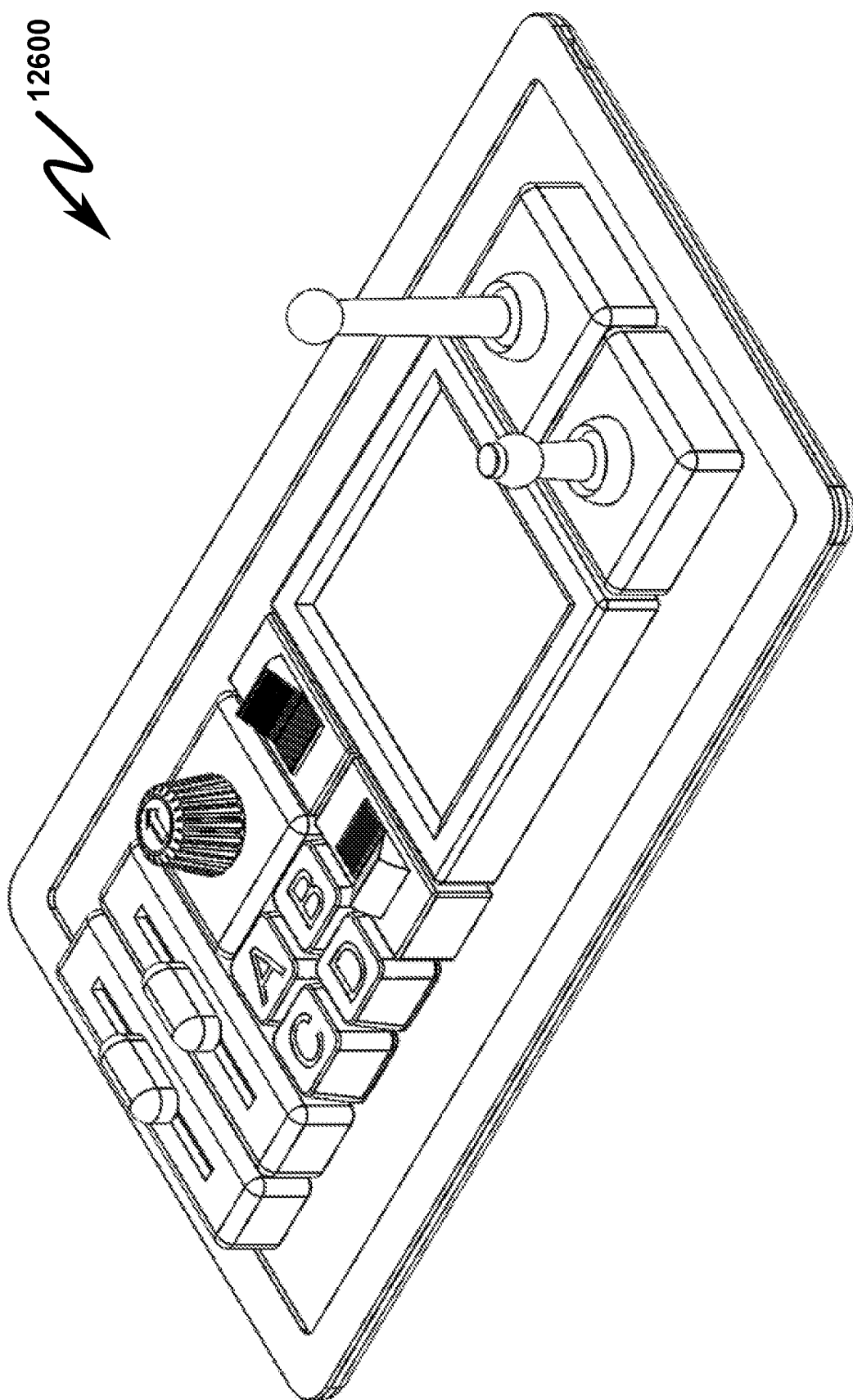
Figure 127:
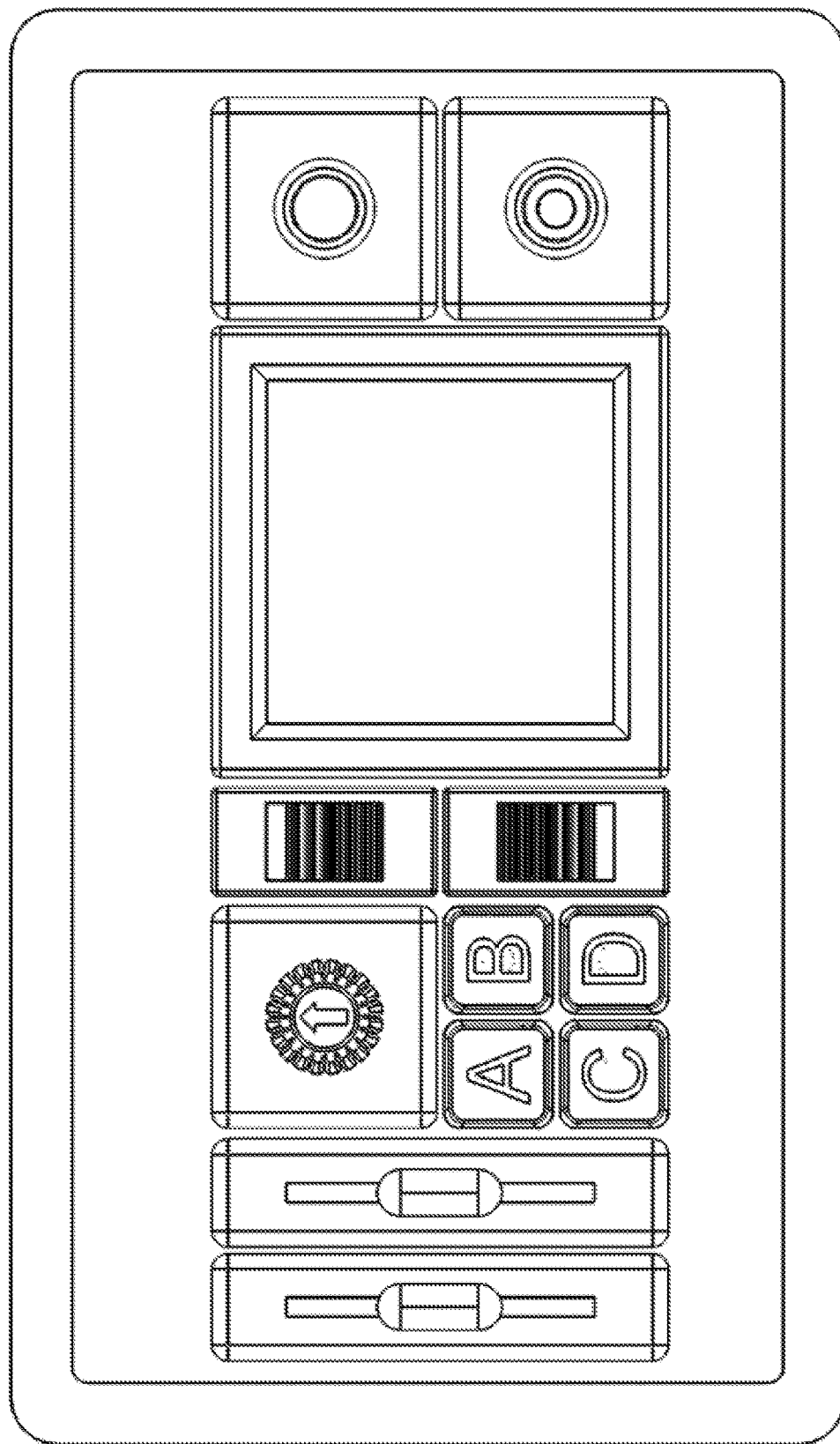

As generally depicted in FIG. 126 (12600)-FIG. 127 (12700), the techniques described above may be used to assemble keyboards of arbitrary configuration by simply placing the TPO elements on the pressure sensitive TSA surface. When combined with the automatic identification feature, the TPO arrays present a powerful method to generate custom keyboard structures by simply mating an arbitrary number of different TPO overlays in a user-defined array pattern. Placing the TPO array on the TSA then automatically configures the software with the appropriate application software and drivers necessary to properly interpret each individual TPO overlay based on the TPI identification read by the TPD within the TSA.

Exemplary TSA+TPO Identification Method (12800)

The above-described automatic TPO identification indicia may in many invention embodiments be associated with an automatic TPO identification method. As generally depicted in the flowchart of FIG. 128 (12800), an exemplary present invention automatic TPO identification method can be generally described as comprising the steps of:
(1) Encoding a TPO overlay ID as a TPO bit-based physical identifier (TPI) on bottom surface of a TPO (12801);
(2) Applying the auto-identified TPO to a TSA surface (12802);
(3) Scanning the surface of the TSA to locate pressures points associated with the auto-identified TPO (12803);
(4) Determining if new TPO pressure points have been detected on the TSA surface, and if not, proceeding to step (10) (12804);
(5) Locating a TPI pressure registration pattern (TRP) indicating auto-ID field on the surface of the TSA (12805);
(6) Locating the TPO ID field (TPI) using the location of identified TRP registration pattern (12806);
(7) Decoding the located TPI field on the surface of the TSA from binary pressure points within the TPI to a TPI index (TPX) value (12807);
(8) Retrieving TPO support software for the currently detected TPO from an application/driver software database (12811) with TPX index as the lookup indexing key (12808);
(9) Presenting a software application/user interface to a user using TPX-indexed software loaded from the application/driver software database (12811) (12809);
(10) Interpreting TSA inputs from TPOs placed on the surface of the TSA based on existing or dynamically loaded software drivers/applications loaded from the application/driver software database (12811) and proceeding to step (3) (12810).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Preferred Embodiment System Summary

The present invention preferred exemplary system embodiment anticipates a wide variety of variations in the basic theme of construction, but can be generalized as a tactile touch sensor system comprising:
(a) touch sensor array (TSA); and
(b) TSA pressure overlay (TPO);
wherein:
the TSA comprises a pressure-sensitive surface (PSS) incorporating row-column force detection;
the TPO comprises a pressure contact surface (PCS);
the TPO overlays the PSS;
the TPO is configured to transmit pressure to the PSS via the PCS;
the TSA is configured to determine if the TPO is present on the PSS;
the TSA comprises a TPO detector (TPD) configured to detect an identification (TPI) of the TPO; and
the TSA is configured to interpret the transmitted pressure based on the detected TPI of the TPO.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a tactile touch sensor method comprising:
(1) Encoding an overlay identification (TPI) within a touch sensor physical overlay (TPO) incorporating a pressure contact surface (PCS) to uniquely identify a function of the TPO;
(2) Overlaying the TPO to a surface of a touch sensor array (TSA) comprising a pressure-sensitive surface (PSS) incorporating row-column force detection to allow the transmission of pressure to the PSS via the PCS;
(3) Reading the TPI with a TPO detector (TPD);
(4) Interrogating the TPI via a hardware computer interface (HCI) using a user computing device (UCD);
(5) Loading an application software driver (ASD) on the UCD based on the TPI read by the TPD;
(6) Presenting a software application/interface to a user based on the TPI read by the TPD;
(7) Interpreting inputs from the TSA inputs through the HCI based on the TPI read by the TPD; and
(8) Proceeding to step (6) if the ISO has not been modified or replaced and proceeding to step (2) if the TPD has detected a change in the TPO placed on the TSA.

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein at least a portion of the TPO is transparent.

An embodiment wherein at least a portion of the TPO is translucent.

An embodiment wherein the TPO is formed via a manufacturing process selected from a group consisting of: injection molding; 3D printing; embossing; laser-cutting from blank overlays; and laser-cutting from stock overlay materials.

An embodiment wherein the TPO comprises material selected from a group consisting of: Rogers Corporation PORON® brand microcellular urethane; urethane; urethane foam; silicone; silicone foam; neoprene foam; rubber; thermoplastic polyurethane (TPU); and transparent overlay material retaining a printed sheet of paper.

An embodiment wherein the TPO comprises a flexible overlay.

An embodiment wherein the TPO comprises a flexible overlay comprising a textured surface.

An embodiment wherein the TPO comprises a flexible overlay comprising a key/button feature selected from a group consisting of: key/button with surface texturing; key/button with edge indentations; key/button with edge ridges; key/button with raised overlay; key/button with depressed/lowered overlay; key/button with raised bump indicia; key/button with domed overlay; and key/button with domed overlay and key caps.

An embodiment wherein the TPO comprises a rigid mechanical overlay.

An embodiment wherein the TPO comprises a keyboard selected from a group consisting of: QWERTY keyboard; DVORAK keyboard; court-stenographer keyboard; numeric keypad keyboard; piano keyboard; musical instrument keyboard; and musical sampler player keyboard.

An embodiment wherein the TPO is configured to exert a unique force profile when contacting the TSA.

An embodiment wherein the TPO further comprises a radio frequency identification (RFID) tag incorporating the TPI.

An embodiment wherein the TPO further comprises an optical TPI readable by the TPD, the optical TPI selected from a group consisting of: bar code; QR code; and text.

An embodiment wherein the TPO is attached to the TSA via the use of one or more magnets.

An embodiment wherein the TPO is attached to the TSA using a mechanism selected from a group consisting of: peripheral edge insertion; side edge insertion; magnetic bezel; and hinged bezel.

An embodiment wherein the TPI is determined by the TPD via the detection of magnets positioned in the TPO.

An embodiment wherein the TPI is determined by the TPD via the detection of surface protrusions present within the PCS.

An embodiment wherein the TPI is determined by the TPD via the presence of a radio frequency identification (RFID) tag in the TPO.

An embodiment wherein the TPO comprises a physical pressure generation device selected from a group consisting of: slider; knob; toggle switch; pushbutton switch; joystick; joystick/pushbutton combination; and mouse/puck.

An embodiment wherein the TPO comprises a mouse/puck for which position, rotation, and/or differential tilt pressure applied by the mouse/puck to the PSS is sensed by the TSA.

An embodiment wherein the TPO comprises a mouse/puck further comprising a mouse/puck shell is mated to a replaceable contact surface plate.

An embodiment wherein the TPD comprises a detector selected from a group consisting of: magnetometer; radio frequency identification (RFID) tag reader; radio frequency identification (RFID) tag array reader; camera; optical sensor; capacitance sensor; inductive sensor; and conductance sensor.

An embodiment wherein the TPO further comprises conductive electrodes configured to present a predetermined capacitance profile to a selected region of the TSA.

An embodiment wherein the TPO further comprises conductive electrodes configured to present a predetermined conductance profile to a selected region of the TSA.

An embodiment wherein the TPO further comprises conductive electrodes configured to present a predetermined inductance profile to a selected region of the TSA.

An embodiment wherein the TPO comprises symmetric latch-and-clasp mechanisms along an X-axis and Y-axis of the TPO to permit formation of modular combinations of a plurality of TPO structures.

An embodiment wherein the TSA further comprises a hardware computer interface (HCI) configured to interact with a user computing device (UCD) to automatically load application software driver (ASD) on the UCD in response to detection by the TPD of the TPI associated with the TPO.

An embodiment wherein the TPO further comprises a programmable deformable membrane that is activated from a deformation actuator selected from a group consisting of: piezo-electric element; pneumatic element; and heating element.

An embodiment wherein the TPO is configured to accept side illumination from a light source within the TSA.

An embodiment wherein the TPO is configured to collect electrical energy via the use of a power harvesting coil.

One skilled in the art will recognize that other embodiments are possible based on combinations of elements taught within the above invention description.

GENERALIZED COMPUTER USABLE MEDIUM

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks, hard drives, and USB thumb drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710, 578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A tactile touch sensor (TTS) system and method allowing physical augmentation of a high-resolution touch sensor array (TSA) has been disclosed. Physical augmentation is accomplished using a TSA physical overlay (TPO) placed on top of the TSA. The TPO is constructed to transmit forces to the underlying TSA. Force transmission is accomplished by either using a flexible overlay or with a rigid mechanical overlay that transmits user forces exerted on the overlay to the underlying TSA. Incorporation of TPO identifiers (TPI) within the TPO permits identification of the TPO by a TPO detector (TPD) allowing operational characteristics of the TSA to be automatically reconfigured to conform to the currently applied TPO structure by a user computing device (UCD). The UCD may be configured to automatically load an appropriate application software driver (ASD) in response to a TPI read by the TPD from the currently applied TPO.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

The invention claimed is:

1. A tactile touch sensor system comprising:
   an overlay associated with a functionality and capable of receiving a first force;
   an identifier associated with the overlay;
   a touch sensor array coupled to the overlay and comprising a first force sensing element and a second force sensing element configured to detect the first force; and wherein
   the overlay is capable of transmitting a first portion associated with the first force to the first element and a second portion associated with the first force to the second element, wherein the first portion and the second portion are unequal; and
   the touch sensor array generates a first touch data based on the force.

2. The tactile touch sensor system of claim 1, wherein the first touch data comprises an input for the functionality.

3. The tactile touch sensor system of claim 1, wherein the functionality is an application program.

4. The tactile touch sensor system of claim 1, wherein the tactile touch sensor system is configured for the functionality based on the identifier.

5. The tactile touch sensor system of claim 1, wherein the overlay includes an indicator associated with the identifier.

6. The tactile touch sensor system of claim 1, wherein the [identifier] comprises one of a group consisting of a magnet, a radio frequency identification (RFID) tag, a dot pattern, a raised indicia, an antenna coupled to a microcontroller, an optical indicia, a shorting bar, a conductive electrode, and a conductive bar.

7. The tactile touch sensor system of claim 1, wherein the overlay is detachably coupled to the touch sensor array.

8. The tactile touch sensor system of claim 1, wherein the touch sensor array is capable of generating a second touch data based on a second force received on the overlay in a same user input as the first force.

9. A method for operating a tactile touch sensor system comprising:
   coupling an overlay associated with a functionality to a touch sensor array;
   associating an identifier with the overlay;
   receiving a first force on the overlay;
   transmitting a first force from the overlay to the touch sensor array;
   detecting a first magnitude of a first portion of the first force applied at a first portion of the touch area;
   detecting a second magnitude of a second portion of the first force applied at a second portion of the touch area; and
   generating a first touch data based on the first force;
   wherein the first portion and the second portion are unequal.

10. The method of claim 9, wherein the first touch data comprises an input for the functionality.

11. The method of claim 9, wherein the functionality is an application program.

12. The method of claim 9, further comprising configuring the tactile touch sensor system for the functionality based on the identifier.

13. The method of claim 9, wherein the overlay includes an indicator associated with the identifier.

14. The method of claim 9, wherein the identifier comprises one of a group consisting of a magnet, a radio frequency identification (RFID) tag, a dot pattern, a raised indicia, an antenna coupled to a microcontroller, an optical indicia, a shorting bar, a conductive electrode, and a conductive bar.

15. The method of claim 9, wherein the overlay is detachably coupled to the touch sensor array.

16. The method of claim 9, further comprising generating a second touch data based on a second force received on the overlay in a same user input as the first force.

17. An overlay comprising:
   a first contact location for receiving a first force;
   a second contact location for transmitting the first force to a touch sensor array; and
   means for indicating a functionality associated with the overlay; wherein,
   the touch sensor array comprises a first force sensing element configured to detect a first portion of the first force and a second force sensing element configured to detect a second portion of the first force; and
   the first portion and the second portion are unequal.

18. The overlay of claim 17, wherein the functionality is an application program.

19. The overlay of claim 17, wherein the means for indicating is associated with an identifier.

20. The overlay of claim 17, wherein the means for indicating comprises one of a group consisting of a magnet, a radio frequency identification (RFID) tag, a dot pattern, a raised indicia, an antenna coupled to a microcontroller, an optical indicia, a shorting bar, a conductive electrode, and a conductive bar.

* * * * *